United States Patent
Hunter, Jr.

(10) Patent No.: US 10,770,860 B2
(45) Date of Patent: Sep. 8, 2020

(54) LOOKTHROUGH COMPRESSION ARRANGEMENT

(71) Applicant: INNOVEN ENERGY LLC, Colorado Springs, CO (US)

(72) Inventor: Robert O. Hunter, Jr., Colorado Springs, CO (US)

(*) Notice: Subject to any disclaimer, the term of this patent is extended or adjusted under 35 U.S.C. 154(b) by 460 days.

(21) Appl. No.: 15/788,429

(22) Filed: Oct. 19, 2017

(65) Prior Publication Data
US 2018/0123314 A1    May 3, 2018

Related U.S. Application Data

(60) Provisional application No. 62/496,885, filed on Oct. 31, 2016.

(51) Int. Cl.
*H01S 3/30* (2006.01)
*G21B 1/03* (2006.01)
(Continued)

(52) U.S. Cl.
CPC ............. *H01S 3/305* (2013.01); *G21B 1/03* (2013.01); *H01S 3/0057* (2013.01);
(Continued)

(58) Field of Classification Search
CPC ...... H01S 3/305; H01S 3/0057; H01S 3/2391; H01S 3/2316; Y02E 30/14
See application file for complete search history.

(56) References Cited

U.S. PATENT DOCUMENTS

| | | | | | |
|---|---|---|---|---|---|
| 5,033,051 | A | * | 7/1991 | Werner | H01S 3/305 359/327 |
| 5,062,112 | A | * | 10/1991 | Buchman | H01S 3/305 359/327 |
| 2018/0159290 | A1 | | 6/2018 | Hunter, Jr. | |

OTHER PUBLICATIONS

Shaw et al. "Ultrahigh-brightness KrF laser system for fast ignition studies", Fusion Engineering and Design vol. 44 (1999) 209-214. (Year: 1999).*

(Continued)

*Primary Examiner* — Eric L Bolda

(57) ABSTRACT

An apparatus and process for pumping laser media by an optical pump over a 10 nanosecond period and thereafter time compressing the energy into an extraction pulse and focusing onto a target with a final 1 nanosecond irradiation time are disclosed. The exciting pump pulses are directed into a lookthrough compression arrangement wherein they energize a stimulated scattering process in low pressure (about 1 atmosphere) gaseous media and impinge in an off axis backward geometry. The extraction pulse is formed and directed towards the target with the appropriate information (color, phase, desired irradiance pattern) impressed on it at relatively low energy by manipulation with conventional, solid material optical elements. Once formed, it traverses the gaseous media, is amplified, and proceeds through a vacuum transition section and onto the target. After the injection of the extraction pulse into the lookthrough compression arrangement, it is amplified in the gaseous media by conversion of the pump energy, coupled through the scattering process. The media and the pump and extraction pulses are tailored to give high energy gain to the input optical pulse, high output fluence, good beam quality (high fidelity amplification to the desired temporal and spatial shape), and time compression. Once injected into the entrance to the first section by the material elements, the extraction pulse proceeds through shutter areas that separate different media (Continued)

regions and encounter no further solid material optical elements as it travels to the target. The focus on the target is impressed before amplification and time compression from the pump pulses and results in a very high brightness irradiance of the target. The desired spatial pattern of irradiance on the target is likewise formed with material elements and then imaged onto the target. Fluences some 2-3 orders of magnitude above those available under the conventional art may be thus obtained with an output brightness better by some six orders of magnitude.

44 Claims, 51 Drawing Sheets

(51) Int. Cl.
 H01S 3/23 (2006.01)
 H01S 3/00 (2006.01)
(52) U.S. Cl.
 CPC ............ *H01S 3/2391* (2013.01); *H01S 3/005* (2013.01); *H01S 3/0071* (2013.01); *H01S 3/2316* (2013.01); *H01S 2301/02* (2013.01); *Y02E 30/14* (2013.01)

(56) References Cited

OTHER PUBLICATIONS

Averbakh, V. et al., Stimulated Molecular Scattering of Light in Gases at Different Pressures, Soviet Journal of Quantum Electronics, vol. 5, No. 10, pp. 1201-1206, 1976.
Campbell, J. et al., Status of the National Ignition Facility: An Optics Perspective, Lawrence Livermore National Laboratory, OSA/OIC, 2004.
Sawicki, R., The National Ignition Facility: Laser System, Beam Line Design and Construction, in M.A. Lane and C.R. Wuest (Eds.), Optical Engineering at the Livermore National Laboratory II: The National Ignition Facility, Proceedings of SPIE, vol. 5341, pp. 43-53, 2004.
Campbell, J. et al., NIF Optical Materials and Fabrication Technologies: An Overview, in M.A. Lane and C.R. Wuest (Eds.), Optical Engineering at the Lawrence Livermore National Laboratory II: The National Ignition Facility, Proceedings of SPIE, vol. 5341, pp. 84-101, 2004.
Hunter, A. et al., Single Pulse Excimer Ground Based Laser ASAT Concept Definition Study, Thermo Electron Technologies Corporation, Oct. 25, 1989, TTC-1588-4, 1989.
Turcu, I. et al., Measurement of KrF Laser Breakdown Threshold in Gases, Optics Communications, 134, 1997, pp. 66-68.
Ewing, J. et al., Optical Pulse Compressor Systems for Laser Fusion, IEEE Journal of Quantum Electronics, vol. QE-15, No. 5, pp. 368-379, May 1979.
Murray, J. et al., Raman Pulse Compression of Excimer Lasers for Application to Laser Fusion, IEEE Journal of Quantum Electronics, vol. QE-15, No. 5, pp. 342-368, May 1979.
Bloembergen, N. et al., Report to the American Physical Society of the Study Group on Science and Technology of Directed Energy Weapons, Review of Modem Physics, vol. 59, No. 3, Part II, pp. S1-S201, 1987.
Damzen, M. et al., Laser Pulse Compression by Stimulated Brillouin Scattering in Tapered Waveguides, IEEE Journal of Quantum Electronics, vol. QE-19, No. 1, pp. 7-14, 1983.
Reintjies, R. et al., Stimulated Raman and Brillouin Scattering, Handbook of Optics, vol. 4: Optical Properties of Materials, Nonlinear Optics, Quantum Optics, McGraw Hill, NY, Chapter 15, pp. 15.1-15.60, 2009.
Greytak, T. et al., Spectrum of Light Scattered from Thermal Fluctuations in Gases, Physical Review Letters, vol. 17, No. 4, pp. 179-182, 1966.

Yip, S. et al., Application of a Kinetic Model to Time-Dependent Density Correlations in Fluids, Physical Review, vol. 135, No. 5A, pp. A1241-A1247, 1964.
Bhatnagar, P. et al., A Model for Collision Processes in Gases I, Small Amplitude Processes in Charged and Neutral One-Component Systems, Physical Review, vol. 94, No. 3, pp. 511-525, 1954.
Soures, J., Solid-State Lasers for ICF, in Nuclear Fusion by Inertial Confinement: A Comprehensive Treatise, G. Velarde, Y. Ronen and J.M. Martinez-Val (Eds.), CRC Press Inc., Ch. 14, pp. 351-370, 1993.
Svelto, O., Principles of Lasers, 5th Ed., Springer, NY 2010.
Scott, A. et al., Gain and Noise Characteristics of a Brillouin Amplifier and their Dependence on the Spatial Structure of the Pump Beam, Journal of the Optical Society of America, vol. 7, No. 6, pp. 929-935, 1990.
Carman, R. et al., Theory of Stokes Pulse Shapes in Transient Stimulated Raman Scattering, Physical Review A, vol. 2, No. 1, pp. 60-72, 1970.
Averbakh, V. et al., Experimental Investigation of Stimulated Molecular Scattering in Nitrogen in the Pressure Range 1-4 atm, Soviet Journal of Quantum Electronics, vol. 9, No. 12, pp. 1574-1575, 1979.
Greytak, T., Doctoral Dissertation, Spectrum of Light Scattered from Thermal Fluctuations in Gases, Massachusetts Institute of Technology, Cambridge, MA, pp. 1-156, 1967.
Phelps, A., Theory of Growth of Ionization During Laser Breakdown, Physics of Quantum Electronics: Conference Proceedings, P.L. Kelly, B. Lax and P.E. Tannenwald (Eds.), McGraw Hill, NY, pp. 538-547, 1966.
Damzen, M. et al., Direct Measurement of the Acoustic Decay Times of Hypersonic Waves Generated by SBS, IEEE Journal of Quantum Electronics, vol. QE-23, No. 3, pp. 328-334, 1987.
Damzen, M. et al., High-Efficiency Laser Pulse Compression by Stimulated Brillouin Scattering, Optics Letters, vol. 8, No. 6, pp. 313-315, 1983.
Hagenlocker, E. et al., Effects of Phonon Lifetime on Stimulated Optical Scattering in Gases, the Physical Review, vol. 154, No. 2, pp. 226-233, 1967.
Maier, M. et al., Transient Threshold Power of Stimulated Brillouin Raman Scattering, Physics Letters, vol. 34A, No. 6, pp. 299-300, 1971.
Hagenlocker, E. et al., Stimulated Brillouin and Raman Scattering in Gases, Applied Physics Letters, vol. 7, No. 9, pp. 236-238, 1965.
Shaw, M. et al., Measurement of the Nonlinear Refractive Index of Air and Other Gases at 248 nm, Optics Communications, vol. 103, pp. 153-160, 1993.
Bishop, D. et al., Ab Initio Study of Third-Order Nonlinear Optical Properties of Helium, Physical Review A, vol. 37, No. 2, pp. 464-469, 1988.
Bliss, E. et al., Effects of Nonlinear Propagation on Laser Focusing Properties, IEEE Journal of Quantum Electronics, QE-12, No. 7, pp. 402-406, 1976.
Pasmanik, G., Self-Interaction of Incoherent Light Beams, Soviet Physics JETP, vol. 39, No. 2, pp. 234-238, 1974.
Partanen, J. et al., High-Power Forward Raman Amplifiers Employing Low-Pressure Gases in Light Guides: I. Theory and Applications, Journal of the Optical Society of America B, vol. 3, No. 10, pp. 1374-1389, 1986.
Goldhar, J. et al., Intensity Averaging and Four-Wave Mixing in Raman Amplifiers, IEEE Journal of Quantum Electronics, vol. QE-18, No. 3, pp. 399-409, 1982.
Hooker, C. et al., Novel Four-Wave Mixing Phenomenon in a Raman Amplifier, Physical Review Letters, vol. 74, No. 21, pp. 4197-4201, 1995.
Betin, A. et al., Conservation of Spatial Coherence of Stokes Beams Amplified in a Multimode Pumping Field, JETP Letters, vol. 23, No. 10, pp. 528-531, 1976.
Lindl, J. et al., The Physics Basis for Ignition Using Indirect Drive Targets on the National Ignition Facility, Physics of Plasmas, vol. 11, pp. 339-491, 2004.

(56) References Cited

OTHER PUBLICATIONS

Lindl, J., Development of the Indirect-Drive Approach to Inertial Confinement Fusion and the Target Physics Basics for Ignition and Gain, Physics of Plasmas, vol. 2, pp. 3933-4024, 1995.
Johnson, T. et al., Physics of the Krypton Fluoride Laser, Journal of Applied Physics, vol. 51, No. 5, pp. 2406-2420, 1980.
Wadt, W., The electronic States of Ne2+, Ar2+, Kr2+, and XE2+: II. Absorption Cross Sections for the 1(½)u 1(³⁄₂)g, 1(½)g, 2(½)g Transitions, Journal of Chemical Physics, vol. 73, No. 8, pp. 3915-3926, 1980.
May, A. et al., Collisional Narrowing of the Vibrational Raman Band of Nitrogen and Carbon Monoxide, Canadian Journal of Physics, pp. 2331-2335, 1970.
Carleton, K. et al., Detection of Nitrogen Rotational Distributions by Resonant 2+2 Multiphoton Ionization Through the a1Πg State, Chemical Physics Letters, vol. 115, No. 6, pp. 492-495, 1985.
Linford, G. et al., Design Descriptions of the Prometheus-L and -H Inertial Fusion Energy Drivers, Fusion Engineering and Design, 25, pp. 111-124, 1994.
Waganer, L., Innovation Leads the Way to Attractive Inertial Fusion Energy Reactors—Prometheus-L and Prometheus-H, Fusion Engineering and Design, 25, pp. 125-143, 1994.
Lehecka, T. et al., Production of High Energy, Uniform Focal Profiles with the Nike Laser, Optics Communications 117, 1995.
McRory, Jr., R., Laser-Driven ICF Experiments, Nuclear Fusion by Inertial Confinement: A Comprehensive Treatise, by G. Velarde, Y. Ronen and J.M. Martinez-Val (Eds.), CRC Press Inc., Boca Raton, FL, Ch. 22, pp. 555-596, 1993.
Matsushima, I. et al., Two-Dimensional Beam Smoothing by Broadband Random-Phase Irradiation, Optics Communications 120, pp. 299-302, 1995.

\* cited by examiner

Lookthrough Compression Arrangement with Multiple Section Fast Compression Stage

Pump Pulse Envelope Matching of Extraction Pulse to Backward Compression Section Forward ASE with Transient Cutoff The curves shown are on lines of constant Gain Exponent at the value indicated.

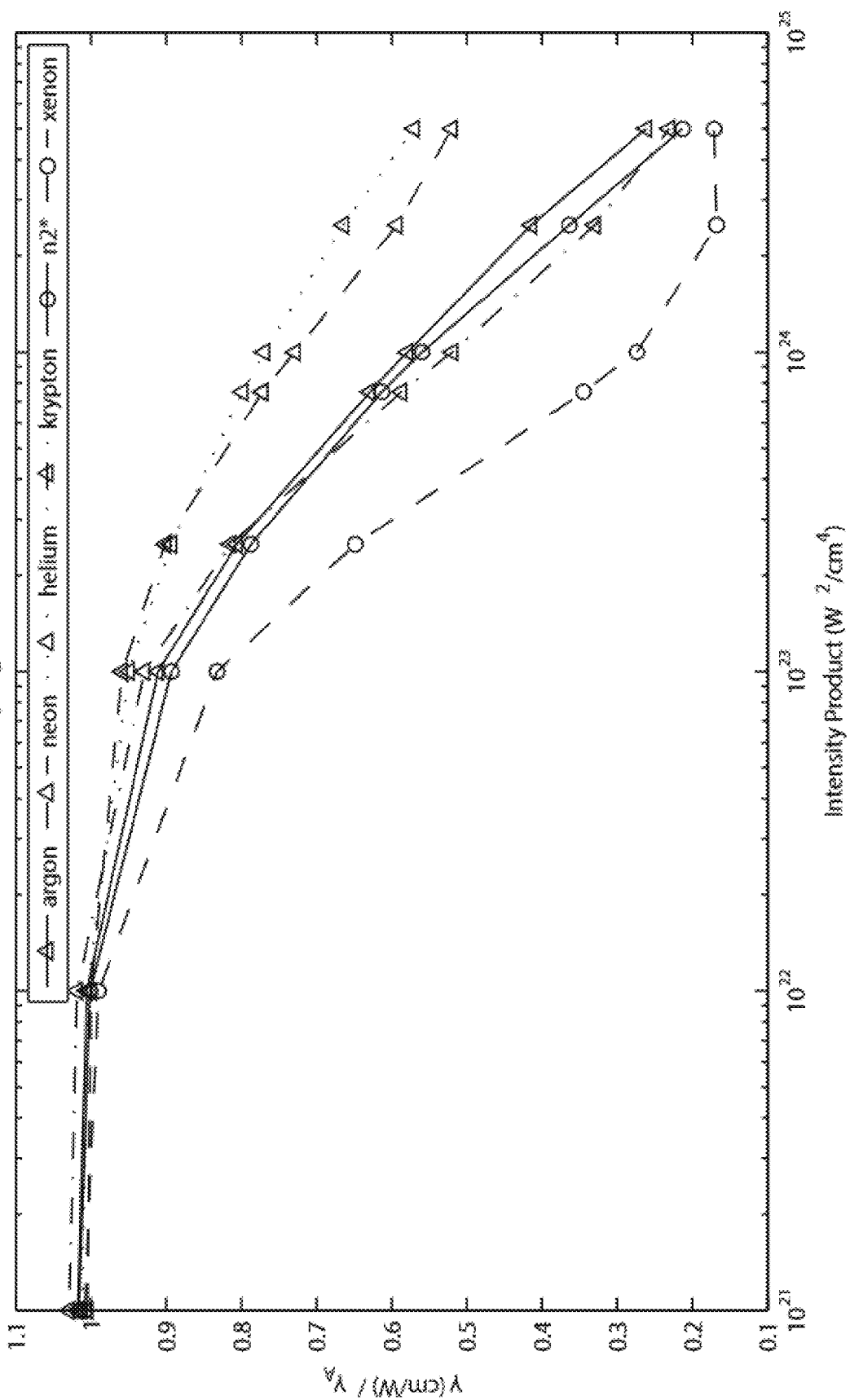

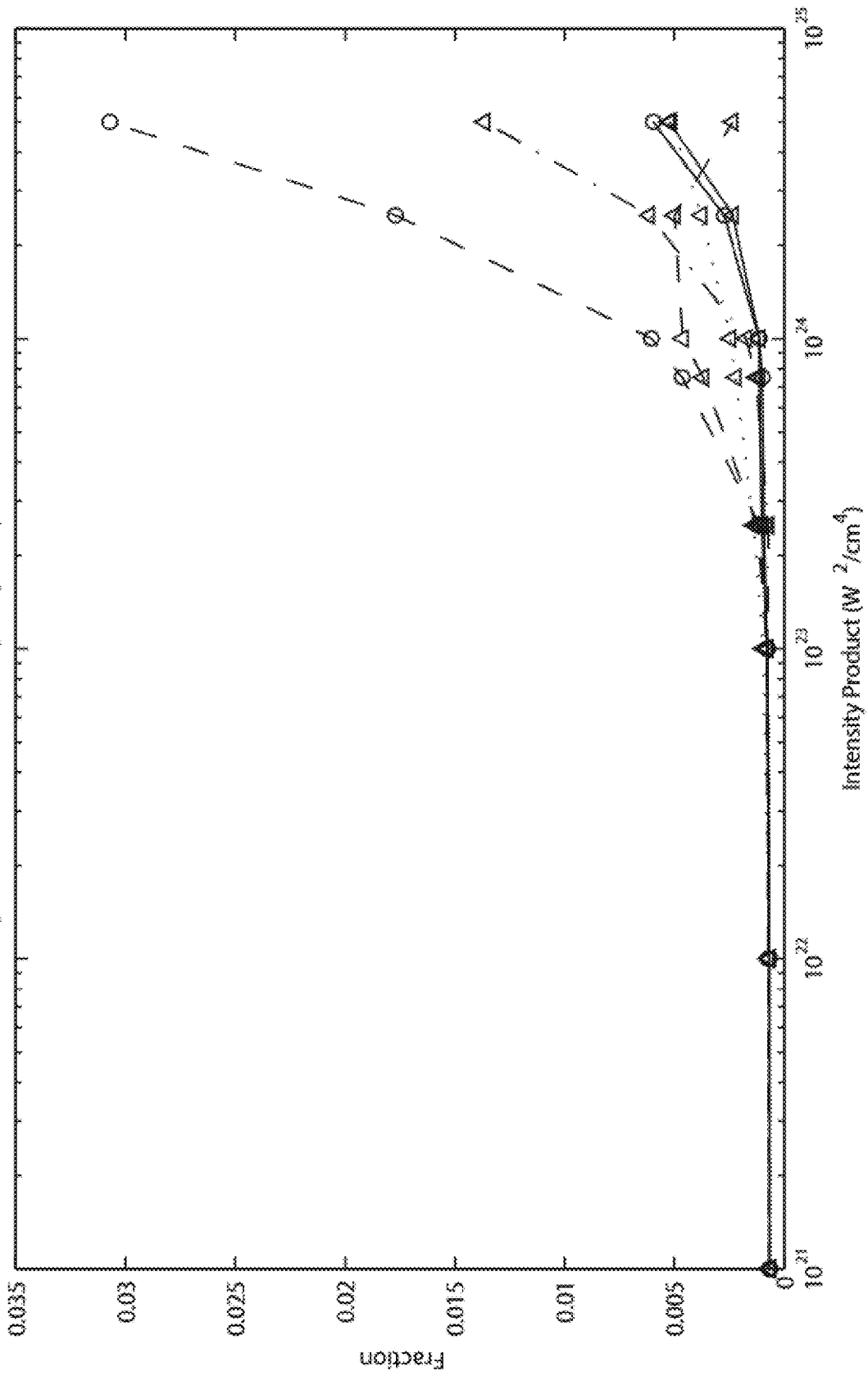

LCA with Two Section Fast Compression Stage

LCA with Two Section, Non Index Matched, Fast Compression Stage

LCA with a 3 Section Design

LCA with Single Section Fast Compression Stage

LCA with Variable Medium Coupling Parameter and Single Section Fast Compression Stage Continuously Graded Coupling Constant Stage ($\gamma_0$=2E-11  $l_p$=1E+11  $\alpha$=3)

$$\gamma(x)=1/((1/\gamma_0)+(lpx)/\alpha))$$

LCA with Index and/or Density Matching between Sections of the Fast Compression Stage LCA with Multisection Fast Compression Stage Tuned to Multiple Pump Colors LCA with Fast Compression Stage Amplifying Multiple Extraction Pulse Colors with Single Color Pump LCA with Fast Compression Section Producing Multiple Extraction Pulse Colors with Multiple Color Pump LCA Time Sequenced Extraction in Fast Compression Stage LCA with Segmented Fast Compression Section and Common Pump LCA with Segmented Fast Compression Stage and Separate Pumps LCA with Material Elements LCA with Adaptive Optics LCA with Brillouin Scattering Phase Conjunction Projection of Arbitrary Irradiance Patterns with LCA LCA with Zoom Section Matching Pump Pulse Envelope with Longitudinal Pump Segments Input Pump Object Phase Illumination Pattern to Produce Longitudinal Pump Segments Section Matching Pump Pulse Envelope with Transverse Pump Segments Object Plane Illumination Pattern to Produce Transverse Pump Segment Synchronization of Pump Pulse Segments for Matching to Forward Compression Geometry Production of Synchronization Pulses for Forward Compression Geometry LCA with Modulated Pump to reduce Speckle LCA with Temporally Modulated Pump and Extraction Beams Input and Output Extraction Pulse Shapes for Two Extraction Pulse Shapes Lookthrough Backward Optical Compressor Stage with
Multiple Sections and Temporarily Modulated Pump and Extraction Beams LCA with a Large Direct Compression Ratio LCA Orientation with Respect to Gravity

Layout for Inline Direct Compression and Fast Compression Cells

Method of Producing Lookthrough Series Compression Stages

Arrangement for Direct Compression with Pump Beam Generation in Extraction Path Pulse In Line Compression Cell Opposed Pumping Geometries with Direct Compression Stage and Pumps with Fast Compression Stage on the Other Side of Target Opposed Pumping Geometries with Target Between Direct Compression Stage and RAC Pump Stage Angularly Separated Outputs from a Direct Compression Stage for Packaging with Material Output Optics Extraction Pulse Tracking with One Pump Beam Extraction Pulse Tracking with Two Pump Beams Method of Producing Extraction Pulse Tracking

US 10,770,860 B2

LOOKTHROUGH COMPRESSION ARRANGEMENT

RELATED APPLICATION

This application claims priority to U.S. provisional patent application Ser. No. 62/496,885 titled "Lookthrough Compression Arrangement," filed on Oct. 31, 2016, and hereby incorporated by reference.

BACKGROUND

The presence of material optical elements (such as lenses, windows, prisms, and other elements used for beam handling and focusing) is a limitation on the fluence produced by a laser output. Material optical elements are often positioned after the final amplification stage of the laser and are exposed to the output fluence of the laser. If the output fluence exceeds the damage threshold of a material optical element, the element is damaged and performance of the laser is compromised. Also, the beam quality and, hence, focusability of a laser beam is limited by phenomena such as optical damage and nonlinear index growth in material optical elements. Limitations on output fluence and focusability imposed by material optical elements are detrimental to the use of lasers as drivers for inertial confinement fusion. The cost and commercial feasibility of laser-driven ICF is directly related to these constraints as well.

In laser-driven ICF systems, the laser is based on a solid state energy storage medium (e.g. $Nd^{3+}$:glass). Energy is stored by using a low-energy input pulse to pump the solid state energy storage medium to a long-lived excited state and subsequently extracting energy in the form of a high-energy pulse with short duration. The pumping and extraction processes dictate the staging requirements for the amplification of the low energy input pulse to a high energy output pulse. The staging requirement often necessitate variable aperture sizes in different amplifier sections and/or regenerative designs with attendant complexity and beam quality limitations. In solid state energy storage lasers, intermediate spatial filtering may be utilized to suppress nonlinear growth in order to limit overall phase distortion and intensity fluctuations. The fundamental wavelength of many high energy solid state energy storage media is in the infrared (e.g. 1064 nm). Infrared wavelengths are suboptimal for the targets most commonly used in ICF. Wavelengths in the UV are preferred. As a result, additional material optical elements for frequency doubling or tripling are typically required when using solid state energy storage media in ICF applications. Such optics are also susceptible to damage when exposed to laser pulses having high power and impose further limitations on the cost and performance of ICF systems.

SUMMARY

One aspect presented herein describes optical systems in which a low distortion amplifying medium is placed after the last solid material element. The optical systems provide better focusability and enable higher fluence of the output beam. In addition, an input pattern may then be reproduced at the output focus with good fidelity. In some embodiments, the optical systems provide a temporally compressed output pulse that is generated from an input pulse by using the input pulse to extract energy from a pump pulse. Relaxation of the constraints associated with conventional solid state energy storage media and material optical elements would greatly reduce the cost per unit of energy of lasers drivers for ICF applications. Embodiments of the optical system are designed to permit manipulation of the laser beam properties prior to final amplification. Such designs can be used to provide high brightness output beams. The advantages of the optical system disclosed herein extend beyond ICF to applications that require high fluence, temporally compressed laser pulses.

The optical system includes a compression stage with one or more amplifying sections. The compression stage is configured to receive an entrance pulse and direct it through the one or more amplifying sections to produce an exit pulse. The fluence of the exit pulse is greater than the fluence of the entrance pulse. Each amplifying section is configured to receive an input pulse and to produce an output pulse. The fluence of the output pulse is greater than the fluence of the input pulse. The one or more amplifying sections are arranged in an optically coupled configuration along the pathway of propagation of the entrance pulse through the compression stage. The entrance pulse to the compression stage is directed to a first amplifying section. The first amplifying section receives the entrance pulse as an input pulse and amplifies it to produce an output pulse. The output pulse from the first amplifying section has a higher fluence and/or shorter pulse duration than the input pulse to the first amplifying section. The output pulse of the first amplifying section is directed to a second amplifying section. The second amplifying section receives the output pulse from the first amplifying section as an input pulse and amplifies it to product an output pulse. The output pulse from the second amplifying section has a higher fluence and/or shorter pulse duration than the input pulse to the second amplifying section. The process continues analogously through each of the amplifying sections. The output pulse from the last of the amplifying sections corresponds to the exit pulse from the compression stage.

The optical path between amplifying sections includes a propagation medium. The output pulse from an amplifying section is directed through the propagation medium to a succeeding amplifying section. The propagation medium is preferably a gas. In one embodiment, the propagation medium between amplifying sections includes no material optical elements. By excluding material optical elements, higher fluences become possible because concerns over damage to material optical elements and distortions of optical signals associated with such damage are alleviated. Instead, the output pulse from an amplifying section is delivered with high fidelity as the input pulse of the succeeding amplifying section.

The process of amplification in each of the amplifying sections is stimulated scattering. Stimulated scattering processes include stimulated Raman scattering (SRS) and stimulated molecular scattering (STMS). Stimulated Raman scattering processes includes stimulated vibrational Raman scattering (SVRS) and stimulated rotational Raman scattering (SRRS). Stimulated molecular scattering processes include Brillouin scattering. Each amplifying section includes a scattering medium. The stimulated scattering process of each amplifying section is driven by a pump pulse and occurs through interaction of the pump pulse with the input pulse via the scattering medium. As the input pulse propagates through the amplifying section, it becomes amplified by the stimulated scattering process. The degree of amplification increases as the path length over which stimulated scattering occurs increases. A pump pulse is delivered to each amplifying section, propagates therethrough, and interacts with the scattering medium and input pulse to effect amplification and an increase in the fluence of the input pulse. In one embodiment, amplification of the input pulse includes extraction of energy from the pump pulse. In another embodiment, the direction of propagation of the pump pulse is counter to the direction of propagation of the input pulse. In a further embodiment, the input and output pulses of an amplifying section have shorter pulse length than the pump pulse delivered to the amplifying section. Utilization of a pump pulse with long pulse length is cost effective because pump lasers with long pulse lengths are less expensive than pump lasers with short pulse lengths and lead to lower cost per unit energy. The exit pulse of the compression stage has high output fluence and provides large amounts of energy in a short pulse at very low cost.

In one embodiment, the optical system further includes a module with a laser for providing an entrance pulse to the compression stage. In another embodiment, the optical system further includes a module with a laser for providing pump pulses to the compression stage. In still another embodiment, the optical system further includes a target chamber that includes a target and the exit pulse from the compression stage is directed to the target. In one embodiment, the target is an ICF target and the exit pulse ablates the surface of the target and/or initiates the ICF process. The target chamber is coupled to the compression stage by a transition section that includes a transition medium through which the exit pulse of the compression stage passes to enter the target chamber. In one embodiment, the transition section lacks a material optical element. In another embodiment, the transition medium is a gas.

The optical system optionally includes modules optically coupled to the compression stage. The modules may include material optical elements and may be separated from the compression stage by material optical elements. Modules include lasers for producing the entrance pulse to the compression stage and lasers for producing pump pulses for the amplifying sections. The optical system may also include material elements for directing laser beams to and from the compression stage. Material optical elements include lenses, prisms, beam splitters, polarizers, filters, and apertures. The amplifying sections may also utilize scattering and pump processes other than those mentioned above. The optical system also optionally includes conventional post-amplification output beam handling optics that includes material optical elements. The properties (peak intensity, fluence, pulse duration) of the input and output pulses of the amplifying sections and pump pulse properties can be tailored such that high conversion efficiency, large system gains for the amplification of the entrance pulse, and temporal compression of the entrance pulse are simultaneously obtained. Since the preferred amplifying media are common gases and no solid material optical elements are exposed to the very large output fluences from the amplifying sections, the cost per unit energy available from the present optical system is expected to be two orders of magnitude lower than is possible from optical systems based on the conventional glass storage lasers currently used for ICF. Furthermore, the brightness of the exit pulse available from the present optical system can by some six orders of magnitude higher than the brightness available from conventional glass storage lasers. The present optical system accordingly provides a far more cost-effective laser driver for ICF than current lasers that rely on glass or other solid state energy storage media.

REFERENCE NUMERALS/ABBREVIATIONS

Figure 1:
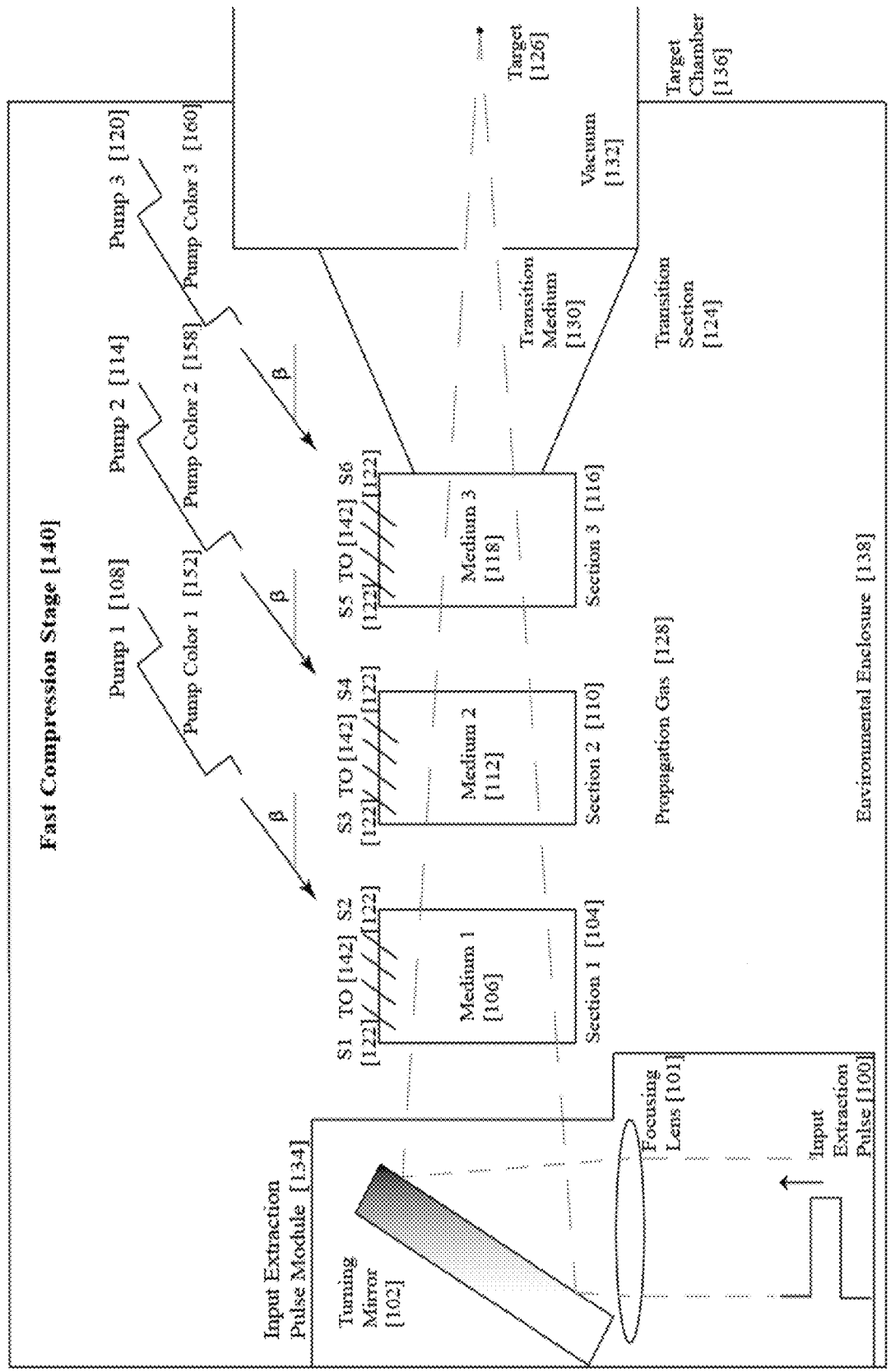
FIG. 1 shows an optical system with a compression stage that includes a plurality of amplifying sections, a module with a laser for producing an entrance pulse to the compression stage, modules with a laser for producing pump pulses for the amplifying sections, a transition section, and a target chamber with target for receiving the exit pulse from the compression stage.

The numbering method used herein is to label a given Figure according to an embodiment or aspect number that may apply, followed by a separate number indicating the designation below, such as [18. 108] for Embodiment 18, Pump 1.

| | | |
|---|---|---|
| | Pump 1 | [108] |
| | Pump 2 | [114] |
| | Pump 3 | [120] |
| | Pump 1 Pump | [108p] |
| | Pump 2 Pump | [114p] |
| | Input Extraction Pulse | [100] |
| | Output Extraction Pulse | [1000] |
| | Input Extraction Pulse Module | [134] |
| | Medium 1 | [106] |
| | Medium 2 | [112] |
| | Medium 3 | [118] |
| Transient Opening | TO | [142] |
| Shutters | S1 | [122] |
| | S2 | [122] |
| | S3 | [122] |
| | S4 | [122] |
| | S5 | [122] |
| | S6 | [122] |
| | Transition Medium | [130] |
| | Transition Section | [129] |
| | Vacuum | [132] |
| | Target | [126] |
| | Target Chamber | [136] |
| | Section 1 | [104] |
| | Section 2 | [110] |
| | Section 3 | [116] |
| Pump Colors | PC1 | [152] |
| | PC2 | [158] |
| | PC3 | [160] |
| | PC4 | [162] |
| Extraction Colors | EC1 | [900] |
| | EC2 | [901] |
| | EC3 | [902] |
| | EC4 | [903] |
| Pump Polarization | PP1 | [709] |
| | PP2 | [709] |

| | | |
|---|---|---|
| Extraction Polarization | EP1 | [703] |
| | EP2 | [703] |
| | Modulated Pump | [1800] |
| | Modulated Extraction Pulse | [1801] |
| | Material Optical Element | [900] |
| | Fast Compression Stage | [140] |
| | Direct Compression Stage | [141] |
| | Direct Compression Stage Output Pulse Envelope | [143] |
| | Isolation Section | [901] |
| | Isolation Activation | [9011] |
| | Beam Pump | [903] |
| | Transient Grazing | [905] |
| | Integrated Stage Layout | [142] |
| | On Axis Compression Stage | [143] |

DETAILED DESCRIPTION

A. Terms and Definitions

BRILLOUIN SCATTERING is generally a light scattering process whereby an acoustic wave in a gaseous, solid, or liquid medium is excited during a light scattering process. As with Raman scattering, the beam quality of the stimulated scattered beam may be decoupled from the pump beam and independent apertures combined into a diffraction-limited output under certain conditions. It has generally not been used at low gas pressure (~1 atmosphere) due to the low gain coefficient and pump and extraction limitations due to optical element damage. In some embodiments herein, it is used in the Fast Compressor Stage [140], for example, where very high pump fluences may be realized for the arrangements described herein. The ASE constraints for Brillouin scattering may be similar to those associated with Raman scattering for geometries of interest. In a typical operating regime, the allowable gain length products are generally somewhat less than those characteristic of the Raman scattering process. The frequency shift for Brillouin scattering is small for short wavelengths, leading to very high quantum efficiencies (≥0.999) for certain cases given herein. The gains are given by the same formula shown in the Raman scattering discussion above and are describable in terms of a coupling coefficient to combine the effects of the parameters governing the gain. The nomenclature is generally the same as for the Raman coupling constant. Particularly for backward scattering at low gas pressures (~1 atmosphere) and short wavelengths, the scattered excitation is the velocity field of undivided atoms or molecules as opposed to collective acoustic oscillations. In the Russian literature, the overall process is called Stimulated Molecular Scattering (STMS) and has been described by kinetic theory (see, for example, V. S. Averbakh, A. I. Makarov, and V. I. Talanov, "Stimulated Molecular Scattering of Light in Gases at Different Pressures," *Soviet Journal of Quantum Electronics*, Vol. 5, No. 10, pp. 1201-1206, 1976, incorporated by reference herein for all purposes).

Where the names Brillouin scattering, Raman scattering, and STMS are used, it is understood that the processes are interchangeable in the sense that other media scattering by a different mechanism may be substituted in that component.

RAMAN SCATTERING (include SVRS, SRRS) in this context generally refers to the scattering of light by an atom or molecule with internal degrees of freedom. In the scattering process, internal energy may be lost to or gained from the light field. Thus, the scattered light may be frequency shifted. For energy gained, the process is generally called anti-Stokes (higher scattered light frequency than the original light beam); for energy lost, the process is generally called Stokes scattering (lower frequency than the incident light beam). If Stokes scattering occurs multiple times, the first effect is called first Stokes; when the first Stokes downscatters, it is called second Stokes, etc. This convention also applies to Brillouin scattering and STMS. Stimulated Raman scattering may occur when there is net gain and is used extensively in the certain of the optical layouts described herein. A high intensity pump beam may pass through a Raman active medium and may be depleted; a second beam, often referred to as a seed beam, may be amplified in intensity. The pump beam energy may then be transferred to the seed beam. In gaseous media under certain circumstances, the beam quality of the seed beam may be decoupled from and made much better than that of the pump beam. Also, the quantum efficiency may be quite high since, for example, in nitrogen rotational Raman scattering the energy lost is generally ~$10^2$ cm$^{-1}$ out of $4 \times 10^4$ cm$^{-1}$ incident energy at a 0.25 micron (krypton fluoride) pump laser wavelength, implying a quantum efficiency of approximately 0.9975. Since light can scatter off any of the internal degrees of freedom, the largest gain process is often chosen to work with. The gain may be a function of pump and scattered light wavelengths, pump and scattered light pulse lengths, type and strength of transition, scattering angle between pump and stimulating beam, polarization, and/or line widths of the pump and scattered beams. Large scale Raman scattering may be used to combine many independent pump beams and/or to produce diffraction limited output from poor beam quality pump beams. A coupling coefficient may be used to relate the Raman gain and the pump power per area (optical pump flux). The Greek letter $\gamma$ is used herein and is usually in units of cm watt$^{-1}$. The gain is generally given by $\gamma I_p$, with the pump flux, $I_p$, in watts/cm$^2$. The gain is then in cm$^{-1}$. Gain length products of $\gamma I_p L$, where L is a characteristic length, may describe the amplification properties (units=nepers). For the forward and backward scattering processes incorporated herein, the amplified spontaneous emission (ASE) generated and amplified by the light beams may be used as a design consideration. Characteristically, gain length products of 10-40 due to ASE limitations may be possible, depending on the geometry.

STIMULATED MOLECULAR SCATTERING (STMS). See Brillouin scattering.

FORWARD ASE (FASE). For a given beam of light, this is the amplified spontaneous emission within 90° angle from the propagation direction of the light.

BACKWARD ASE (BASE). For a given beam of light, this is the amplified spontaneous emission within 90°-180° angle from the propagation direction of the light.

PUMP PULSE. For a given section, or a stage, the energy coming into it generates gain for an extraction pulse impinging on the same geometric volume. The pump pulse energy may thereby be converted into an increase in the extraction pulse energy.

COMPRESSION. The energy in a pump pulse may be temporally and/or spatially compressed during conversion to the extraction pulse energy in addition to the normal optical compression that may be associated with linear optics. Stages may be cascaded to produce an overall compression whose performance may be the product of multiple stage independent performances.

EXTRACTION PULSE. For a given section or stage, the extraction pulse converts pump pulse energy into amplified extraction pulse energy while passing through a common section and/or stage volume.

COLOR. For a given laser beam, it may be considered to have a centerline (average) frequency and a bandwidth often referred to as Full Width at Half Maximum (FWHM). If two beams are separated in frequency by more than a FWHM, they may be considered two different colors.

SECTION. Medium filled region where the Extraction Pulse is amplified as it intersects with the Pump Pulse. Often the section is filled with a uniform coupling medium. In certain designs, the coupling constant may vary as a function of position.

STAGE. A stage includes one or more sections performing a discrete optical function. For example, temporal compression and beam quality improvement may be found in a Direct Compression Stage with, say, 3 sections. A stage may also have continuously varying properties.

LOOKTHROUGH COMPRESSION STAGE. Impressing phase, color, temporal, polarization, and irradiance pattern information on a laser beam prior to a first amplification. Material surface may or may not be used downstream of the injected signal. Compression refers to spatial and/or temporal compression, i.e., the first amplification of a pulse is provided by a process wherein the pumping optical probe has a longer temporal pulse width than the injected and exit signals.

B. General Operation

Almost all lasers are built with permanent optical elements that handle the optical energy following the laser amplification. The amplification may occur in an oscillator, where feedback is used to selectively amplify the initial noise from the lasing medium, or in an amplifier, where an input signal is amplified by the laser medium. One class of lasers is super-radiant, taken to mean that they amplify noise without any optical element feedback. They usually produce very low energy and highly divergent output beams and may not be in widespread use. The use of optical elements placed after the laser medium is common as a way of matching the laser light to a given application; for example, focusing, aiming, moving the beam, changing its polarization, splitting the beam, etc.

Described herein is a lookthrough configuration where the optical properties (phase, etc.) may be controlled before final amplification. Also, the laser medium is usually quite different from the propagation medium, and, in the case of gas and liquid lasers, material windows are commonly utilized. The operating parameters of the laser output are often related to the optical properties of the windows, mirrors, lenses, etc. that are placed in the optical beamtrain after the laser light exits the laser medium. In particular, optical damage and heating are major constraints for high power levels. For applications such as inertial confinement fusion (ICF), the provision of relatively large amounts of energy in a relatively short time has been strongly limited by optical damage in both the laser medium and the beam handling elements. This leads to relatively costly and delicate systems. Also, the use of intervening solid materials may limit the brightness that can be projected through a given aperture and may lead to the need for many parallel apertures to obtain the overall energy desired to energize a target. In addition, ICF target studies have shown a need for relatively short wavelength light ($\lambda \leq 0.35$ microns) due to target coupling physics. Optical damage problems are then more severe than at longer wavelengths. This leads to architectures where the light is generated at long wavelengths and then frequency multiplied just prior to final focusing on the target (see, for example, J. H. Campbell, "Status of the National Ignition Facility: An Optics Perspective," *Lawrence Livermore National Laboratory*, OSA/OIC, 2004, and R. H. Sawicki, "The National Ignition Facility: Laser System, Beam Line Design and Construction," in M. A. Lane and C. R. Wuest (Eds.), *Optical Engineering at the Lawrence Livermore National Laboratory II: The National Ignition Facility, Proceedings of SPIE*, Vol. 5341, pp. 43-53, 2004. The technique and architecture described in this application and "*Optical Configurations for Fusion Laser*," by R. O. Hunter, Jr., U.S. Provisional Patent Application No. 62/497,908 filed Dec. 6, 2016, remove the limitations and much of the costs associated with handling the bulk of the laser energy with material, permanent optical surfaces.

One measure of the performance of a pulsed laser system is its brightness, usually presented as joules or watts per steradian. The definition of brightness used herein is $$B_p \equiv SE_p \left(\frac{D}{\lambda}\right)^2,$$

where $B_p$ is the pulsed brightness in units of joules or watts per steradian, S is the Strehl ratio (farfield peak intensity normalized to farfield peak intensity in the absence of phase and intensity fluctuations in an aperture of diameter D), $E_p$ is the pulse energy or power (in joules or watts), D is the optical aperture size the energy may be projected through, and $\lambda$ is the light wavelength. Table 1 shows the brightnesses for three pulsed systems. The first, a single NIF beamline (see, for example, "The National Ignition Facility: Laser System, Beam Line Design and Construction," supra; "NIF Optical Materials and Fabrication Technologies: An Overview," by J. H. Campbell, R. A. Hawley-Fedder, C. J. Stolz, J. A. Menapace, M. R. Borden, P. K. Whitman, J. Yu, M. Runkel, M. O. Riley, M. D. Feit and R. P. Hackel, in M. A. Lane and C. R. Wuest (Eds.), *Optical Engineering at the Lawrence Livermore National Laboratory II: The National Ignition Facility, Proceedings of SPIE*, Vol. 5341, 2004, pp. 84-101) represents performance of a solid state glass storage laser beamline with light generated and amplified at a relatively long wavelength (1.06 microns) at the pulse length of interest for ICF and then converted to a shorter wavelength (0.35 microns) by frequency tripling. This system costs about $10^7$ for each beamline producing about $10^4$ joules, and a total system of 192 beamlines delivers an energy of about $1.9 \times 10^6$ joules. The second, Forward Scattered Raman Cell (A. M. Hunter, II and G. Houghton, "Single Pulse Excimer Ground Based Laser ASAT Concept Definition Study," Thermo Electron Technologies Corporation, Oct. 25 1989, TTC-1588-R, 1989) describes the performance of a forward scattering geometry $H_2$ gas Raman cell pumped by an excimer laser that produced about $10^3$ joules at a 0.35 micron wavelength. This arrangement combined many poor optical quality pump beams to produce a high spatial quality extraction beam at a relatively long pulse length. The third, Fast Compressor Design, is the estimated performance for the first embodiment discussed herein and in "*Optical Configurations for Fusion Laser*," by R. O. Hunter, Jr., U.S. Provisional Patent Application No. 62/497,908, supra. Note that the subject architecture and components produce brightness a factor of about $10^7$ and $10^6$ (power brightness and energy brightness, respectively) higher than those of a NIF beamline at a cost per unit energy some $10^2$ less. This increase in brightness and reduction in cost compared to conventional practice should be enough to make ICF a viable commercial energy production technology. This subject arrangement may utilize both spatial and temporal compression. In addition, a single beamline of the embodiment described herein may deliver more energy than the entire 192 beamline system for NIF. Brightness may be of utility in reducing the total optical surface area and optical material volume, increasing the standoff distance to target, providing more finely featured irradiance patterns, and delivering more total energy than current practice. The low unit energy cost with suitable temporal and spatial properties may be of utility to rapidly demonstrate and commercialize ICF. In addition, the higher brightness and shorter pulse length than those economically available from glass lasers at large scale permits higher areal and volumetric energy densities to be delivered to the target. The multicolor capability and shorter wavelength of certain embodiments may also enhance the coupling of the laser energy to the target and consequent target performance.

ouin and Stimulated Molecular Scattering [STMS]), to produce laser stage media where the amplified output (extraction beam) may have much better beam quality than the optical pump beams and may have a shorter pulse length than the pump pulses. Also, the amplified pulse may give very high energy and power brightnesses. Many embodiments of the overall architecture have no material windows that are exposed to the full optical energy fluence may transmit the optical energy from the laser region to a vacuum region containing an ICF target without unacceptable phase distortion or absorption. The stimulated scattering processes may work with a gas pressure above and below the exemplary 1 atmosphere used herein and may have breakdown levels on the order of 10 or more times the energy fluence needed to efficiently convert the pump pulse beams to the shortened and improved beam quality output extraction pulse(s) over a broad range of pressure.

The Lookthrough Compression Arrangement may entail amplification after the optical extraction pulse leaves (passes through or is reflected from) a permanent material optical element. It may be desirable to have an amplification process that permits temporal pulse compression, high gain for the extraction pulse, and operates at high efficiency. For a given output fluence after amplification, the gain should be larger than the ratio of the output fluence to the material element damage fluence amplification to prevent permanent optical damage. The desired output fluence may be in the range of $10^3$-$10^4$ joules/cm$^2$, and typical damage fluence may be 0.1-1 joules/cm$^2$, leading to desired amplifications of greater

TABLE 1

Approximate Brightnesses for Three Systems

| Parameters | System | | |
|---|---|---|---|
| | Single NIF Beamline (192 Beamlines) | Forward Scattered Raman Cell | Fast Compressor Design |
| Wavelength λ (microns) | .35 | .35 | .25 |
| Aperture D (meters) | .4 | .2 | .3 |
| Energy (joules) | $10^4$ | $10^3$ | $1.35 \times 10^6$ |
| Power (watts) | $3.3 \times 10^{12}$ ($6.33 \times 10^{14}$ Total for 192 Beamlines) | $2 \times 10^9$ | $1.35 \times 10^{15}$ |
| Pulse Length (seconds) | $3 \times 10^{-9}$ [4] | $5 \times 10^{-7}$ | $10^{-9}$ |
| Strehl Ratio S | .0002 [1] | .6 [2] | .9 [3] |
| Energy Brightness (joules/steradian) | $2.77 \times 10^1$ [1] | $1.96 \times 10^{14}$ | $7.8 \times 10^{17}$ |
| Power Brightness (watts/steradian) | $9.14 \times 10^{20}$ | $3.92 \times 10^{20}$ | $7.8 \times 10^{26}$ |
| References | "Status of the National Ignition Facility: An Optics Perspective," supra; and "The National Ignition Facility: Laser System, Beam Line Design and Construction," supra | "Single Pulse Excimer Ground Based Laser ASAT Concept Definition Study," supra | Discussion Herein |
| Estimated $/joule | $10^3$ | $10^3$ | 10 |

[1] Estimated based on 300 micron spot at 5 meter focal length.
[2] S = .6, data.
[3] S = .9, projection.
[4] The pulse is temporally shaped; the time is representative of the main power pulse.

It should be noted that this particular application is far removed from the conventional practice of lasers in science, medicine, industry and research. The techniques described herein, in part or whole, may have general applicability beyond the immediate ICF application in other fields of practice.

The Lookthrough Compression Arrangement described herein has several elements. First, for the exemplary application (ICF) it utilizes stimulated scattering (Raman, Brillthan $10^3$. Thus, the design and operation of such amplification stages should be based on an examination of the scattering properties of the media employed. The examination and inventions herein presented may simultaneously exhibit the desired amplification properties as well as very low optical distortion produced by the amplification process. Short (less than $10^{-9}$ second) pulses may be produced at low cost with very high brightness optical properties controlled by small area material optics.

The basic parameters for some candidate gas scatterers are given in Table 2, below.

TABLE 2

Estimated Primary Scattering Gas Parameters for Temporal Compression Sections for .25 micron Pump Laser Wavelength, STP gas conditions, and a 180° Backscattering Angle

| Gas | n − 1 | Scattering Process[2] | Coupling Constant $\gamma_c$ (cm/watt) | Saturation Fluence $S_b$ (joules/cm) | Breakdown Fluence[1] $E_b$ (joules/cm$^2$) | | $R_B$ Ratio ($E_b/S_b$) | | Stokes Wave-Length Shift (cm$^{-1}$) | Transition Full Width at Half Maximum $\Delta\nu$ (gigahertz) |
|---|---|---|---|---|---|---|---|---|---|---|
| | | | | | $10^{-8}$ sec | $10^{-9}$ sec | $10^{-8}$ sec | $10^{-9}$ sec | | |
| He | $3.59 \times 10^{-5}$ | STMS | $1.52 \times 10^{-13}$ | 439 | $6.96 \times 10^4$ | $2.14 \times 10^4$ | 159 | 48.7 | .2 | 9.5 |
| Ne | $6.91 \times 10^{-5}$ | STMS | $5.71 \times 10^{-13}$ | 117 | $3.00 \times 10^4$ | $9.67 \times 10^3$ | 256 | 82.7 | .09 | 4.2 |
| Ar | $3.03 \times 10^{-4}$ | STMS | $9.99 \times 10^{-12}$ | 6.67 | $1.13 \times 10^3$ | 621 | 169 | 93.1 | .067 | 2.9 |
| Kr | $4.76 \times 10^{-4}$ | STMS | $2.31 \times 10^{-11}$ | 2.89 | 418 | 109 | 145 | 37.7 | .047 | 2.0 |
| Xe | $8.19 \times 10^{-4}$ | STMS | $6.10 \times 10^{-11}$ | 1.09 | 94 | 29 | 86.2 | 26.6 | .04 | 1.6 |
| N$_2$ | $3.22 \times 10^{-4}$ | STMS | $1.06 \times 10^{-11}$ | 6.29 | $4.35 \times 10^3$ | $1.81 \times 10^3$ | 692 | 289 | .08 | 3.5 |
| | | Raman - SRRS S(10) | $1.3 \times 10^{-11}$ | 5.13 | $4.35 \times 10^3$ | $1.81 \times 10^3$ | 848 | 355 | 92 | 3.5 |
| | | Raman - SVRS (0 → 1) | $2.7 \times 10^{-12}$ | 24.7 | $4.35 \times 10^3$ | $1.81 \times 10^3$ | 176 | 73.7 | 2327 | 45 |
| HD | $1.56 \times 10^{-4}$ | STMS | $2.18 \times 10^{-12}$ | 30.6 | $9.7 \times 10^3$ | $3.64 \times 10^3$ | 284 | 119 | .23 | 11.1 |
| | | Raman - SRRS S(1) | $2.66 \times 10^{-10}$ | .25 | $9.7 \times 10^3$ | $3.64 \times 10^3$ | $3.48 \times 10^4$ | $1.46 \times 10^4$ | 441 | .76 |
| | | Raman - SVRS (0 → 1) | $3.1 \times 10^{-10}$ | .215 | $9.7 \times 10^3$ | $3.64 \times 10^3$ | $4.05 \times 10^4$ | $1.46 \times 10^4$ | 3000 | ~40 |

[1]$E_B$ taken from "Measurement of KrF Laser Breakdown Threshold in Gases," by I.C.E. Turcu, M.C. Gower, and P. Huntington, *Optics Communications*, 134, 1997, pp. 66-68, with energy scaling as related to pulse length by estimation based on a combined multiphoton ionization and inverse bremmstrahlung absorption model.
[2]STMS—Stimulated Molecular Scattering; SRRS—Stimulated Rotational Raman Scattering; SVRS—Stimulated Vibrational Raman Scattering. Q(1) and S(1) are standard spectrascopic nomenclature.

The gases shown are the noble gases, except Radon, and N$_2$ and HD, and they have fairly well characterized properties. The second column gives the indices of refraction near the operating wavelength and the third column indicates the applicable scattering process with a computed coupling constant. The coupling constant or pump power loss coefficient is fundamental to the design of the sections and/or stages that convert and compress pump energy to extraction beam energy. Note that the coupling constants vary more than two orders of magnitude for STMS in the various gases at the stated condition. For a 180° backscattering geometry, the saturation fluence, Sb, ($\equiv 2/c\gamma_c$), where c is the speed of light and $\gamma_c$ is the medium coupling coefficient, is given. It will vary slowly as a function of angle mean 180o. Sb is the fluence in a short extraction pulse counter-propagating to a pump pulse required to convert at least 63% of the pump light energy accessible to the extraction pulse energy. In the discussion below, the parameter εSAT is used in general and refers to the saturation energy at an arbitrary scattering angle. $S_b$ refers to 180° scattering only.

An efficient compressor stage or section will operate with its fluence at a multiple (typically 3-10) of the saturation fluence. The breakdown fluence is shown for two pulse lengths, $10^{-9}$ and $10^{-8}$ seconds, typical of the extraction and pump pulse lengths for ICF, respectively. Breakdown may be the lowest lying limiting process that interferes with the efficient transfer of energy from the pump beam(s) to the extraction beam. The parameter $R_b$ is then the ratio of the breakdown fluence to the saturation fluence. This ratio is large (~$10^2$-$10^3$) for most cases, indicating that the scattering process may take place efficiently with good margin against breakdown. In the course of the scattering interaction the pump photons at a frequency $\nu_p$ lose energy and the extraction photons appear at a lower frequency, $\nu_s$, in a Stokes scattering process. Thus, the extraction beam frequency is offset from that of the pump beam by $\nu_p-\nu_s$, termed the Stokes shift, written here in inverse wavelength units (cm$^{-1}$). Given that the pump frequency may be about $4 \times 10^4$ cm$^{-1}$, and a typical STMS Stokes shift on the order of 0.1 cm$^{-1}$ (see Table 2), the quantum efficiency is very high (>0.999) for most transitions shown. The transition full width at half maximum (FWHM) describes the width of the offset Stokes line. This relates to the gain bandwidth that may be needed and characterizes the ability of this transition to amplify pulses in terms of extraction pulse and pump pulse frequency content. As shown, a typical gas may have a $3 \times 10^9$ Hertz (Hz) FWHM for the transition lineshape. This indicates the ability to amplify a pulse of less than $10^{-9}$ seconds duration; for example, a bandwidth limited Gaussian pulse for a $3 \times 10^9$ Hz (FWHM) has a $1.5 \times 10^{-10}$ second time duration (FWHM of the Gaussian pulse). One of the most important parameters, $R_b$, indicates output fluences of some $10^3$ joules/cm$^2$ may be utilized with good margin against breakdown (note an $R_b$ value of 82.7 for neon at $10^{-9}$ seconds in Table 2). This fluence is far beyond a nominal average operating fluence constrained by optical surface damage levels of some 1 joule/cm$^2$ for a pulse length of $10^{-9}$ seconds at the 0.25 micron wavelength. This implies that the overall stage gain of the extraction pulse should be on the order of $10^3$ for a $10^3$ joule/cm$^2$ output fluence for a design where the input extraction pulse is handled by permanent material surfaces.

Such a high stage gain may be achieved within limits imposed by amplified spontaneous emission (ASE) and may entail a new combination of amplification geometry and materials to simultaneously achieve substantial temporal compression, high stage gain, and high extraction efficiency. Previously, (see, for example, J. J. Ewing et al., "Optical Pulse Compressor Systems for Laser Fusion," *IEEE Journal of Quantum Electronics*, Vol. QE-15, No. 5, pp. 368-379, May 1979; J. R. Murray et al., "Raman Pulse Compression of Excimer Lasers for Application to Laser Fusion," *IEEE Journal of Quantum Electronics*, Vol. QE-15, No. 5, pp. 342-368, May 1979), getting all three of these parameters in a single stage may have been held to not be obtainable. In their analysis, the constraints may result in multiple stages, large mirror counts and areas, low efficiency and, hence, relatively large costs per unit energy compressed. The use of multiple sections with different saturation and ASE properties and/or synchronous pump beam excitation in a single stage as described herein makes simultaneously achieving large temporal pulse compression, high gain, and high efficiency practicable.

In order to optimize the extraction efficiency at high gain, the coupling coefficient $\gamma_c$ may be modulated spatially. Consider a given pump pulse impinging on the scattering medium. The coupling constant may be varied by changing the properties of the pump pulse or by changing the coupling properties of the medium. Two simple methods would be to change the angle of the polarization vector of a linearly polarized pump pulse thereby changing the coupling to a linearly polarized extraction pulse and by grading the concentration(s) of the active medium constituents that are producing all or a portion of the coupling. Similarly, lookthrough geometries, although previously discussed for forward scattering with no temporal compression, low stage gains and conversion in a single propagation gas, (see, for example, "Single Pulse Excimer Ground Based Laser ASAT Concept Definition Study," supra, where use of the atmosphere is discussed), may be utilized herein at high stage gains, backward scattering geometries and may have substantial temporal pulse compression in addition to the phase correction aspects.

Figure 2:
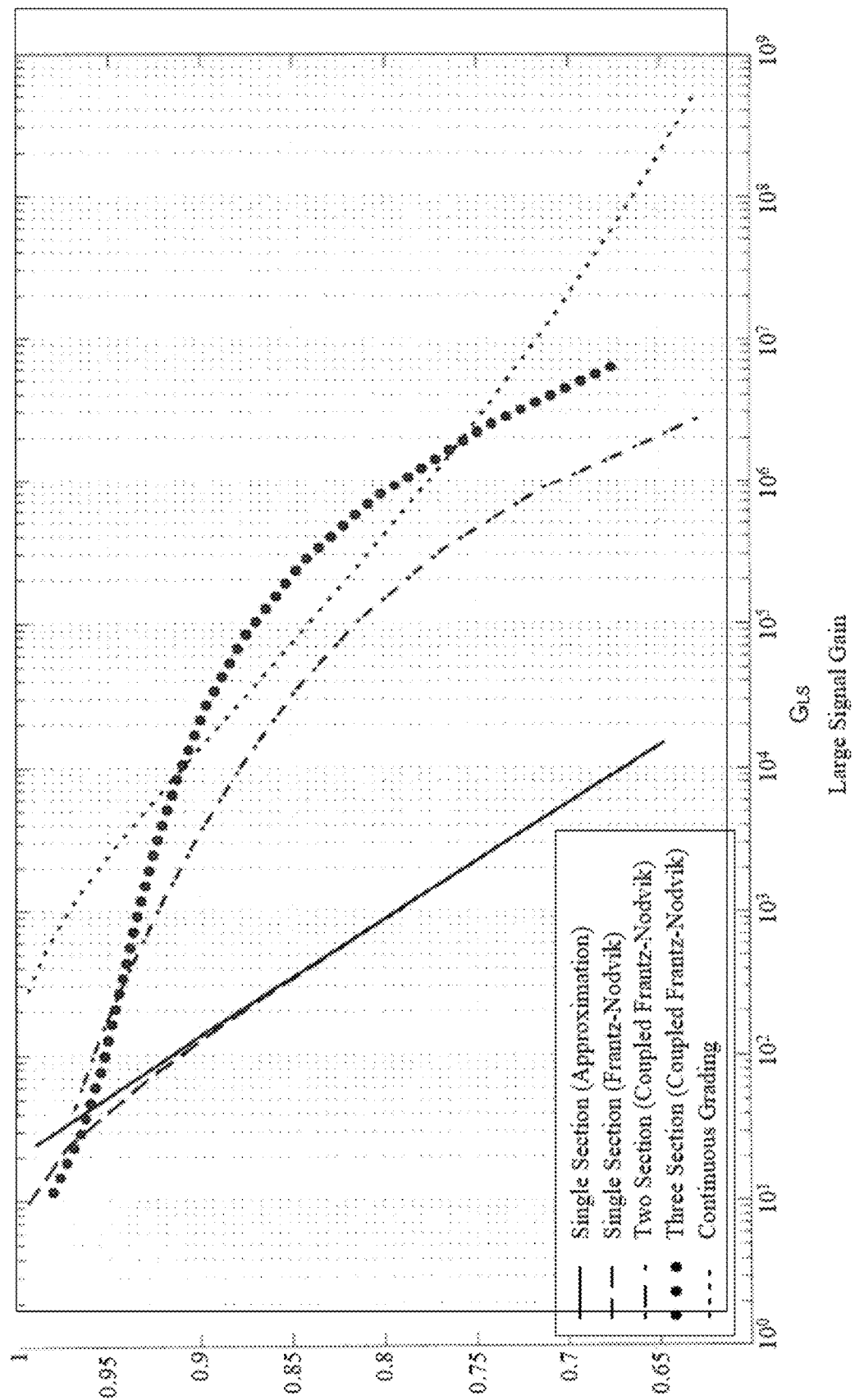
FIG. 2 compares the theoretical efficiency of several compression stages under various assumptions.

FIG. 1 shows a basic arrangement for efficient pulse compression. An Input Extraction Pulse [100] passes through a Focusing Lens [101], reflects off Turning Mirror [102] and enters Section 1 [104] at the same time as the leading edge of Pump 1 [108] arrives at the plane of Shutter 1 [122]. The Pump 1 [108] physical pulse length is approximately twice the distance between S1 and S2 [122] for a backward propagation angle of near 180°; that is, the Input Extraction Pulse [100] and Pump Pulse 1 [108] are near counter-propagating. The Input Extraction Pulse [100] is amplified as it propagates to Shutter S2 plane and Pump 1 [108] is depleted. The amplified Input Extraction Pulse [100] then enters Section 2 [110] at the plane of Shutter S3 [122] when the Pump 2 [114] leading edge arrives at that same plane. The Input Extraction Pulse [100] is further amplified on passing through Section 2 [110] and exits at the plane of Shutter S4 [122] at about the time the trailing edge of Pump 2 [114] arrives at the plane of Shutter S4 [122]. The Pump 2 [114] is depleted as it exits Section 2 [110]. The Input Extraction Pulse [100] is further amplified during the same cycle of propagation through Section 3 [116], including the same timing constraints on the arrival of the Input Extraction Pulse [100] and Pump Pulse 3 [120] at the entrance and exit planes, defined as the positions of Shutters S5 and S6 [122], respectively. The medium properties may be varied among Medium 1 [106], Medium 2 [112], and Medium 3 [118]. Also, optical properties of Pump 1 [108], Pump 2 [114], and Pump 3 [120] may be set to give optimum performance by, for example, varying the polarization state during the pump pulse and/or their flux levels. The physical lengths of the Section ([104], [110], and [116]) and the Pumps ([108], [114], [120]) may also be adjusted as well. For decoupling the beam quality of the Pumps ([108], [114], and [120]) from that of the Input Extraction Pulse [100], the bandwidth of the pumps may need to be less than the scattering linewidth of the respective medium. See, for example, N. Bloembergen et al., "Report to The American Physical Society of the Study Group on Science and Technology of Directed Energy Weapons," *Review of Modern Physics*, Vol. 59, No. 3, Part II, pp. S1-S201, 1987, which mentions combining poor optical quality separate pump beams in a Raman scattering process to produce a near diffraction limited output beam. A detailed description is given in "Single Pulse Excimer Ground Based Laser ASAT Concept Definition Study," supra, for the case of Raman scattering. The temporal coherence properties of the Pumps ([108], [114], and [120]) need to be controlled to ensure good conversion efficiency and beam quality decoupling. Other major controlling parameters for the Lookthrough Compression Arrangement are the small signal gains for each section, the saturation properties of each section, the coupling parameters, and the pump fluxes. FIG. 2 shows a comparison of compression stages with 1, 2, and 3 sections in terms of gains and conversion efficiencies from a simple model (counter-propagating beams, 1-D Frantz-Nodvik extraction model) for a case of a total G ($G_0$), wherein $G_0$=20, with the gain apportioned equally per section. The ratio of the coupling constant $\gamma_c$ for each section is separately set. Here $G_{SS}$=the small signal gain exponent; for a given section $G_S\varepsilon_{SAT}$ is the available pump energy and $G_{SS}$ equals the sum of the sections $G_s$. The unit of $G_s$ and G is nepers. In addition to the fundamental conversion properties of the number and type of sections, the amplified Input Extraction Pulse [100], after passing through Shutter S6 [122], enters the Transition Medium [130], passes through the Transition Section [124] into the Target Chamber [136], traverses the Vacuum [132] and impinges on the Target [126]. The input Extraction Pulse Module [134] is shown as providing the Extraction Pulse [100] as matched to the Fast Compressor Stage [140] that is enclosed in the Environmental Enclosure [138], filled with the Propagation Gas [128]. The Fast Compressor Stage comprises the Propagation Gas section and 3 sections [106, 112,118]. Between shutters: S1 [122] and S2 [122], S3 [122] and S4 [122], and S5 [122] and S6 [122] are Transient Openings [142] to let pumps 1 [108], 2[114] and 3 [120] enter the Sections 1 [104], 2 [110], and 3 [116], respectively. The Input Extraction Pulse Module [134] is filled with the Propagation Gas [128], and the Pumps 1 [108], 2[114] and 3 [120] and Input Extraction Pulse [100] may be produced by previous elements (not shown) inside or outside the Environmental Enclosure [138].

There are many scattering media that may be used. Of major interest for the ICF application may be certain gas phase noble gases, He, Ar, Kr, Xe, Ne, the simple diatomic gases $N_2$ and $H_2$ with their isotopic combinations, and other gases, including, but not limited to, $SF_6$, $CH_4$, $CD_4$ and $CF_4$ including isotopic combinations. Each section may be based on a different scattering medium, including mixtures. In the case of $N_2$, there are rotational Raman transitions (SRRS), Raman vibrational transitions (SVRS), and a Stimulated Molecular Scattering (STMS) transition that may have suitable coupling constants. Table 2 shows the respective values. The coupling constant and other properties shown may be different as a function of laser frequency, medium pressure, temperature, interaction angle and other parameters. For the noble gases, the STMS scattering may be of primary interest as there may be no suitable Raman transitions. Here, the term Brillouin scattering is considered as a limiting case of STMS. STMS occurs not only at lower pressures and angles more toward 180° backscatter and herein includes stimulated scattering off of the velocity distribution of individual scatterers as well as the effects of collisions, and, at high density and/or more forward scattering geometries, transitions into classic Brillouin scattering, with well-defined sound waves in the final state. Absorptive Rayleigh and Brillouin scattering, although not discussed extensively herein, may be utilized as well. For purposes of discussion, STMS and Raman stimulated scattering are considered for the above gaseous media as the coupling mechanisms. The ratio of breakdown fluence to the coupling saturation fluence is a primary parameter and is shown as $R_b$ in Table 2. The STMS coupling coefficient in the Brillouin limit may be estimated from a hydrodynamic model at high pressure and/or forward scattering angles (see, for example, M. J. Damzen, and H. Hutchinson, "Laser Pulse Compression by Stimulated Brillouin Scattering in Tapered Waveguides," *IEEE Journal of Quantum Electronics*, Vol. QE-19, No. 1, pp. 7-14, 1983, and J. Reintjes and M. Bashkansky, "Stimulated Raman and Brillouin Scattering," in *Handbook of Optics, Vol. 4: Optical Properties of Materials, Nonlinear Optics, Quantum Optics*, M. Bass, C. DeCusatis, J. Enoch, V. Lakshminarayanan, G. Li, C. MacDonald, V. N. Mahajan and E. Van Stryland, McGraw Hill, N.Y., Chapter 15, pp. 15.1-15.60, 2009). Also, at certain pressures of interest (around 1 atmosphere) the description of the scattering regime entails kinetic theory (see, for example, T. J. Greytak, and G. B. Benedek, "Spectrum of Light Scattered from Thermal Fluctuations in Gases," *Physical Review Letters*, Vol. 17, No. 4, pp. 179-182, 1966; and S. Yip and M. Nelkin, "Application of a Kinetic Model to Time-Dependent Density Correlations in Fluids," *Physical Review*, Vol. 135, No. 5A, pp. A1241-1247, 1964). The kinetic theory formulation of S. Yip and M. Nelkin, supra, as developed in V. S. Averbakh et al., "Stimulated Molecular Scattering of Light in Gases at Different Pressures," *Soviet Journal of Quantum Electronics*, Vol. 5, No. 10, pp. 1201-1206, 1976, (J15), has been used to generate coupling coefficients based on STMS and its transition to Brillouin scattering. Herein, the coupling constants utilized in computations are generated with a Bhatnagar-Gross-Krook (BGK) model. In addition to generating small signal coupling constants, the full nonlinear BGK approach (see "A Model for Collision Processes in Gases. I. Small Amplitude Processes in Charged and Neutral One-Component Systems*," by P. L. Bhatnagar, E. P. Gross, and M. Krook, *Physical Review*, Vol. 94, No. 3, pp. 511-525, 1954, [J228]) is utilized to determine the detailed behavior at high signal time pumps flux product in this scattering regime. The largest constant in each case shown in Table 2 should be a good indicator of the dominant mechanism. The phonon lifetime may also be important as it affects the transient response. In the ASE noise discussion, the equivalent noise source varies substantially and may be important. These mechanisms (STMS, Raman and Brillouin scattering) have different pressure, wavelength and scattering angle scaling. Experimentation and computations for the exact mixture and scattering conditions employed are desirable.

A way to show the advantage of staging by multiple sections may be to use a simple model of pulsed extraction by a laser pulse from a storage medium. The energy storage medium may be one such as Nd:glass or the pump light field. In the 1-D Frantz—Nodvik model, (see, for example, "Solid-State Lasers for ICF," by J. M. Soures, in *Nuclear Fusion by Inertial Confinement: A Comprehensive Treatise*, G. Velarde, Y. Ronen and J. M. Martinez-Val (Eds.), CRC Press, Inc., Chapter 14, pp. 351-370, 1993) the output fluence $\varepsilon_{OUT}$ in terms of the saturation fluence, $\varepsilon_{SAT}$ (where $\varepsilon_{SAT}$ is the fluence that locally converts 63% of the stored pump energy it has access to during extraction from the storage medium [in this exemplary case, the travelling optical pump pulse] to extraction pulse optical energy, assuming an unpopulated lower state and using $\varepsilon_{SAT}$ as the normalizing parameter for both the extraction input ($\varepsilon_{IN}$) and output ($\varepsilon_{OUT}$) energies is given by:

$$\frac{\varepsilon_{OUT}}{\varepsilon_{SAT}} = \ln\left\{1 + G_o\left[\exp\frac{\varepsilon_{IN}}{\varepsilon_{SAT}} - 1\right]\right\}.$$

In this expression, $G_o$ is the overall small signal gain and is equal to $e^{G_{SS}}$, where $G_{SS}=\int g_o \, dl$, l is path length that the extraction fluence propagates through in the gain medium, and $g_o$ is the local small signal gain. As an example, suppose $G_{SS}=10$ [neper] and $$\frac{\varepsilon_{IN}}{\varepsilon_{SAT}} = 1.0;$$

then $G_o=2.2\times 10^4$ and $$\frac{\varepsilon_{OUT}}{\varepsilon_{SAT}} = 10.5.$$

Of the 10 $\varepsilon_{SAT}$ available ($G_{SS}\varepsilon_{SAT}$ is the stored energy in the pump beam), 9.5 are converted from the pump beam, corresponding to a stage extraction efficiency of 0.95. The efficiency may be written:

$$\eta = \frac{\frac{\varepsilon_{OUT}}{\varepsilon_{SAT}} - \frac{\varepsilon_{IN}}{\varepsilon_{SAT}}}{G_{SS}}.$$

These expressions may be combined to give the tradeoffs between $G_{SS}$ (limited by ASE), efficiency (limited by the need to input a substantial normalized fluence, $$\frac{\varepsilon_{IN}}{\varepsilon_{SAT}}),$$

and the large signal gain, $$\frac{\varepsilon_{OUT}}{\varepsilon_{IN}}.$$

For the nonlinear scattering processes of most interest, $G_{SS}$ may be about 25 at the ASE limit as discussed herein. At this limit, for a signal gain $\gg 1$, $$(25) \eta \cong \frac{\varepsilon_{OUT}}{\varepsilon_{SAT}},$$

and $$\frac{\varepsilon_{OUT}}{\varepsilon_{SAT}} = 22.5$$

at a nominal extraction efficiency of 0.9. Then, $$22.5 \cong \ln\left\{1 + 7.2 \times 10^{10}\left[\frac{\varepsilon_{IN}}{\varepsilon_{SAT}}\right]\right\}, \text{ for } \frac{\varepsilon_{IN}}{\varepsilon_{SAT}} \ll 1,$$

giving $$\frac{\varepsilon_{IN}}{\varepsilon_{SAT}} = .082$$

with a large signal gain $G_{LS}$ or 274. Generally, and in the same approximation, we have $$\frac{\varepsilon_{IN}}{\varepsilon_{SAT}} = e^{-(1-\eta)G_{SS}}.$$

After some manipulation, the following approximation for $G_{LS} \geq 1$ relating efficiency $\eta$, the small signal gain exponent $G_{SS}$ and the large signal gain $G_{LS}$ may be obtained:

$$\frac{G_{LS}}{G_{SS}} = \eta e^{(1-\eta)G_{SS}}$$

The maximum ratio for $$\frac{G_{LS}}{G_{SS}}$$

is obtained at $\eta = 1/G_{SS}$, and is at an efficiency of order 0.05-0.1, too small to be of practical interest. For an efficiency of 0.9 and a $G_{SS} = 20$, $$\frac{G_{LS}}{G_{SS}} = 6.65,$$

and $G_{LS} = 133$. For a $G_{LS}$ of $10^4$ and $G_{SS} = 20$, $\eta \cong 0.7$. Thus, assuming $G_{SS}$ is limited to a value of around 20 due to ASE, an efficiency of 0.9 may not be attainable in a single section with a large signal gain of $10^4$. For efficiencies $\geq 0.9$ and $G_{SS}$ limited to a maximum of 25, the large signal gain <270. These limitations lead to the use of coupled discrete sections as described herein, in order to get overall stage gains of $10^3$-$10^4$. At the same time efficiencies, greater than 0.9 at reasonable $G_{SS}$ values may be realized. Other techniques for controlling the coupling constant besides discrete sections (such as continuous grading) are described as well. FIG. 2 shows the performance of one, two and three discrete section stage designs, and a continuously graded coupling constant stage design in terms of these three parameters. The curves were generated for an equal allocation of $G_{SS}$ between the discrete sections for a total $G_{SS} = 20$ Below, various embodiments are presented for multiple section designs that can simultaneously produce high large signal gains ($10^2$-$10^5$) with efficiencies at or above 0.9 at $G_{SS}$ constraints of 20-25.

Below, a design for a large signal gain over $10^3$, an efficiency over 0.90 for a $G_{SS}$ of 20 is shown for 3 sections. According to the above analysis, a single section may have, for a $G_{SS}$ of 20 and $\eta$ of 0.90, a large signal gain of about 45. If all three parameters are desired at the same time, this shows the strong advantage for multiple section stages. Table 3 shows a 3 section Lookthrough Compression Arrangement with a large signal gain of $7.9 \times 10^3$, a 10:1 time compression, and over 90% conversion efficiency with an overall small signal gain exponent $G_{SS}$ of 20. The section values are based on estimates for a square extraction pulse shape and square pump pulse shape. The output extraction pulse length, $\tau_{EXTRACT}$, is assumed to be the same as the input extraction pulse length, $\tau_{INPUT}$. The above $G_{SS}$ limit of 20-25 is based on ASE generated immediately in front of the extraction pulse by the pump and propagating backward into the unconverted pump pulse (pump backward ASE, or pump BASE). For the design shown in Table 3, this ASE may be roughly estimated as $$J_N = \frac{dI_n}{d\Omega}$$

(watts/cm$^2$ steradian) $\Delta\Omega$ (steradian) $\tau_p$ (seconds) $e^{G_{SS}}$. $J_n$ is the output noise fluence. Here, $\tau_p$ is about $0.5 \times 10^{-9}$ seconds (the time to cross a gl=1 section of the pump beam immediately in front of the extraction pulse as it enters the first section, $$\frac{dI_n}{d\Omega}$$

the equivalent noise source, and $\Delta\Omega$ the solid angle subtended by the input aperture. For this case, $$\Delta\Omega \cong \frac{\pi(30)^2}{4\pi(150)^2}$$

steradian. The product is $(5 \times 10^{-10}$ seconds$)(10^4$ watts/cm$^2$ steradian$)(2.5 \times 10^{-3}$ steradians$) = 1.25 \times 10^{-8}$ joules/cm$^2$. Including the $e^{20} = 4.85 \times 10^8$ factor, $J_N = 6.06$ joules/cm$^2$ at the output, competing with an exit fluence of 805 joules/cm$^2$. There may be other noise sources competing for the pump energy. There include the ASE from the pump pulse at a frequency shift (first Stokes) and ASE from the extraction pulse (second Stokes frequency shift) both forward (FASE) and backward (BASE); the details are presented herein below. This backward going BASE for the pump pulse (near copropagation with the extraction pulse) may be one main competitor. Also the forward going FASE for the extraction pulse may be significant. Both are sensitive to the transverse dimension and pulse length details. The energies shown in Table 3 reflect a computation taking into account the various scattering processes. Some of the ASE is decoupled from section to section; the overall G limit computed above is characteristic of the single section arrangement. For series sections, the BASE for the pump pulse is considered as coupled through all sections. The pump FASE is considered on a single section basis. The FASE and BASE for the extraction pulse is considered for each single section. Also, there are losses due to impurity absorption and Rayleigh scattering. The extraction pulse FASE decoupling assumption from section to section follows from the fact that the pulse length drives the forward gain to 0 for STMS on axis. The peak ASE may be at an angle typically 10°-20° (FIG. 45) for an exemplary design with a simple scattering model show the peak FASE angle. There will be a different frequency associated with the pulse FASE for each section, depending on the different section scattering media; thus, simple section spatial separation may be utilized to reduce FASE coupling. For the pump FASE in a multi-section arrangement with separate pumps, the pump forward ASEs may be time decoupled as well. When the pumps enter at an offset angle 180°, the pump FASE needs to be calculated as to how each section contributes. For many designs where the pumps are not at 180°, the pump FASE may then be based on a shorter forward direction and thus reduced even further. The backward pump BASE originates in front of the extraction pulse and goes back along the total extraction path. Hence, it has a larger value. The above applies to STMS scattering. Raman scattering has an entirely different transient angular behavior; thus, the design considerations are different.

Table 3, based on STMS scattering, is computed for an ASE and spontaneous emission loss case. For this design case, the overall loss to ASE and linear scattering (Rayleigh, trace absorption) is on the order of 1.25% for the stage, small enough to give the overall estimate, with losses, of $G_{LS}$=7.8× $10^3$, $\eta$=0.91, with a K (time compression factor) of 10. Since $G_{SS}$ is 20, the coupled pump BASE will be below 1% as shown in Table 5.

TABLE 3

Exemplary 3 Section Stage

| Parameter | Section 1 | Section 2 | Section 3 | Stage |
|---|---|---|---|---|
| $\varepsilon_{input}$ (J/cm²) | 0.1 | 38.79 | 237.4 | 0.1 |
| $\varepsilon_{output}$ (J/cm²) | 38.79 | 237.4 | 804.91 | 804.81 |
| $\tau_{input}$ (sec) | 1.00E-9 | 1.00E-9 | 1.00E-9 | 1.00E-9 |
| $\tau_{pump}$ (sec) | 1.00E-8 | 1.00E-8 | 1.00E-8 | 1.00E-8 |
| $\varepsilon_{pump}$ (J/cm²) | 66.73 | 222.44 | 583.77 | 872.95 |
| $\gamma_c$ (cm/watt) | 9.99E-012 | 1.50E-012 | 5.71E-013 | — |
| Gas | Ar | .27 Ar/.73 He | Ne | — |
| $\varepsilon_{sat}$ (J/cm²) | 6.67 | 44.49 | 116.75 | — |
| L (cm) | 150 | 150 | 150 | 450 |
| Width (cm) | 30 | 30 | 30 | 30 |
| $G_{SS}$ (nepers) | 10 | 5 | 5 | 20 |

TABLE 3-continued

Exemplary 3 Section Stage

| Parameter | Section 1 | Section 2 | Section 3 | Stage |
|---|---|---|---|---|
| K ($\tau_{pump}/\tau_{extract}$) | 10 | 10 | 10 | 10 |
| $G_{LS}$ | 387.71 | 6.12 | 3.39 | 8.05E+03 |
| $\eta_0$ | 0.58 | 0.89 | 0.97 | 0.92 |
| FASEextraction + Spontaneous (%) | 2.71E-001 | 1.26E-001 | 4.15E-002 | — |
| BASEextraction + Spontaneous (%) | 3.68E-002 | 3.00E-003 | 2.10E-003 | — |
| FASEpump + Spontaneous (%) | 3.45E-002 | 3.30E-003 | 1.30E-003 | — |
| BASEpump + Spontaneous (%) | 4.29E-002 | 2.50E-003 | 1.10E-003 | — |

This 3 section stage shows the desired combination of large signal gain, $G_{LS}$ (the 1-D ideal case without loss subtraction), time compression, K, and efficiency $\eta$ subject to ASE constraints based on G. The energy extraction calculations were done for a 180° backscattering geometry with a one-dimensional analysis.

Figure 3:
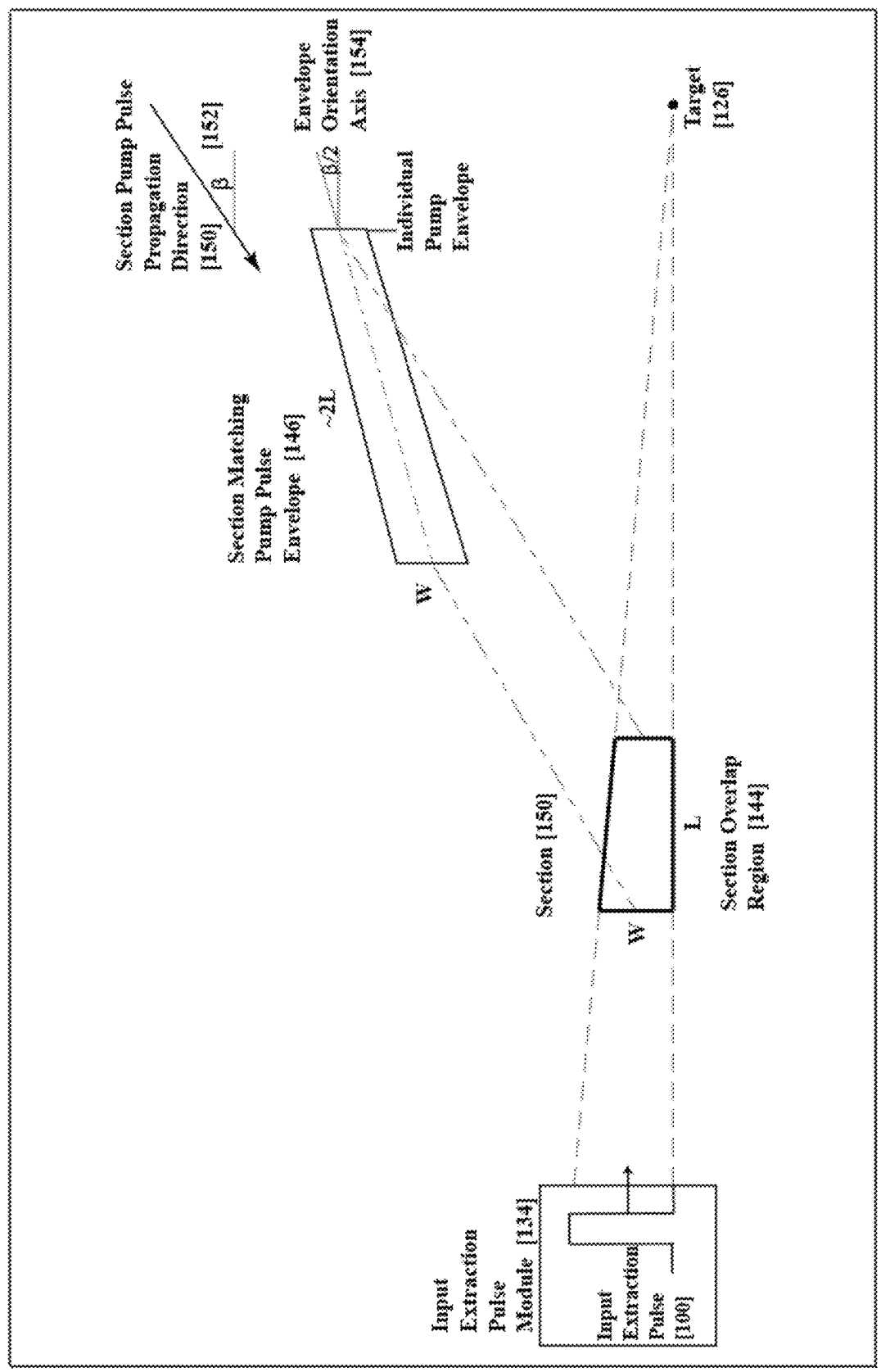
FIG. 3 shows the condition for geometrically matching a backward propagating pump pulse to the extraction pulse in a section.

For the above simple analysis to apply to lookthrough compressors as shown in FIG. 1, if off axis pump beams are utilized, they may be configured to deliver a near equivalent of a counter-propagating pump to a given section so that the simple analysis may give a good estimate. FIG. 3 shows a shaped pump pulse that will overlap well onto a given section. For a given section, the Section Pump Pulse Envelope [146], propagating in the Section Pump Pulse Propagation Direction [150] at an angle β [152] to the axis of the propagation of the Input Extraction Pulse [100] as it enters the Section Overlap Region [144], has the shape to match the Input Extraction Pulse [100] as it travels through the Section [150]. The example shown is for an Input Extraction Pulse [100] length much less than the Section [150] length L. Note the taper of the envelope and its Envelope Orientation Axis [154]. Below, in Embodiment 17, methods are shown for approximating such a shape. Also, shape matching for forward compression is shown in the same embodiment. The optical coupling efficiency is thus considered unity for illustrative purposes in the various calculations presented.

In Table 4 the condition for simply setting the color of the section pump beam are illustrated. As the different sections may have different scattering media, their offset frequencies may differ. As an example, the frequency offsets are given for the three section scattering media of the exemplary case presented in Table 3 are given in Table 4 that shows certain exemplary values for the three pump colors and frequency content for the media utilized in Table 3.

TABLE 4

Exemplary Color and Frequency Content Properties For 3 Section Backward Compressor near .25μ Wavelength

| | Pump Pulse Section 1 | Pump Pulse Section 2 | Pump Pulse Section 3 | Extraction Pulse |
|---|---|---|---|---|
| Wavelength (microns) | .2490016 | .2490010 | .24900155 | .2490000 |
| Wavenumber (cm⁻¹) | 40,160.376 | 40,160.479 | 40,160.392 | 40,160.30 |
| Bandwidth (FWHM in Hertz) | 9.87 × 10⁸ | 2.78 × 10⁹ | 1.42 × 10⁹ | ~10⁹ |

The exemplary case here has a single color output pulse at a certain wavelength. The colors for driving the three sections are slightly different and are set at the peaks of the respective gain curves. The bandwidth of the drive is given by an approximate rule that the pump bandwidth should be ⅓ or less than the gain bandwidth for the extraction pulse. Under these conditions, extraction calculations for Table 3 may apply. Broader bandwidths may be used, and the calculations modified. Also, for 2 gain media, argon and neon, the Stokes frequency shift is smaller than their respective gain bandwidths ($0.75 \times 10^9$ Hz separation versus $2.8 \times 10^9$ and $4.2 \times 10^9$ Hz FWHM transition widths) and a single color drive may well be entirely suitable for both. However, for cases where the transition center shift is relatively large relative to its linewidth, the color separation for the pump beams becomes more important. For the exemplary case shown in FIG. 1, the three pump colors [152], [158], [160] separately energize the three sections. The angle of incidence, β, may be different for each pump, and within each pump beam, a variety of β's and colors may be present. The color may be adjusted, depending on the respective β.

Some fundamental properties and considerations for stage design are discussed above. Below, certain general aspects governing the optical and design choices are presented in some detail. First, there are amplified spontaneous emission (ASE) losses that serve as an energy drain, both for the pump pulse (first Stokes shifted ASE) and for the extraction pulse (its frequency is set for backward scattering and its ASE is at a second Stokes shift frequency). Second, there are the gain and saturation properties of the stimulated scattering media. Third, there is optical breakdown of the various media. Fourth, there are self-focusing and phase aberration effects due to the nonlinear index of refraction. Fifth, there are effects due to both the finite bandwidth of the amplification medium and the transient response coupled to the nonlinear scattering process. There are many other factors that are part of a detailed design and performance characterization; however, certain of the above may be important to the inventions herein and are discussed in some detail.

First Stokes ASE for the Pump Pulse

The effects of ASE from the pump pulse(s) and the extraction pulse may now be estimated. For pump pulse ASE, there may be amplified spontaneous emission (ASE) from regions of the active medium occupied by the pump energy, it may also be occupied by the extraction pulse. A simple model gives the relative ASE and signal terms:

$$I_s(L) = \frac{I_p d^2\sigma/dVd\Omega \Delta\Omega}{g}[e^{gL} - 1] + I_s(0)e^{gL}.$$

In this model (similar to those in *Principles of Lasers*, 5th Edition, by O. Svelto, Springer, New York, N.Y., 2010 (B20), and "Gain and Noise Characteristics of a Brillouin Amplifier and their Dependence on the Spatial Structure of the Pump Beam," by A. M. Scott, D. E. Watkins and P. Tapster, *Journal of the Optical Society of America*, Vol. 7, No. 6, pp. 929-935, 1990) the gain g is assumed to be uniform (the loading by the ASE is not considered), the noise and signal originate from a region near $1=0$ and are amplified through a medium with a local gain $g(cm^{-1})$ to a position L. The noise term is $$I_N \equiv \frac{I_p d^2\sigma/dVd\Omega \Delta\Omega}{g} = \frac{d^2\sigma/dVd\Omega \Delta\Omega}{\gamma_c} = \frac{dI_N}{d\Omega}(\Delta\Omega),$$

using $g=I_p\gamma_c$, where $\gamma_c$ is the coupling constant (cm/watt), $$\frac{d^2\sigma}{dVd\Omega}$$

is the differential cross section per unit volume equal to the product of the scattering cross section $d\sigma/d\Omega$ ($cm^2$/steradian in the direction of $\Delta\Omega$) and the scatterer density $N(cm^{-3})$, and where $\Delta\Omega$ is the solid angle subtended by the exit area at a length L. For a backward scattering geometry with a 180° counter-propagating pump, as discussed below, for pump BASE G may be defined as $G \equiv gL$. For a spatially constant $I_p$, the noise terms may be compared for various scatterers, both as to relative size and amount of extraction energy relative to an extraction fluence at the exit L. An estimate of the noise fluence source term, corresponding to noise from a region with a gain-length product of (1), is $$\varepsilon_{NS} = \frac{I_N}{gc}$$

with $$I_N \equiv \frac{dI_N}{d\Omega}\Delta\Omega_p.$$

ASE from $1^{st}$ gain length initiates a noise term $$I_N = \frac{d\sigma}{d\Omega}\Delta\Omega_p \frac{dN(j)}{dV} \frac{1}{\gamma_c I_p} \cdot I_p \quad (1)$$

$$= \frac{T_N}{d\Omega} \cdot \Delta\Omega_p \quad (2)$$

where:

$$\frac{dI_N}{d\Omega} = \frac{d\sigma}{d\Omega}\frac{dN(j)}{dV} \cdot \frac{1}{\gamma_c}. \quad (3)$$

The cross section $$\left(\frac{d\sigma}{d\Omega}\right)$$

dependence in (3) drops out when we insert the steady state expression for $\gamma_c$ in (3 and the amplified noise output is:

$$I_N^A = \frac{dI_N}{d\Omega}\Delta\Omega_p \cdot e^{gl} \quad (4)$$

If the amplified noise represents a function F (~1%) of the initial pump intensity $I_p$ then:

$$F \cdot I_p = I_N \cdot e^{gl} \text{ or } gl = \ln\left(F \cdot \frac{I_p}{I_N}\right) \quad (5)$$

represents the gain length at which amplified ASE becomes a potential issue. If instead of an intensity fraction F we are concerned with the critical gl for energy conversion of fraction F of the extractable pump energy, then we have approximately:

$$gl \simeq \ln\left(F \cdot \frac{I_p}{I_N}\right) + 3.2 \qquad (6)$$

The line narrowing effects of amplification as discussed in Murray et. al. alter (6 to:

$$gl \simeq \ln\left(F \cdot \frac{I_p}{I_N}\right) + 4.8 \qquad (7)$$

and for conversion at the 1% level (F=0.01) we set:

$$(1) \; G_c \equiv gl \simeq \ln\left(F \cdot \frac{I_p}{I_N}\right) + 0.2 \qquad (8)$$

Since $gl = \gamma_c I_p L_p$ we can use (8 to calculate $I_p$:

$$(2) \; I_p \simeq \frac{(0.2 - \ln I_n)}{\gamma_c L_p} + \frac{\ln I_p}{\gamma_c L_p} \qquad (9$$

by iterating (9 with starting condition $$I_p = \frac{1}{\gamma_c L_p}$$

on RHS. Table 5 gives the noise, $I_N$, at $G_c$ for some exemplary scatterers. This table was generated for STP conditions, 180° backscatter geometry, 0.25 micron wavelength, $\Delta\Omega = 10^{-3}$ steradian and L=1.5 meters.

TABLE 5

Equivalent Pump Noise Source ($I_N$) and Limiting Stage Gain ($G_c$)

| Gas | Transition | $I_N$ (watts/cm$^2$) | $\gamma_C$ (cm/watt) | gl (nepers) |
|---|---|---|---|---|
| He | STMS | 9.6 | 1.48 × 10$^{-13}$ | 25.7 |
| Ne | STMS | 9.8 | 5.52 × 10$^{-13}$ | 24.3 |
| Ar | STMS | 10.9 | 9.50 × 10$^{-12}$ | 21.2 |
| Kr | STMS | 11.7 | 2.17 × 10$^{-11}$ | 20.3 |
| Xe | STMS | 14.1 | 5.67 × 10$^{-11}$ | 19.1 |
| N$_2$ | STMS | 13.8 | 1.01 × 10$^{-11}$ | 20.9 |
| N$_2$ | SRRS, S (10) | 0.0172 | 1.30 × 10$^{-11}$ | 27.6 |
| HD | STMS | 14.7 | 2.18 × 10$^{-12}$ | 22.5 |
| HD | SRRS, S (1) | 0.0015 | 2.66 × 10$^{-10}$ | 32.0 |

Table 5 may indicate that an overall limiting gain $G_c$ of order 19-25 may be anticipated due the backward pump ASE for STMS scattering in the noble gases and a $G_c$ of 22.6 for SRRS scattering in N$_2$ for the conditions indicated. Note that the equivalent noise source may be about 9.6-15 watts/cm$^2$ for the STMS case for many of the scatterers listed. The analysis above disregarded the loss term due to noise once the extraction pulse has arrived in the noise origin region; since the entrance extraction pulse flux may be above 10$^8$ watts/cm$^2$, the neglect of the above equivalent noise source appears warranted as it is some 10$^{-6}$ that of the extraction pulse. Also, the transient effect on gain reduction due to the finite bandwidth of the medium response has not been included; for many cases of interest the gain in the pump may approach the steady state value computed above. The backward gain neglects the gain multiplication factor of 2-3 seen in phase conjugation experiments (see, for example, A. M. Scott, D. E. Watkins and P. Tapster, "Gain and Noise Characteristics of a Brillouin Amplifier and their Dependence on the Spatial Structure of the Pump Beam," supra). Thus, it may be implicitly assumed here that the pump beams may be set off axis and/or have a sufficient spatial and/or temporal incoherence or be otherwise arranged so that the conditions to observe such enhanced gain may be avoided. The above estimate assumed a single section stage and may be readily extended to more sections. A factor that may be in the range of −3 to +7 may be added to the above estimated values for $G_c$ due to typical variations in design and the simplicity of the analysis. If large overall G values are desired, it is interesting to note that using Raman SRRS in N$_2$ (other Raman scatterers may be considered as well) gives a substantial increase in stage performance in terms of a low equivalent pump noise source. Thus, the first section may include a low equivalent noise medium, for example, with N$_2$ SRRS as the amplifying medium, from which STMS ASE is not further amplified in the next section(s) as it is offset in frequency. A multiple section stage may then have an estimated design $G_{SS}$ approaching 30 or more. Color offsets for the different pumps to drive SRRS for the low noise section versus STMS based sections then may become a design requirement. Of course, the solid angle factor may be reduced by changing the geometry in order to go to higher $G_C$ values as well. One way to accomplish this is increasing section spatial separation and/or reducing section area.

Second Stokes ASE in Extraction Pulse Region

The extraction pulse produces gain for spontaneous emission occurring within its pulse envelope. This may be a major constraint for Raman scattering, as the ASE travelling with the extraction pulse has a gain coefficient based on the local extraction flux that may be much higher than the pump flux. "Raman Pulse Compression of Excimer Lasers for Application to Laser Fusion," supra, includes a detailed discussion of the constraints introduced as to G, efficiency and the achievable time compression. STMS and related Brillouin scattering are discussed in detail below. This ASE also gives a constraint on the transverse extraction pulse dimension.

ASE Section Decoupling

The STMS scattering from the Stokes shifted extraction beam has a wide coupling constant variation as a function of angle. For noise copropagating with the extraction beam, the second scattering Stokes light emitted around the propagation direction may be in the Brillouin regime and the linewidth may become smaller and the near forward angle steady state gain coupling constant may become larger than the 180° backscattering value. The narrower second Stokes gain linewidth may then produce a diminution of gain from transient effects due to the short pulse width of the extraction pulse as related to this linewidth; this may lead to an optimum forward angle for ASE to grow at. A 3-D code has been written to describe this scattering. It utilizes the Averbakh scattering model (see "Stimulated Molecular Scattering of Light in Gases at Different Pressures," supra, extended to arbitrary scattering angles and describes the scattering coupled with a transient scattering formulation similar to those found in *Laser Handbook: Volume* 2, by F. T. Arecchi and E. O. Schulz-Dubois (Eds.), North-Holland Publishing Company, Amsterdam, 1972, and "Theory of Stokes Pulse Shapes in Transient Stimulated Raman Scattering," by R. L. Carman, F. Shimizu, C. S. Wang and N. Bloembergen, *Physical Review A*, Vol. 2, No. 1, pp. 60-72, 1970. The initial noise source is similar to that given in the pump ASE noise discussion.

Under the assumption that the sections are decoupled, the extraction pulse forward ASE is given in Table 3 for the exemplary design. Calculations indicate that the peak angle for ASE loss varies between sections. Another factor that may reduce the coupling between sections is the fact that the gain peaks occur at substantially separated wavelengths for different scattering media. Thus, multisection stages as discussed above may have decoupling due to such transient gain and angularly dependent effects that lead to the limits by the second Stokes ASE generated by the extraction pulse in a given single section. The separation of the sections comprising a stage was as shown in FIG. 1 and may permit operation with gains and fluences larger than with unseparated sections. In addition, as will be shown below, a section/stage may be segmented with optical separation and/or absorbing boundaries to isolate the segment and lead to larger energies, gains and time compressions as well.

Figure 4:
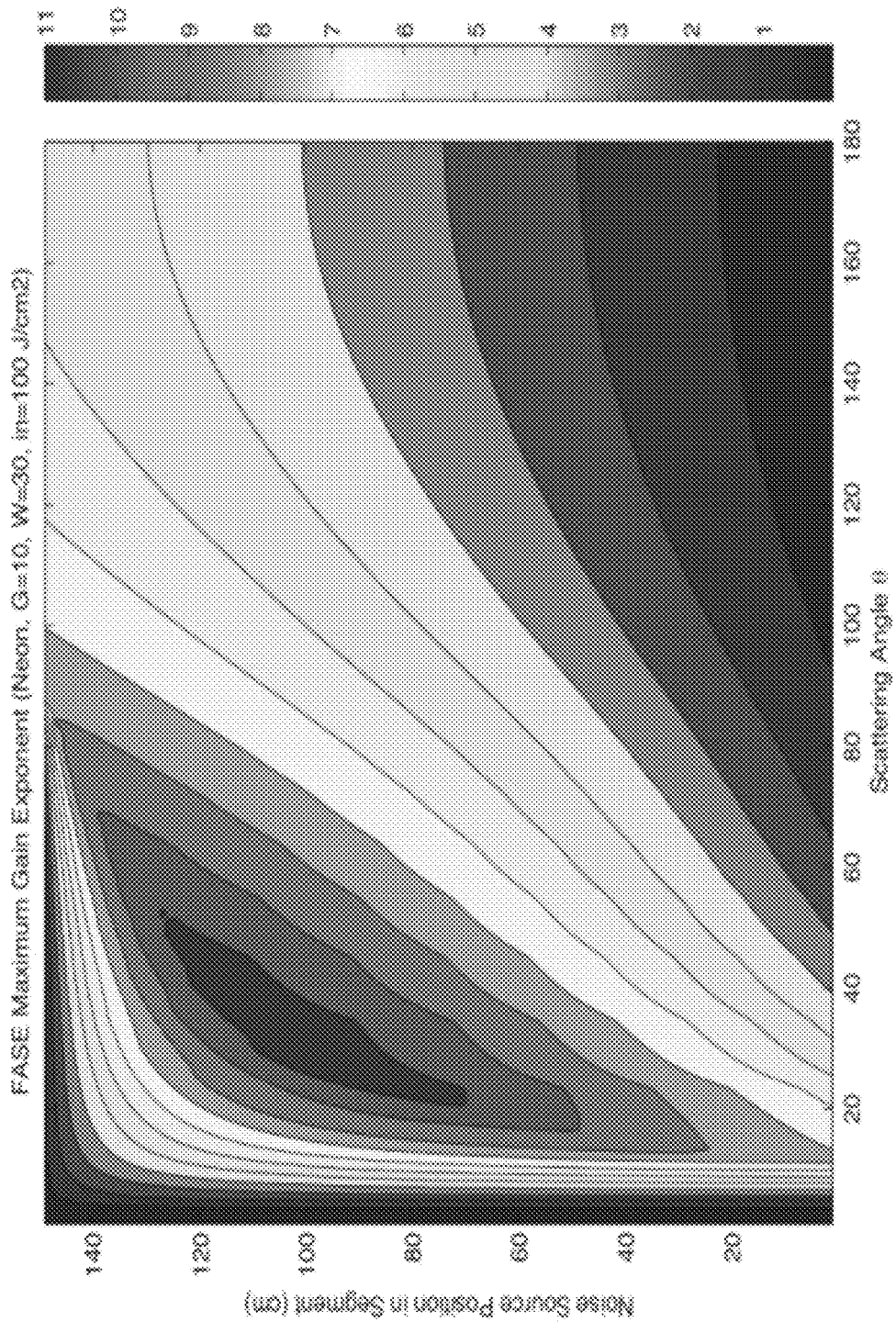
FIG. 4 compares the gain for Forward ASE with a transient cutoff.
Figure 5B:
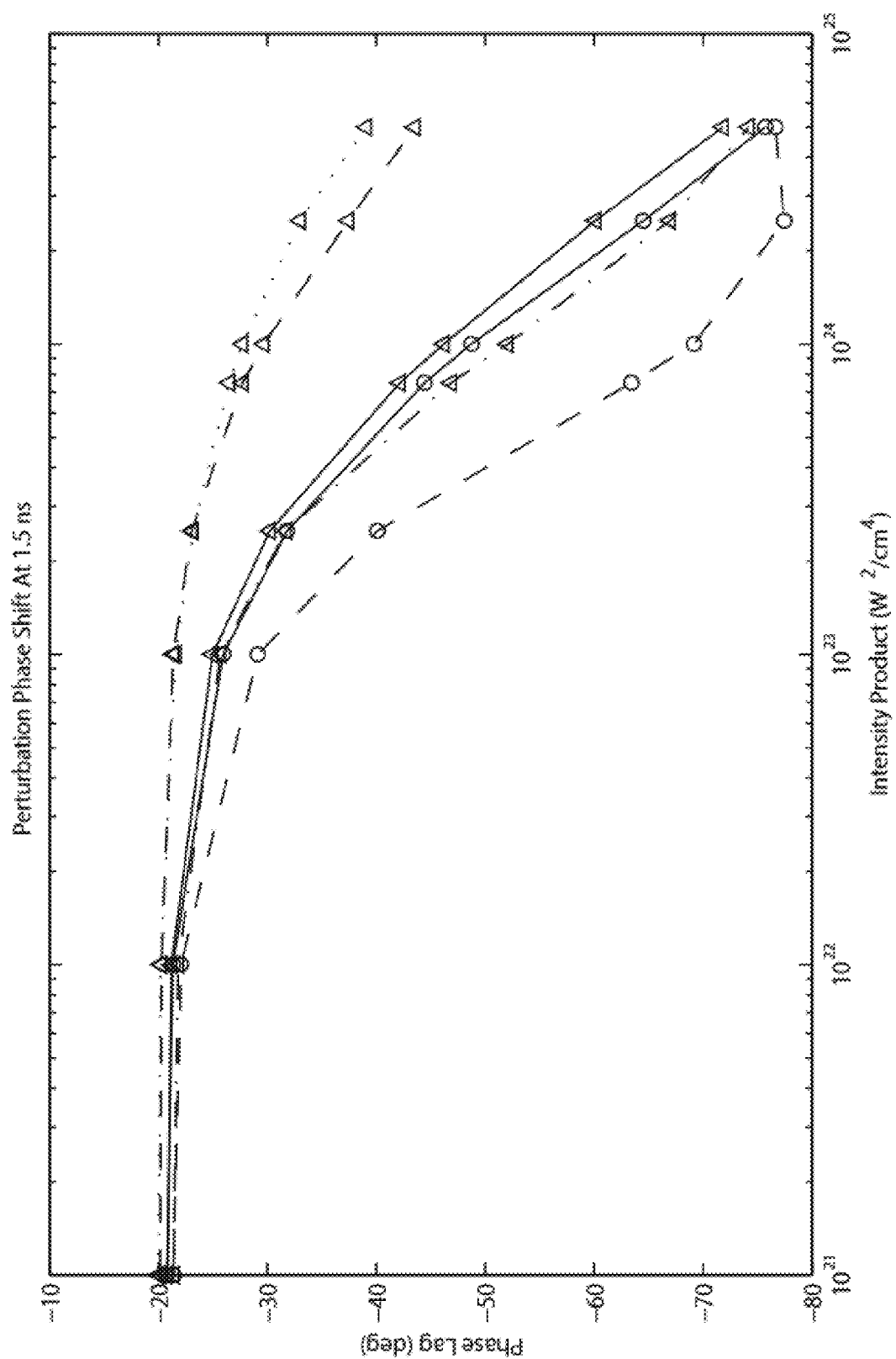
FIG. 5 compares the saturation characteristics for STMS under various conditions: (5A) Instantaneous Coupling Constant at 1.5 ns, (5B) Perturbation Phase Shift at 1.5 ns, (5C) 10%-90% Rise Time, (5D) Density Perturbation in Other Frequency Components at 1.5 ns.
Figure 5C:
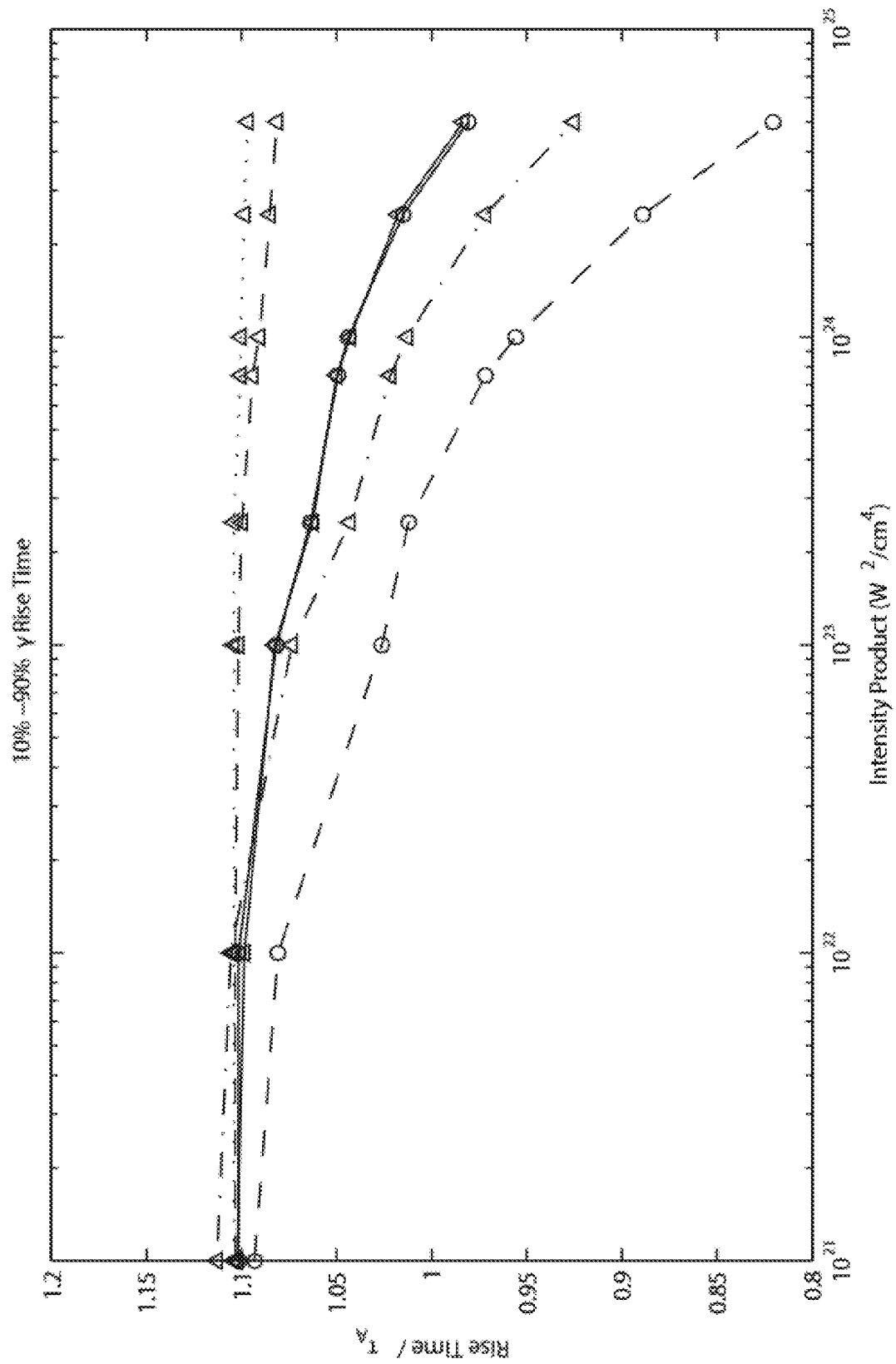

As an illustrative example, consider FIG. 4. This shows a calculation for the ASE emitted by a 1 nanosecond pulse that is amplified in a $G_{SS}=10$ section with neon as the active medium. The extraction pulse enters at $1\varepsilon_{sat}$ fluence at the bottom of the figure (Z=0) and exits at a fluence of $10\varepsilon_{sat}$ (Z=150 cm) for the 30 cm. diameter section. Note that since the extraction beam is gaining energy as it propagates from the entrance to exit, the local gain coefficient, $\gamma_c I_s(z)$ seen by the extraction pulse ASE is increasing. However, the transient response of the medium drives the gain to 0 for ASE exactly co-propagating with the extraction beam. The net effect is to produce peak ASE, propagating at around 20°-30° with the model from the extraction pulse optical axis. As the extraction pulse ASE peaks at different angles in different media, this tends to decouple the sections. Also, in the transition from one section to another, the ASE extraction pulse changes from a high number of saturation fluences to a low number (often of order unity) at the entrance to the next section. Hence, the ASE will leave the second section due to its angular propagation direction before it encounters the peak of the ASE amplification that occurs near the exit of a section. In addition, the peak extraction pulse ASE is frequency shifted from one section to another as the scattering medium changes. Together, these effects may decouple extraction pulse ASE from section to section.

For the example shown, amplification as a function of θ is falling off below about 20° and goes to 0 (no amplification) at 0° for a 1 nanosecond pulse. Thus, angular restriction of the Extraction Pulse FASE noise rays serves to restrict the energy lost. For the scattering situation shown, with typically a 150 cm scattering length, detailed calculations displayed herein may indicate acceptable energy loss fraction ($\sim 10^{-2}$). As shown in FIG. 2, this would mean keeping the section aspect ratio, defined as L/W, above about 5. This is defined from Shutter S4 (122) and Shutter S5 (122), and the spaces between filled with any Propagation Gas (128) not pumped by the Pump 1 (108), Pump 2 (114), and Pump 3 (120). The geometry between the Sections may be chosen to filter out all, or substantially all, of the extraction pulse ASE by making the intrasection spaces large enough that, for a particular beam cutoff angle, $\theta_{CUT}$, the extraction pulse ASE ($\theta > \theta_{CUT}$) may propagate outside the Section Overlap Region (150) for the next section. In addition, for a given section, a region may be unpumped and serve such an angular filtering function within a section itself. In addition, the extraction pulse ASE from a section will impinge on the input to the next section, and its growth may be calculated and thereby set the geometry such that appreciable extraction pulse ASE may not be produced in the next section.

As compared to the limitations on Raman pulse compression as analyzed in "Raman Pulse Compression of Excimer Lasers for Application to Laser Fusion," supra, the STMS process for backscattered extraction with 1 amagat noble gases, for example, is not as sensitive to pulse compression ratios and may yield higher temporal compression ratios at high efficiency than Raman processes. A practical consequence of section decoupling may be that the sections need not be spatially separated.

Figure 19:
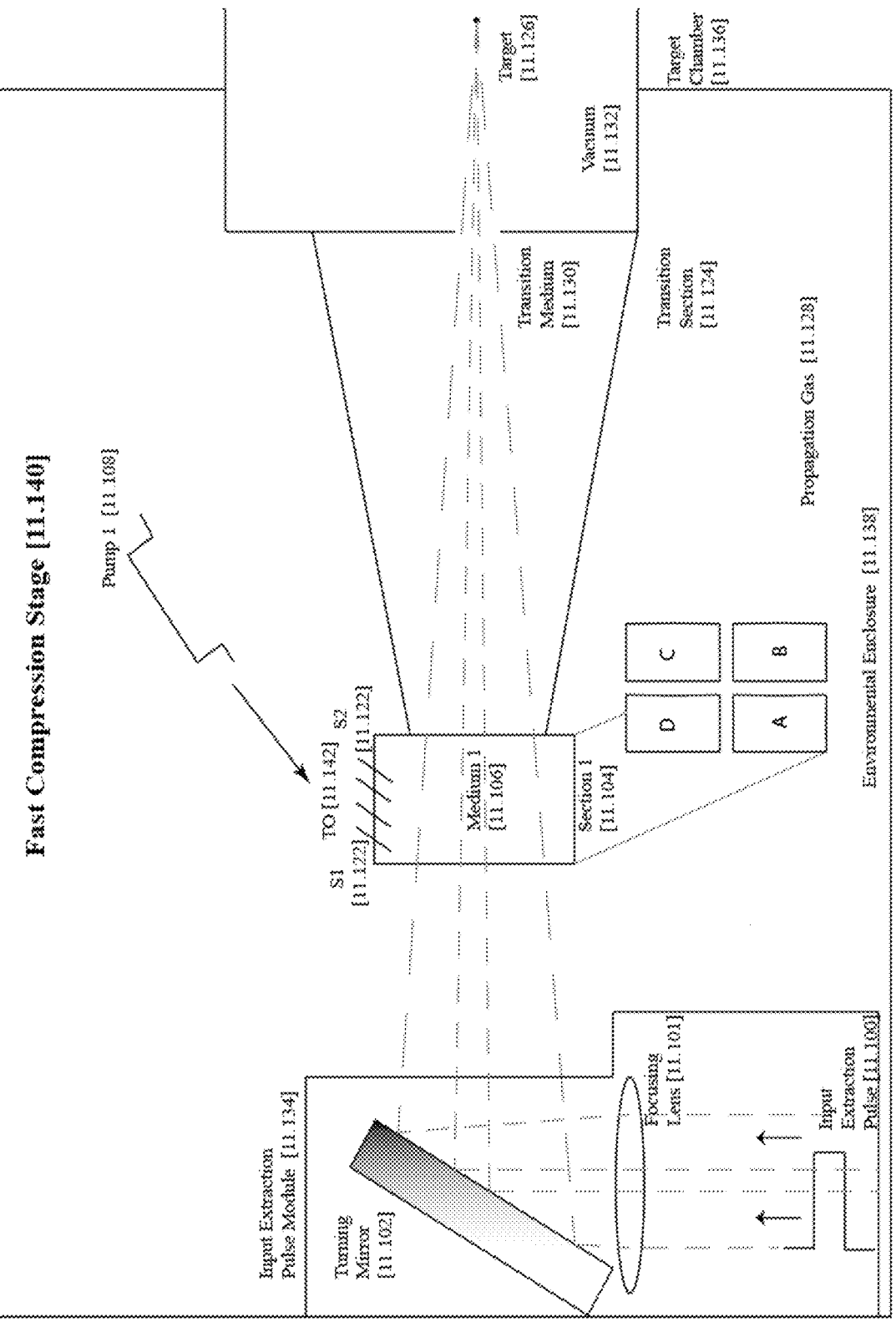
FIG. 19 shows an optical system with a segmented compression stage wherein the extraction pulse may be segmented optically or physically to reduce coupling between portions of the beam.
Figure 20:
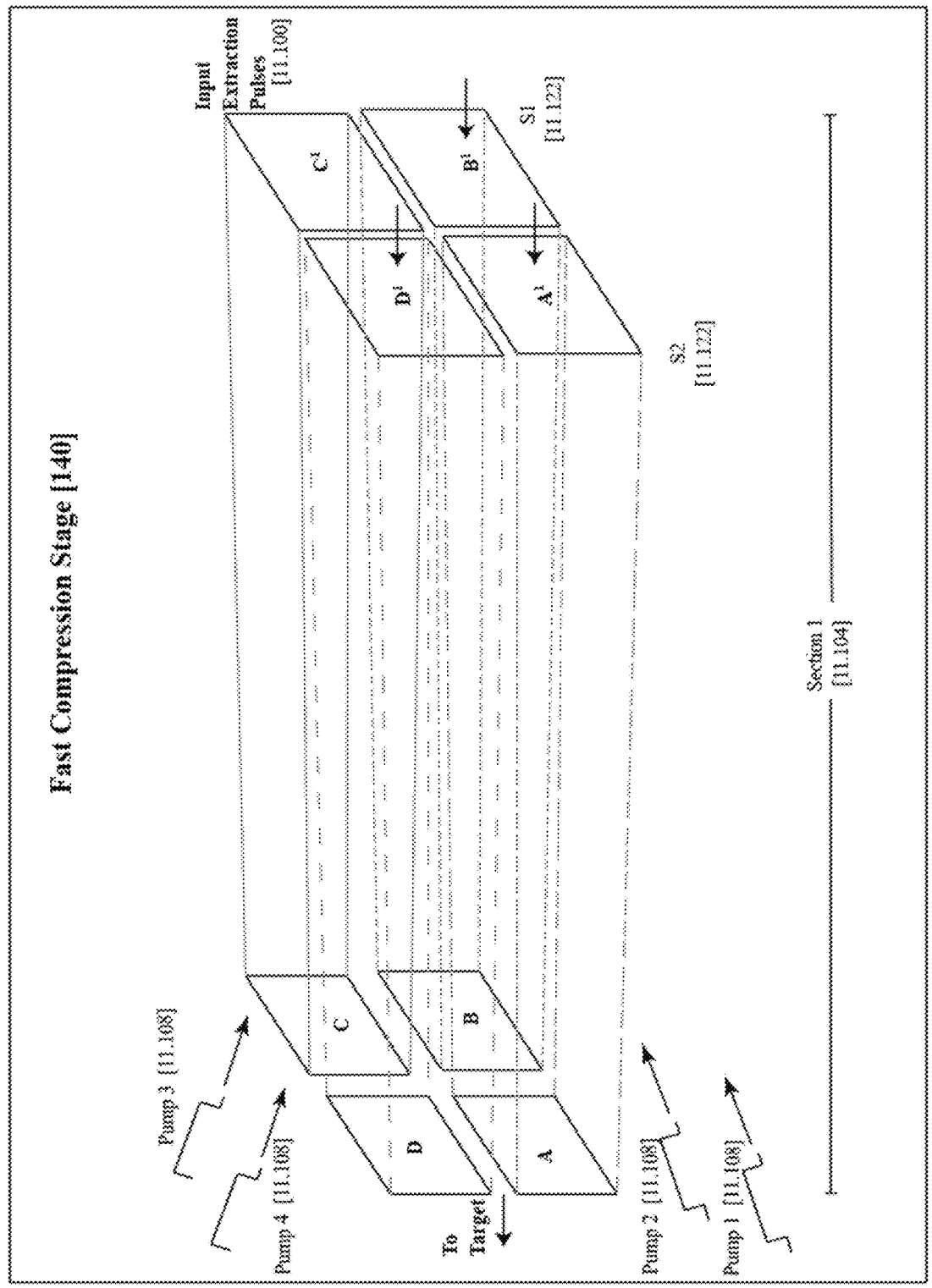
FIG. 20 shows an optical system with a segmented compression stage corresponding to different frequency pump matched extraction pulse segments.

By transversely segmenting an output, the desired energy output may be obtained from multiple segments subject to individual segment constraints. If the segments are packaged closely together, a compact array may be produced. For example, if a total energy output desired exceeds that available from a single aperture as set by extraction pulse FASE and/or pump pulse BASE, then multiple apertures may be utilized in a fashion such that they cannot communicate in terms of the limiting phenomenon. In addition to physical baffling/separation, there are other ways to segment the output. Two variants are shown in FIG. 19 and FIG. 20. In FIG. 19 the same pump frequency is utilized for different segments. However, the extraction beams may be offset in their frequencies such that the extraction pulse ASE from one segment is not amplified substantially by the extraction beam in the adjacent segment or does not reach it. For STMS, this condition would correspond to a frequency shift between the extraction beams at least on the order of the Brillouin shift for ASE propagating in that direction. As an example, the Brillouin shifts in the neon for typical angles are:

TABLE 6

Scattering Line Parameters in Neon
(STP, wavelength of .25 microns)

| Scattering Angle | Brillouin Shift (Hertz) | Brillouin FWHM (Hertz) | $\tau_{ph}$ (seconds) |
| --- | --- | --- | --- |
| 1° | $3.0 \times 10^7$ | $3.1 \times 10^6$ | $5.1 \times 10^{-8}$ |
| 5° | $1.5 \times 10^8$ | $7.3 \times 10^7$ | $2.2 \times 10^{-9}$ |
| 10° | $2.9 \times 10^8$ | $2.6 \times 10^8$ | $6.1 \times 10^{-10}$ |
| 20° | $5.5 \times 10^8$ | $6.6 \times 10^8$ | $2.4 \times 10^{-10}$ |
| 30° | $7.8 \times 10^8$ | $1.0 \times 10^9$ | $1.5 \times 10^{-10}$ |
| 40° | $1.0 \times 10^9$ | $1.4 \times 10^9$ | $1.1 \times 10^{-10}$ |
| 180° | $2.8 \times 10^9$ | $4.24 \times 10^9$ | $3.8 \times 10^{-11}$ |

Thus, if the extraction pulse FASE is at 20°, adjacent segments would need to be separated by $5.5 \times 10^8$ Hz in extraction pulse color using this criterion. Note that for the 180° case (backscatter), the linewidth is $4.24 \times 10^9$ Hz, meaning that many (~5) separate color lines for color separated extraction pulses could be accommodated for a common pump color. FIG. 20 shows different pump pulse colors associated with different Extraction Pulse Colors. Other transverse isolation techniques are discussed below as well.

Similarly, the adjacent segments may have orthogonal polarization in the extraction pulses. Then, the FASE would not be amplified in the adjacent segment. Also, if the pulses are temporally separated such that an adjacent extraction pulse does not overlap a given extraction pulse in time, the ASE from one will not be amplified in the other. Any combination of these techniques may be used to isolate a segment from its neighbors. As to the pump BASE limitations, is not strongly affected by the reduced solid angle; one way to control it is to have sections, or portions of sections, pumped with two orthogonal polarizations. A single extraction polarization may be chosen to couple to both pump polarizations. For linear polarization, this might correspond to a vertical extraction pulse linear polarization with the two pump polarizations at ±45°. The extraction pulse saturation coupling constant to the pumps would than be ½ that for 0° separation in the STMS case, but the pulse BASE would see G a factor of 2 less than for a single pump polarization.

The calculation shown below of such ASE for an STMS (Table 13) case indicates such limitations. At 1 atmosphere pressure near room temperature, the noble gases and nitrogen are in a regime where the Brillouin lines corresponding to acoustic waves are heavily damped for a 180° scattering angle (direct backscatter) with 0.25 micron wavelength light. This scattering is in the kinetic regime where the transition from single particle interaction without collisions to the hydrodynamic region with collective medium response takes place. The language used to describe this transition is varied; herein the designation stimulated molecular scattering (STMS) is used. In the collisionally dominated regime, depending primarily on density, gas parameters, scattering wavelength, and angle, this turns into Brillouin scattering. In the low pressure regime where kinetic theory is used to describe the scattering, as compared to hydrodynamic theory for the Brillouin scattering, the interaction of the light fields and the atomic/molecular scatterers may take place in a region where the collisions are frequent enough to fill in the velocity distribution function but not yet frequent enough to produce hydrodynamic behavior. See, for example, "Spectrum of Light Scattered from Thermal Fluctuations in Gases," supra, with theory provided in "Application of a Kinetic Model to Time-Dependent Density Correlations in Fluids," supra. Stimulated laser scattering in this regime for $N_2$ was reported in "Stimulated Molecular Scattering of Light in Gases at Different Pressures," supra, and "Experimental Investigation of Stimulated Molecular Scattering in Nitrogen in the Pressure Range 1-4 atm," by V. S. Averbakh, A. I. Makarov and A. K. Potemkin, *Soviet Journal of Quantum Electronics*, Vol. 9, No. 12, pp. 1574-1575, 1979. In Table 2, the STMS values for STP conditions and a particular kinetic theory formulation ("Stimulated Molecular Scattering of Light in Gases at Different Pressures," supra) are shown for backward scattering. The STMS values are utilized for sizing the Lookthrough Compression Arrangement based on coupling constants and ASE constraints.

In addition, gain saturation and amplification properties are of interest. At a short enough pulse length, there will be little or no effect on gain and saturation by atomic/molecular collisions and the lower laser state will behave as the evolution of the distribution function of single atomic or molecular scatterers. For an exemplary $10^{-9}$ second pulse, typical collision frequencies may be on the order of $3 \times 10^9$ $sec^{-1}$, indicating collisions may play a role. Both the coupling effects and saturation properties then depend on a given design and need to be verified in detail (theoretically and/or experimentally) in such a transition regime. The behavior at a $1.5 \times 10^{-9}$ second pulse length has been examined in some detail (shown in FIG. 5A-D).

Figure 34:
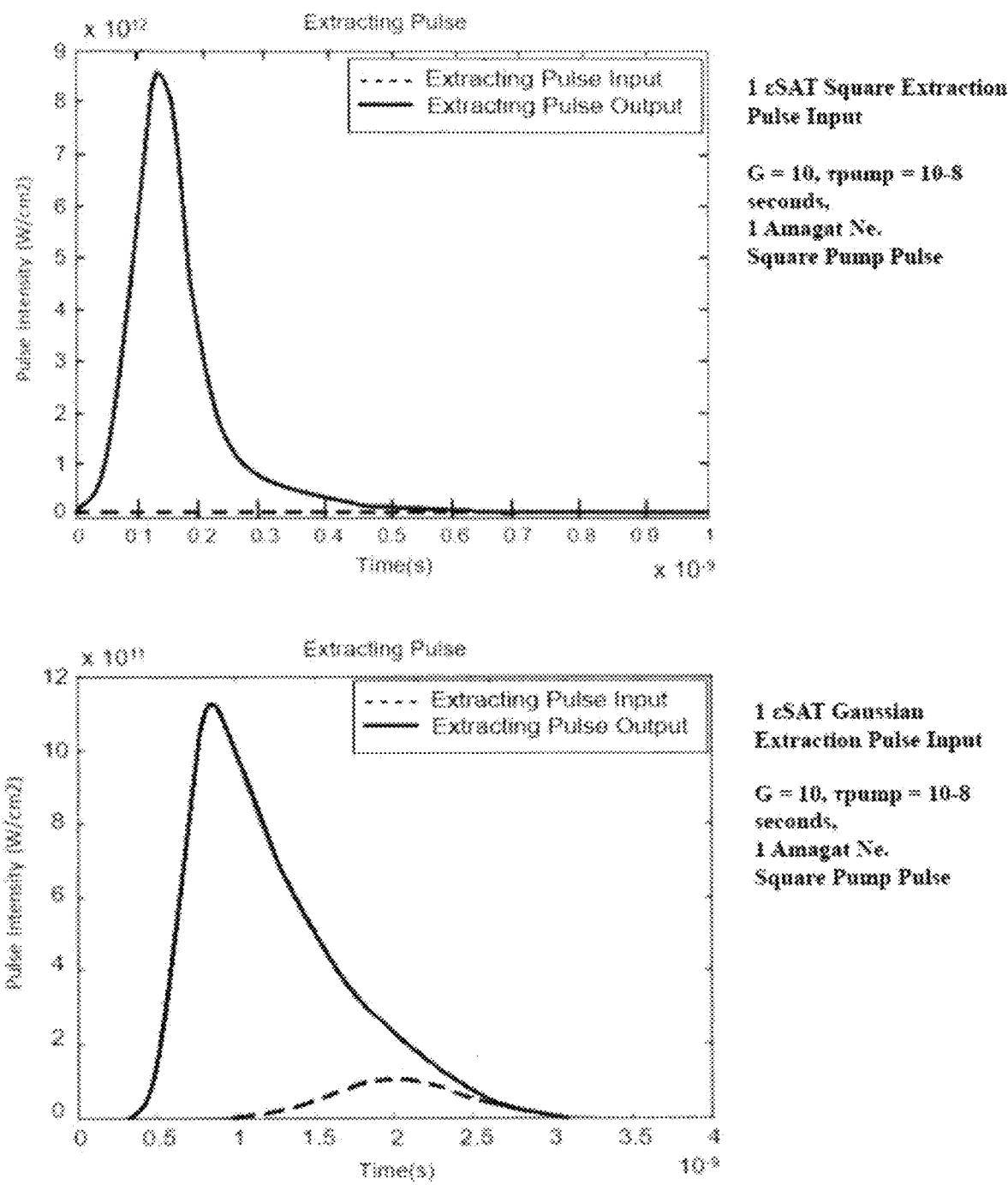
FIG. 34 plots the input and output extraction pulse shapes for two extraction pulse shapes.

In terms of the gain medium's ability to support backward STMS amplification, the simulation results based on Bhatnagar-Gross-Krook [BGK] theory indicate that at STP conditions and a wavelength of 0.25 microns, the basic scattering process coupling properties are linear up to a signal extraction and pump intensity product on the order of $I_P I_S = 10^{24}$ watts$^2$/cm$^4$ (see FIG. 5A-D). The density fluctuation resulting from the beat wave between the pump and extraction waves may then provide very good amplification properties with relatively constant parameters up to that product of pump and extraction intensities. Above roughly that value, the wave amplitude product may be large enough to begin introducing nonlinear effects into the amplification properties. In many laser media there are saturation effects; i.e., at a large enough extraction flux, the gain is reduced as a function of frequency across the linewidth. For homogeneous transitions the gain is uniformly lowered across the lineshape as the optical flux increases. In an inhomogeneous transition the lineshape changes nonuniformly as a function of the laser flux. In some types of lasers, such as the free-electron laser (FEL), the energy to be converted to output optical light energy may be carried by an electron beam; once a certain energy fraction is extracted (converted to amplified signal energy) the electron trajectories may be sufficiently modified such as to preclude further efficient conversion. Here, using STMS, the medium serves as a way to couple the two beams with very small energy transferred to the medium (the fractional energy transfer to the medium in the course of the stimulated scattering process is around $10^{-6}$ of the converted energy) and the collision frequency is high enough to fill in the distribution. Consequently, the perturbation due to the extraction is small; this may result in very high conversion efficiency and advantageous saturation properties. However, at large enough values of the beat wave amplitudes that drive the stimulated process, the distribution function of the particles is distorted and such distortion may result in changes of the properties of the amplifying medium; i.e. the line becomes inhomogeneous and the gain coupling constant is lowered (saturation). One way to characterize the properties of such a coupling medium may be shown in terms of the gain coupling constant ($\gamma_c$), the phase shift of the coupling polarization from the pump-signal beat wave ($\Delta\Phi$), the introduction of other frequency components into the coupling polarization (percent of energy in frequency components other than the fundamental beat wave), and the rise time, $\tau_{10\%-90\%}$, in terms of response to a square pulse. FIG. 34 shows these parameters from simulations over a large range of pump-extraction flux products. Up to and above $10^{24}$ watts$^2$/cm$^4$ for typical scattering conditions of interest, these gases may act as very good amplifiers. The line also appears basically homogenous below these values. This conclusion may apply to mixtures of these gases, as well, near STP conditions. Such results may be sensitive to density and temperature.

For neon and helium, the falloff in properties goes to somewhat higher flux product. These calculations may show the suitability of operating at high extraction fluences. The scaling with the product of the signal and pump fluxes indicates $I_s I_p \cong 10^{24}$ watts$^2$/cm$^4$; for an efficient amplifier $I_s$ may be approximately $KI_P$, and a simple scaling leads to:

$$I_s \cong \sqrt{K} 10^{12} \text{ watt/cm}^2,$$

where K is the temporal compression ratio. If operating as an amplifier with a temporal compression of 10, this may correspond to an extraction optical flux of about $3 \times 10^{12}$ watts/cm$^2$, or, for a $10^{-9}$ sec pulse, 3,000 joules/cm$^2$.

In terms of the scattering in these gases as the density is lowered, the gases become collisionless and nonlinearities emerge at relatively low flux levels. At a value of the ratio of wavelength of the fluctuation, $\lambda_F$, transferred to the medium in the scattering process to a molecular scattering length, L, there is a transition to the hydrodynamic regime.

The characteristic parameter y is of the order $$\sim .1 \frac{\lambda_F}{L}$$

(see T. J. Greytak, Doctoral Dissertation, "Spectrum of Light Scattered from Thermal Fluctuations in Gases," Massachusetts Institute of Technology, Cambridge, Mass., pp. 1-156, 1967). Thus y is 0 in the collisionless regime, and a value of 2 or more marks the transition to the hydrodynamic regime. In between, the collisions have the effect of introducing a term to the kinetic equation that drives the distribution back towards a Maxwellian in velocity space. Collisions then redistribute the distribution function distortion introduced by the stimulated scattering process. For the case shown, at STP and 180° scattering of 0.25 micron light, the nonlinearities observed may be much larger if collisions are not included. This computation is for a square intensity pulse of constant frequency, set to be at the maximum of the gain curve for the scattering process, and entails a direct velocity space computation with the collisions included in a BGK model (see "A Model for Collision Processes in Gases. I. Small Amplitude Processes in Charged and Neutral One-Component Systems*," supra). The plots indicate that below a pump-signal product of $10^{23}$ watts$^2$/cm$^4$, the amplifier properties may be essentially constant for all six gases shown. At $10^{24}$ watts$^2$/cm$^4$, neon and helium appear to be suitable for high fidelity amplification. By $10^{25}$ watts$^2$/cm$^4$, even neon and helium may not be suitable for high fidelity amplification, primarily due to the appearance of substantial distortion due to the appearance of higher harmonics. The results shown may indicate that neon, for example, may support an energy fluence of $4 \times 10^3$ joules/cm$^2$ for a $1.5 \times 10^{-9}$ second pulse in the extraction beam at a time compression factor of 10. The stimulated gain risetime would be around 0.1 nanoseconds, or 0.067 of the pulse length. These results may indicate the feasibility of operating with fluences of $10^3$-$10^5$ joules/cm$^2$ for $10^{-9}$-$10^{-8}$ second pulse lengths while retaining very good amplification properties for such gases and conditions. In addition, pulses as short as $10^{-10}$ seconds may be realizable.

Breakdown

Another key phenomenon is the breakdown (ionization of the initially neutral gas atom and/or molecules) by the pump and/or extraction optical fields. Data on breakdown as a function of pressure near 1 atmosphere pressure in some gases of interest are given in "Measurement of KrF Laser Breakdown Threshold in Gases," supra. These data were taken with a $1.8 \times 10^{-8}$ second pulse length, and the pressure scaling indicates the breakdown is largely dominated by inverse bremmstrahlung absorption of laser energy by electrons leading to collisional excitation of electronic states and subsequent rapid ionization by electrons or photons. At shorter pulse lengths, there may be a transition to a multiphoton ionization absorption dominated regime. The breakdown fluences given in Table 2 are estimates for $10^{-9}$ and $10^{-8}$ second pulse lengths. The composition of the gas and the exact operating wavelength (particularly as multiphoton processes become important) will affect these estimates as well as the pulse length. The parameter $R_B$ is the ratio between the breakdown fluence and the saturating extraction fluence $S_b$, where $$S_b = \frac{2}{\gamma_c C}$$

at a 180° scattering angle. The production of absorbing species below breakdown is a strong function of the flux; a factor of 2-4 in flux may be sufficient to keep concentration growth at acceptable levels. (see, for example, A. V. Phelps, in "Theory of Growth of Ionization During Laser Breakdown," *Physics of Quantum Electronics: Conference Proceedings*," P. L. Kelley, B. Lax, and P. E. Tannenwald (Eds.), McGraw-Hill Book Company, New York, pp. 538-547, 1966). In addition to electrical breakdown, a large optical flux may strongly affect molecules by processes such as multiphoton absorption and photodissociation. Although other molecules other than the certain hydrogen and nitrogen isotopes discussed herein may be used, the discussion herein centers on a few simple molecules as being well understood, experimentally well characterized, and adequate for the discussions illustrating the principles contained herein.

Saturation

Rotational Raman scattering parameters for $N_2$ and HD are shown in Table 2. The coupling coefficient is relatively large. Since the lower state for lasing action is a bound rotational state, there is a constraint associated with lower state population buildup, as the rotational relaxation time of some $0.3 \times 10^{-9}$ seconds at 1 atmosphere (for $N_2$, longer for HD) is of the order of a $10^{-9}$ second extraction pulse length. The STMS scatterers were discussed above for one set of conditions. However, at elevated pressures where Brillouin scattering dominates in the backward direction and the lower level lifetime becomes longer (about $10^{-9}$ seconds at 10 atmospheres pressure in $N_2$ from "Stimulated Molecular Scattering of Light in Gases at Different Pressures," supra), lower state behavior then becomes a major concern. For example, Damzen and Hutchinson conducted numerical studies, ("Laser Pulse Compression by Stimulated Brillouin Scattering in Tapered Waveguides," supra), measured certain phonon lifetimes for Brillouin scattering at high pressure (M. J. Damzen, M. H. R. Hutchinson and W. A. Schroder, "Direct Measurement of the Acoustic Decay Times of Hypersonic Waves Generated by SBS," *IEEE Journal of Quantum Electronics*, Vol. QE-23, No. 3, pp. 328-334, 1987), and experimentally obtained high efficiency extraction in the high pressure regime (M. J. Damzen and H. Hutchinson, "High-Efficiency Laser Pulse Compression by Stimulated Brillouin Scattering," *Optics Letters*, Vol. 8, No. 6, pp. 313-315, 1983). These works were performed at relatively low extraction fluences due to the higher pressure. Many others have performed such work in the Brillouin regime.

Transient Effects

There may be several aspects of amplification that are related to the time history of the pump and signal beams and may be of interest in the design and performance of such amplifiers.

(1) The response of the scattering medium itself. The transfer of energy from the pump beam to the extraction beam may be mediated by the induced polarization caused by the frequency difference between the two beams (the beat wave). In the stimulated scattering process, it takes time for the polarization to develop as the response evolves with a local characteristic time scale of the phonon lifetime, due to decay or dephasing, $\tau_{ph}$. Along a path length l with a steady state gain coefficient $\gamma_c$ and assumed constant pump flux $I_p$, the small signal gain ($e^G$) for the signal flux $I_S$, initially evolves with $G \sim (2\gamma_c I_p l \tau/\tau_{ph})^{1/2}$ and, on a time scale of $\gamma_c I_p l \tau_{ph}$, approaches the steady state gain and then $G = G_{SS} = \gamma_c I_p l$. In the section on gain and saturation, the response to a square beat wave (square $I_p$ and $I_S$ in time)

was presented for STMS. E. E. Hagenlocker, R. W. Minck and W. G. Rado, "Effects of Phonon Lifetime on Stimulated Optical Scattering in Gases," *The Physical Review*, Vol. 154, No. 2, pp. 226-233, 1967; M. Maier and G. Renner, "Transient Threshold Power of Stimulated Brillouin Raman Scattering," *Physics Letters*, Vol. 34A, No. 6, pp. 299-300, 1971; "Theory of Stokes Pulse Shapes in Transient Stimulated Raman Scattering," supra *Physical Review A*, Vol. 2, No. 1, pp. 60-72, 1970; and E. E. Hagenlocker and W. G. Rado, "Stimulated Brillouin and Raman Scattering in Gases," *Applied Physics Letters*, Vol. 7, No. 9, pp. 236-238, 1965, describe various aspects of the temporal evolution of the gain related to the evolution of the stimulated scattering process itself.

(2) The choice between HD SRRS and $N_2$ STMS or SRRS is related to the respective linewidth and the desire not to saturate the population on the Raman transition during the extraction pulse. For pure $N_2$ on a single SRRS transition, a total of about $$\frac{.035}{2} \times 2.7 \times 10^{19} \text{ cm}^{-3} \times P_{N_2}(\text{atm}) \times$$

$$\frac{5 \text{ ev}}{\text{photon}} 1.6 \times 10^{-19} \text{joules/ev} \times 150 \text{ cm} = 57 P_{N_2}(\text{atm})\text{joules/cm}^2.$$

Here, 0.035 is a typical rotational state fraction and 2 comes from lower level saturation, and the 57 joules/cm² at $P_{N2}$=1 atmosphere is available if there is no collisional rotational relaxation during the extraction pulse. If the extraction pulse length were extended to 3 nanoseconds, given a rotational relaxation rate of $3 \times 10^9$ sec$^{-1}$ in $N_2$, well over 100 joules/cm² would be available for a 1 atmosphere $N_2$ pressure. For HD, the fraction would be some 20 times larger due to the rotational state fraction parameters. However, the higher coupling constant for SRRS in HD leads to lower concentration for the same coupling parameter as $N_2$. For STMS in $N_2$, saturation is not a problem for these first section designs, but the noise level is much higher than for Raman scattering. Vibrational transitions may be considered as well. Then relaxation times may be considerably longer than those for rotational transitions.

(3) For a finite pulse in time, the minimum (bandwidth limited) frequency bandwidth times pulse length product is $\Delta v_{s\ 1/2} \Delta t_{p\ 1/2} \cong 0.44$ for a Gaussian pulse, where $\Delta t_{p\ 1/2}$ is the FWHM in time and $\Delta v_{s\ 1/2}$ needed is the FWHM in Hertz. Thus, if the pulse length is $10^{-9}$ seconds, the $\Delta v_{s\ 1/2}$ is about $4.4 \times 10^8$ Hertz. Table 2 gives the FWHM of the Stokes line for certain scatterers of interest. They support amplifications of pulses on the nanosecond time scale. If the gain G has a temporal history, it may narrow an extraction or ASE pulse in time and, hence, may spread the spectrum out sufficiently to alter its coupling to the medium. Such broadening is on the order of $$\Delta v_{s1/2} \simeq \frac{2(G)^{1/2}}{\Delta t_{P_{1/2}}}.$$

See, for example, "Gain and Noise Characteristics of a Brillouin Amplifier and their Dependence on the Spatial Structure of the Pump Beam," supra.

(4) In an amplification medium with a bounded frequency response, the gain may not be uniform as a function of frequency. This may lead to the need for a full transient treatment when the signal bandwidth approaches that of the gain medium. Nonlinear Kramers-Kronig may produce substantial shift, depending on the lineshape.

These four major considerations influence the scaling of the sections and stages that are discussed herein. Of course, they may affect the evolution of the extraction pulse as it passes through the medium. In general, the ASE energy that competes for the pump or extraction pulse energy arises from noise and entails many e-foldings (20-30) before it gets to an appreciable level relative to the pump or extraction pulse fluences. Thus, the transient behavior may have a major influence on allowable geometries, etc. The signal amplification fidelity and overall efficiency may be important for compressors as discussed herein. The influence of the above factors may be determinative with respect to obtaining a good beam quality pulse of the desired pulse shape at high efficiency.

Self-Focusing

One of the major limitations in glass lasers that store energy and then extract it in a short pulse is self-focusing. As the extraction pulse propagates through the glass medium, its electric field produces a contribution to the index of refraction proportional to the local intensity. Then the index is higher where the intensity is higher. For initial transverse intensity perturbations, a corresponding phase perturbation is then generated due to the nonlinear index. This optical change may produce further focusing of the intensity perturbation and leads to two phenomena, namely self-focusing and beam breakup, that are major limitations in the architecture and operation of glass lasers due to the damage to the glass laser material that follows from these effects and consequent inability to focus.

TABLE 7

Estimated Nonlinear Coefficients for Gases

| Gas | $\chi^{(3)}$ @1.06 μm cm³cm³ erg⁻¹ (1) | $\chi^{(3)}$ @ .25 μm cm³cm³ erg⁻¹ (2) | $n_{20}$ (cm²/ watt amagat) (3) | $n_{20}$ (cm²/ watt amagat) (4) |
|---|---|---|---|---|
| He | $3.6 \times 10^{-39}$ | $4.46 \times 10^{-39}$ | $4.73 \times 10^{-21}$ | $5 \times 10^{-21}$ |
| Ne | $7 \times 10^{-39}$ | $1.12 \times 10^{-38}$ | $1.18 \times 10^{-20}$ | $6.7 \times 10^{-21}$ |
| Ar | $1 \times 10^{-37}$ | $1.8 \times 10^{-37}$ | $1.9 \times 10^{-19}$ | $3.2 \times 10^{-19}$ |
| Kr | $3 \times 10^{-37}$ | $6.0 \times 10^{-37}$ | $6.36 \times 10^{-19}$ | — |
| Xe | $7.6 \times 10^{-37}$ | $3 \times 10^{-36}$ | $3.1 \times 10^{-18}$ | — |
| $N_2$ | — | — | — | $8.3 \times 10^{-19}$ |

(1) Averaged experimental values, Table III "*Atoms in Intense Laser Fields*," by M. Gavrila (Ed.), Academic Press, New York, 1992, (B9).
(2) Estimated wavelength dependence, scaling to .25 μm.
(3) Using formulas in Gavrila (B9) $n - 1 = n_2|E_0|^2$, $n_2 = \frac{3\pi}{2} N\chi^{(3)}$ using $I = \frac{cn}{8\pi}|E_0^2|$,
and $\chi^{(3)} = \chi^{(3)}$ at .25μ from Table 4, $n - 1 = \frac{3\pi}{2} N\chi^{(3)}|E_0|^2 = \frac{3\pi}{2} N\chi^{(3)} \frac{I}{c} 8\pi = n_{20}I$.
(4) "Measurement of the Nonlinear Refractive Index of Air and Other Gases at 248 nm," by M.J. Shaw, C.J. Hooker and D.C. Wilson, *Optics Communications*, Vol. 103, pp. 153-160, 1993 (J150).

For the noble gases and $N_2$, the parameters relating to self-focusing are presented in Table 7. The first column gives $\chi^{(3)}$ in the notation of *Atoms in Intense Laser Fields*, by M. Gavrila (Ed.), Academic Press, New York, 1992, where $\chi_{1.06}^{(3)}$ is stated for a 1.06 μm wavelength of light. $\chi_{0.25}^{(3)}$ is the next column and is scaled to 0.25 μm wavelength from 1.06 μm based on factors estimated from D. M. Bishop and B. Lam, "Ab Initio Study of Third-Order Nonlinear Optical Properties of helium," *Physical Review A*, Vol. 37, No. 2, pp. 464-469, 1988, computed for helium. These are then converted to simple coupling coefficient using the formula:n−1=$n_0$+$n_{20}$I. Then the contribution to the wavefront distortion may be calculated. The key parameter is the B integral, B=$\int_0^L$[2π/λ] $n_{20}$I(z)dz, which is the accumulated phase difference due to the nonlinear term. This integral is an indication of the effects mentioned above as they relate to laser amplifiers. For a near diffraction limited imaging system, S≅$e^{-B^2rms}$ for small B (less than 1 radian), where S is the Strehl ratio. Typically, the $B_{rms}$ is about ⅓ B. This leads to a criterion of 0.3 radians rms, or 0.9 radians peak to peak, to maintain good optical performance. Typical glass laser sections for ICF are designed and operated with a B integral up to 2-3. These imaging criteria may be related to input intensity variations. For glass lasers at their operating wavelength, characteristic values are $n_{20}$≅4×$10^{-16}$ $cm^2$/watt for ED-2 glass, see, for example, E. S. Bliss, J. T. Hunt, P. A. Renard, G. E. Sommargren, and H. J. Weaver, "Effects of Nonlinear Propagation on Laser Focusing Properties," *IEEE Journal of Quantum Electronics*, QE-12, No. 7, pp. 402-406, 1976); and $10^{-16}$ $cm^2$/watt ("Solid-State Lasers for ICF," supra). Note this is 3 to 4 orders of magnitude higher than $n_{20}$ for the noble gases at 1 amagat as shown in Table 7. The B integral can be computed as the sum of the section values:

$$B_{SECTION} = \int_0^{L_S} \frac{2\pi}{\lambda_s} n_{20_s} I(z) dz.$$

As an example, the integral is estimated for the sections of FIG. 3. This gives 0.388 radians for all 3 sections. The results are displayed in Table 8.

TABLE 8

B Integral Calculation

B integral in straight amplifier sections

B = 2π/λ $n_2$ int[z = 0:L | Is(z)]
$n_2$ = nonlinear index of refraction    $I_o$, $I_i$ = initial, final Stokes intensity
λ = Stokes wavelengths    L = gain length region
Approximate $I_s$(z) as an exponential rise
$I_s$(z) = $I_i$ * $(I_o/I_i)^{(z/L)}$
And we got for B:
B~2πn2 L/λ (Io − Ii)/ln(Io/Ii)

| Gas | Units | Ar | Ar/He | Ne |
|---|---|---|---|---|
| $n_2$ | [$cm^2$/W] | 1.90E−19 | 3.25E−20 | 1.18E−20 |
| λ | [nm] | 250 | 250 | 250 |
| $\nu_S$ | [$cm^{-1}$] | 40000 | 40000 | 40000 |
| L | [cm] | 150 | 150 | 150 |
| $I_i$ | [W/$cm^2$] | 1.00E+08 | 3.88E+10 | 2.37E+11 |
| $I_o$ | [W/$cm^2$] | 3.88E+10 | 2.37E+11 | 8.05E+11 |
| B | [rad] | 0.046 | 0.134 | 0.207 Total: 0.388 |

As a very rough estimate, relating the input spatial intensity variation Δ$I_i$, to the output, if 2:1 for $$\frac{\Delta I_o}{I_o}$$

is an acceptable output intensity variation, $$(\Delta I_o \sim I_o), \frac{\Delta I_i}{I_i} \cong 10^{-2}$$

and a 1% uniformity input beam has to be injected. The growth of intensity from phase variations depends on the transverse wave number. For just the compressor section, 0.388 radians may lead to an injected uniformity of about Δ$I_i$≈0.10 for the same exit uniformity criterion. The detailed calculation of such behaviors is well known to persons skilled in the art.

A major design constraint in amplifying short pulses is associated with nonlinear effects, usually termed self-focusing and beam breakup. See, for example, "Solid-State Lasers for ICF," supra. At the entrance to an amplifying section, small intensity modulations that are present grow with a rate given by $e^{gz}$ with $$g = K_\perp \left(\frac{n_{20}I}{n_0} - \frac{K_\perp^2}{4K^2}\right)^{1/2},$$

from p. 359. Here $K_\perp$ is the transverse wave number of the intensity modulation, $n_{20}$ is the nonlinear index of refraction, $n_0$ is the linear index of refraction of the medium, K is the wavenumber of the incident laser light, and I is the intensity of the signal laser light. This expression is attributed to Bespalov and Talanov. The maximum growth occurs for a transverse wavenumber, $K_{\perp m}$, given by $$K_{\perp m} = \left(\frac{2n_{20}I}{n}\right)^{1/2} K.$$

The maximum growth rate, $g_m$, at this $K_{\perp m}$ may be written, $$g_m = \frac{n_{20}I}{n_0} K.$$

For many of the cases discussed below, amplification occurs through a medium that is not homogeneous; i.e., where $n_{20}$ varies along the propagation path.

For typical operating parameters herein, the total phase shifts are small enough to not result in beam breakup and are small enough to support good optical imaging performance.

There are contributions from both the pump and extraction beams to the nonlinear index. As indicated above, self-focusing and beam breakup due to the extraction beams have been the subject of much work and are prominent in conventional ICF laser design. The pump beam can also produce nonlinear effects. When operating with pulse compression, at high efficiency, the extraction intensity can be many times the average pump intensity. Also, the variation through the extraction path integrated pump in a good design may be fairly small $$\left(\frac{\Delta I_P}{I_P} \cong 1 - 20\%\right.$$

and is reduced by the square root of the number of fluctuation regions the point on the extraction pulse passes through, leading to about 1% the value of the extraction pulse). This shows a pump beam B integral due to the $\Delta I_P/I_P$ some 30-100 times smaller than that due to the extraction beam for typical designs. Thus, the major design criterion may be associated with the pump uniformity being good enough to give reasonably uniform ($G_{LS\ RMS}/G_{LS} \cong 20\%$) amplification of the extraction beam.

Direct Compression Limits Due to Self-Focusing

For a single region of medium, direct compression may be limited by the B integral. A simple scaling shows the limitation due to self-focusing. The B integral for the phase change due to the non-linear index is:

$$\langle B \rangle = \frac{2\pi n_{20}}{2} \frac{L}{\lambda} I_S$$

while the gain parameter $G_{SS}$ is:

$$G_{SS} = \gamma_c I_P L.$$

Their ratio is:

$$\frac{\langle B \rangle}{G_{SS}} = \frac{2\pi n_{20} I_S}{2\gamma_C I_P \lambda}$$

and if the time compression, for an efficient amplifier, is defined as $$C \equiv \frac{I_s}{I_p},$$

$$\frac{\langle B \rangle}{G_{SS}} = \frac{2\pi n_{20} C}{2\gamma_c \lambda}.$$

For $\langle B \rangle \cong 2$, typically taken as a criterion in solid state lasers (see, for example, "Solid-State Lasers for ICF," supra), $G_{SS} \cong 10$, and using He as the gas, a value of C=48 is obtained. Table 9 gives the limiting time compressions for some gases of interest.

TABLE 9

Limiting Time Compression Ratio

| He (STMS) | 46.9 |
| Ne (STMS) | 30.3 |
| Ar (STMS) | 46.9 |
| Kr (STMS) | 81.8 |
| Xe (STMS) | 44.8 |
| N$_2$ (SRRS) | 24.9 |
| HD (SRRS) | 963 |

For certain cases in Table 9, compression up to, and perhaps above, about $3 \times 10^3$ may be achievable if limited by ASE and breakdown effects alone. One mechanism for reducing the B limitation based on the simple analysis is finite spatial coherence of the extraction beam. Also, the B integral criterion is derived for, and applies primarily to, a plane wave; finite spatial coherence may be desired in order to pump the next stage or to irradiate the target. The spread in local extraction beam propagation angles (finite spatial coherence) may tend to stabilize the beam and reduce the growth rate. These two effects, and perhaps others, may increase C to over $10^3$.

Self-Focusing Reduction Due to Finite Spatial Coherence and Free Electrons

The finite spatial coherence of the beam may be utilized to reduce and/or stabilize the beam self-focusing due to its nonlinear index. Discussions related to such effects may be found, for example, in "Self-interaction of Incoherent Light Beams," by G. A. Pasmanik, *Soviet Physics JETP*, Vol. 39, No. 2, pp. 234-238, 1974, incorporated by reference herein for all purposes. For a local spread in beam angle greater than the wavefront tilt induced by intensity fluctuations, the growth rate may be greatly reduced. The B integral that characterizes the effect of the nonlinear interaction may be estimated:

$$B \simeq \frac{2\pi l n_{20} I}{\lambda},$$

where $n_{20}$ is the nonlinear index coefficient, I is the beam flux, l a characteristic path length, and $\lambda$ is the laser wavelength. For B=$2\pi$, the perturbed optical wavefront may have lagged that of the unperturbed wavefront by 1 wavelength. Therefore, the peak induced wavefront angle $\theta$ is of the order $$\theta \sim \frac{\lambda}{\lambda_\perp},$$

where $\lambda_\perp$ is the transverse wavelength of the phase modulation. The Bespalov and Talanov growth rate that may be used to characterize this effect is given in "Solid-State Lasers for ICF," supra, incorporated for reference herein for all purposes. The transverse wavelength for maximum growth may be derived as:

$$\lambda_{\perp m} = \frac{\lambda}{\left(2n_{20}\frac{I}{n}\right)^{1/2}},$$

where n is the linear index. For an illustrative value, consider an example ($\lambda = 2.5 \times 10^{-5}$ cm, $n_{20} = 4.6 \times 10^{-21}$ cm$^2$/watt for He at 1 amagat, I=$10^{13}$ watts/cm$^2$, and n=1.000036. A critical angle, $\theta_c$, may be estimated:

$$\theta_c \sim \frac{\lambda}{\lambda_{\perp m}} \sim \left(2n_{20}\frac{I}{n}\right)^{1/2} \sim 3.03 \times 10^{-4} \text{ radians}.$$

As for relevance to exemplary designs, consider one that may have a 0.2 meter×0.2 meter region to be pumped that may be about 500 meters from pumping source. If this design may be operated with the maximum allowed spatial coherence, this leads to a spread angle among the spatial components of the extraction beam of approximately $$\theta_s \sim \frac{.2 \text{ m}}{500 \text{ m}} = 4 \times 10^{-4} \text{ radians}.$$

Thus, by operating the extraction beam with angular dispersion among the spatial components, $\theta_s > \theta_c$, the pump beam may be able to operate well above the conventional B=2-3 limit for a quasi-collimated extraction beam. Likewise, in a Fast Compression Stage for a 1 cm envelope for the irradiance pattern produced at a 30 meter focal length $$\theta_{SFC} \sim \frac{10^{-2} \text{ m}}{30 \text{ m}} < 3.3 \times 10^{-4} \text{ radians}.$$

Using neon at 1 amagat and I=$10^{12}$ watts/cm$^2$, $\theta_c$~$1.16 \times 10^{-4}$ radians. This result may indicate that for the exemplary design producing a 1 cm target irradiance envelope in a typical geometry, there is little coherent B growth in the Fast Compression.

To estimate this stabilizing effect more closely, for 0 spatial growth rate, use the Bespalov-Talanov model. The spatial growth rate is (see p. 359, "Solid-State Lasers for ICF," supra):

$$g_{BT} = K_{\perp}(n_{20}I/n - K_{\perp}^2/4K^2)^{1/2}$$

$$\text{where } K_{\perp} = \frac{2\pi}{\lambda_{\perp}} \text{ and } K = \frac{2\pi}{\lambda}.$$

To estimate minimum growth, $g_{BT}=0$, and $$\frac{K_{\perp}}{K} = 2\sqrt{\frac{n_{20}I}{n}}$$

and is equal to the minimum spread angle, $\theta_m$.

This minimum spread angle is shown in Table 10 below for various gases and intensities. At this spread angle or larger the spatial incoherence may strongly stabilize beam breakup and imaging properties even with appreciable B-integral values.

TABLE 10

Minimum Spread Angle for Transverse Intensity Growth Suppression in Exemplary Media (radians) at STP and .25 Micron Wavelength

| Gas | Flux (watts/cm$^2$) | | | | Nonlinear Coefficient (cm$^2$/watt) |
| --- | --- | --- | --- | --- | --- |
| | $10^{10}$ | $10^{11}$ | $10^{12}$ | $10^{13}$ | $n_{20}$ |
| He | $1.41 \times 10^{-5}$ | $4.47 \times 10^{-5}$ | $1.41 \times 10^{-4}$ | $4.47 \times 10^{-4}$ | $5 \times 10^{-21}$ |
| Ne | $1.64 \times 10^{-5}$ | $5.18 \times 10^{-5}$ | $1.64 \times 10^{-4}$ | $5.18 \times 10^{-4}$ | $6.7 \times 10^{-21}$ |
| Ar | $1.13 \times 10^{-4}$ | $3.57 \times 10^{-4}$ | $1.13 \times 10^{-3}$ | $3.57 \times 10^{-3}$ | $3.2 \times 10^{-19}$ |
| Kr | $1.30 \times 10^{-4}$ | $4.10 \times 10^{-4}$ | $1.30 \times 10^{-3}$ | $4.10 \times 10^{-3}$ | $4.2 \times 10^{-19}$ |
| Xe | $2.83 \times 10^{-4}$ | $8.94 \times 10^{-4}$ | $2.83 \times 10^{-3}$ | $8.94 \times 10^{-3}$ | $2 \times 10^{-18}$ |
| N$_2$ | $1.82 \times 10^{-4}$ | $5.76 \times 10^{-4}$ | $1.82 \times 10^{-3}$ | $5.76 \times 10^{-3}$ | $8.3 \times 10^{-19}$ |
| HD | $1.23 \times 10^{-4}$ | $3.90 \times 10^{-4}$ | $1.23 \times 10^{-3}$ | $3.90 \times 10^{-3}$ | $3.8 \times 10^{-19}$ |

This estimate indicates that there may be value in tailoring the spatial coherence characteristics to avoid nonlinear index effects leading to filaments and/or focal property degradation.

There may be two major constraints for some embodiments involving various compression stages. In a Fast Compression Stage for direct focusing onto target, if the dimension of the desired target irradiance is about 1 cm with an overall focal length of some 30 meters, $\theta_T$ would be $3.3 \times 10^{-4}$ radians and is then the angular extent of the ray paths in the Fast Compressor Stage that may be compared to $\theta_c$ and $\theta_m$. Thus, $\theta_m \leq 3.3 \times 10^{-4}$ may be desired. This constrains the optical extraction flux in each section. The other constraint is the finite angle subtended in the pump beam(s) as it relates to break-up of pump light. The average flux in the pump beams may be lower than the section extraction flux by about the compression ratio. In addition, the beam quality criterion for the pump(s) may be much lower than for the Fast Compressor extraction beams, where near diffraction limited performance may be desired.

With respect to the four main design considerations discussed above, the discussion has centered on a one nanosecond temporal pulse width for the extraction pulse. Table 11 gives a summary of the temporal scaling from that value for lookthrough compressors with high compression ratios that may obtain:

TABLE 11

Approximate Temporal Scaling

| Extraction Pulse | $G_pW \propto \tau_p^{1/3}$, $\eta_c K \approx$ constant |
| --- | --- |
| a. Forward Amplified Spontaneous Emission Pump Pulse | (STMS) (Raman) |
| | Constant - Depends on G only, not time |
| b. Backward Amplified Spontaneous Emission | |
| Optical Breakdown Threshold | $\tau_p^{1/2}$ |
| Nonlinear Index (B-integral) | $\tau_p^{-1}$ |
| Amplification Characteristics | Slightly better at longer pulses. Raman more useful as time compression ratio decreases. |

Note:
$G_pW$ is the product of number of saturation fluences and transverse linear spatial dimension for the extraction pulse. $\eta_c$ is the FASE limited conversion efficiency and K is the temporal compression ratio, $\tau_{pump}/\tau_{extract}$.

These scalings are not universal and will depend on the details of a design; however, this gives a general indication of the trends to be expected around 1 nanosecond for any of the embodiment examples considered herein. Thus, the overall behavior tends to improve with pulse length in these controlling parameters.

Another effect that may be used to ameliorate the nonlinear growth is the presence of free electrons. They introduce a negative index of refraction contribution, as the difference between the original index of refraction and the sum of the contribution to the index from the positive ions and the electrons may be negative. The effects of the electron contribution may be to reduce the nonlinear index growth rate. An estimate of the electron density for the conditions above (1 amagat He with $10^{13}$ watts/cm$^2$ at 0.25 μm wavelength) leads to:

$$\Delta n \cong -\frac{1}{2}\frac{n_e}{n_{ec}} + n_{20}I,$$

where $n_e$ is the free electron density (cm$^{-3}$) and $n_{ec}$ is the critical electron density ($1.1 \times 10^{21}/\lambda^2$ cm$^{-3}$, with $\lambda$ in microns). An $n_e \cong 1.6 \times 10^{15}$ cm$^{-3}$ in He gas at STP, this may then give an index contribution that is on the order of the nonlinear index for self-focusing. This physical effect may have been observed in "Measurement of the Nonlinear Refractive Index of Air and Other Gases at 248 nm," by M. J. Shaw, C. J. Hooker and D. C. Wilson, *Optics Communications*, Vol. 103, 1993, pp. 153-160, incorporated by reference herein for all purposes.

One advantage with regard to utilization of a gaseous medium is that the production of such an electron density may not lead to an irreversible change in the medium properties (i.e., damage) as may occur in solid materials. The free electrons may be obtained by many methods, for example, ionization of impurities, dopants, and scattering gases by the light from the pump and/or extracting and/or externally provided beams of optical radiation, bombardment by external electron beams, etc. Of course, since the negative index does not depend directly on I, it may not uniformly negate the nonlinear index, and introduces defocussing properties.

Conventional glass ICF lasers have phase aberrations that are much larger and are not near the diffraction limit for optical imaging. Typically, $n_{20}$ for Nd: YAG may be some $10^4$ larger than for neon, a candidate for the certain look-through compression media outlined in the inventions herein. Consequently, as an example, the operating intensity may be $10^3$ larger in neon than in glass and may produce $\frac{1}{10}$ the induced phase shift (B integral) at the same time.

Multiwave Processes

Several multiwave processes have been observed as affecting the efficiency and gain of stimulated scattering processes, mostly in Raman scattering. Some of the most relevant may be:

(1) Anti-Stokes production from strong Stokes-pump interaction. For a Stokes beam propagating nearby collinearly with a pump beam, there is a phase matching angle for anti-Stokes production. This angle may be of the order $10^{-5}$ radians for STMS scattering and $\leq 10^{-3}$ radians for Raman scattering. "High-Power Forward Raman Amplifiers Employing Low-Pressure Gases in Light Guides: I. Theory and Applications," by J. P. Partanen and M. J. Shaw, *Journal of the Optical Society of America B*, Vol. 3, No. 10, pp. 1374-1389, 1986, discusses this phenomenon as related to Raman amplifiers. Typical designs herein have very substantial offset angles (160°-180°) in the backward compression geometries or appreciable crossing angles (~5°-30°) for forward geometries, both much greater than the 0.00057°-0.057°. The potential use of finite spatial coherence in pump and extraction beams may be considered in terms of such phenomena as a limitation due to the nearly collinear propagation. That is, if the phase matching angle is on the order of the spatial coherence angle for beamspread, the effect needs to be evaluated for the specific design.

(2) Pump pairs may interfere, forming grating structures that spatially modulate the gain and lead to Stokes extraction beam diffraction. "Intensity Averaging and Four-Wave Mixing in Raman Amplifiers," by J. Goldhar and J. R. Murray, *IEEE Journal of Quantum Electronics*, Vol. QE-18, No. 3, pp. 399-409, 1982, presents experiments and analysis for this type of scattering. The number of pump beams and large incident angles for typical designs herein indicate this may not be of substantial importance.

(3) Various scatterings (diffuse or ordered index modulation) of pump or Stokes beams that are scattered into a phase matched direction with a strong wave. "Novel Four-Wave Mixing Phenomenon in a Raman Amplifier," by C. J. Hooker, E. J. Divall, G. J. Hirst, J. M. D. Lister, M. J. Shaw and D. C. Wilson, *Physical Review Letters*, Vol. 74, No. 21, pp. 4197-4201, 1995, presents data and experiments for pump beams scattering off ordered pump beam interference patterns in windows as well as diffuse scatter off optical elements. Diffuse Stokes beam scatter also has been observed to lead to four wave mixing and second Stokes generation. These phenomena set design criteria for scatter in any material optical elements as well as particulate scatter in gases. For typical designs herein, the use of Transient Apertures and lack of solid surfaces near the scattering region may make such scatter negligible.

(4) The effect of multiwave processes on the basic amplification process, for example, gain suppression by parametric wave mixing, under certain circumstances, may be pronounced. See, for example, "Stimulated Raman and Brillouin Scattering," by J. Reintjes and M. Bashkansky, in *Handbook of Optics, Vol. 4: Optical Properties of Materials, Nonlinear Optics, Quantum Optics*, by M. Bass, C. DeCusatis, J. Enoch, V. Lakshminarayanan, G. Li, C. MacDonald, V. N. Mahajan, and E. Van Stryland, McGraw Hill, N.Y., Chapter 15, 2009, pp. 15.1-15.60.

It is presumed there is sufficient design flexibility that the basic performance outlined herein may be obtained with due consideration of such processes in the design, by a person skilled in the art.

In summary, for the three extraction sections shown in FIG. 1, an initial design for consideration may be one where the $R_b$ is on the order of 10 or more at the output of each section, the input section fluences are 0.1-1.0 the section medium saturation fluence, $\varepsilon_{SAT}$, and overall pump ASE for Brillouin and/or Raman scattering has gain constraints on the total sum of section $G_{SS}$ on the order of 20-30. When the sections are coupled together, a high overall gain results at high efficiency, as shown in Table 3 and may display good beam quality performance as well.

To summarize, there are several aspects of the Look-through Compression Arrangement that govern its design:

(1) High Gain at High Conversion Efficiency

In order to stay within the material damage limitations, the gain of the injected pulse from the point where it traverses material elements to the stage output must be large enough to provide the desired fluence output. For typical designs that may have an output of $10^3$ joules/cm$^2$ and a material damage limitation of around 1 joule/cm$^2$ or even less at the injection point, this implies a gain between the input and the output in excess of $10^3$. At the same time, the efficiency of conversion of total pump beams energy to the extraction beam energy needs to be high; preferably in excess of 0.9. Of course, if material elements are utilized in the output, this constraint on high gain may be relaxed.

(2) High Beam Quality Extraction Beam and Beam Quality Decoupling from Pump Beams The pump beams may be of relatively poor optical quality and can be independent of one another in terms of phase to minimize complexity and optical cost. The output beam may well need to be near diffraction limited. Thus, the phase and intensity properties of the pumps and extraction pulses need to be decoupled and multiple pump beams may need to be combined. Such beam quality decoupling may be accomplished by making the bandwidths of the pump beams much less than the scattering linewidths of the medium. Also, the pump beams should have sufficient spatial coherence (i.e., occupy a reasonably large solid angle) and/or be offset in angle from 180° backward propagation by a sufficient amount to decouple the pump and extraction beam qualities. Such criteria have been discussed and experimentally verified (see, for example, A. A. Betin, and G. A. Pasmanik, "Conservation of Spatial Coherence of Stokes Beams Amplified in a Multimode Pumping Field," *JETP Letters*, Vol. 23, No. 10, pp. 528-531, 1976). Also, the pump beams, perhaps being of relatively narrow bandwidths, will produce speckle (hot spots and cold regions) that needs to be averaged to provide high efficiency conversion and good beam quality. Section design to produce minimum linear index fluctuations and minimal nonlinearities may also be desired.

(3) Time Compression

It may be desirable to have the timescale of the extraction pulse shorter than that of the pump pulse. This may be accomplished by having the extraction and pump beams operating in crossbeam geometries up to 180° (backscattering). High conversion efficiency may be obtained by matching the pump beam envelope to the path of compressed extraction beam.

(4) Amplified Spontaneous Emission (ASE)

The noise from spontaneous emission due to the pump coupling to the scattering medium will be amplified and compete with the extraction pulse stimulated emission for the pump energy. This places constraints on overall geometries and small signal gains. For an extraction pulse with high multiples of the saturation fluence, the second Stokes ASE generated in the medium by the extraction pulse is a major constraint, particularly for Raman systems.

(5) Nonlinear Index

The evolution of intensity fluctuations is important as the lookthrough geometry relies on amplification past the last filtering position where material elements may be utilized. Control of the spatial structure of the input pulse needs to be considered. In particular, the induced index may affect the imaging properties of the medium.

(6) Target Requirements

The output beam is to be focused with the desired irradiance pattern on a target. Also, the polarization, color characteristics (bandwidth, number of colors, color positions) and temporal pulse shaping are to be consistent with proper operation of the target for the ICF application. Certain targets, such as those requiring near isentropic compression, require a precise and carefully shaped pulse. Others have relaxed requirements. Spatial and temporal uniformity (related to the noise for shot to shot and beamline to beamline) from beam to beam may be important. The input pulse shape to a Lookthrough Compression Arrangement may be quite different that the output pulse shape to target.

(7) Lookthrough Integration to Target and Transition Section

The pointing and tracking and compensation for linear optical perturbations downstream of the injected pulse are major considerations. Some form of adaptive optics or other phase compensation technique may be desirable. To minimize optical distortion, low index and/or index-matched sections and/or density matched sections may be desired. The adaptive optics may compensate for shutter and/or flow induced linear index fluctuations in the extraction optical path.

C. General Variations

The fundamental stage design, comprising a set of sections, depends on the section saturation and extraction fluences, the breakdown levels, induced absorptions, and the amplified spontaneous emission (ASE) properties. As discussed in "*Optical Configurations for Fusion Laser*," by R. O. Hunter, Jr., U.S. Provisional Patent Application No. 62/497,908, supra, the use of scattering media with varying properties in different sections is useful to not only give high efficiency, but may also relax the ASE constraints. Thus, different isotopic mixtures of Raman active gases may be used to offset in frequency their noise emission in one section from the gain in a different section for both rotational and vibrational scattering. In the case of Brillouin or STMS scattering, the gain for extraction pulse BASE may be decoupled from section to section by using gases with different frequency shifts and peak BASE directions. Then the peak gains do not necessarily overlap. Likewise, the pump properties, including polarization, may be tailored for each region separately. One major variant is the constant pump power version in "*Optical Configurations for Fusion Laser*," by R. O. Hunter, Jr., U.S. Provisional Patent Application No. 62/497,908, supra.

One way to suppress various instabilities in ICF targets may be to make the irradiating light with characteristics so that the target instability growth rate(s) are diminished. Two immediate possibilities are to control the polarization and the bandwidth of the laser light. Lindl gives a criterion (J. D. Lindl et al, "The Physics Basis for Ignition Using Indirect Drive Targets on the National Ignition Facility," *Physics of Plasmas*, Vol. 11, pp. 339-491, 2004; and Lindl, "Development of the Indirect-Drive Approach to Inertial Confinement Fusion and the Target Physics Basis for Ignition and Gain," *Physics of Plasmas*, Vol. 2, pp. 3933-4024, 1995 [J136]) for suppressing stimulated Brillouin scattering (SBS) in the target.

For a flux of $10^{18}$ watts/cm$^2$ and a wavelength of 0.25 microns, this criterion implies a bandwidth of 0.0025 microns. This may be accomplished by operating a given compression stage at several pump/extraction color lines or by overlapping the output from several stages operating at different colors. Typical compressors will have a $R_b$ on the order of $10^2$ (see Table 2); if it is operated on 10 lines at once, with equal intensities, this leads to an equivalent $R_b$ of 10, since the saturation fluence at each line remains constant but the fluence of breakdown will be the sum of the fluences of each line. Such a compressor (10 separate pump and extraction lines) may have gain characteristics based on the individual line pump extraction points. The total output fluence is the sum of the individual line fluences. Hence, the effective saturation per line needs to be lowered by the number of lines to maintain efficient extraction. For example, from Table 2, if pure neon were utilized on 10 lines, the total output fluence would be, say, 5 times the saturation fluence for each of 10 lines, or $5 \times 1.17 \times 10^2 = 5.85 \times 10^2$ joules/cm$^2$ per line, and $5.85 \times 10^3$ joules/cm$^2$ for the 10 lines. This is less than the $1.5 \times 10^4$ joules/cm$^2$ for the breakdown fluence at $10^{-9}$ seconds. Of course, the frequencies chosen should be checked so as to not cause the breakdown fluence to be adversely affected (by multiphoton resonances, for example). At a $10^{-8}$ second pulse width, the ratio of the breakdown fluence to the saturating extraction fluence is large in leading to more flexibility.

The general design requirements discussed above refer primarily to the properties of the scattering media in terms of interaction with the light fields. The requirement for very high optical quality of the section media and integrated optical path through to the target entails starting with a good quiescent media—with good index matching prior to the arrival of the first pump and extraction pulses. The normal criterion is for a $\lambda/60$ root mean square wavefront distortion at the wavelength of interest. In the embodiments using active mirror compensation or phase conjugation Brillouin scattering, the above value would apply after correction by phase conjugation.

A major constraint is the effect of speckling (interference among different spatial components in a given beam). The pump beams may be narrow linewidth ($\leq 10^9$ H2 bandwidth); the spatial and temporal coherence parameters may need to be controlled to keep path integrated pump intensity fluctuations for the extracting beam at roughly the $\pm 10\%$ (RMS) level. For both extraction and pump beams the induced nonlinearities may need to be computed and kept at a low value ($\leq \lambda/10$ peak to peak along a given extraction ray). The electron density needs to be kept below about a factor of $10^{-3}$ less than the neutral density to keep beam absorption and index fluctuations from free electrons becoming important. Thus, the transient index and absorption are controlled by the operating parameters.

For Brillouin scattering (see, for example, "Limiting Sensitivity of a Stimulated-Brillouin-Scattering Amplifier and a Four-Wave Hypersonic Phase-Conjugating Mirror," supra) the above are given for backscattering; as the extraction pulse undergoes gain, so does the noise. To cope with such noise growth, Raman and Brillouin scattering have different properties. In Raman scattering, the growth of the second Stokes generated by the first Stokes of the extraction pulse is a major limitation, as the first Stokes is the amplified extraction pulse and becomes much larger than the pump flux in an efficient compression system. As described in "*Optical Configurations for Fusion Laser*," by R. O. Hunter, Jr., U.S. Provisional Patent Application No. 62/497,908, supra, the noise from one section to another may be decoupled by changing the pump colors and scattering media properties. In the Raman case, this can be accomplished by isotopic substitution in $N_2$, as the isotopic shifts are larger than the scattering linewidth. In the case of STMS or Brillouin scattering for a short pulse, the gain for noise travelling collinearly with the extraction pulse goes to 0 due to the transient effects.

In terms of angle of incidence of the pump beams and allowed divergence, for Raman scattering the line phase of each molecule adjusts separately and there are no phase matching conditions, only linewidth. For STMS in the kinetic regime, the same condition applies. If it desired to utilize Brillouin scattering, the phase matching condition (there are collective oscillations of the scattered wave) is $$\theta < \left(\frac{\Gamma}{\omega_Q}\right)^{1/2},$$

where $\Gamma$ is the full width at half maximum (FWHM) of the scattering line and $\omega_Q$ is the frequency of the scattered wave, and for typical cases of interest, $\theta < 1$ radian. Since the scattering media are isotropic there is no preferred direction as in solids and this implies the spread in the angle of the incoming pump beam must be less than this value, a condition that may be readily satisfied for many cases of interest.

Absorption of the extraction light is a major consideration. The prepulse gas purity needs to be carefully controlled. At typical wavelength and fluences, long chain molecules (oils, aromatics, etc.) that are commonly present even in high purity noble gases (5 9's or 99.999% pure) have $(10^{-5})$ $(2.7 \times 10^{19}$ cm$^{-3})$ (atoms/molecule) at 5 electron volts/atom leading to $2.2 \times 10^{-3}$ joules/cm$^3$ characteristic of the absorption energy. For a total extraction length of 10 meters, this is 2.2 joules/cm$^2$. At 4 9's purity, this would be an appreciable penalty to the extraction pulse energy (over 1%). Such an absorption may be considered saturable; that is, the leading part of the extraction pulse and/or the pump pulse may make the medium transparent. Also, given a gas of C, H, O following photodissociation of an organic impurity, if each atom needed another 3 photons at 5 eV to be ionized, the loss would increase to 88 joules/cm$^2$ for 4 9's purity, an average of 10 atoms per impurity molecule and a total of 20 eV/atom. This requirement is for background impurities. There are a number of transient absorbers; by analogy to transient absorption in the KrF laser (see, for example, T. H. Johnson, and A. M. Hunter, II, "Physics of the Krypton Fluoride Laser," Journal of Applied Physics, Vol. 51, No. 5, pp. 2406-2420, 1980), negative ions and dimer rare gas positive ions have appreciable cross sections at this wavelength (see, for example, the cross sections for $Ne_2^+$, $Ar_2^+$, $Kr_2^+Xe_2^+$ in the ultraviolet, as discussed in "The Electronic States of $Ne_2^+$, $Ar_2^+$, $Kr_2^+$, and $Xe_2^+$: II. Absorption Cross Sections for the $1(\frac{1}{2})_u \rightarrow 1(\frac{3}{2})_g$, $1(\frac{1}{2})_g$, $2(\frac{1}{2})_g$ Transitions," by W. R. Wadt, Journal of Chemical Physics, Vol. 73, No. 8, pp. 3915-3926, 1980. These cross sections can be in the range of $10^{-18}$-$10^{-17}$ cm$^2$. Absorption will saturate at the ion formation rate; for example, the association reaction, $Ar^+ + 2Ar \rightarrow Ar_2^+ + Ar$, will determine how fast $Ar_2^+$ is created. A typical rate constant for the association reaction above is around $2.5 \times 10^{-31}$ cm$^6$/sec; at $2.2 \times 10^{16}$ cm$^{-3}$, the $Ar_2^+$ energy to dissociate is: $(1.6 \times 10^{-19}$ joules/eV$)$ $(5$ eV$)$ $(2.2 \times 10^{16}$ cm$^{-3})=0.018$ joules/cm$^3$, or for a 10 meter path length, 18 joules/cm$^2$. This implies that for an association time of $$\tau_a = \frac{1}{(2.5 \times 10^{-31} \text{ cm}^6/\text{sec})(2.7 \times 10^{19})} = 5.5 \times 10^{-9}$$

seconds, and for a 1 nanosecond extraction pulse length, about 18% of the $Ar^+$ would turn into $Ar_2^+$, with an associated energy loss of 3.2 joules/cm$^2$.

These types of reactions can be controlled by limiting the density of electrons, and positive ions, that are created prior to breakdown. Breakdown is usually defined as occurring around electron densities of a factor of $10^{-3}$ less than the neutral density at 1 atmosphere (see, for example, A. V. Phelps, in "Theory of Growth of Ionization During Laser Breakdown," *Physics of Quantum Electronics: Conference Proceedings*," P. L. Kelley, B. Lax, and P. E. Tannenwald (Eds.), McGraw-Hill Book Company, New York, pp. 538-547, 1966). Thus, at breakdown levels, 3.2 joules/cm$^2$ in a 10 meter path length would be taken by this process from the extraction beam. It is important to keep the medium at or below the breakdown criterion of electrons and ion densities at $2.7 \times 10^{16}$ cm$^{-3}$ for a 1 atmosphere gas. On the timescales of interest, the transient electron-neutral and electron-ion inverse bremmstrahlung cross section processes may be viewed at nonsaturable losses. Using the same criterion of electron densities at a factor of $10^{-3}$ less than the neutral density, the absorptions correspond to about 20 joules/cm$^2$ at peak electron densities. These are the essential types of criteria to keep absorptions to an acceptable level. Proper calculation of the coupling of these effects to the exact extraction pulse length and pump pulse length for the mixtures of interest can guide experimental optimization for these types of pulse compression media. As mentioned above, keeping the local energy fluence below 2 times the breakdown fluence should suffice to make such losses minimal.

Index and/or matching for the gas section properties may be highly desirable. The phase and amplitude pattern to be amplified in a lookthrough system depends on what the desired pattern looks like in the farfield, in this case, the pattern at focus on the target. Since one application for the lookthrough is focusing on small spot(s) on an ICF target, the input phase across the extraction beam will have a phase component (primarily spherical at such long focal lengths) that provides overall properties and a set of higher order components for controlling the focused intensity. For a design of 100 separate focal spots, the phase modulation for the spot generation may be separately impressed from the overall curvature. Also, keeping the separate spots in a near common amplification path through the active sections of the stage is very useful to ensure a high degree of uniformity of energy among the spots. Lastly, the fundamental criterion is the brightness of the amplifier as it relates to the distance to the target and the size of the beam at exit from the last gain section. Roughly, for a given spot, the energy on a target is the brightness times the solid angle subtended by the spot. Thus, for a given distance to target, the D and S of the output beam must be at or above a certain value to deliver that energy. Thus, from Table 2, for a brightness of say, $7.8 \times 10^{17}$ Joules/steradian at the exit of the Fast Compression Stage, and a distance to target of 30 meters, $10^6$ joules can be delivered to a spot of less than $10^2$ microns diameter with a D of 0.3 meters for a single aperture. The delivered intensity pattern may be of arbitrary shape (features down some 25 microns) and as the pattern is larger than the diffraction limit, modulation may be used to change the pattern size and time history during the pulse. Above, the general design variations were discussed primarily in terms of the scattering properties and parameters controlling design. In addition, there are many possible general designs. First, the number of sections is variable and includes sections with continuously varying coupling properties. Second, the transverse dimension of the beam relates to the brightness, $B_p$, and may be limited by FASE in the extraction beam unless multiple apertures are phase matched. The length of a given section may be widely varied; for nearly counter-propagating pump and extraction beams, the sections are usually about $$\frac{c t_{pump}}{2}$$

in length, although that can be varied. The sections may be separated from one another or be contiguous. For forward scattering, the section length may be adjusted depending on the crossing angle. For near collinear forward scattering, a single medium may be utilized, while multiple media may be desirable as the crossing angle is increased. The scattering process may be varied from section to section, as may certain optical pumping properties—flux levels, pulse length, color, bandwidth, angle, polarization. The matching of the shape and characteristics of the pump beams to the stage parameters may be critical to overall coupling efficiency.

D. Further Variations

Lookthrough geometries have been previously proposed (see, for example Single Pulse Excimer Ground Based Laser ASAT Concept Definition Study, by A. M. Hunter, II, and G. Houghton, Thermo Electron Technologies Corporation, dated Oct. 25, 1989, TTC-1588-R) without temporal compression and at relatively low efficiencies. Many Brillouin experiments have been run where high conversion efficiency is obtained in a single gaseous media (see Principles of Phase Conjugation, by B. Y. Zel'dovich, N. F. Pilipetsky, and V. V. Shkunov, Springer-Verlag, Berlin, 1985), in direct front pumping geometries. However, the use of multiple media or graded sections to achieve high stage gains, high conversion efficiency, good beam quality, high output fluence, and temporal compression in a lookthrough geometry utilizing off axis pumping, is new and novel. Also, the designs where the material optical surfaces are not needed past injection to the stage is new. In addition, the use of noble and single diatomic gases using Raman scattering and/or STMS at low pressure is new. The saturation and gain properties of these media have not been previously recognized as highly favorable (as in the inventions herein) for the ICF application and, indeed, have been essentially dismissed. Overall, these inventions may provide a reduction of over a factor of 100 in cost to produce high energy, short pulses for ICF, as well as be very advantageous for other applications.

In the embodiments that follow, many of the computations are for illustrative purposes. For example, focusing is not considered in the energy extraction models. Square pulse models are utilized that do not include the spatial, frequency, and temporal characteristics to the level of detail that may be required to give a high level of accuracy for both design and operation. Thus, both more accurate modeling and experimentation may be required to give a desired level of predictability. Also, at high stage gains, the intensity history of the extraction pulse may be quite different from input to output and may need to be compensated for.[1]

[1] For the tables that present design and performance data for single and multisection Fast Compressor Stages, the extraction calculations are presented on an exemplary basis. Typically, they are done with a 1-D Frantz-Nodvik model, assume a constant cross sectional area of the section even though, in practice, focusing may be taking place, and are done for an idealized backward (180°) propagating pump to extraction pulse angle. Below, several finite effects are considered, including, but not limited to, the effect of finite response time of the medium on pulse shape and amplification characteristics, the matching of an off-axis pump envelope geometrically to the path of the extraction pulse, transverse spatial and temporal uniformity of the extraction and pump pulses. In addition, $S_b$, the backward saturation fluence, is utilized with on a simple mixture formula, and is considered constant for 90°-180° backscattering due to the slow $\gamma_c$ variation in the typical kinetic regime used in the examples. Each medium is considered to have the extraction color at the peak of the gain response, and the spectral matching of the pump pulse and extraction pulse is not considered in detail. Also, for large gain over small amplification lengths, the accuracy of this treatment is lessened. In summary, there are many details that may need to be analyzed to achieve a desired level of design. The novel and important parts of the invention herein may be adequately illustrated at this level of modeling. The reader may notice differences in some of the parameters. This is due to a variety of tools used in generating this application.

Preferred Embodiment (FIG. 1)

The Preferred Embodiment operation is discussed in the General Discussion. It is novel in producing high stage gain, high conversion efficiency for the pump beam energy to extraction beam energy, good time compression, and good beam quality. The Preferred Embodiment was illustrated with the configurations of FIG. 1 and parameters of Table 3. The LCA shown displays a configuration for the ICF application where a Transition Section allows Target irradiation at very high pulse brightness (some 6 orders of magnitude better than conventional ICF practice) at a factor of around $10^2$ lower cost per joule when coupled with a suitable pump beam generator.

Figure 6:
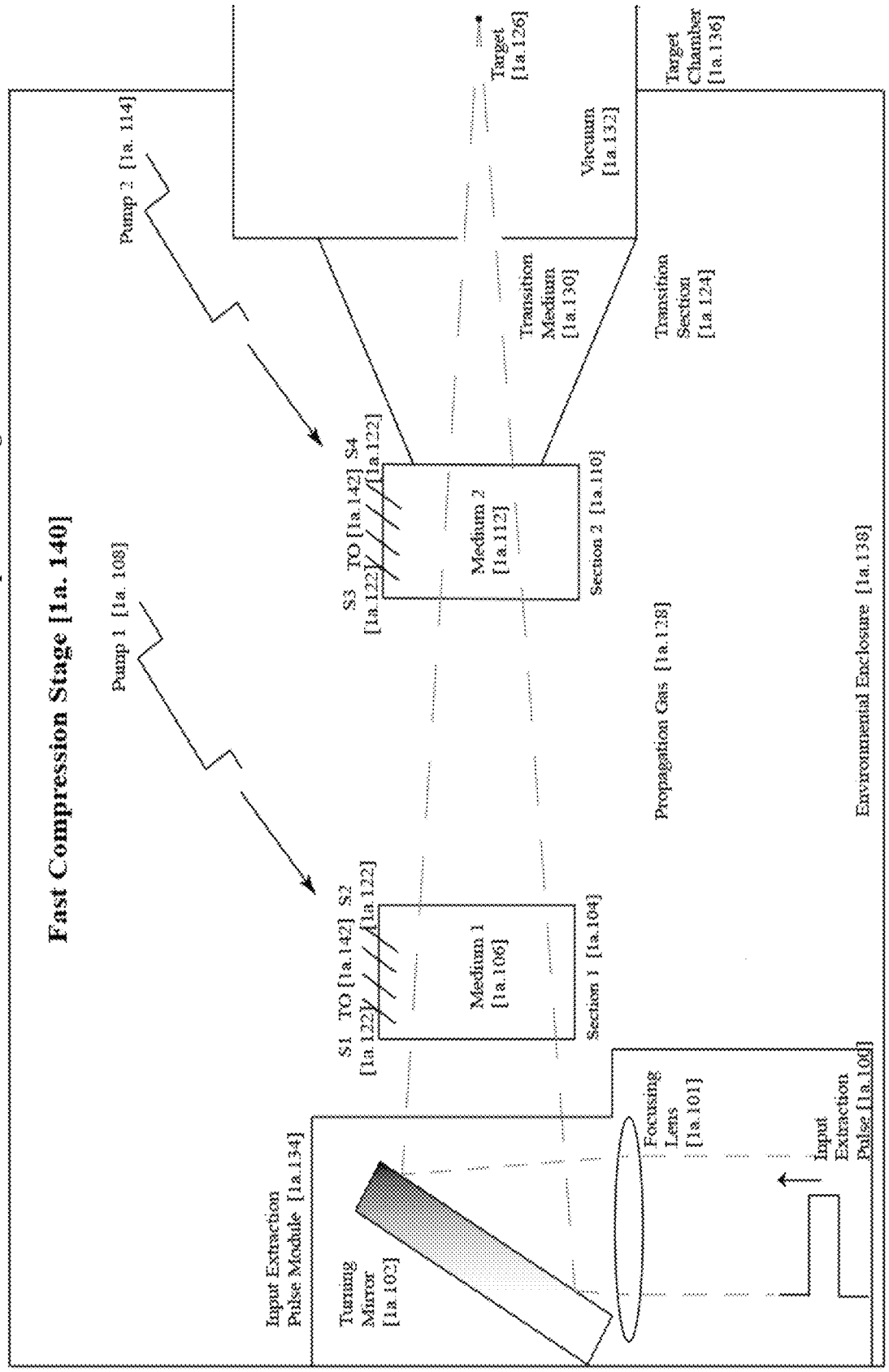
FIG. 6 shows an optical system with a compression stage that includes two amplifying sections separated by a propagation medium, a module with a laser for producing an entrance pulse to the compression stage, modules with a laser for producing pump pulses for the amplifying sections, a transition section, and a target chamber with target for receiving the exit pulse from the compression stage.
Figure 7:
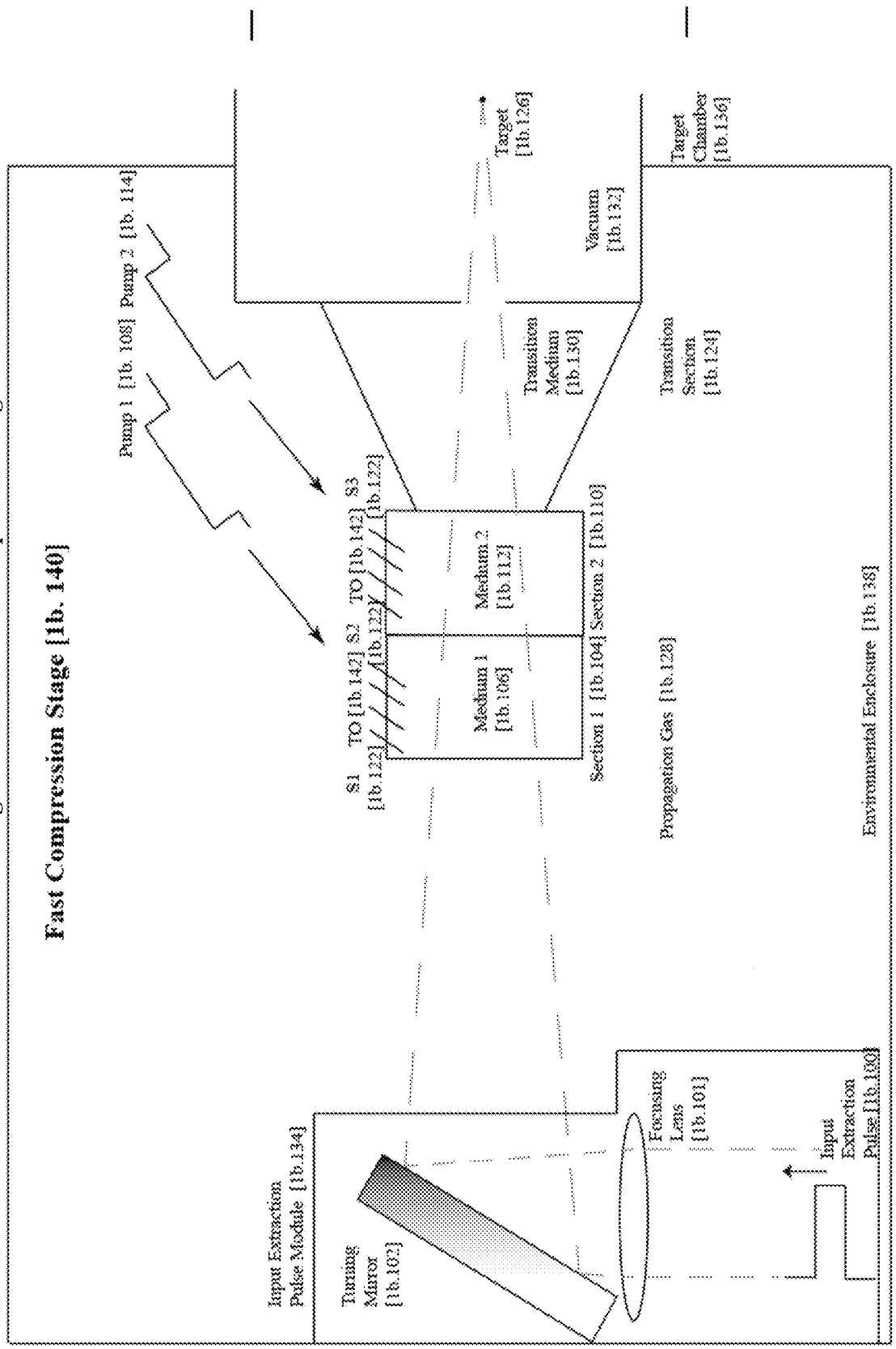
FIG. 7 shows an optical system with a compression stage that includes two amplifying sections directly adjacent to each other, a module with a laser for producing an entrance pulse to the compression stage, modules with a laser for producing pump pulses for the amplifying sections, a transition section, and a target chamber with target for receiving the exit pulse from the compression stage.

A 1$^{st}$ Embodiment: 2 Sections with Both Raman and STMS Sections and Index Matching (FIG. 6 and FIG. 7)

An exemplary embodiment is 2 sections in the amplification stage. For this exemplary case, a temporal compression of 10 with a $10^{-9}$ second extraction pulse length is utilized. Table 12 presents the performance of such a Lookthrough Compression Arrangement. This first embodiment also features index matching between the Section 1 and Section 2 to facilitate good optical quality for the overall extraction pulse. Overall, Table 12 indicates a stage gain of $1.64 \times 10^4$, an extraction efficiency $\eta_o$ of 0.90, and a temporal compression K of 10. The efficiency does not include the pump optical coupling efficiency or the small decrement associated with ASE growth. This embodiment uses SRRS on the HD S(1) Raman transition in the first section with a pump color some 441 cm$^{-1}$ higher than the extraction pulse. The second section has a pump frequency some 0.09 cm$^{-1}$ offset above the extraction frequency and uses STMS in Ne. Of the total pump energy, 96 percent is directed into the second section.

The amplifying bandwidth of the HD may be estimated. With a $\Delta v_{1/2}$(FWHM) of $1.56 \times 10^9$ Hertz for the HD S(1) transition estimated as broadened by He, the transition may support a bandwidth limited pulse length of some $2.8 \times 10^{-10}$ seconds. Note that in Table 2, the HD self-broadening linewidth is estimated as $0.76 \times 10^9$. For this mixture, the linewidth should be close to the He broadened value. Thus, this case may support a near bandwidth limited nanosecond pulse with a frequency content up to about $10^9$ Hz. The effective amplification bandwidth may be about $$\frac{1.56 \times 10^9}{\sqrt{G}},$$

where G is the gain seen by the extraction pulse. As a low noise first section a $G_{SS}$ of about 7 is typical; this leads to an effective gain bandwidth of $5.0 \times 10^8$ Hz, which would support a bandwidth limited Gaussian pulse of 0.75 nanosecond duration. A neon final section has a gain FWHM of $4.2 \times 10^9$ Hz (see Table 2) and may support a pulse length of around 0.1 nanosecond using the same criterion.

The first embodiment has a low noise Raman scattering first section utilizing HD at low concentration as the scattering medium, with He and Ne as index matching gases. The K$\eta$ (product of compression ratio and conversion efficiency) of 5.8 for the Raman process in Section 1 [1a. 104] is within the acceptable range for these parameters as analyzed according to reference "Raman Pulse Compression of Excimer Lenses for Application to Laser Fusion," supra. The case shown is for a net $G_{SS}$ of 25. The various amplification conversion pump and extraction parameters are shown in Table 12. The losses due to first and second Stokes ASE are computed as about $6.5 \times 10^3$ joules out of a total output of $6.56 \times 10^5$ joules. The computations shown are approximate and are for a constant area amplification stage.

Also, there will be an optical coupling efficiency for overlapping the extraction pulse with the pump pulse. The imaging Strehl due to nonlinear optical effects is estimated at 0.95, indicating very good optical performance in terms of focusability for this stage.

The effects of multiwave processes, except for the basic extraction process, have been treated as though the criteria as discussed above for the spatial and a temporal coherence of the pump and extraction beams have been met and so may not result in substantial efficiency or beam quality reduction.

The first embodiment performance has been completed for the section parameters shown in Table 12. For this type of stimulated scattering process, spontaneous emission, amplified in the forward direction relative to the extraction pulse propagation path, can deplete the pumping pulse. The previous noise discussion indicates a G of 25 is below the limit when the first section is based on Raman scattering in HD. Once the energy is compressed into a short extraction pulse, the G≅15 second section corresponds to a criterion of about 15 saturation fluences that may be conveyed in the extraction pulse before the second Stokes ASE converts substantial beam energy into a diffuse beam. As seen in Table 2, the saturation fluence, $S_b$, is 117 joules/cm$^2$ in neon for typical conditions. Thus, some 1,755 joules/cm$^2$ may go through the stage output and into the Transition Section. Depending on the details of the G=15 neon section characteristics and the extraction pulse details, the 30 cm width may need to be adjusted down to keep the extraction pulse FASE within reasonable bounds as shown in FIGS. 6 and 7.

This embodiment may be configured as in Embodiment 1a (FIG. 6) or 1b (FIG. 7). The linear index matching characteristics of Medium 1 [1a. 106] and Medium 2 [1a. 112] are used to eliminate S1 [1b.122] and for 1b, we see the simplification that results. Also, the possibility of utilizing Ne as part or all of the Transition Medium [1b. 130] could, in total, result in only one shutter being utilized in this Fast Compression Stage [1b. 140] if S1 [1b. 122] is also eliminated.

The Pump 1 in 1a, [1a. 108] and Pump 1 in 1b [1b. 108] have a color centered on the S(1) transition Raman shift (about 441 cm$^{-1}$ from Table 2) above the Input Extraction Pulse [1a and 1b, 100] color, whereas the Pump 2 colors in 1a [1a. 114] and 1b [1b. 114] are centered 0.09 cm$^{-1}$ above the Input Extraction Pulse [1a and 1b, 100] color.

TABLE 12

First Embodiment Stage Amplification Properties
(STP, .25 micron, 180° Backscatter Stage)

| Parameter | Section 1 | Section 2 | Stage |
|---|---|---|---|
| $\varepsilon_{input}$ (J/cm$^2$) | 0.1 | 38.6 | 0.1 |
| $\varepsilon_{output}$ (J/cm$^2$) | 39.00 | 1641.92 | 1641.819 |
| $\tau_{input}$ (sec) | 1.00E−009 | 1.00E−009 | 1.00E−009 |
| $\tau_{pump}$ (sec) | 1.00E−008 | 1.00E−008 | 1.00E−008 |
| $\varepsilon_{pump}$ (J/cm$^2$) | 67.20 | 1751.31 | 1818.52 |
| $\gamma_{section}$ (cm/watt) | 9.92E−12 | 5.71E−013 | — |
| Gas | HD/He/Ne[1] (.078, .206, .716) | Neon | — |
| $\varepsilon_{sat}$ (J/cm$^2$) | 6.72 | 116.75 | — |
| L (cm) | 150 | 150 | 300 |
| Width (cm) | 20 | 20 | 20 |
| $G_{SS}$ (nepers) | 10 | 15 | 25 |
| K ($\tau$ pump/$\tau$ extract) | 10 | 10 | 10 |
| $G_{LS}$ | 389.97 | 42.54 | 1.64E+04 |
| $\eta_o$ | 0.58 | 0.92 | 0.90 |
| FASEextraction + Spontaneous (%) | 1.20E−03 | 5.67E−01 | — |
| BASEextraction + Spontaneous (%) | 5.44E−04 | 8.80E−02 | — |

TABLE 12-continued

First Embodiment Stage Amplification Properties
(STP, .25 micron, 180° Backscatter Stage)

| Parameter | Section 1 | Section 2 | Stage |
|---|---|---|---|
| FASEpump + Spontaneous (%) | 6.19E−04 | 2.00E−03 | — |
| BASEpump + Spontaneous (%) | 2.05E−05 | 2.50E−03 | — |

[1]The parameters are based on an S(1) linewidth of 1.56 × 10⁹ Hz as broadened by He and neon.

As in the general discussion, the spatial and temporal pump pulse envelopes for FIGS. 6 and 7, in both Embodiments 1a and 1b are tailored to overlay the amplified Input Extraction Pulses [1a. 100 and 1b. 100, respectively] when they arrive in the respective Medium 1 and Medium 2 regions. The propagation gas may be neon, helium, or other low $\gamma_c$ mixture. In general, the operation is as described previously in the general discussion. Once in the transition section, this will be a limitation on the fluence that may be transmitted through the Transition Medium [1a. 130 and 1b. 130]. It should be noted that for many geometries discussed above, the spatial pulse (at $10^{-9}$ second pulse width) length of the extraction pulse is on the order of 30 cm (and is also characteristic of the transverse dimension). In terms of breakdown, as shown in Table 2, helium may then pass in the range of 20-40 $S_b$, or, 8,800-17,600 joules/cm².

The second Stokes for this extraction pulse may be a strong limiting factor in, for example, the section transverse dimension. After the amplification stage, the propagation may be helium and/or neon. Matching the fluence to a vacuum transition section implies that the output fluences may be limited in optical compression by focusing past the point of the second Stokes ASE converting substantial energy to a diffuse beam, breakdown, or nonlinear phase aberrations degrading the focusability of the beam before the vacuum transition plane. Thus, the helium and/or neon ASE parameters and breakdown fluence versus pulse length are critical parameters. This embodiment may be combined with an adaptive optic system, an imaging lens, system, a focal pattern irradiance generator and temporal modulation to properly shape the input beam before it is injected into the active gain medium region. These aspects are discussed later in the text and may be generally used separately or together in configurations with the various embodiments.

Figure 8:
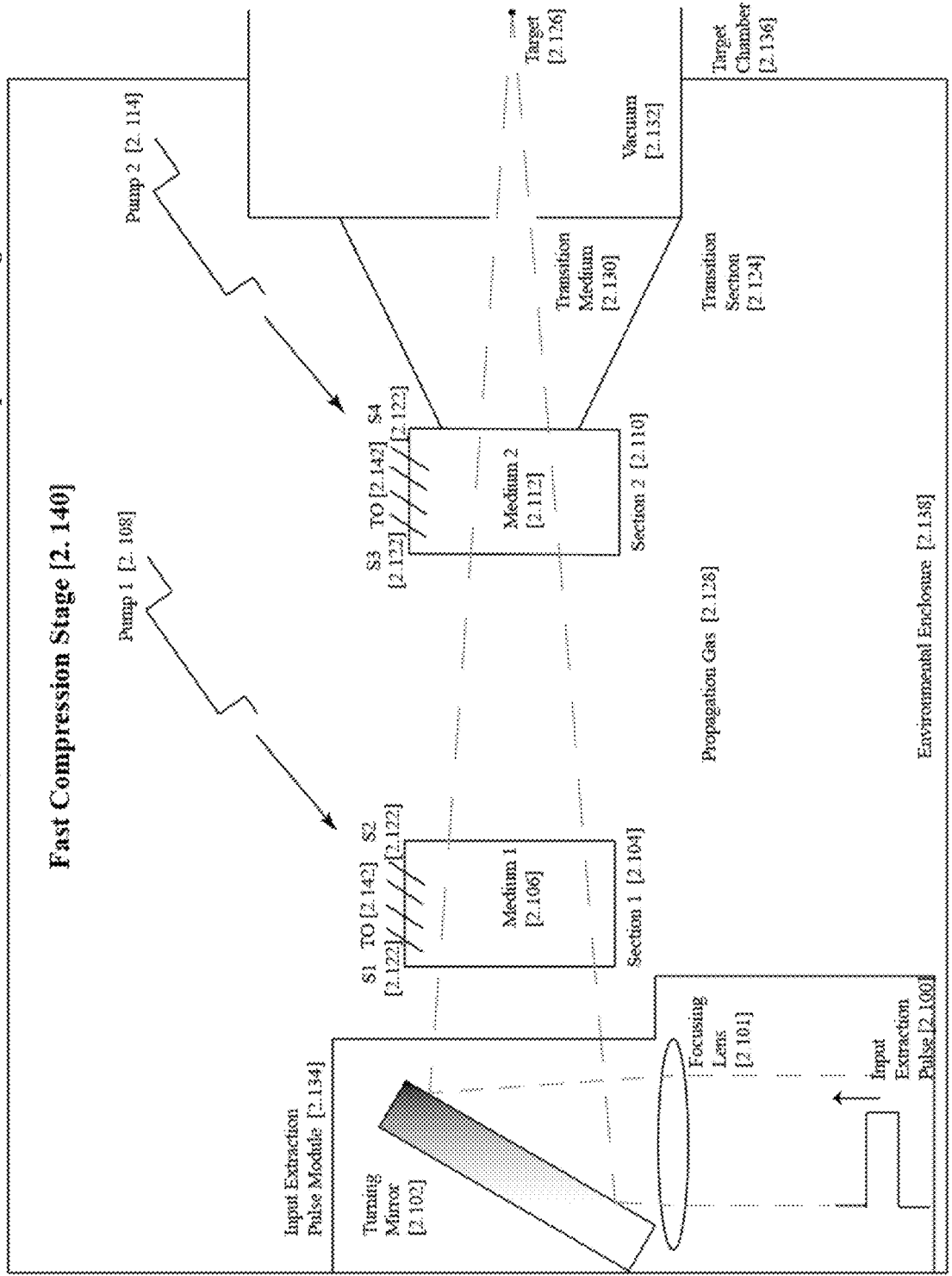
FIG. 8 shows a similar geometry as FIG. 6 but with a non-index and density matched propagation gas and scattering media.

A 2$^{nd}$ Embodiment: 2 Section Stage without Index Matching (FIG. 8)

Another embodiment, whose performance parameters are estimated in Table 13, may be based on STMS scattering in both sections. This stage is not index matched between sections and the overall G is lower, due to the noise properties of STMS. The pump frequency offsets may be much smaller. For the design parameters shown in Table 13, the Pump 1 [2. 108] color would be set at the N₂ STMS shift, or, 0.08 cm$^{-1}$, above the color of the Input Extraction Pulse [2. 100] color. The Pump 2 [2. 114] color would be set at the neon STMS shift, or, 0.09 cm$^{-1}$, above the Input Extraction Pulse [2. 100] color. The difference, ~4×10⁸ Hz at 180° scattering angle (backscatter) up to 90° scattering angle (range of angles likely for 10:1 compression), is small enough that a single color for Pump 2 [2. 114] and Pump 1 [2. 108] would suffice. In fact, if STMS is used in both sections, the same pump frequency may be utilized for both sections. Alternatively, due to the fact that the STMS coupling constant is close to that for the SRRS coupling constant in N₂ (for S(10), see Table 2), such a Raman transition could be used in the first section with two pump colors required. For the all STMS variation, as shown in Table 13, the two sections are chosen to have the same G, 10, in this case, and the same L. The Section 1 [2. 104] is operated with a coupling constant some 6 times that of the Section 2 [2. 110], and so is pumped with about ⅙ of the energy. Section 2 [2. 110] input is 0.09 of the saturation energy of that section, and the output is 7.6$\varepsilon_{SAT}$; the Section 2 [2. 110] is then driven at about $\varepsilon_{SAT}$, giving an overall extraction efficiency above 0.9. The overall gain exponent, $G_{SS}$, is 20, with a small signal gain of $e^{20}$=4.9×10⁸. For an output fluence of 10³ joules/cm², $\varepsilon_{SAT2}$=117 joules/cm², or, the coupling constant $\gamma_{c2}$=6.7×10$^{-13}$ cm/watt for Section 2 [2. 110], and the coupling constant is 6 times larger than that for Section 1 [2. 104]. The gases chosen give the desired coupling. The overall gain is then ~90 in the first section, and 9 in the second. The input fluence to Section 1 [2. 104] approaches 2 joules/cm². Adjusting the overall focal length to target at the S1 [2. 122] to Turning Mirrors [2. 102] separation permits achieving this drive fluence with a lower fluence on the output material element of the Input Extraction Pulse Module [2. 134].

TABLE 13

Two-section Fast Compression Stage

| Parameter | Section 1 | Section 2 | Stage |
|---|---|---|---|
| $\varepsilon_{input}$ (J/cm²) | 1.67 | 145.5 | 1.67 |
| $\varepsilon_{output}$ (J/cm²) | 145.03 | 1273.45 | 1273.45 |
| $\tau_{input}$ (sec) | 1.00E−009 | 1.00E−009 | 1.00E−009 |
| $\tau_{pump}$ (sec) | 1.00E−008 | 1.00E−008 | 1.00E−008 |
| $\varepsilon_{pump}$ (J/cm²) | 191.3 | 1168 | 1359.3 |
| $\gamma_c$ (cm/watt) | 3.50E−012 | 5.71E−013 | — |
| Gas | .67 He/.33 N₂ | Neon | — |
| $\varepsilon_{sat}$ (J/cm²) | 19.06 | 116.75 | — |
| L (cm) | 150 | 150 | 300 |
| Width (cm) | 30 | 30 | 30 |
| $G_{SS}$ (nepers) | 10 | 10 | 20 |
| K (τ pump/τ extract) | 10 | 10 | 10 |
| $G_{LS}$ | 86.85 | 8.75 | 7.63E+02 |
| $\eta_O$ | 0.75 | 0.97 | 0.93 |
| FASEextraction + Spontaneous (%) | 3.90E−002 | 8.41E−001 | — |
| BASEextraction + Spontaneous (%) | 3.30E−003 | 5.60E−003 | — |
| FASEpump + Spontaneous (%) | 4.80E−003 | 1.60E−003 | — |
| BASEpump + Spontaneous (%) | 4.10E−003 | 1.80E−003 | — |

Figure 9:
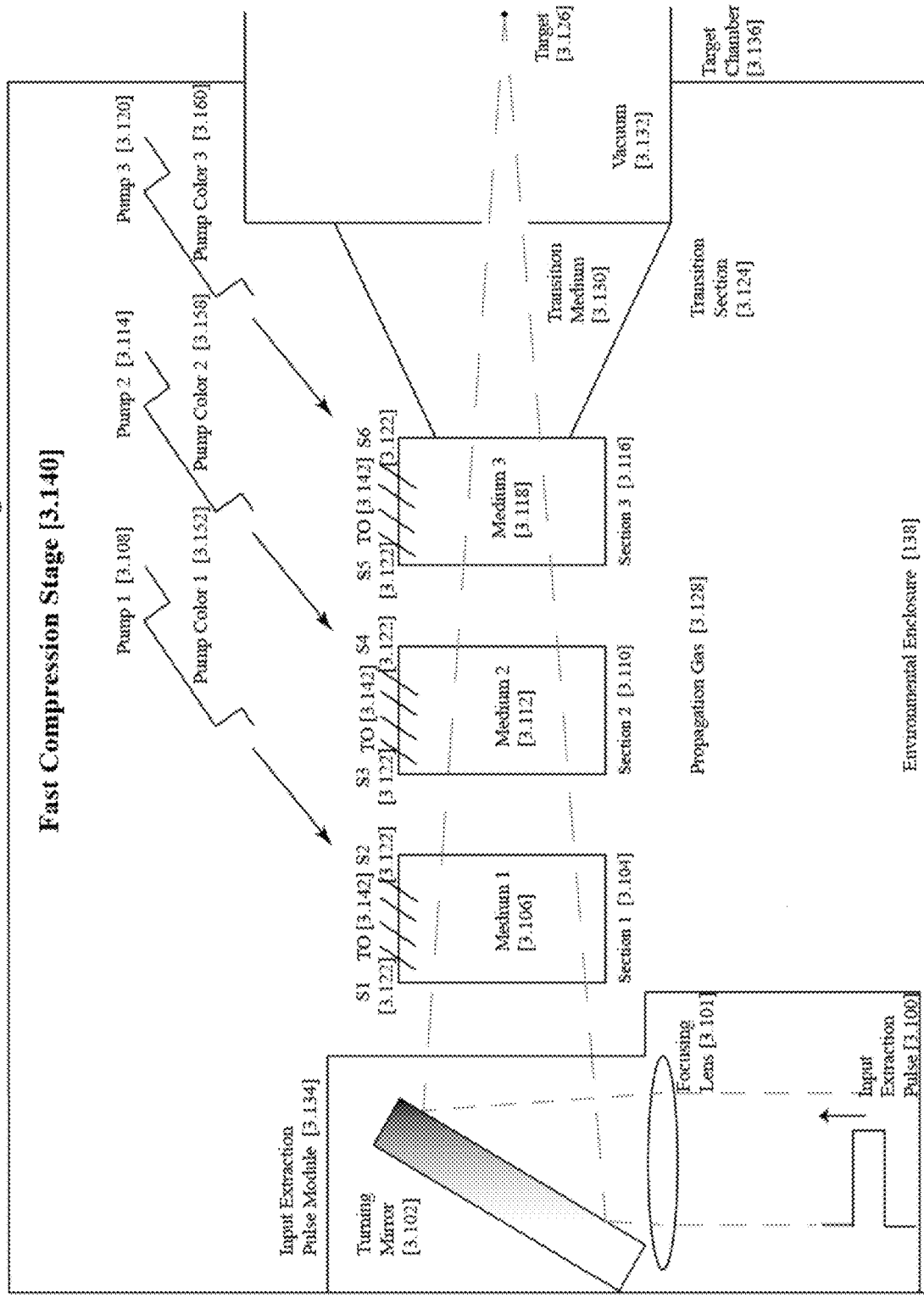
FIG. 9 shows a similar geometry as FIG. 1 but with exemplary parameters as described in the text.

A 3$^{rd}$ Embodiment: 3 or More Section Stages (FIG. 9)

As shown in FIGS. 1 and 2 outlining the principles of multisection stages, a three section design may be achieved. Such a design may produce higher stage gains and potentially higher efficiencies. This class of design tends to emphasize the optical coupling efficiency and performance of the last section, as typically 90% of the pump energy may be converted here. Thus, the complexity of more sections may be advantageous in terms of driving the last section more efficiently. As shown in FIG. 2, $G_{LS}$ may be larger at 3 sections for a given G limitation. Alternatively, having Raman transitions in the earlier sections will enable a larger G. More sections, if they are discrete, may mean more Transient Openings and other mechanical devices, separate gas handling systems, section interfaces, more drive wavelengths, etc. Table 14 shows the results of a 3 section performance analysis. Embodiment 3 is associated with FIG. 1 as the basic arrangement. Note that in Table 14, the overall $G_{SS}$ is 23 as compared to the $G_{SS}$=20 design of Table 3. Since the noise limit for a single stage for argon was derived as $G_{SS}$=20.2, the Table 14 design is preferred. In multisection designs, there is an additional G increment associated with the larger $\varepsilon_{SAT}$ of the output (in this case $\varepsilon_{SAT3} \approx 60\varepsilon_{SAT1}$, and the ΔG increment is ln60=4.1). The increased length but reduced aperture size adds another ln ΔG increment of 1.5 due to the solid angle factor. Overall, a total G of around 26 should be near the 1% loss to pump BASE. However, the G=20 given as the preferred embodiment has better margins against pump BASE. The pump may be angle or color offset similarly to the size in Table 3, however, note that the Ar/He mixture is not the same. Alternatively, a single pump color may be adequate, particularly if Ne and $N_2$ are utilized as the main scattering components in an all STMS arrangement. Embodiment 3 is given in FIG. 9 with corresponding media design and performance parameters shown in Table 14, and the overall operation is as described in the general discussion part of this application. This 3 section LCA is the Preferred Embodiment. It is anticipated its performance would be enhanced by incorporating the various aspects such as Adaptive Optics discussed below. This particular design is not index or density matched. Since the FWHM of the Ar STMS transition is given in Table 2 as $2.9 \times 10^9$ Hz, the Input Extraction Pulse [3. 100] may be a 1 nanosecond pulse and have reasonable amplification characteristics.

performance except at low pulse compressions. FIG. 8 shows the basic arrangement. Table 15 gives the parameters for an exemplary section based on STMS in neon, Embodiment 4 is simpler than those shown above. The use of a single gas may enable the elimination of a separate propagation gas and any shutters. Thus, S1 [4. 122] and S2 [4. 122] may be removed if the Transmission Medium [4. 130] is neon and the Propagation Gas [4. 128] is neon and the Input Extraction Pulse Module [4. 134] is filled with neon and/or has a low fluence output window. The Pump 1 [4. 108] may be modulated as described below to exceed the $G_{SS}$=20 level shown in Table 15 based largely on pump BASE. The use of two pump polarizations may extend the G out to around 30. The Extraction Pulse FASE limit may be extended by reducing the width for high G or for similar modulation and/or segmentation as described below.

TABLE 15

Performance Parameters for a Single Section Stage

| Parameter | Section 1 (Neon) |
|---|---|
| $\varepsilon_{input}$ (J/cm$^2$) | 1 |
| $\varepsilon_{output}$ (J/cm$^2$) | 1779.83 |
| $\tau_{input}$ (sec) | 1.00E−009 |
| $\tau_{pump}$ (sec) | 1.00E−008 |
| $\varepsilon_{pump}$ (J/cm$^2$) | 2335.08 |
| $\gamma_c$ (cm/watt) | 5.71E−013 |

TABLE 14

3 Section Performance Analysis

| Parameter | Section1 | Section 2 | Section 3 | Stage |
|---|---|---|---|---|
| $\varepsilon_{input}$ (J/cm$^2$) | 0.1 | 7.8 | 103.7 | — |
| $\varepsilon_{output}$ (J/cm$^2$) | 7.8 | 103.7 | 1209.4 | 1209.3 |
| $\tau_{input}$ (sec) | 1.00E−009 | 1.00E−009 | 1.00E−009 | 1.00E−009 |
| $\tau_{pump}$ (sec) | 1.00E−008 | 1.00E−008 | 1.00E−008 | 1.00E−008 |
| $\varepsilon_{pump}$ (J/cm$^2$) | 33.37 | 106.67 | 1167.54 | 1307.58 |
| $\gamma_{section}$ (cm/watt) | 9.99E−012 | 5.00E−012 | 5.71E−013 | — |
| Gas | Argon | .5 Ar/.5 He | Neon | — |
| $\varepsilon_{sat}$ (J/cm$^2$) | 6.67 | 13.33 | 116.75 | — |
| L (cm) | 150 | 150 | 150 | 450 |
| Width (cm) | 30 | 30 | 30 | 30 |
| $G_{SS}$ (nepers) | 5 | 8 | 10 | 23 |
| K (τ pump/ τ extract) | 10 | 10 | 10 | — |
| $G_{LS}$ | 78.46 | 13.22 | 11.66 | 1.21E+04 |
| $\eta_O$ | 0.23 | 0.90 | 0.95 | 0.92 |
| FASEextraction + Spontaneous (%) | 3.69E−002 | 3.08E−001 | 5.58E−001 | — |
| BASEextraction + Spontaneous (%) | 1.71E−002 | 8.30E−003 | 5.30E−003 | — |
| FASEpump + Spontaneous (%) | 2.53E−002 | 8.00E−003 | 1.60E−003 | — |
| BASEpump + Spontaneous (%) | 2.17E−002 | 6.80E−003 | 1.80E−003 | — |

Figure 10:
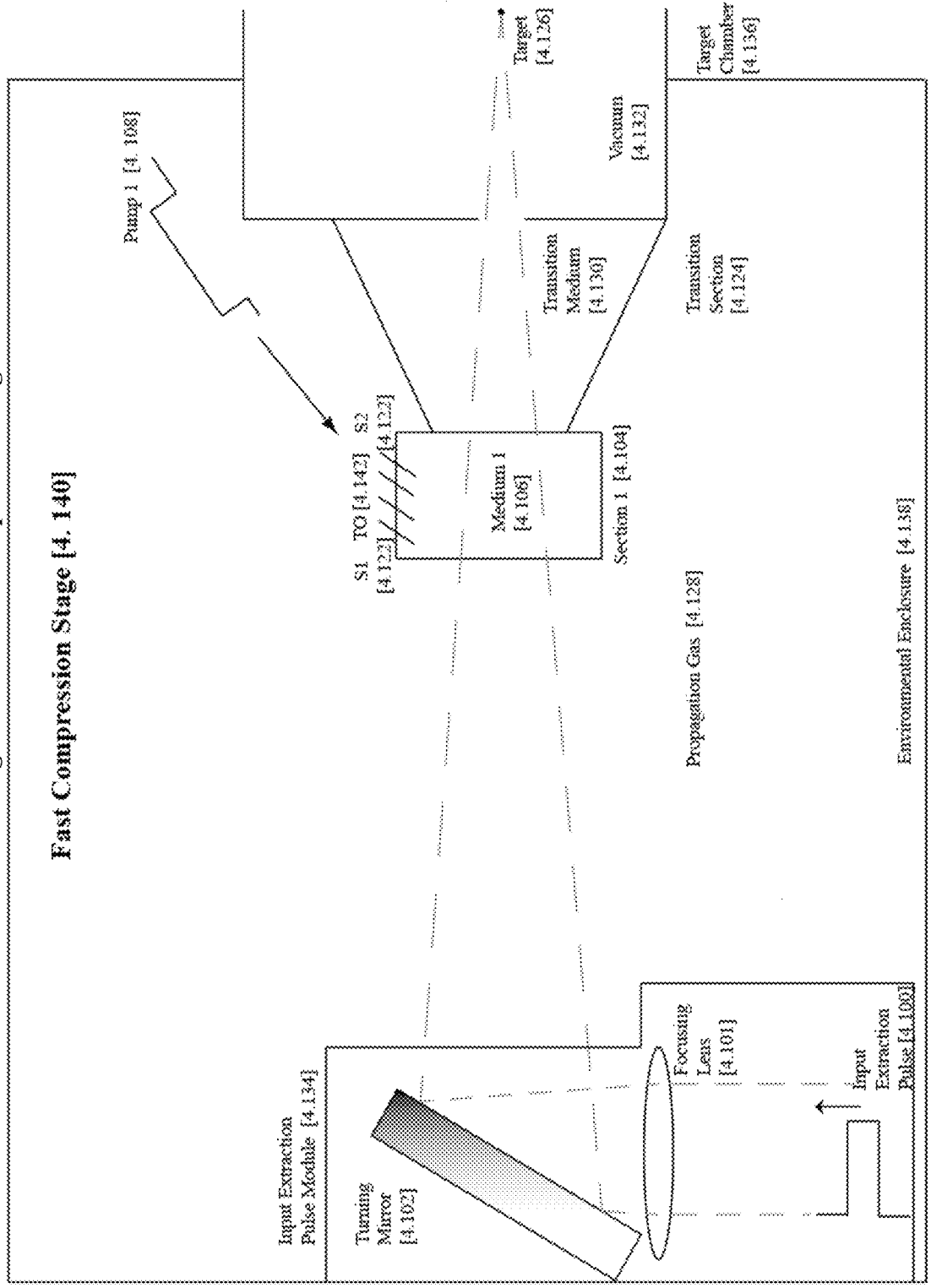
FIG. 10 shows an optical system with a compression stage that includes a single amplifying section, a module with a laser for producing an entrance pulse to the compression stage, a module with a laser for producing pump pulses for the amplifying section, a transition section, and a target chamber with target for receiving the exit pulse from the compression stage.

A 4$^{th}$ Embodiment: Single Section Stage (FIG. 10)

For a single section stage to give high stage gains at high efficiency, it is desirable to operate at high values of $G_{SS}$. For example, the Frantz-Nodvik equation, at a $G_{SS}$ of 30, predicts an efficiency of 0.9 at a $G_{LS}$ of $10^3$. For neon with an STMS $S_b$ of 5.33 joules/cm$^2$, this implies roughly an output fluence of 150 joules/cm$^2$. To obtain such a $G_{SS}$ in a single section, a Raman transition is preferable from a noise viewpoint; however, the compression/efficiency constraints outlined in "Raman Pulse Compression of Excimer Lasers for Application to Laser Fusion," supra, may preclude such TABLE 15-continued Performance Parameters for a Single Section Stage

| Parameter | Section 1 (Neon) |
|---|---|
| Gas | Ne |
| $\varepsilon_{sat}$ (J/cm$^2$) | 116.75 |
| L (cm) | 150 |
| Width (cm) | 20 |
| $G_{SS}$ (nepers) | 20 |
| K (τ pump/τ extract) | 10 |

TABLE 15-continued

Performance Parameters for a Single Section Stage

| Parameter | Section 1 (Neon) |
|---|---|
| $G_{LS}$ | 1.78E+03 |
| $\eta_O$ | 0.76 |
| FASEextraction + Spontaneous (%) | 1.77E−001 |
| BASEextraction + Spontaneous (%) | 8.40E−003 |
| FASEpump + Spontaneous (%) | 1.36E−002 |
| BASEpump + Spontaneous (%) | 7.60E−002 |

Figure 11:
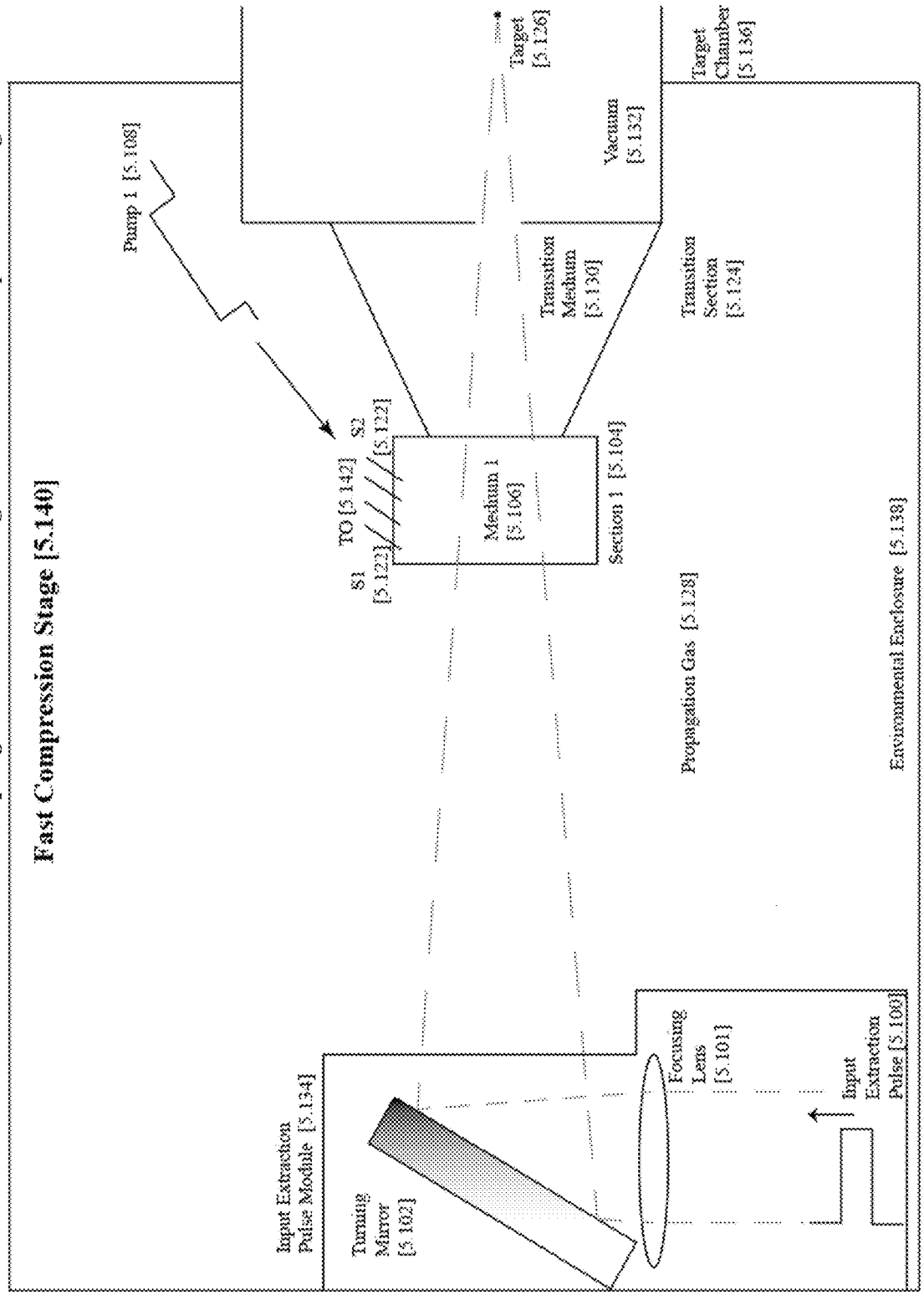
FIG. 11 shows a similar geometry as FIG. 10 but with a variable medium coupling parameter; such as, by varying gas concentrations as a function of position.
Figure 12:
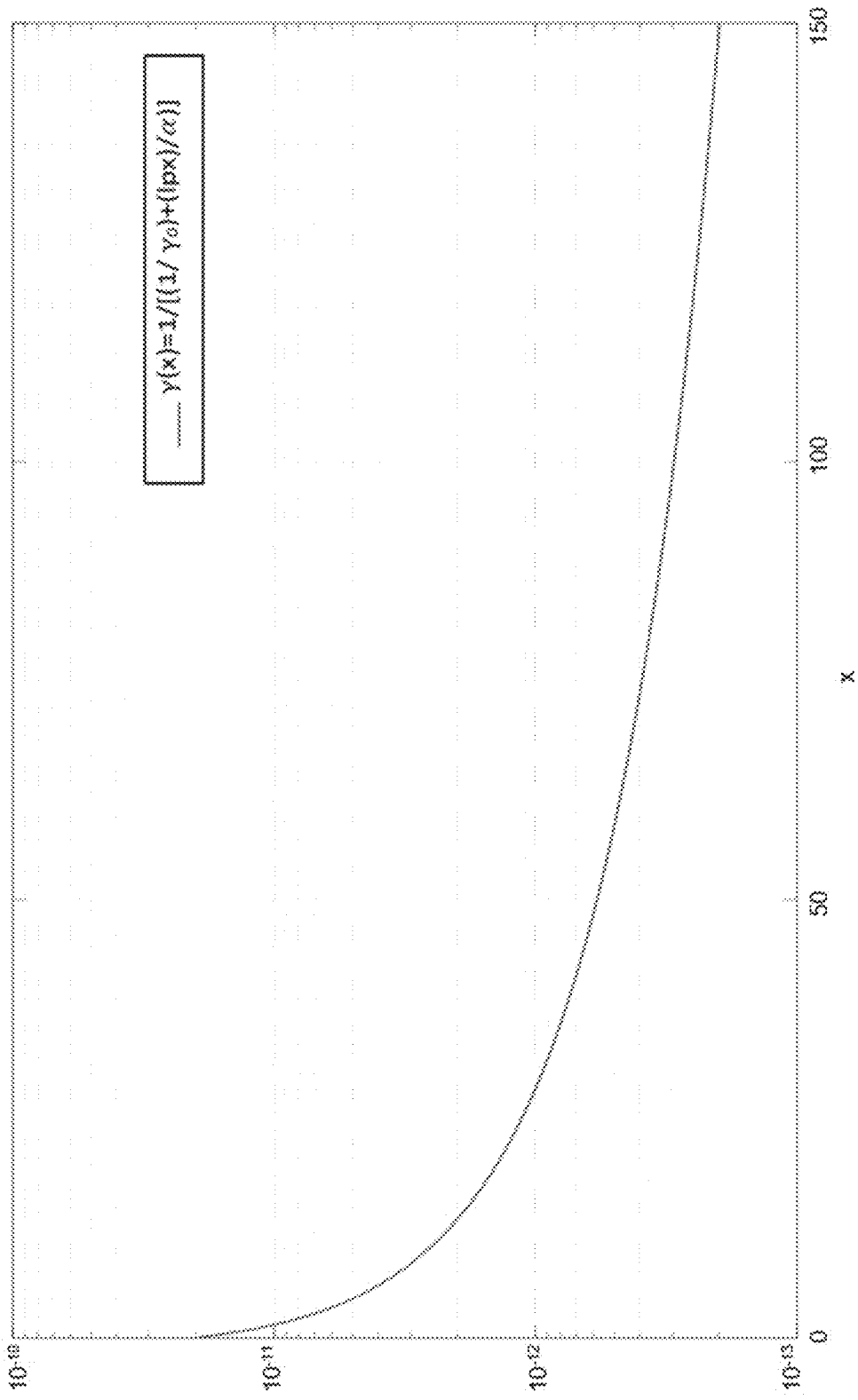
FIG. 12 plots the performances of a continuously graded coupling constant stage.

A 5$^{th}$ Embodiment: Media Parameters with Continuous Grading (FIG. 11 and FIG. 12)

A fifth embodiment entails continuous or quasi-continuous grading of the gas parameters along the path traversed by the extraction pulse. In FIG. 2, curve 5 labeled "Continuous Grading" shows the computed 1-D performance with a coupling constant controlled to give operation at a constant value of $\varepsilon/\varepsilon_{SAT}$ throughout the extraction length. For curve 5, the $\alpha$ varies as a function of $G_{LS}$. In such designs, roughly 2 times the saturation energy is needed locally in the extraction pulse to convert the pump pulse energy efficiently ($\geq 0.9$) into the extraction pulse. The condition for maintaining the local desired fluence may be simply written. First, $$\frac{dI_s}{dz} = \gamma(z) I_p I_s$$

is the gain equation. The extraction energy fluence, $\varepsilon_s$, is a multiple $\alpha$ of the local saturation energy $\varepsilon_{SAT}$, where $\varepsilon_s = \int_0^{\tau_{EXTRACTION}} I_s(t) dt$; using the approximations $\tau_{EXTRACTION} \ll \tau_{PUMP}$ and $I_p$=constant and the condition $$\frac{d\varepsilon_s}{dz} \cong \frac{2I_p}{c}$$

for efficient extraction, where c is the speed of light in the medium, the following relations may be derived:

$$\varepsilon(z) = \alpha \varepsilon_{SAT}(z) = \frac{2\alpha}{\gamma(z)c}, \varepsilon_{SAT}(z) = \varepsilon_{SAT}(0) + \frac{2I_p z}{c};$$

this leads to $\frac{2\alpha}{\gamma(z)c} = \varepsilon_{SAT}(0) + \frac{2I_p z}{c},$ These expressions assume unity quantum efficiency. In order to illustrate the process, we consider constant pump flux. Then, $$\gamma(L) = \frac{1}{\frac{1}{\gamma(0)} + \frac{I_p L}{\alpha}}.$$

The integrated small signal gain coefficient is given by $G = \int_0^L \gamma(z) I_p dz$, leading to a small signal gain of $$G_{SS} = e^G = \left[1 + \frac{I_p \gamma(0) L}{\alpha}\right]^\alpha.$$

The large signal gain may be obtained from:

$$\frac{\varepsilon_{SAT}(0) + \frac{2I_p L}{c}}{\varepsilon_{SAT}(0)} = 1 + \frac{2I_p L}{c \varepsilon_{SAT}(0)} = 1 + \gamma(0) I_p L = G_{LS}.$$

A relation between $G_{LS}$ and $G_{SS}$ is:

$$G_{ss} = \left[1 + \frac{G_{LSO} - 1}{\alpha}\right]^\alpha.$$

Note that at large signal gains much greater than 1, $$G_{SS} \cong \left(\frac{G_{LS}}{\alpha}\right)^\alpha.$$

The above relations are approximations derived for high efficiency extraction. This gives $$G_{LS} \simeq \alpha e^{\frac{G}{\alpha}},$$

where $G_{SS}$ is the small signal gain exponent. Thus, for an $\alpha \cong 3$ and G=20, $G_{LS}$=2.36×10$^3$. Table 16 gives the performance for a continuously graded medium seen in FIG. 12.

For $\alpha$=1, corresponding to an extraction efficiency of about 63%, the small signal gain is equal to the large signal gain. The large signal gain factor of 10$^3$ then implies a small signal gain factor of 10$^3$, whereas the threshold for gain from noise to a saturating ASE is about e$^{20}$, or 4.85×10$^8$, in typical geometries of interest. This shows the great advantage in terms of the pump ASE margin for this type of grading of the coupling constant. Also, for the second Stokes ASE, the local condition is $\varepsilon_{LOC} = \alpha \varepsilon_{SAT}$, whereas near the exit of a discrete section it is approximately $\varepsilon_{EXIT} = G \varepsilon_{SAT}$. Thus, the second Stokes ASE is greatly reduced if gas concentration grading is utilized as compared to a uniform coupling constant for a given section unless a large number of sections of low-G are utilized.

For an $\alpha$ of 2, corresponding to an extraction efficiency of about $$.87, G_{ss} \cong \left(\frac{10^3}{2}\right)^2 = 2.5 \times 10^5.$$

For a stage gain of 10$^4$ and $G_{SS}$=e$^{20}$=4.85×10$^8$, an $\alpha$=2.4 is obtained, corresponding to a local extraction efficiency of 91%. If the small signal gain is set at an ASE limit of e$^{20}$, this shows simultaneously achieving a stage gain of 10$^4$ and a conversion efficiency in excess of 90% within the bound set by pump BASE interfering with the oncoming pump beam. A particular design is shown in Table 16. The design shown is for constant pump power and a constant α, or local ratio of $\varepsilon_S$ to $\varepsilon_{LOC}$, of 3. This design yields a section gain of $10^2$, a one-dimensional extraction efficiency of 0.95, a pulse compression ratio of 10, and an output fluence of $10^3$ joules/cm². The approximate G=10.5, indicating little problem with pump BASE. For a larger overall gain, a second section with large signal gain of 10—$10^2$ may be utilized to drive this section. It can operate at much lower efficiency—for example, a 20% efficiency, and the overall one-dimensional efficiency can still be above 90% for the two sections in series. If a G of 6 is allocated to the second section, an input to it of 0.1 joule/cm² and a saturation fluence of 7.54 joules/cm² would give an efficiency of 0.25 and an output of 10 joules/cm². The total 1-D efficiency for the 2 sections would be 92%, large signal gain of $10^4$, and time compression of 10 relative to the pump energy. A G of 16 is less than the criterion of 20 for ASE growth for the approximate $10^{-3}$ steradian solid angle subtended by the output exit for a typical geometry. The continuous grading of γ can be approximated by a set of discrete γ sections as the two section example above shows. The above analysis indicates general scaling only. A given design should be analyzed numerically, particularly when the phonon lifetime is on the order of the extraction pulse width and the $\gamma_c$ changes substantially over the spatial extent of the extraction pulse. In addition, the pump BASE limit may be modified due to the change in $\varepsilon_{SAT}$ and $I_N(O)$ from the single section case analyzed above.

TABLE 16

Graded Coupling Backward Compression Section (Constant α and Pumping Flux)

| Parameter | Value |
| --- | --- |
| L (meters) | 1.5 |
| Gas at STP 1 atmosphere | See FIG. 49 |
| γ(0) (cm/watt) | $2 \times 10^{-11}$ |
| γ(L) (cm/watt) | $2 \times 10^{-13}$ |
| $\varepsilon_{IN}$ (joules/cm²) | 10 |
| $\varepsilon_{OUT}$ (joules/cm²) | $10^3$ |
| $G_{SS}$ | 10.6 |
| $e^{G_{SS}}$ | $3.9 \times 10^4$ |
| $G_{LS}$ ($\varepsilon_{OUT}/\varepsilon_{IN}$) | $10^2$ |
| α | 3 |
| $\varepsilon_{PUMP}$ (joules/cm²) | $10^3$ |
| $\tau_{PUMP}$ (seconds) | $10^{-8}$ |
| $\tau_{EXTRACTION}$ (seconds) | $10^{-9}$ |
| $\eta_0$ | .95 |
| Compression Ratio | 10 |

This table is constructed for a gas mixture that varies the coupling constant that varies from $2\times10^{-11}$ cm/watt at the entrance to $2\times10^{-13}$ cm/watt at the exit of the stage. As in many exemplary cases, it is based on a constant pump power over the length of the section. Using the noble gases Kr, Ar, Ne, and He, the concentrations are varied to produce the coupling constant profile shown in FIG. 12 Of course, a staircase profile using the pure gases may be utilized to approximate the continuous profile. The frequency of the pump beam may be modulated to couple efficiently to the local gain profile if the centerline of the local gain profile changes as a function of distance down the section. For the case shown, the 1.5 meter length means that the 1 nanosecond extraction pulse covers about ⅕ of the spatial extent of the compressor. Thus, since the $\gamma_c$ changes during the 0.3 m length, an analysis considering the effects of such a high $\gamma_c$ gradient would need to be performed for a particular design.

Producing the graded concentration profiles may be accomplished in many ways. One example is flowing gas transversely to the optical axis with nozzles inserting variable gas concentrations versus optical path length; another is mixing gases by inserting a perforated pipe array into the optical region injecting the desired gas spatially and then retracting the array prior to the pump pulse arrival. For the gas mixtures in the graded section, the total phase shift due to the gas is about $10^3$ waves. For typical room environments, this would give about 1 wave or less differential shift if not index matched.

The dominant scattering process for the case shown is STMS. The same technique may be utilized for Raman backward compression where it can help relax the $2^{nd}$ Stokes ASE limits. In terms of the geometric layout, the single section layout of Embodiment 4 is exemplary. Here, the Constant Pump frequency may be used if the gain center frequency doesn't shift markedly with the material, as in mixtures where $N_2$ (STMS) is graded by neon, helium and $N_2$ with neon and nitrogen giving much of the active profile. FIG. 11 is an embodiment wherein Medium 1 (5. 106) is such a graded medium.

A $6^{th}$ Embodiment: Index and/or Density Matched Sections (FIG. 13)

By using the same linear index of refraction materials throughout a section and/or in different sections, the effect of index fluctuations and difficulties in gas handling are greatly reduced. The first embodiment described two stages that were index, but not density matched. For lookthrough configurations, this may give higher overall optical quality and reduce the level of optical compensation needed for a given design, if any. Table 17 shows a variable coupling constant section that is index matched. One design approach entails two gas mixtures of the same index but with different coupling constants. By changing the fraction one to the other, the coupling may be varied but the index remains the same. If the mixture is density matched as well, then both density and index are matched. For mixtures, as well as other pressures and scattering mechanisms, the coupling constant needs to be computed for the mixture of interest. The overall section gain shown in Table 17 is fairly small, 2.65, and so several sections would be needed. The output here would be index matched to a neon filled transition section. Using the same pump power with a constant coupling section of the M gas, and an input of 4 joules/cm², the driver section would have an efficiency of about 0.7 and a G of 7. This gives an overall pulse length compression of 10, a total G of 11, a 2 section large signal gain of 125, and combined two-section efficiency of 0.84. This may then be a fully index matched compression section and transition section. If the 4 joules/cm² is too high for the injection fluence due to material damage, one interface to a $3^{rd}$ section might not be index matched. There is a design trade off between the range of coupling constant, and section optical parameters may be balanced against the number of interfaces and interface index matching. Also, when using such a mixture, the effect of lineshapes needs to be considered in terms of the effects on the amplifier performance frequency response.

Figure 13:
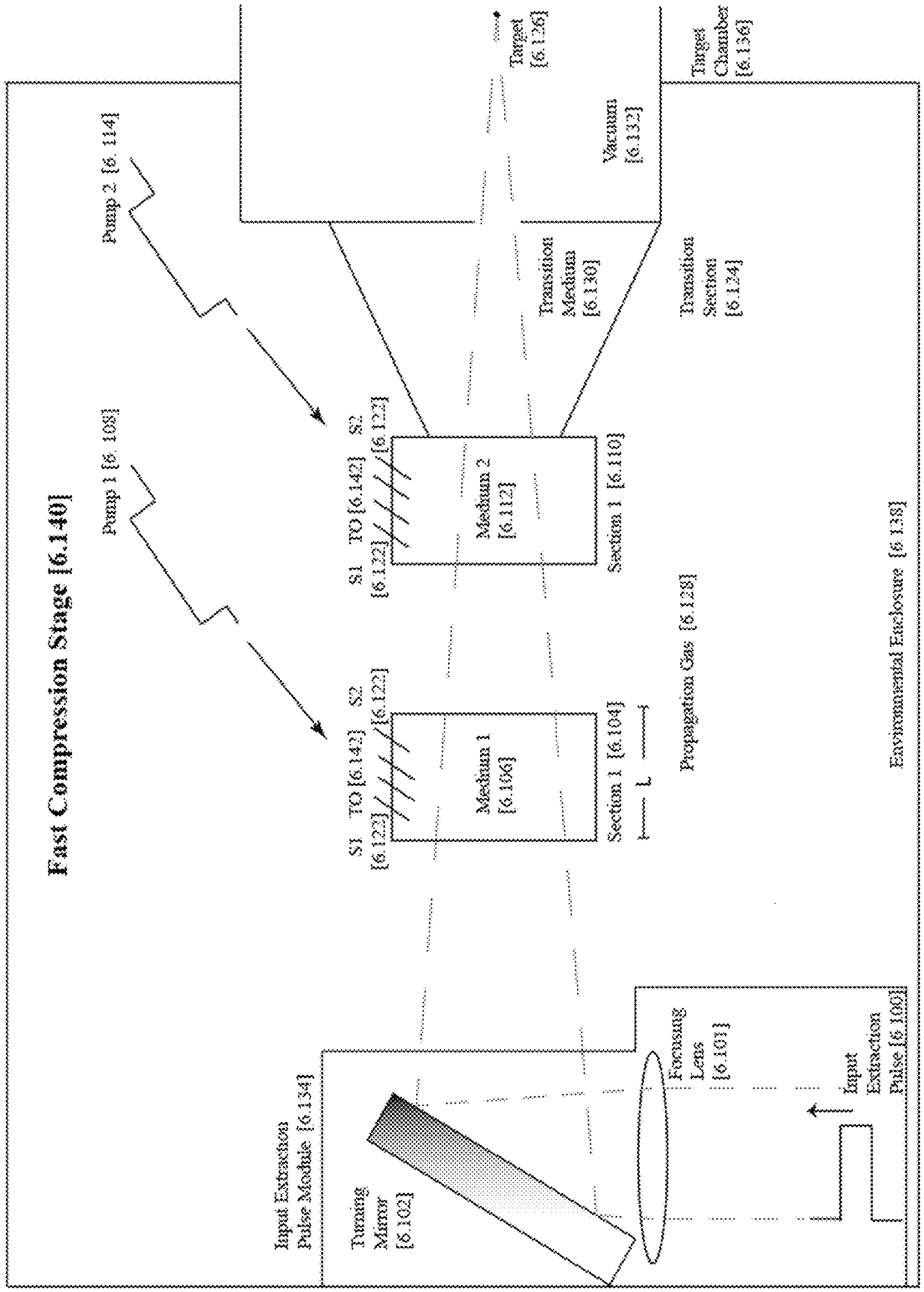
FIG. 13 shows a similar geometry as FIG. 10 but with an index and/or density matched propagation gas and scattering media.

In FIG. 13, Embodiment 6 is shown. Medium 2 [6. 112] would have the gas properties shown in Table 17. Medium 1 [6. 106] or Section 1 [6. 104] would have an active length, L, of 1.5 meters. The general operation is as described above. The Pump 2 [6. 114] is sized to produce the parameters given in Table 17, such as a pump fluence normal to the extraction pulse path of 350 joules/cm$^2$ in a 10$^{-8}$ second pulse. The pump color may be controlled to match the gain peak as a function of time, as the argon peak gain response is somewhat offset from the neon (Table 2 gives 0.067 cm$^{-1}$ vs 0.09 cm$^{-1}$ for argon and neon), or the extraction calculation needs to take the peak response difference into account. N$_2$ has an index and coupling constant similar to argon, and a frequency shift of 0.08 cm$^{-1}$ closer to that of neon (0.09 cm$^{-1}$). A design utilizing N$_2$, He as the M mixture may then be formulated and Pump 1 [6. 108] may be set at a constant color. The extension to the embodiment configuration such as those shown in FIG. 6-9 where any of the sections may be graded in a similar fashion is straightforward.

TABLE 17

Index Matched Variable Coefficient Amplifier Section

| Parameter | Entrance | Exit | Section |
|---|---|---|---|
| Gas (at STP 1 atmosphere total pressure) | 100% M (.13 Ar, .87 He) | 100% Ne | |
| L | | | 1.5 meters |
| n − 1 | 6.9 × 10$^{-5}$ | 6.9 × 10$^{-5}$ | 6.9 × 10$^{-5}$ |
| $\gamma_C$ (cm/watt) | 1.53 × 10$^{-12}$ | 5.7 × 10$^{-13}$ | |
| $\alpha$ | 4.27 | 4.27 | |
| $\varepsilon_{SAT}$ (joules/cm$^2$) | 44 | 117 | |
| $\varepsilon_{PUMP}$ (joules/cm$^2$) | | 350 | 350 |
| $\varepsilon_{EXTRACTION}$ (joules/cm$^2$) | 186 | 500 | |
| $\tau_{PUMP}$ (seconds) | | | 10$^{-8}$ |
| $\tau_{EXTRACTION}$ (seconds) | | | 10$^{-9}$ |
| $\eta_O$ | | | .99 |
| $G_{SS}$ | | | 4.0 |
| $e^{G_{SS}}$ | | | 56 |
| $G_{LS}$ ($\varepsilon_{OUT}/\varepsilon_{IN}$) | | | 2.65 |

The added gas mixture M is 0.13 Ar and 0.87 He by partial pressure, with an estimated index of refraction of 1.000069 at 0.25 micron wavelength and STP. The host gas is neon. The concentration is varied to keep $\alpha$ constant through the amplifier.

One way to obtain a density matched design between sections in a stage is to use scattering media that have very different scattering coupling constants for roughly the same density. Exact density matching is then obtained by adjusting additives and/or utilizing base mixtures with intermediate density in a multisection architecture. A density matched three section design is shown in Table 18 where the first section is pure deuterated methane (CD$_4$) with a small admixture of Ar to provide density matching, and the third section is pure neon (Ne). Since Ne has an atomic weight of 20.183 (see *General Chemistry*, by L. Pauling, W.H. Freeman (Ed.), Dover Publications, Inc., p. 93 and p. 847, 1988) and C 12.01115 (including isotopic variations) and D 2.01410 (*General Chemistry*, supra, p. 846), the weight of CD$_4$, neglecting the mass difference due to the chemical bonds, is 20.0676. By adding a small amount of heavier gas, the weights can be equalized. As show in Table 18, the choice for this design is to add a trace amount of Ar, atomic weight 39.948, to the CD$_4$ to make it heavier. The gas mixture densities (assuming equal temperature and pressures) are shown in Table 18. The densities are matched to the fourth significant place, and the coupling constants are approximately 50 times different. To make an efficient Section 2, a coupling constant of about 4×10$^{-12}$ cm/watt is desired. However, the same density is to be obtained. The mixtures shown in Table 18 are chosen. Table 18 is based on STMS scattering, with required pump frequency effects as desired above. Another possibility is using a mixture of CH$_4$ and He with adjusting admixtures for Section 2. The overall performance is a signal gain of over 10$^4$ with an efficiency of better than 0.9 and a time compression ratio of 10, as shown in Table 18.

TABLE 18

Density Matched 3 Section Design

| Parameter | Section 1 | Section 2 | Section 3 | Stage |
|---|---|---|---|---|
| Partial Pressure Fractions | .9942/.0058 | .55/.45 | 1.0 | |
| Densities at STP (g/cm$^3$) | 9.0102 × 10$^{-4}$ | 9.0103 × 10$^{-4}$ | 9.0103 × 10$^{-4}$ | |
| Coupling Constant (cm/watt) | 2.86 × 10$^{-11}$ | 4.27 × 10$^{-12}$ | 5.52 × 10$^{-13}$ | |
| $\varepsilon_{SAT}$ (joules/cm$^2$) | 2.33 | 7.02 | 120.72 | |
| Gas | .9942 CD$_4$/ .0058 Ar | .55 He/.45 Ar | Ne | — |
| L (cm) | 150 | 150 | 150 | 450 |
| W (cm) | 30 | 30 | 30 | 30 |
| $G_{SS}$ (nepers) | 5 | 10 | 10 | 25 |
| $G_{LS}$ | 56.92 | 32.84 | 9.59 | 1.79E+04 |
| $\varepsilon_{IN}$ (joules/cm$^2$) | 0.07 | 3.98 | 130.84 | 0.07 |
| $\varepsilon_{OUT}$ (joules/cm$^2$) | 3.98 | 130.84 | 1254.17 | 1254.17 |
| $\eta_0$ | 0.34 | 0.86 | 0.96 | 0.94 |
| $T_{input}$ (secs) | 1.00E−09 | 1.00E−09 | 1.00E−09 | 1.00E−09 |
| $T_{pump}$ (secs) | 1.00E−08 | 1.00E−08 | 1.00E−08 | 1.00E−08 |
| $\varepsilon$ pump (J/cm2) | 11.66 | 148.30 | 1169.59 | 1329.5421 |
| $\gamma_{section}$ (cm/watt) | 2.86E−11 | 4.4955E−12 | 5.70E−13 | — |
| $\varepsilon_{sat}$ (J/cm2) | 2.33 | 14.83 | 116.96 | — |

Simultaneous index and density matching may also be obtained. The density matching reduces shutter temporal performance requirements, while index matching ensures good linear optical performance, even with substantial intersection and/or intersection and/or propagation gas mining. For multiple sections, they may be placed in closer proximity, also, the propagation gas may also be index and/or density matched for multisection Lookthrough Compressors.

Figure 14:
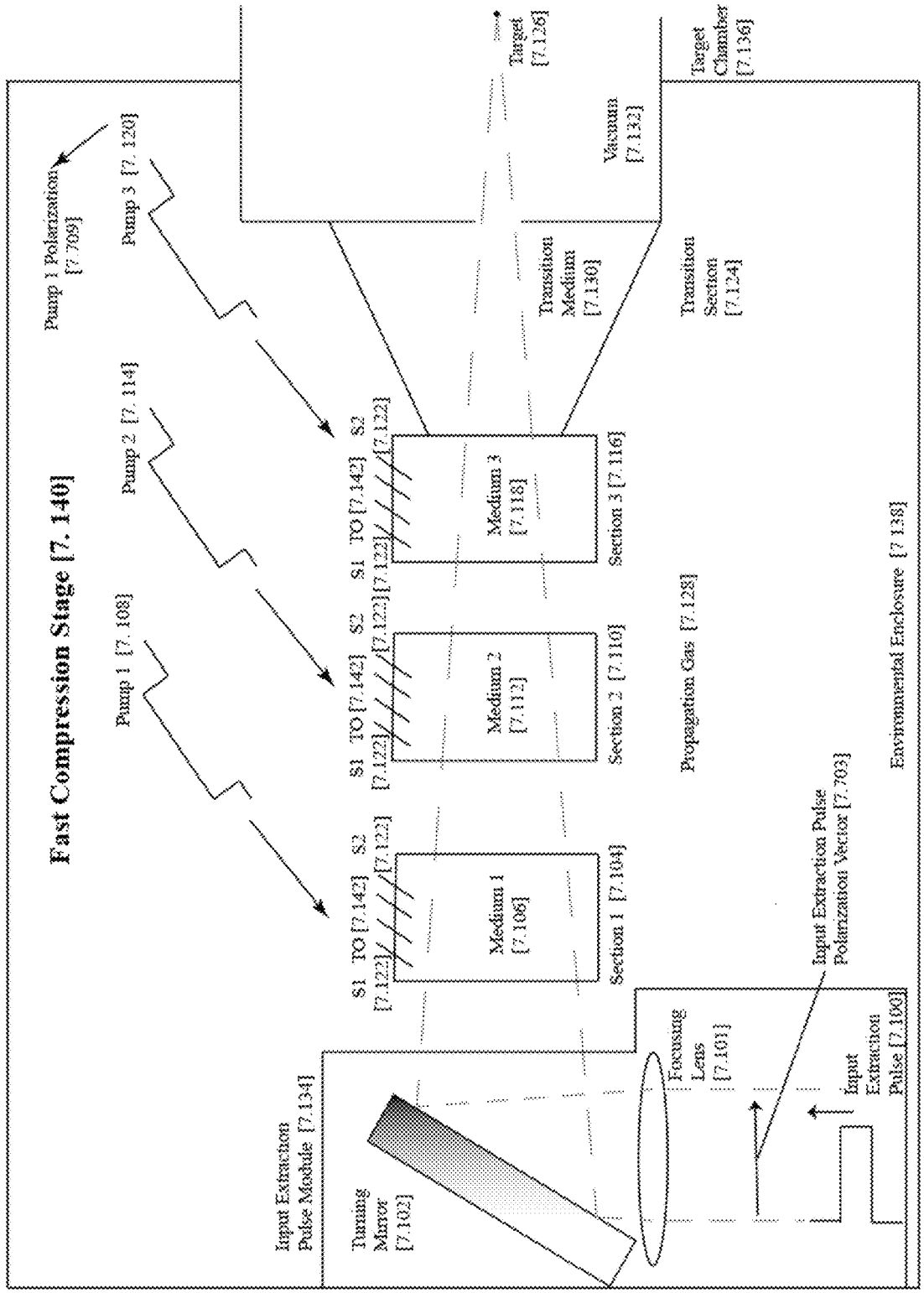
FIG. 14 shows a similar geometry as FIG. 1 but the amplified spontaneous emission properties, optical coupling efficiency and extraction efficiency is controlled by polarization modulation of the pump and extraction beams.

A 7$^{th}$ Embodiment: Polarization Modulation of Optical Fields (FIG. 14)

In the above embodiment, the advantages of varying the coupling constant by controlling gas concentrations were shown in terms of stage gain, efficiency, time compression, and ASE properties. It is also possible to vary the coupling properties by controlling the extraction and/or pump beam optical properties. The particular case shown varies the pump electric field angle as a function of time for linearly polarized light with a constant linearly polarized extracting beam. For the STMS scattering process, the extraction field and pump field need to interfere to create a beat wave that modulates the density of the scattering species and so produces stimulated scattering with energy transfer from the pump wave to the extraction wave. For most analyses and experiments, the beams are linearly polarized with the electric field vectors aligned and are counter-propagating (see, for example, "Stimulated Molecular Scattering of Light In Gases At Different Pressures," supra). By changing the angle of polarization of the extraction beam relative to the pump, the amplitude of the beat wave is varied. This will result in a change of the coupling constant in time and space as the angle is varied.

Often in applications entailing material surfaces at high fluence, the coating and substrate damage considerations restrict operation to one polarization, often linear, for the optical elements, such as glass laser slabs set at Brewster's angle. Many of the designs discussed herein do not have high fluence (relative to damage levels) on material optical elements and so may operate with unpolarized light and variable polarized light (during the pulse) or a mixture of polarizations. This is a substantial advantage of such designs.

The spontaneous emission will not be fully amplified as well if the polarization of the pump beam has changed. Both the coupling constant and amplification for noise factor are reduced as the local polarization angle difference is increased. In Raman scattering, it may be quite different depending on the nature of the transition. One version has the pump polarization vector rotated 60° during the pump pulse. At the beginning of the pump pulse, the vector is aligned with that of the linearly polarized extraction beam. As the vector is rotated, the coupling is lessened, creating an effective $\gamma(z)$. The discussion of the accompanying third embodiment above applies to the extraction process as the $\gamma$ is lowered, resulting in enhanced efficiency. Likewise, a chirped (linear frequency change versus time) frequency of the pump pulse will change the coupling constant. This may be used in conjunction with the polarization rotation as well as any of the above techniques for modulating $\gamma(z)$.

As an example, $CF_4$ has a vibrational mode with a 908 cm$^{-1}$ energy shift. The coupling constant for STMS is on the order of two times the coupling constant for the vibrational mode. Thus, the STMS should be controllable for a small signal gain exponent of around 10. The Raman mode is a Q branch transition, and, hence the gain coefficient should be proportional to $\cos^2\theta$, where $\theta$ is the angle between pump and extraction beams polarization vector (taken as linearly polarized in this case). This is the same as the STMS dependence for linear polarization. The coupling constant may be written:

$\gamma(z)=\gamma_0 \cos^2[\theta(z)]$, and starting with $\theta=0°$ at the entrance to the cell, the prescription for the constant pump power case and constant $\alpha$ is:

$$\gamma(z) = \frac{1}{\frac{1}{\gamma(\theta)} + \frac{I_p L}{\alpha}} = \frac{\gamma(0)}{1 + \frac{\gamma(0)I_p z}{\alpha}} = \gamma(0)\cos^2[\theta(z)].$$

This leads to:

$$\theta(z) = \cos^{-1}\left[\frac{1}{1 + \frac{\gamma(0)I_p z}{\alpha}}\right]^{1/2}$$

This sets the $\theta(t)$ applied to the pump pulse in this case. $\theta(t)$ refers to the rotation angle to match the $\theta(z)$ when the extracting pulse is at z. The noise emitted by the front of the pump pulse will not be fully amplified as it progresses back up the beam. Since the other couplings (Raman polarization combinations, etc.) may not have the same dependence on the rotation angle, the noise amplification for them needs to be separately checked. Clearly, combinations of polarizations and modulations for the pump and extraction beams may be used, including changing the types of polarization during either pulse.

The pump power profile may also be modulated to obtain good extraction efficiency. A low power front into a high $\gamma$ region can produce high gain that is relatively inefficient but doesn't entail large energy. This pump power modulation can be coupled with $\gamma$ grading.

Also, the pump frequency and its content may be changed to vary the coupling constant, including chirping, discrete frequency shifts, and bandwidth control.

In addition to polarization and other control for the coupling of the extraction pulse to the mump pulse, there are two other functions polarization control may perform. The first is to control the pump BASE. The general discussion presented the noise source analysis for the pump BASE emanating from the region just in front of the extraction pulse for the overall G characterizing the section(s). For linear polarization, if the polarization vector is rotated, the pump BASE gain factor will be determined from the value of G. A simple method would be to have the polarization vector rotated +45° for the section(s) length relative to the polarization vector of the extraction pulse and to −45° for the pump pulse corresponding to the second half of the section(s). The pump BASE would then see a gain exponent for all sections with the pump polarization set at one angle. The saturation fluence for the offset angles for the coupling between extraction and pump pulse would be changed as in the above discussion, affecting the design somewhat. However, increasing the overall G as set may be desirable. Mixtures of polarizations, including ionic sections, and allocation among sections may be utilized as well as the simple example.

A third major use of polarization modulation is to control the extraction pulse FASE. By switching polarization behaviors, the first and second half of the extraction pulse, the growth may be reduced as the offset angle means that one polarization of FASE, as it propagates, may encounter the second polarization as it propagates transversely. It will not then have a large gain due to the mismatch between the noise polarization and the extraction pulse polarization.

Other uses of polarization in simultaneous pump and extraction pulse modulation to optimize spatial pump envelope coupling to the medium and temporal pulse shape control.

For the ICF application, the use of polarization variations and mixture may be of value in terms of target coupling. For embodiments without high fluence material elements, the dictating of the Lookthrough Compression Arrangement with gas media to work with all polarizations means that temporal modulation of the polarizations property is readily available, whereas in solid state lasers and wavelength conversion methods, there are strong restrictions on the allowed polarization state. In terms of an example (FIG. 14), an LCA with control of the Input Extraction Pulse [7. 100] is shown with an Extraction Polarization [7. 703] and Pump Polarization [7. 709].

Figure 15:
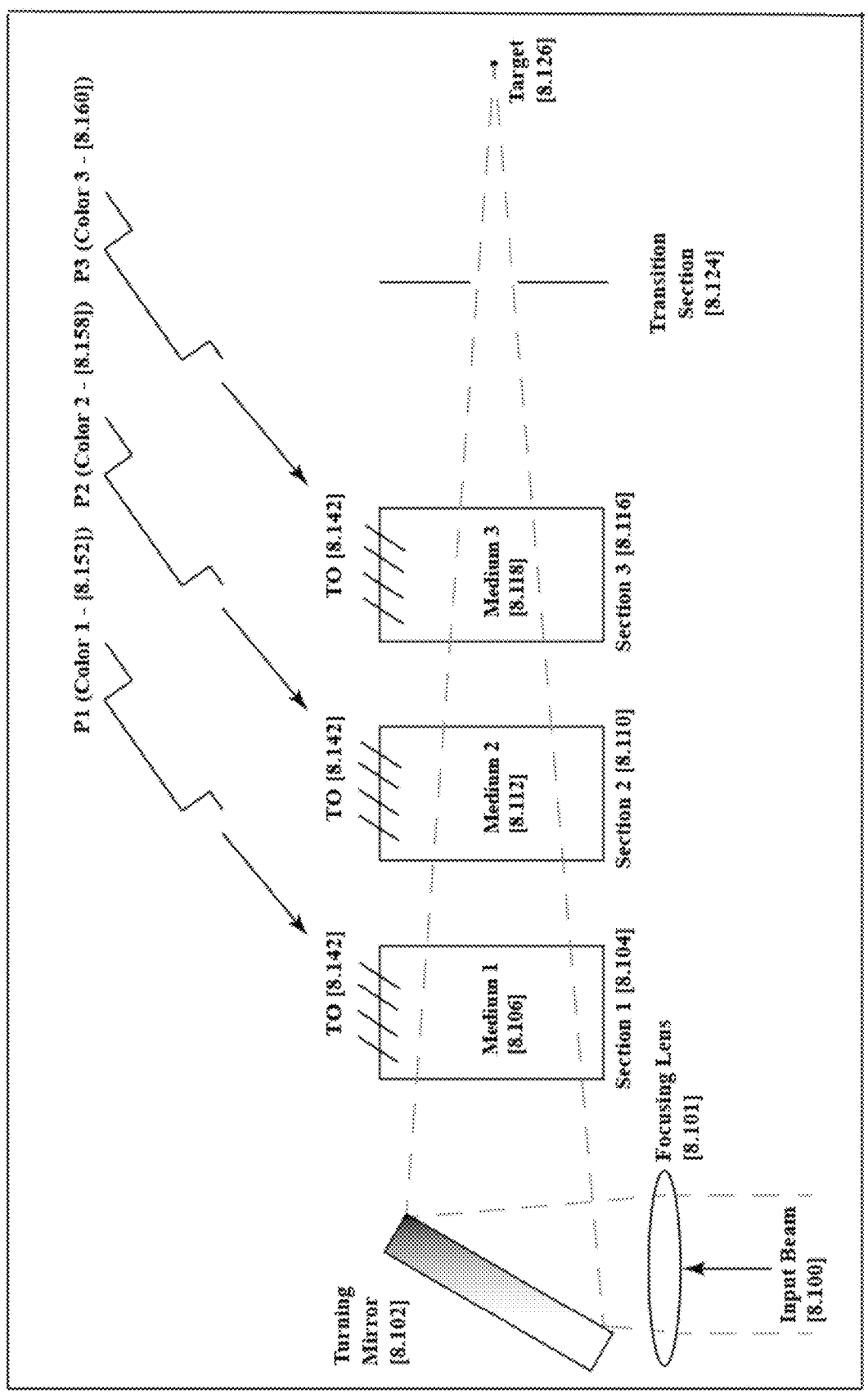
FIG. 15 shows a similar geometry as FIG. 1 but the pump colors are separately controlled to match a single color extraction pulse with the different frequency spectrum scattering response in the different sections.

An 8$^{th}$ Embodiment: Gas Scattering Parameters Matched to Pump Frequency (FIG. 15)

The different sections may entail scattering off different gases. For example, in Table 4, Section 1 and Section 2 utilize Ar Medium 1 [8. 106] and Ar/He Medium 2 [8. 112] as the scattering gases, while Section 3 Medium 3 [8. 118] is based on Ne scattering. In this configuration, the extraction pulse has constant color as it is amplified. The centerline frequency of the gain curve shows their respective offsets as 0.09 and 0.06 cm$^{-1}$ in Table 2. To keep the gain at peak in each section, avoid anomalous dispersion, and maximize efficiency, the pump colors are then offset from each other by the difference, and in this example, the pump for Section 3 has a higher frequency than the one for Sections 1, by 0.05 cm$^{-1}$, or, 1.5×10$^9$ Hertz. For mixtures, such as Medium 2, the gain peak should be separately computed. Fine tuning for each section may be utilized to optimize section performance. Also, the combined use of polarization and color control may occur.

Also, for cases where the frequency shift is larger than the scattering linewidth such as in isotopically substituted N$_2$ sections, the ASE from one section will not be amplified in the succeeding sections, as in rotational scattering, and the sections may be decoupled in terms of ASE parameters.

Figure 16:
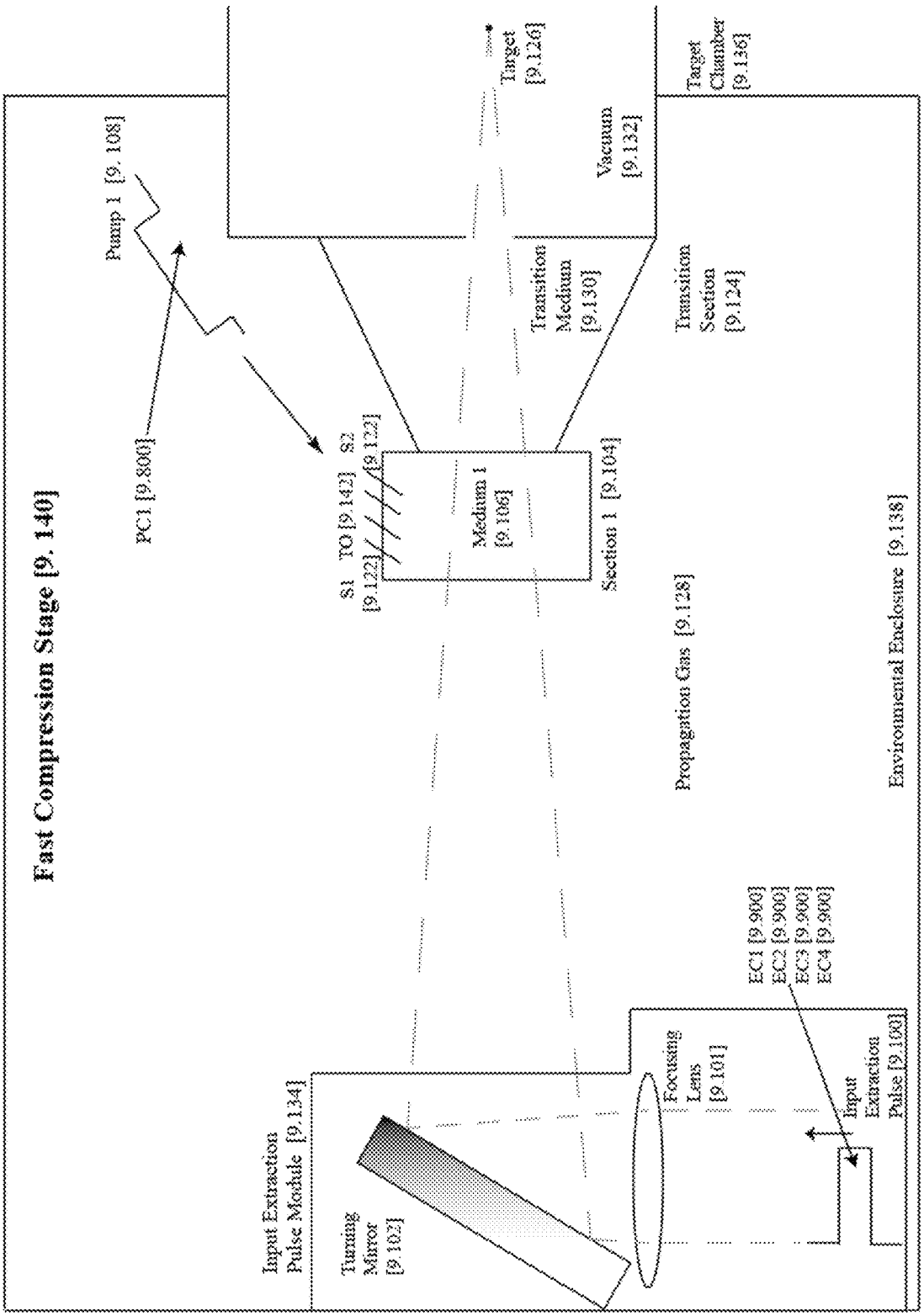
FIG. 16 shows a similar geometry as FIG. 10 but a single pump color is utilized to amplify multiple extraction pulses.

A 9$^{th}$ Embodiment: Multicolor Extraction (Single Pump Color) (FIG. 16)

A mixture of scattering species or scattering states may be used to provide gain at a variety of wavelengths. For a single color pump and STMS scattering, a mixture such as ¼ Ne and ¾ He will provide fairly uniform gain over a relatively broad band of frequencies. In this case, with a pump bandwidth of 10$^8$ Hz, a gain bandwidth of about 10$^{10}$ Hz may be obtained for STMS. This can support a bandwidth limited pulse of less than 10$^{-10}$ second duration. It may also support an output of 5-10 separation colors for the Extraction Pulse spaced across this frequency spectrum. Likewise, from Table 2, different rotational Raman scattering shifts could be utilized, [say S(6)-S(18)], as well as isotopically mixture produced rotational state shifts. A combination of scattering mechanisms could be used N$_2$ is shown with vibrational transitions giving a much larger frequency shift some 2,327 cm$^{-1}$ for the case shown. For lower level saturation of Raman transitions the STMS scattering may then be utilized. These examples show how one pump color in a section may be used to amplify many output colors. FIG. 16 exemplifies this invention. Pump 1 [9. 108] in a single color, while EC1, EC2, EC3, EC4 [9. 900] represent four colors. For this case, Medium 1 [9. 106] may be a mixture of Ne and He. Extension to multiple sections is straightforward.

A 10$^{th}$ Embodiment: Multiline Pump (1 Color/Pump, Multicolors/Pumps) (FIG. 17)

Two primary uses of multicolor pumps are to increase the extraction efficiency and to provide a broad spectrum of output light from a compressor. As outlined in "*Optical Configurations for Fusion Laser*," by R. O. Hunter, Jr., U.S. Provisional Patent Application No. 62/497,908, supra, many colors may be generated for the pump beams for the Fast Compression Stage. These can be further spread in color by Raman scattering if larger bandwidths are desired.

Figure 17:
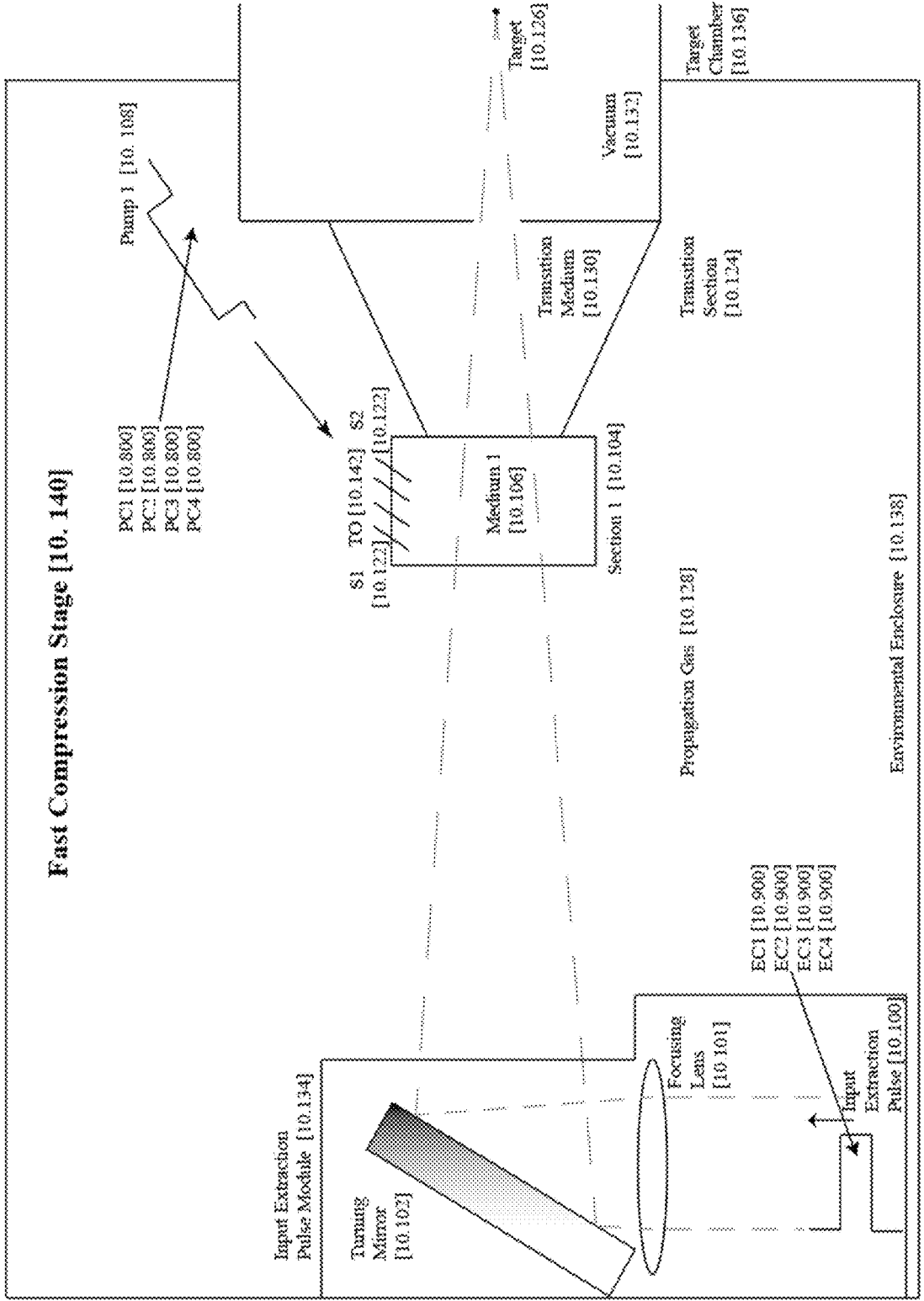
FIG. 17 shows a similar geometry as FIG. 10 but a simultaneous amplification of four extraction pulse colors by four corresponding pump colors is utilized.

For this embodiment, an exemplary case is shown in FIG. 17, PC1, PC2, PC3, PC4 [10. 800] are each associated with a given Input Extraction Pulse [10.100] color EC1, EC2, EC3, EC4 [10. 900]. The Medium 1 [10. 106] may be chosen to give about the same frequency shift (STMS) or may be chosen to give substantially different frequency shifts, such as those characteristic of Raman scattering.

Multicolor Extraction

One way to extract multiple colors may be to have multiple color pumps. In a geometry utilizing multiple separate sources, such as described in some embodiments in "*Optical Configurations for Fusion Laser*," by R. O. Hunter, Jr., U.S. Provisional Patent Application No. 62/497,908, supra, a number of the multiple sources may be operated at a certain color and others at other colors. Thus, a variety of colors may impinge on a given section element. Since the scattering cross section may not vary rapidly for a non-resonant process typical of those described above, the relative gain constant at a given extracting color may be roughly the same for the various colors. Then, many colors may have gain at the same time. For a single scattering gas, the gain may be based on the power in a single pump color so the medium coupling constants may be chosen based on the pump flux per color. Then, multiple injected colors would yield multiple outputs. The saturation simulation results for typical STMS conditions indicate the scattering regime is linear, i.e., each color acts independently at fluences of interval. Another approach is to utilize a scattering medium, such as SRRS in N$_2$, where a single pump drive color may give gain across a set of lines. Here, a single frequency drive may be chosen to amplify, say, 5 transitions [S(6), S(8), S(10), S(12), S(14)] and a multiple color output obtained. An isotopically mixed gas would yield even more frequencies available for amplification. Another approach may be to rely on finite relaxation rates to produce non-equilibrium distribution functions of the scattering species. In this case, many more amplification frequencies are available, as the initial scattering would result in population of the scattering species well removed from the initial thermal equilibrium distribution, leading to gain on Raman transitions usually not available. This approach may relax substantially the ASE constraints for both the pump and extracting beams. For the above mentioned N$_2$ SRRS, high J level transitions [S(16), S(18), S(20), etc.] as well as the odd numbered transitions [S(3), S(5), S(7), etc.] that have lower gains in the thermal equilibrium case may become available. Another possibility is to drive each transition with properly chosen pump colors so that a single color may extract from all active transitions.

Thus, a large portion of the rotational manifold may be accessed by a single extraction color. Vibrational Raman transitions, such as in $N_2$, from v=1 and higher v levels may be utilized. Previously, the restriction for extraction on a rapid time scale may have been thought to represent a fundamental limitation on available extraction energy (see, for example, J. P. Partanen and M. J. Shaw, "High-Power Forward Raman Amplifiers Employing Low-Pressure Gases in Light Guides: I. Theory and Applications," supra). This approach bypasses that possible limitation by making more use of a given available scattering molecule. The complexity associated with multiline generation and pre-amplification chain may be reduced due to the high stage gains outlined herein. A combination of the above techniques may be utilized to produce very wide color separations in the laser output and/or frequency chirped pulses and/or frequency stepped pulse.

Due to the low dispersion nature of typical scattering media, the low number of material scattering elements in the beam train (there may well be no material elements in the high fluence output section), and no need for frequency tripling of the output as there is for 1.06 micron Nd:Glass lasers, a very wide frequency range of output(s) may be available from a Lookthrough Compression Stage and may be useful for efficient coupling to ICF targets.

There may be two main approaches; one, separate color generation in various pump beams with amplification in the Fast Compressor of the separate colors, and, two, amplification of many colors in the Fast Compressor section pumped with a single color. The high stage gain means many colors may be readily simultaneously injected. A combination of scattering processes and media may be employed between section and stages.

For a medium like $N_2$, if a multiline pump with a frequency spread larger than the STMS bandwidth (about 0.07 cm$^{-1}$, or $2\times10^9$ Hz) and smaller than the $N_2$ vibrational bandwidth (or 1.5 cm$^{-1}$, or $0.5\times10^{10}$ Hz, at 1 atmosphere, from A. D. May, J. C. Stryland, and G. Varghese, "Collisional Narrowing of the Vibrational Raman Band of Nitrogen and Carbon Monoxide," Canadian Journal of Physics, pp. 2331-2335, 1970), an array of 10 lines spread $2\times10^9$ Hz apart of $10^8$ Hz bandwidth each will produce an effective backward gain coefficient of $2\times10^{-12}$ cm/watt for the vibrational Raman transition and about $10^{-12}$ cm/watt for the rotational Raman and STMS scattering at 1 atmosphere where the pump power refers to total watts, not watts in each line. By extracting on the vibrational line, some $1.6\times10^3$ joules/cm$^2$ could be obtained from a 1 atmosphere pressure $N_2$ 0.5 meter long section. The compression ratio would be set by forward Raman scattering, and, for efficiency, might be restricted to 3-5, unless the section used a series of $N_2$ isotopic sections or an isotopic mixture of $N_2$. The pump light color would be shifted by 2,327 cm$^{-1}$. The frequencies should be picked to avoid any multiphoton resonances in $N_2$ for absorptions near 2,830-2,840 Å (see, K. L. Carleton, K. H. Welge, and S. R. Leone, "Detection of Nitrogen Rotational Distributions by Resonant 2+2 Multiphoton Ionization Through the $a^1\Pi_g$ State," Chemical Physics Letters, Vol. 115, No. 6, pp. 492-495, 1985), for example, particularly in the pump and extraction beams). For example, a pump beam at 2,500 Å (40,000 cm$^{-1}$) would be shifted to 2,654 Å (37,673 cm$^{-1}$). In $N_2$, these two frequencies need to be adjusted to ensure they are outside the strong multiphoton ionization bands if used in conjunction with shifted inputs of a like amount. This gives very broadband output beams from a converter with different combinations of shifts. Also, the polarization properties of the pump and extraction beams may be varied.

In the case of many pump beams at well-separated colors with respect to the STMS or the Raman linewidths, the extraction section sections can be run multicolor as well. This is useful if the application needs it. For example, in ICF, it is desirable to have broad laser bandwidths to suppress instabilities that interfere with target performance.

For multiple pump colors, with corresponding multiple extraction colors, the color dependence of the coupling coefficient should be considered. For typical conditions utilized herein, SRRS and STMS $\gamma_c$ will go roughly as $1/\lambda$. Thus, the saturation fluences for backward scattering will go as $\lambda$. Then, at a given pumping flux per line, the gain will be larger at shorter wavelengths and the saturation fluence smaller. With multiple pump colors, adjustment in pump flux may be made if the pump wavelength differences are large enough. Table 19 displays an exemplary case with four pump colors. Such colors may be obtained by allocating 9 out of 36 ATDMS, as discussed, for example, in "Optical Configurations for Fusion Laser," by R. O. Hunter, Jr., U.S. Provisional Patent Application No. 62/497,908, supra, to each color. Table 19 shows the parameters of extending a 2 section LCA from a single pump color with single line output to 4 colors output with 4 extraction pulse colors, FIG. 7 shows the LCA arrangement. Note the ample margin against breakdown.

TABLE 19

Multicolor Output from Single Stage

| Parameter | a. Single Color Stage Performance | | | b. Four Pump Color Stage Performance |
|---|---|---|---|---|
| | Section 1 | Section 2 | Stage | |
| $\gamma$ (cm/watt) | $5.280 \times 10^{-12}$ | $5.707 \times 10^{-13}$ | — | |
| Gas | .50 He: .50 $N_2$ | Neon | — | |
| $S_b$ (joules/cm$^2$) | 12.63 | 116.8 | — | |
| $\varepsilon_{OUT}$ (joules/cm$^2$) | 121.7 | 1239 | 1239 | 4957 |
| $\varepsilon_{IN}$ (joules/cm$^2$) | 1.67 | 121.8 | 1.67 | 6.68 |
| $G_{SS}$ (nepers) | 11.6 | 10 | 21.6 | 21.6 |
| $\eta_0$ | .8200 | .9565 | .9413 | .94 |
| $\varepsilon_{PUMP}$ (joules/cm$^2$) | 146.5 | 1168 | 1314.5 | 5258 |
| $\tau_p$ (seconds) | $10^{-8}$ | $10^{-8}$ | $10^{-8}$ | $10^{-8}$ |
| $\tau_{extr}$ (seconds) | $10^{-9}$ | $10^{-9}$ | $10^{-9}$ | $10^{-9}$ |
| L (cm) | 150 | 150 | 300 | 300 |
| W (cm) | 30 | 30 | 30 | 30 |
| $G_{LS}$ | 72.92 | 10.18 | 742.0 | 742 |
| % Breakdown | 3.62 | 12.81 | — | 51.2 (Table 2) |

| c. Stage Pump Energy Allocation (joules) | | | |
|---|---|---|---|
| | Section 1 | Section 2 | Total |
| Color1 | $1.32 \times 10^5$ | $1.05 \times 10^6$ | $1.182 \times 10^6$ |
| Color2 | $1.32 \times 10^5$ | $1.05 \times 10^6$ | $1.182 \times 10^6$ |
| Color3 | $1.32 \times 10^5$ | $1.05 \times 10^6$ | $1.182 \times 10^6$ |
| Color4 | $1.32 \times 10^5$ | $1.05 \times 10^6$ | $1.182 \times 10^6$ |
| Total | $5.28 \times 10^5$ | $4.2 \times 10^6$ | $4.728 \times 10^6$ |

An exemplary multicolor pump scheme is presented in FIG. 17. As a particular case, four colors are utilized to pump a two section stage. Table 19 shows the energy allocation.

The stage performance is computed for each color separately and then the outputs are added. The coupling coefficients are taken to be constant as a function of color. If driven by a multiple mirror ATDM array, one exemplary allocation is 36 inputs total, 4 colors of 9 each. One way to produce such an allocation, based on the architecture presented in "*Optical Configurations for Fusion Laser*," by R. O. Hunter, Jr., U.S. Provisional Patent Application No. 62/497,908, supra, is to use a different scattering medium for the color offsets in each set of 9 ATDMs. An example would be one mirror set of ATDMs is based on STMS scattering, utilizing say, Ar for a frequency shift of about 0.1 cm$^{-1}$ from a common pump frequency, $v_{po}$. If SRRS were utilized for $N_2$ S(10), HD S(1), and $H_2$ S(1), the 3 frequency shifts are 92 cm$^{-1}$, 443 cm$^{-1}$, and 587 cm$^{-1}$, respectively. Thus, the four color output has four colors of <1 cm$^{-1}$ linewidth spaced over an interval of 587 cm$^{-1}$. A combination of color shifts may be used, and if vibrational shifts are desired, another 4 color combination would be an STMS shift of less than 1 cm$^{-1}$, a $CD_4$ shift of 2085 cm$^{-1}$, a $CH_4$ shift of 2917 cm$^{-1}$, and a $CF_4$ shift of 908 cm$^{-1}$, roughly equally spaced over 2085 cm$^{-1}$. This color spread may be well in excess of many lasers used in ICF research and may be advantageous for coupling to the target. From Table 19, the section 1 pump energies are ⅛ the section 2 pump energies. Note that the total input fluence for all four colors is 6.68 joules/cm$^2$ and the total output fluence is 4,957 joules/cm$^2$. For neon at a 10$^{-9}$ second extraction pulse length, the output fluence is about 50% of the breakdown fluence. So both the input total fluence and output total fluence are some four times larger than for a single color. The ratio of the Section 1 and Section 2 pump fluences is 8:1, representing 1 of the 9 mirrors in a color set pumping Section 1 and the 8 remaining mirrors pumping Section 2. This is an exemplary case illustrating the provision of multiple colors, commonly amplified in a single stage. Considering the earlier calculation of the saturation behavior, where a pump signal flux product of 10$^{24}$ watts$^2$/cm$^4$ in a single color may begin to produce non-linear behavior in neon under similar scattering conditions, here it is 2.5×10$^{24}$ watts$^2$/cm$^4$ at the output if all the colors are phase synchronized locally, which may rarely be the case. Thus, the details of such a design may need to be computed and experimentally adjusted.

An 11$^{th}$ Embodiment: Parallel Segmented Stage Elements (FIG. 18-20)

FIG. 20 shows an embodiment wherein four different pump colors may drive four parallel fast compressor stage elements. For example, with an architecture outlined in "*Optical Configurations for Fusion Laser*," by R. O. Hunter, Jr., U.S. Provisional Patent Application No. 62/497,908, supra, with 36 Active Time Delay Mirrors (ATDM), each of the four pump beams shown in FIG. 20 could consist of ATDM inputs, each set of 9 inputs (not shown) to each of Pump 1:Pump 4 being of the same color. If the same color drive to each ATDM was utilized, and, say, one set of 9 mirrors (not shown) was based on STMS scattering in Ar, one set each based on Raman scattering off $CF_4$, $CD_4$, and $CH_4$, the overall color shifts from the RAC input would be 0.67 cm$^{-1}$, 908 cm$^{-1}$, 2085 cm$^{-1}$, and 2917 cm$^{-1}$ in order of Ar, $CF_4$, $CD_4$, and $CH_4$. For a Fast Compressor based on STMS, the embodiment shown may then provide four colors separated as shown above. Each parallel stage element may be based on the same STMS scattering design. The outputs from each element may be overlapped on the target at the same time, or may be staggered in time, as well. One advantage of such an embodiment is that the input optics may operate at different colors for each element and may not have to be designed for multicolor beam handling.

Figure 18:
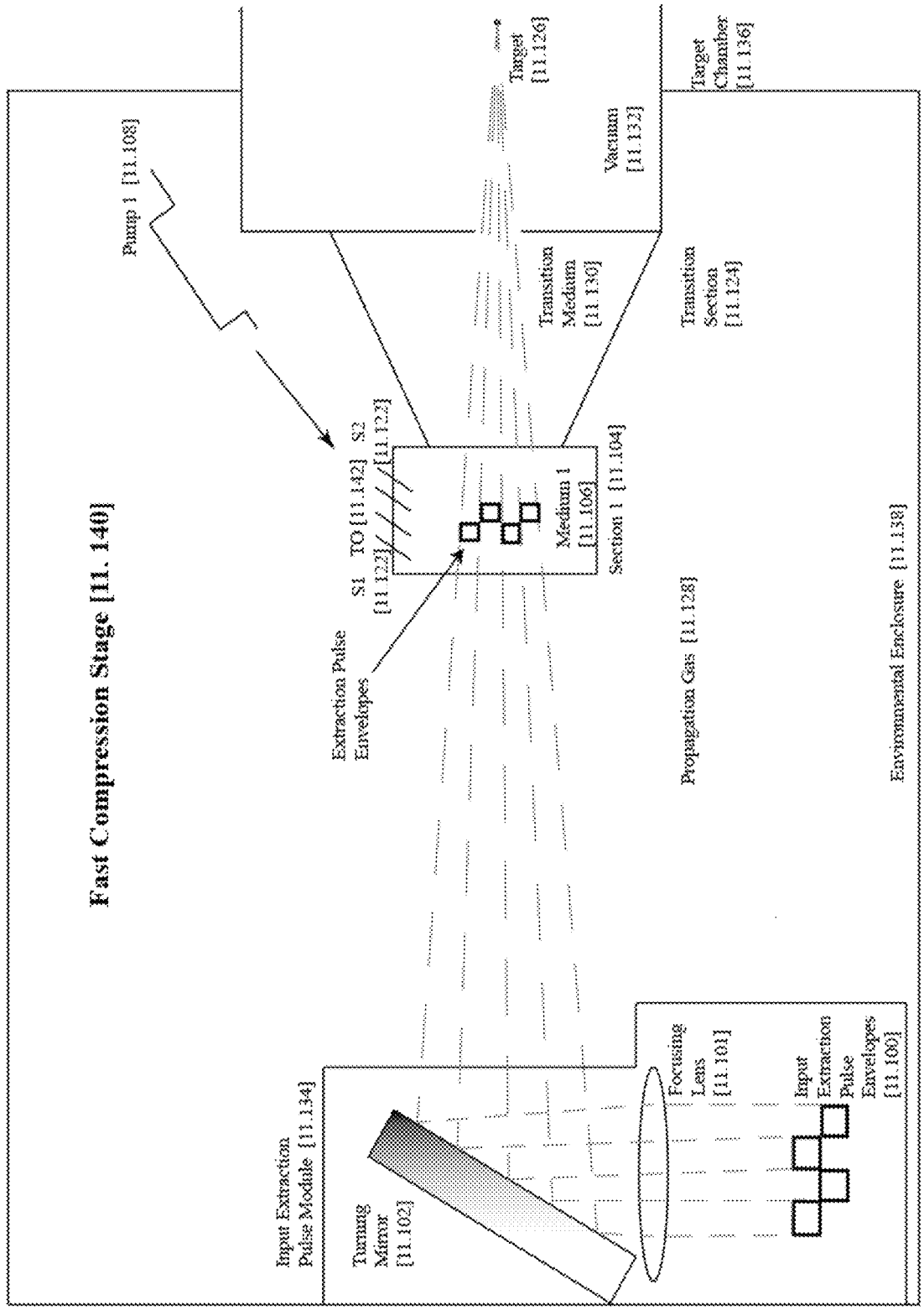
FIG. 18 shows a temporal staggering of portions of the extraction pulse reduces the effect of ASE in the extraction pulse beam.

FIG. 18 shows a LCA where the segmentation is performed by a time delay of segmented Input Extraction Pulses [11. 100] and thus creating a spatial separation of the Extraction Pulse Envelope at Section 1 [11. 104]. FIG. 19 shows a single stage section with one pump [11. 108] driving four different segments A, B, C, and D. FIG. 20 shows a single stage section with four different pumps driving four different segments. The section boundary along the optical path is formed by S2 [11. 122]. Each separate segment, A, B, C, and D (FIG. 19) has a separate pump [11. 108] whose colors may be as described above.

Figure 21:
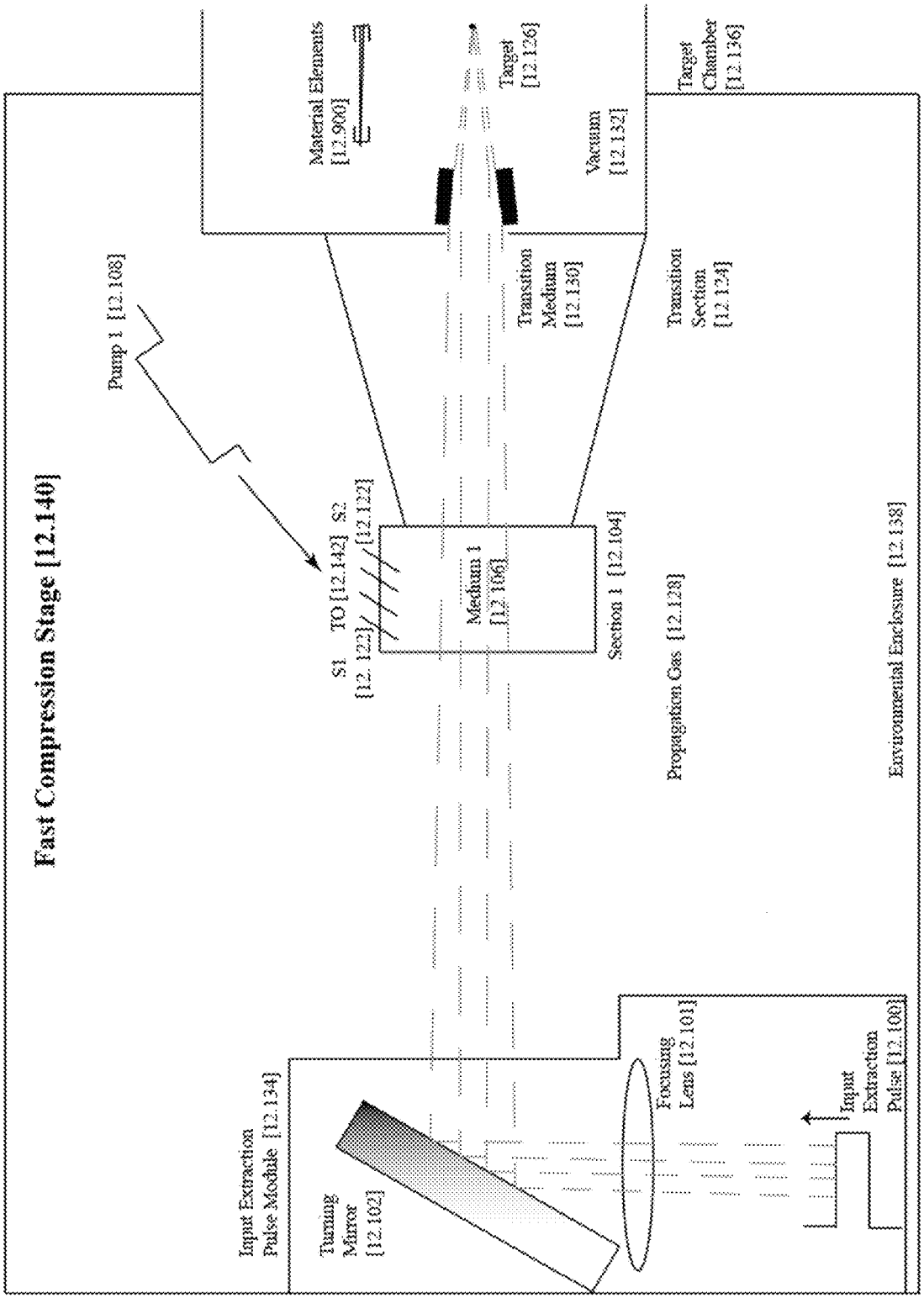
FIG. 21 shows a similar geometry as FIG. 10 but with a grazing angle solid material element for directing and focusing the output onto the target.

A 12$^{th}$ Aspect: Grazing Angle Output Optics (Material Optics) (FIG. 21)

For the ICF application, grazing angle turning mirrors have been proposed for the output of an ICF laser. See, for example, G. J. Linford, D. E. Driemeyer, S. W. Fornaca, and A. W. Maschke, "Design Descriptions of the Prometheus-L and -H Inertial Fusion Energy Drivers," *Fusion Engineering and Design*, 25, pp. 111-124, 1994, and L. M. Waganer, "Innovation Leads the Way to Attractive Inertial Fusion Energy Reactors—Prometheus-L and Prometheus-H," *Fusion Engineering and Design*, 25, pp. 125-143, 1994. The lookthrough compression arrangement described herein could have such a turning mirror set at a very shallow angle. Turning mirrors protect optics from neutron damage and may be made of metal. Such mirrors could be positioned on the output, or in the lower fluence regions that may reduce the loss at larger angles. At low enough fluence, lenses, windows, etc. may be placed at the input, intermediate positions, or on the output. More than one could be used. For the ICF application the gas sections provide some protection against the target output, and the last input optics may be well removed. FIG. 21 shows an LCA as above with the addition of a Material Element [12. 900], in this case, a grazing angle, focusing element.

A 13$^{th}$ Aspect: Adaptive Optics (FIG. 22)

Figure 22:
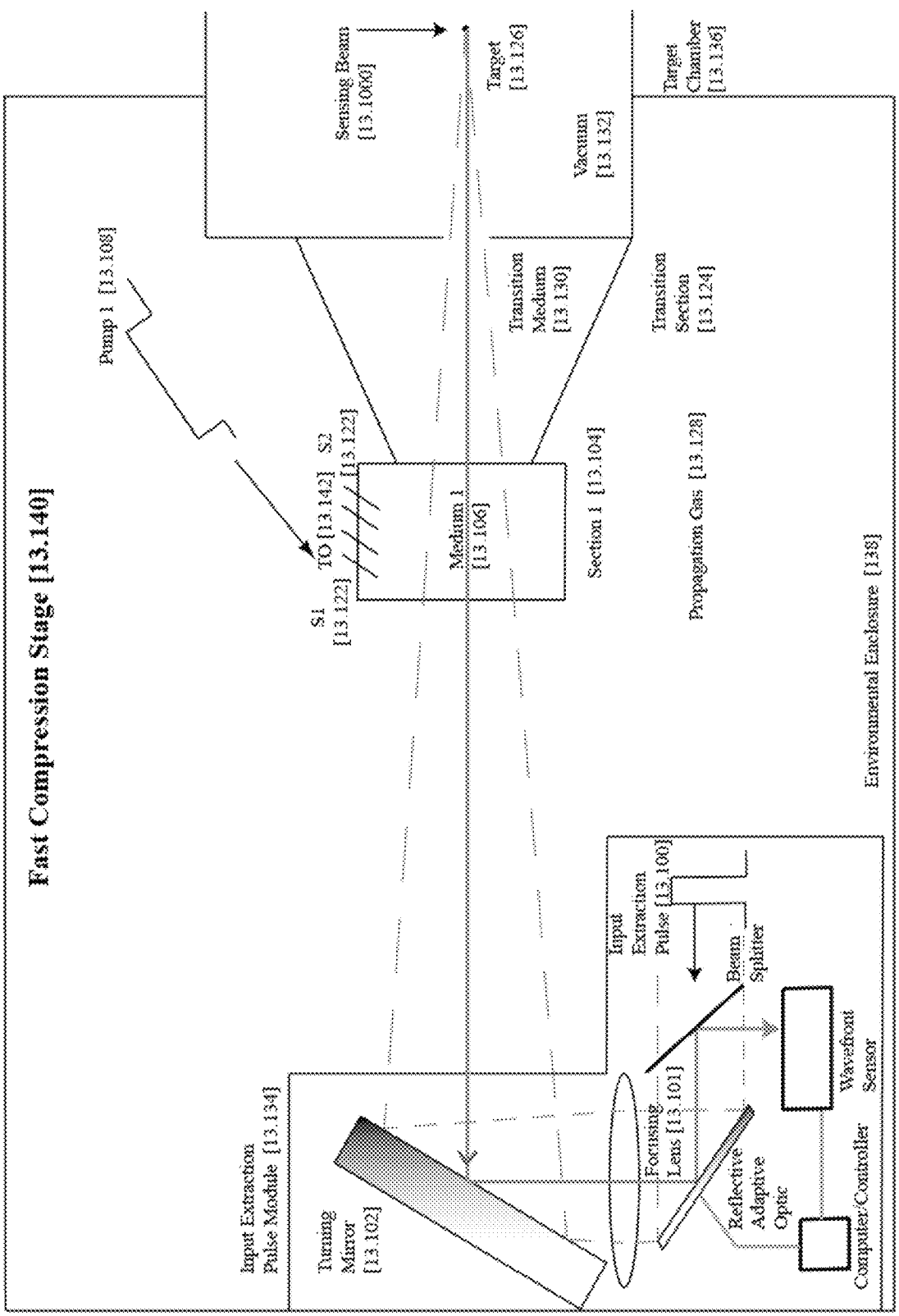
FIG. 22 shows a similar geometry as FIG. 10 but with adaptive optics for producing entrance pulses to the compression stage.

FIG. 22 shows one variation for using adaptive optics to sense and correct for aberrations in the optical path. This variation has an injected beam near the target that propagates back through the beam train and enables the wavefront sensor to accurately determine the aberrations. The conjugate wavefront is then applied to the adaptive optic so that after propagation and amplification, the optical distortions are compensated for. The reference *Single Pulse Excimer Ground Based Laser ASAT Concept Definition Study*, supra, described an adaptive system to compensate for atmospheric distribution. There are many other references to wavefront conjugation. Its use in a lookthrough compressor may not have been proposed.

Other means of compensation are fixed corrector plates, figured lenses or tilted/translated lens assemblies. An arrangement for an LCA is shown in FIG. 22. A sensing beam [13. 1000] is shown scattering off the target or being otherwise directed back into the optical transition.

Figure 23:
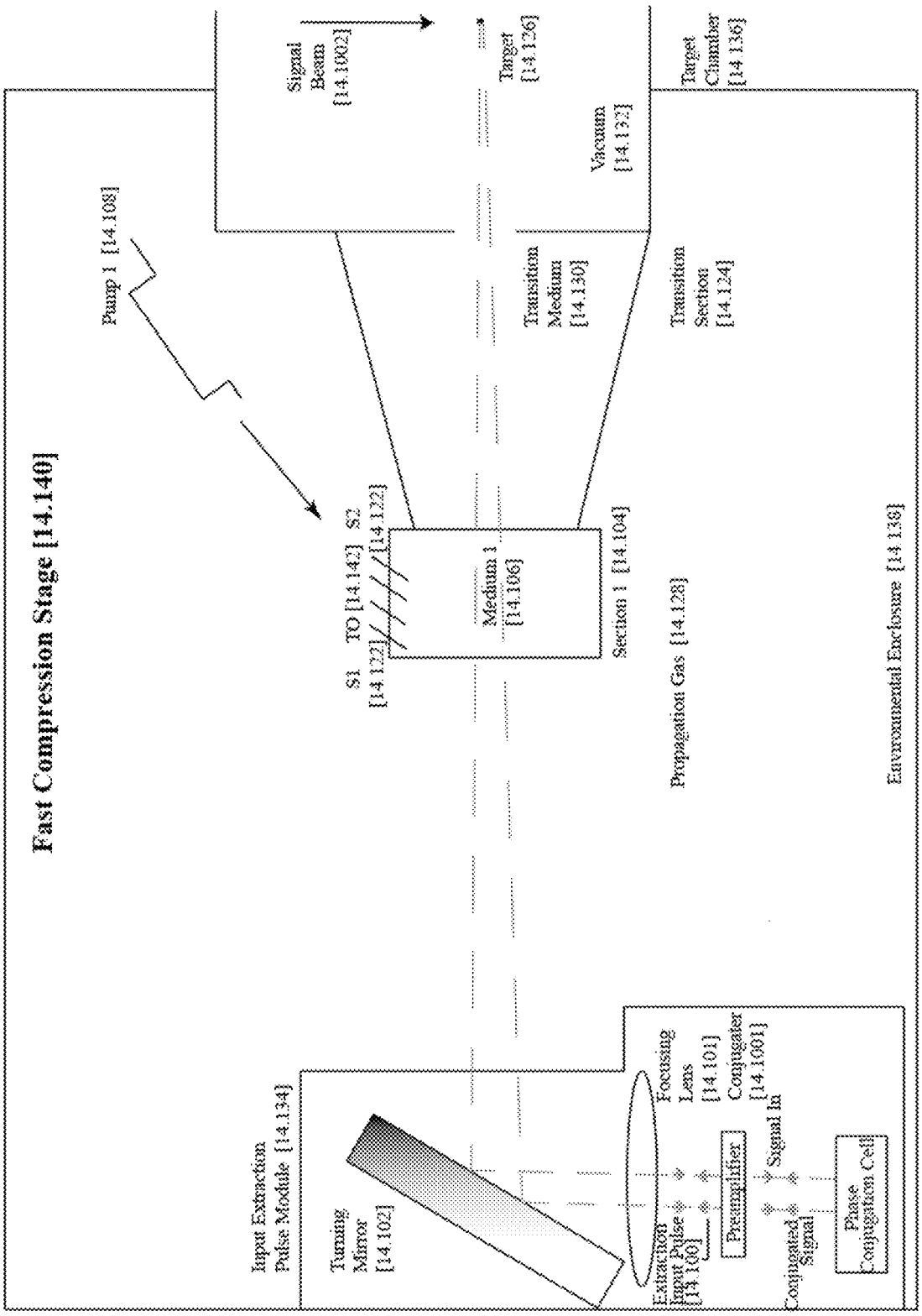
FIG. 23 shows a similar geometry as FIG. 10 but with a Brillouin phase conjugation for fast correction of phase errors and production of the Input Extraction Pulse.

A 14$^{th}$ Aspect: Front Injected Beams (FIG. 23)

Above the use of an injected beam to diagnose wavefront aberrations was described. It is also possible to use a front injected beam that is amplified. Two kinds of optics behind the Fast Compressor stage are active optics (such as a Brillouin cell) and segmented optics (such as in a mirror). One advantage of this configuration is the speed of correction. Conventional A/O systems may well be limited to fairly slow correction (correction time longer than $10^{-3}$ seconds). The Stimulated Brillouin Scattering (SBS) often postulated for phase conjugation may respond very rapidly ($10^{-8}$ seconds). For the ICF application with a Vacuum Transition Section, the vacuum interface may develop rapidly in time and so the SBS may be a preferred approach with a Fast Lookthrough Compression Stage. FIG. 23 shows the arrangement, with a conjugation [14. 1001] providing the Extraction Input Pulse [14. 100] based on amplifying and conjugating the Signal Beam [14. 1002].

Figure 24:
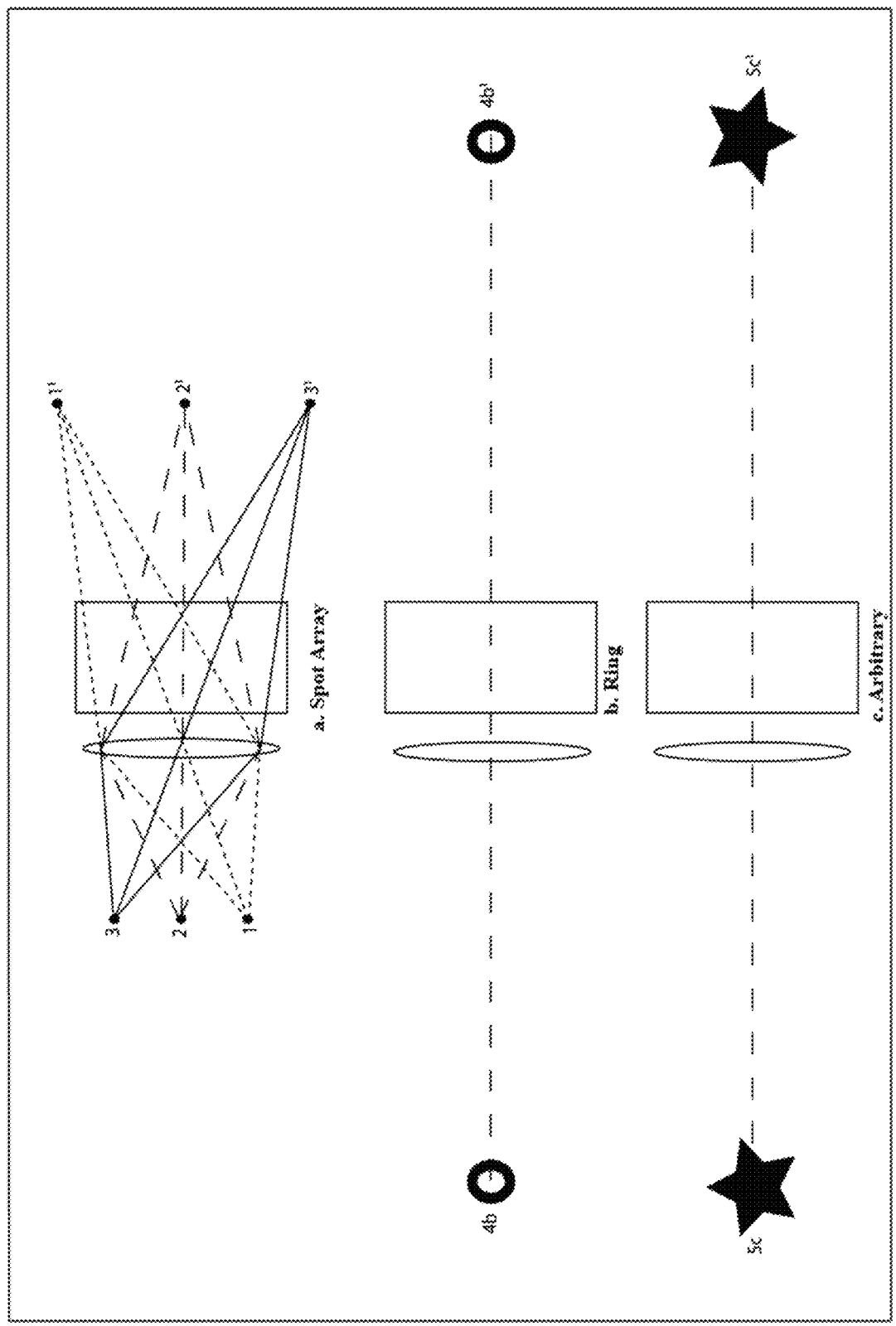
FIG. 24 shows various cross-sectional irradiance patterns of the exit pulse of an optical system, (a) spot array, (b) ring, and (c) arbitrary, in accordance with the present description.

A 15$^{th}$ Embodiment: Arbitrary Irradiance Patterns (FIG. 24)

The lookthrough configuration allows amplitude patterning before the fast compression sections as shown in the preferred embodiment. The amplitude patterning can produce different intensity patterns at focus as compared to a multiple lens. Such patterning is used in lithography to permit improved printing of certain features. Here the amplitude is modulated, for example, by a lithographic plate, and is then amplified. Arbitrary patterns can be formed this way. In addition, the amplitude pattern can be generated to produce intermediate low intensity regions. In addition to the amplitude patterning the LCA in general, acts as an imaging amplifier. FIG. 24 shows three kinds of patterns: a spot array (a), a ring (b), and an arbitrary pattern (c). The Figure is not drawn to scale but to exemplify the arbitrary class of pattern that may be projected through a LCA.

Figure 25:
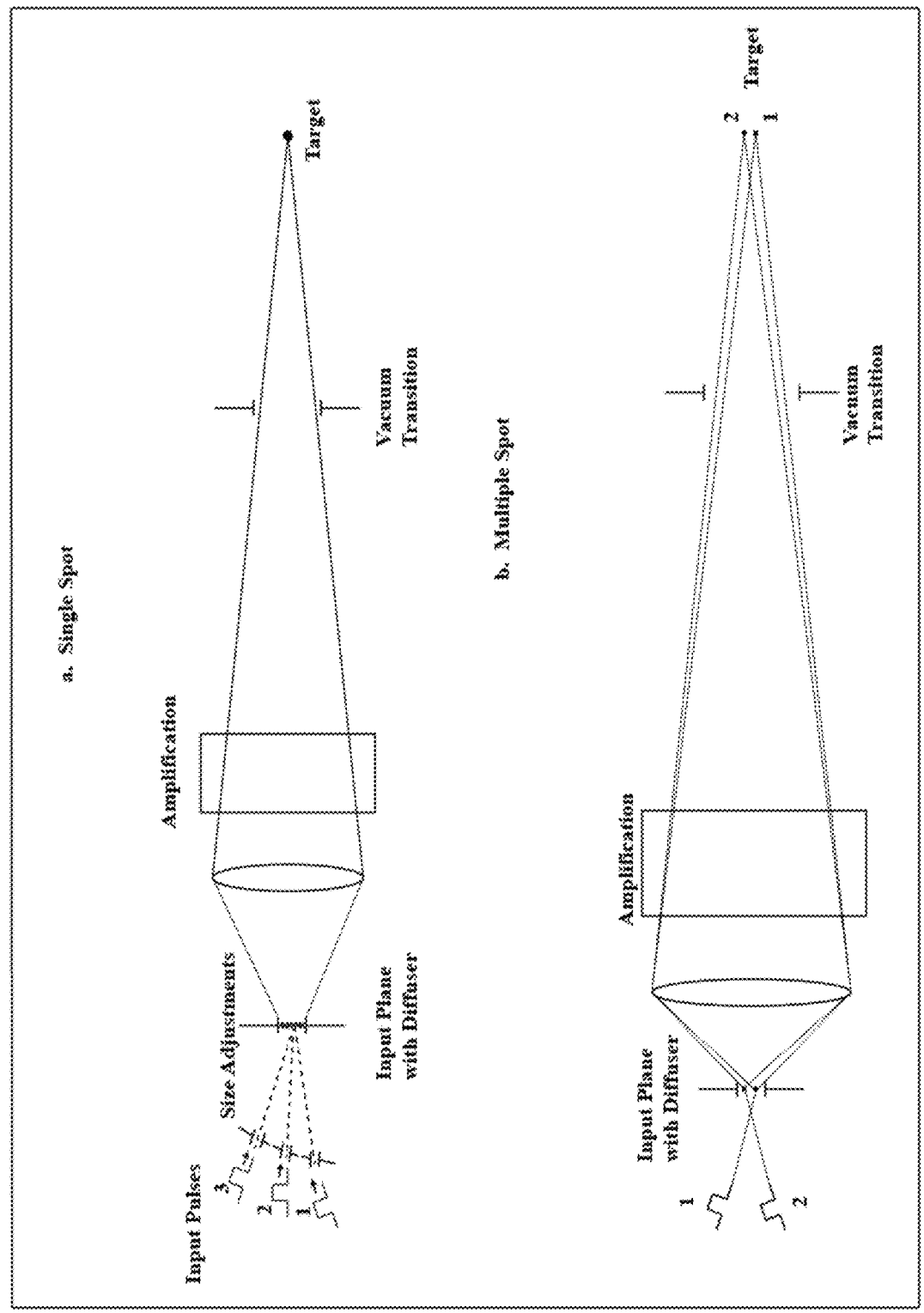
FIG. 25 shows (a) image magnification and (b) transverse matching of exit pulses from the compression stage at the target achieved through delivery of multiple time-sequenced entrance pulses to the compression stage.

A 16$^{th}$ Embodiment: Zoom (Insert O) (FIG. 25)

The lookthrough configuration may be utilized to provide "zoom," that is, varying the spot size produced during an output pulse. Previously, variable spot size was produced in relay imaged systems with the relay between the amplifier and the target. A sequence of spots was projected onto an image plane a back in the amplifier chain (see, for example, T. Lehecka, R. H. Lehmberg, A. V. Deniz, K. A. Gerber, S. P. Obenschain, C. J. Pawley, M. S. Pronko, and C. A. Sullivan, "Production of High Energy, Uniform Focal Profiles with the Nike Laser"). The overall quality was several times diffraction limited. This embodiment projects the various time delayed spot images at the image plan at the input to the Fast Compressor without any intervening optical elements after the amplification. In place of a single spot (FIG. 25$a$), an arbitrary pattern may be projected, shown in FIG. 24$a$ as an array of spots. Another embodiment would project no spots, but tailored focal patterns. FIG. 24$b$, FIG. 24$c$ & FIG. 25$b$ shows zoom and motion in a LCA. Further variations include: reducing the laser spot size over its pulse length by optically zooming the fast compressor input over this same time interval (not shown).

A 17$^{th}$ Embodiment: Spatial and Temporal Pump and Extraction Envelope Matching (FIG. 26-31)

For off axis pumps, in particular, with converging lookthrough geometries, the optical coupling efficiency may be optimized for a given extraction pulse by shaping the pumping light in time and space. FIG. 3 shows such a shaped pulse. The extraction pulse may be shaped as well, particularly in time, to achieve the desired output focusing char-
acteristics and temporal pulse shape on target. There are two major corrections to the shape the pump pulse due to the off-axis angle β and focusing onto target through the compressor. First, the rectangular block of light becomes a parallelepiped with an angle 90°–β instead of 90° at the front and back faces. Second, the parallelepiped then is tapered along its length and becomes a shape where the front and back edges are parallel, but the sides are no longer parallel. The taper angle is ε/2 for backward compression. For small values of β, in terms of pure geometric overlap, the volume ratio of the pump light for that approximately overlaps the interaction region to the original rectangular block is:

$$\text{Volume Fraction in Interaction Region} \simeq 1 - 2\frac{\varepsilon L}{W} - \beta\frac{W}{L}.$$

For a typical design, β may be 0.35 radians, ε≅10$^{-2}$ radians, and W/L≅0.2. These values lead to an estimate of 0.83 for the overlap volume ratio, with a loss of 0.1 due to the taper term and 0.07 for the front and back shaping term. For example, the front and back term may be reduced by oversizing the scattering gas or by shaping the gas section interfaces; the taper term entails reducing the lateral dimensions of the pump pulse or oversizing the input pulse. There are various ways of dealing with achieving a high optical coupling efficiency. These include, but are not limited to, adjustments in the pump pulse lengths and shapes coming from the ATDM, adjustments in pulse lengths and overlaps, shaping the medium, etc. The cost of such shaping may be balanced against the efficiency increases for a Fast Compression Stage. For a multisection stage, the early sections have less influence on overall efficiency and may not require such shaping and it may be advantageous to shape the pump pulse only for the final stage. One method is to operate the previous stage (such as ATDMS) providing the pump pulse in an imaging mode and vary the illumination profile in the input to that stage at its input image plane. For example, if the illumination is broken up into 10 time discrete pulses (10 one nanosecond pulses to be amplified head to tail as a one 10 nanosecond pulse) with 10 step changes in illumination in space, the outputs may approximate the taper. The front and back edges may be shaped by time varying illumination of portions of the input image plane.

Figure 26:
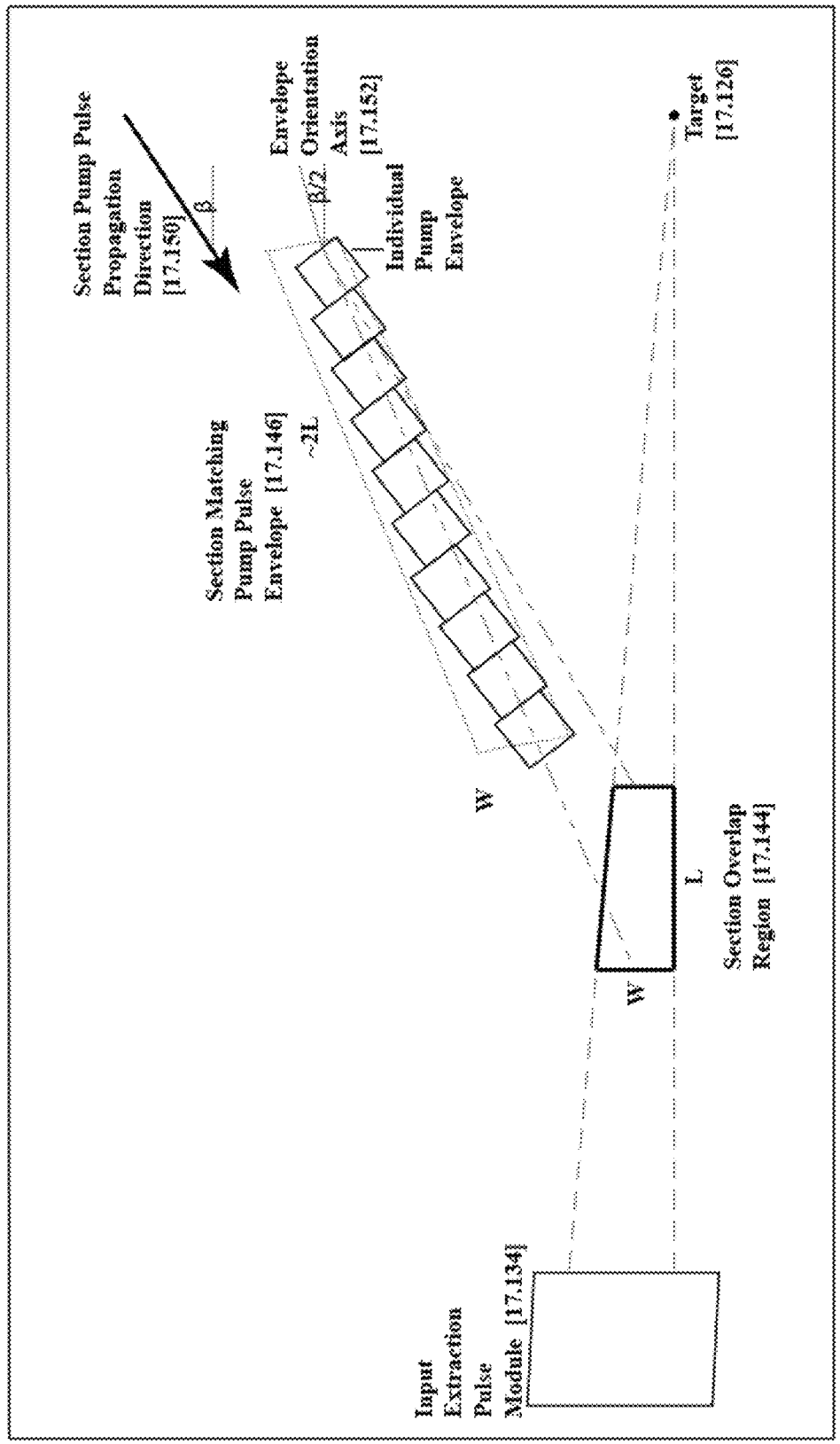
FIG. 26 shows matching of the pump pulse envelope to the input pulse of an amplifying section using a pump pulse with longitudinal segments for a backward propagating pump pulse.
Figure 27:
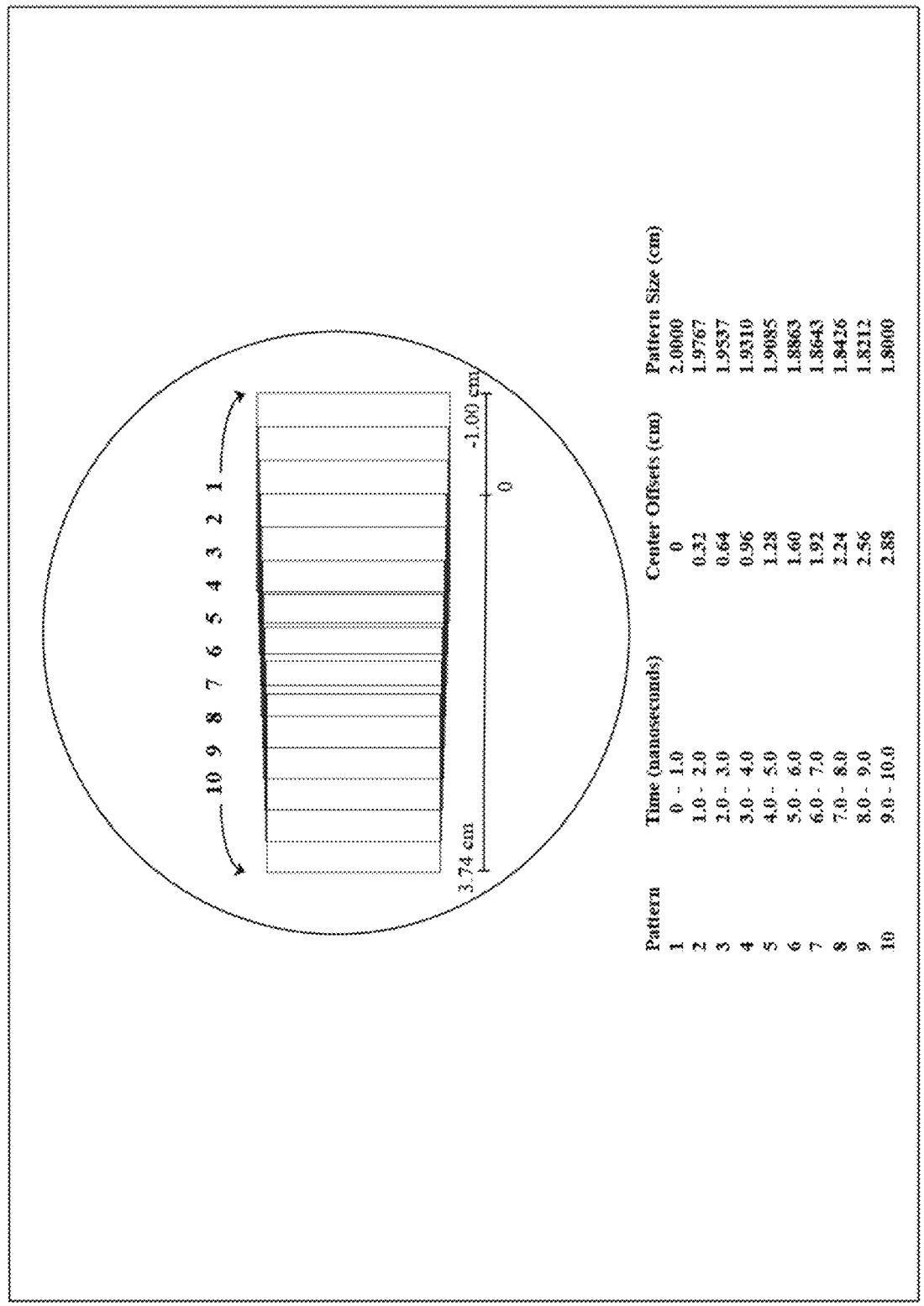
FIG. 27 shows the corresponding illumination pattern (of FIG. 26) at the object plane of the pump pulse that produces longitudinal pump pulse segments.
Figure 28:
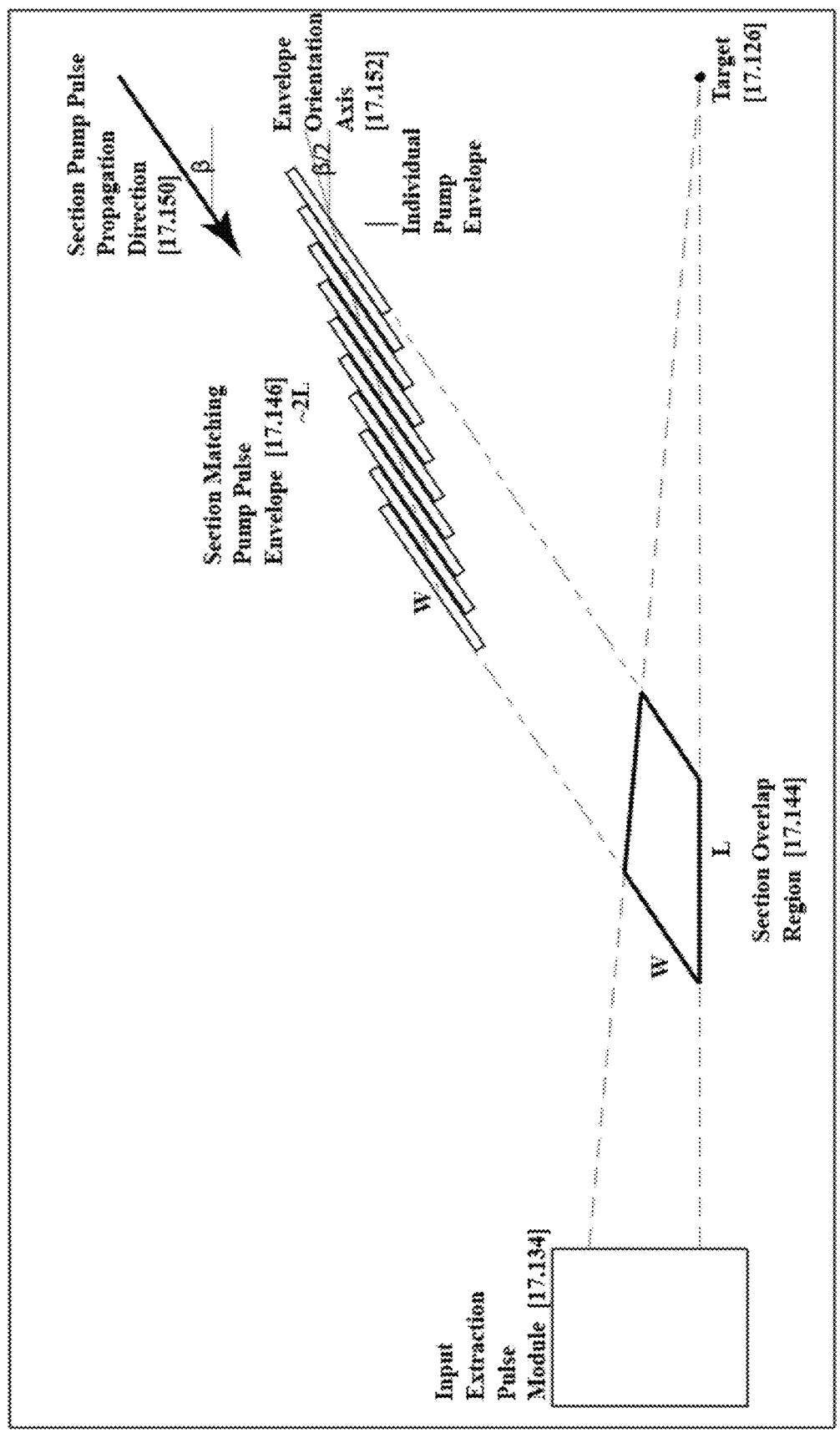
FIG. 28 shows matching of the pump pulse to the input pulse of an amplifying section with transverse pump pulse segments for a pump pulse propagating in a backward direction.
Figure 29:
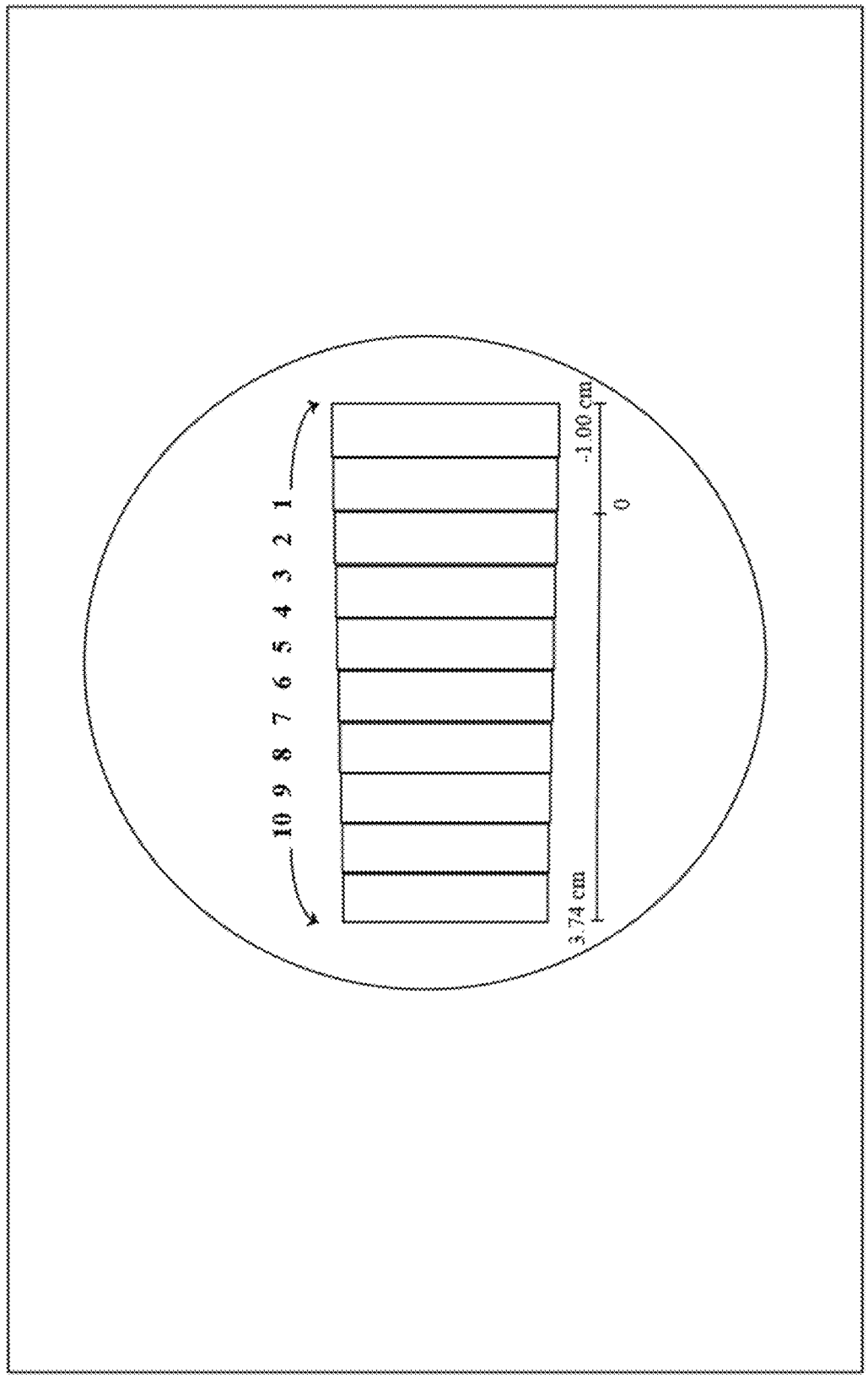
FIG. 29 shows the corresponding illumination pattern (of FIG. 28) at the object plane of the pump pulse that produces transverse pump pulse segments.

FIG. 26 shows approximately a Section Matching Pump Pulse Envelope [17. 146] with 10 such segments. For a 10 segment approximation, FIG. 27 gives an object plane timing diagram and position for a certain set of parameters. FIGS. 28 and 29 show the equivalent for Irradiance Pump Segments. The ATDMS may be configured and driven to give variable length output pulses. Then, the correct pump pulse may be synthesized from adding up such pulses. Such methods, or others, may be designed to provide high coupling efficiency while keeping the frequency content suitable for coupling.

The above discussion was illustrated for a backward compression layout. Implicit in the discussion was the assumption that the pump beam may be swept in angle and/or position to make the pump irradiation synchronous with the extracting pulse for high compression. It is also applicable to the case of forward compression. For Forward Compression, we consider the following analysis.

Figure 30:
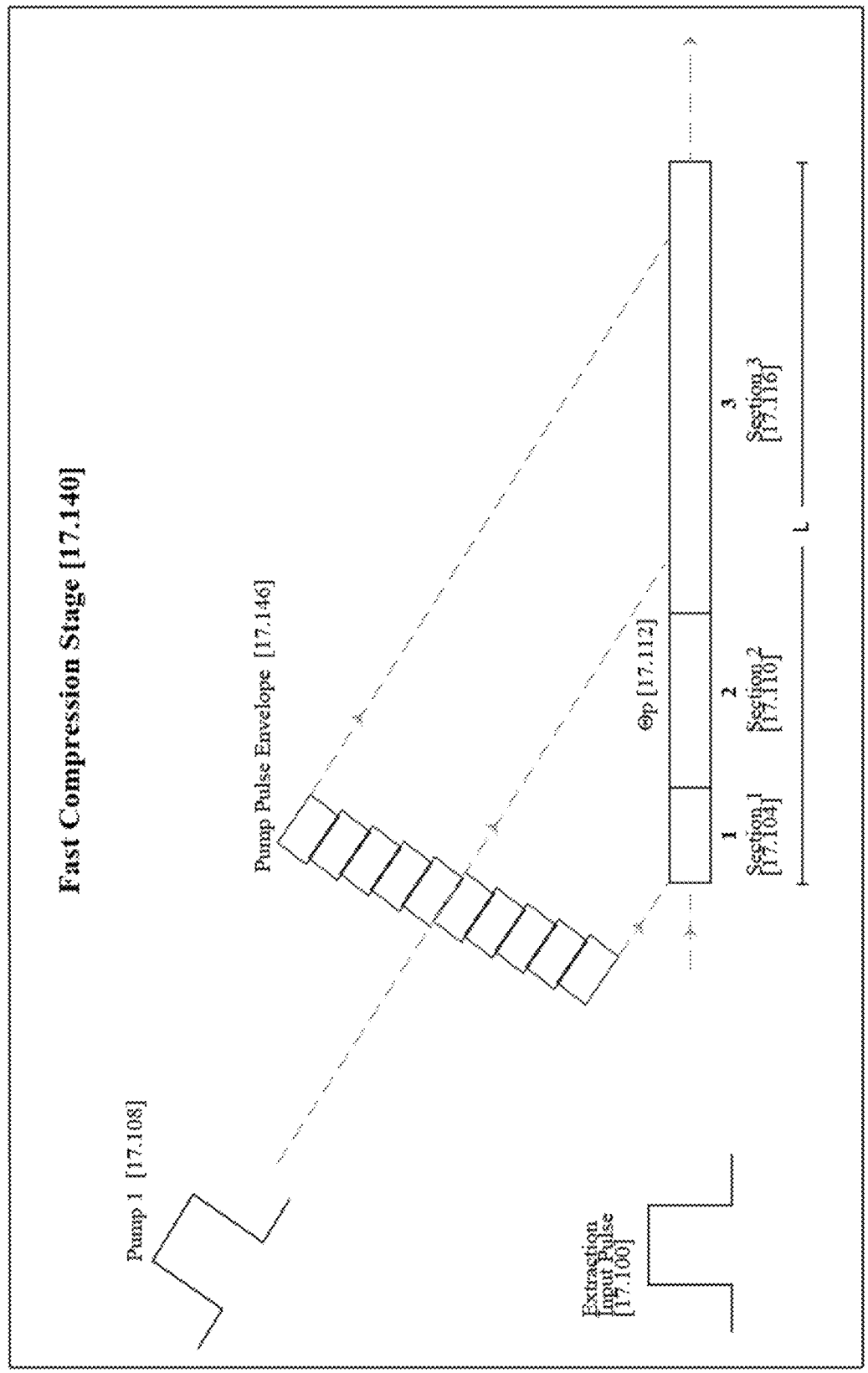
FIG. 30 shows synchronization of pump pulse segments for matching to input pulses of a plurality of amplifying sections for a pump pulse propagating in a forward direction.

FIG. 30 shows a Pump Pulse Envelope [17. 146] for an ideal pulse shape to fill a forward Fast Compression Stage. The shape is approximated by a sequence of differentially delayed pulses each imaged onto a part of the ideal envelope. The ideal envelope would correspond to infinite compression (a very short extraction pulse) moving through the Fast Compressor encountering a transversely (to its path uniform pumped medium. The Sections 1, 2, 3 have γ's picked to give good overall stage gain at acceptable amplification levels from the viewpoint of noise generated just ahead of the extraction pulse and being amplified onto non-focusable ASE. The transverse dimension of the extracting pulse may be limited by the self-generated ASE for the case of STMS scattering. FIG. 3 shows how such a pulse train may be generated from the object plane illumination of the pump beam source. There are other ways of generating such a format, including a continuously varying pulse input.

In FIG. 30, the total length, L, would be the sum of the lengths of Section 1 [17. 104], Section 2 [17. 110] and Section 3 [17. 116]. For a 1 nanosecond Input Extraction Pulse [17. 100], a width, W, of the Fast Compression Stage [17. 140] of 0.3 meters, an L of 2 meters, and a Pump Angle $\sigma_p$ [17. 112] of 0.1, the time compression ratio, k, may be lower than the backward compression case, and have a value in the range of 1-3.

Figure 31:
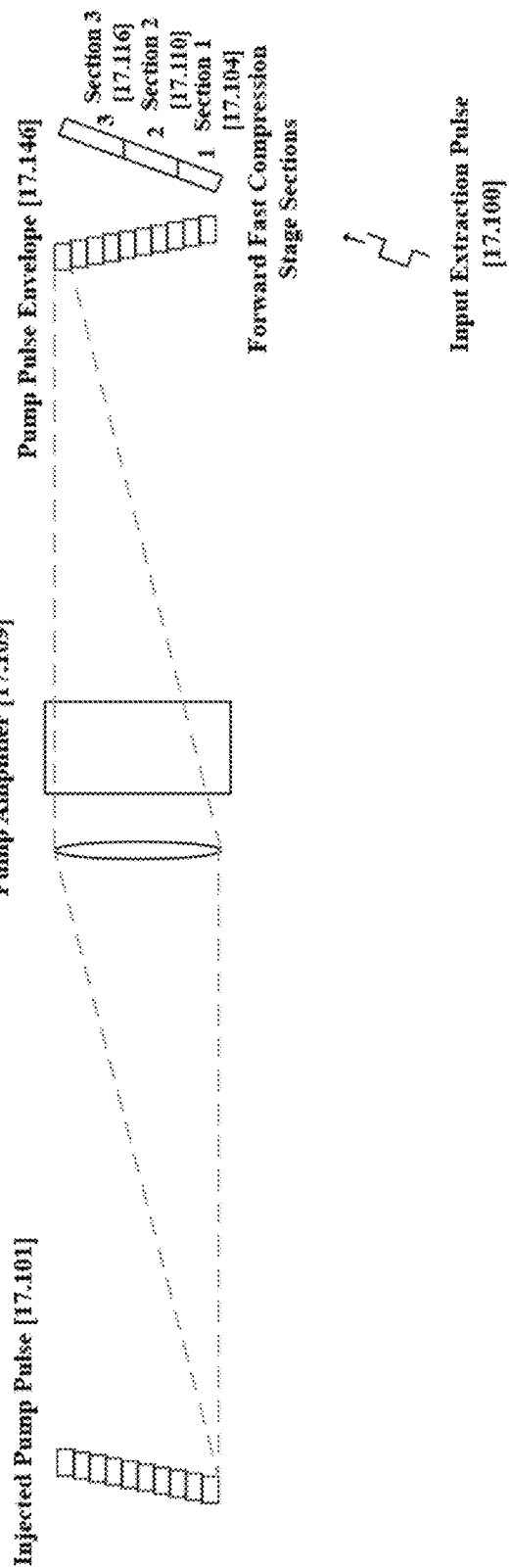
FIG. 31 shows the production of synchronization of pump pulse segments for matching to input pulses of a plurality of amplifying sections for a pump pulse propagating in a forward direction.

FIG. 31 shows a method of drawing a Pump Amplifier [17. 104] with an Injected Pump Pulse [17. 101] so as to form a Synchronous Pump with Forward Compression Stage [17. 141]. The Injected Pump Pulse [17. 101] is formed at the object plane to the Pump Amplifier [17. 109] and images onto the Pump Pulse Envelope [17. 146] after amplification.

Figure 32:
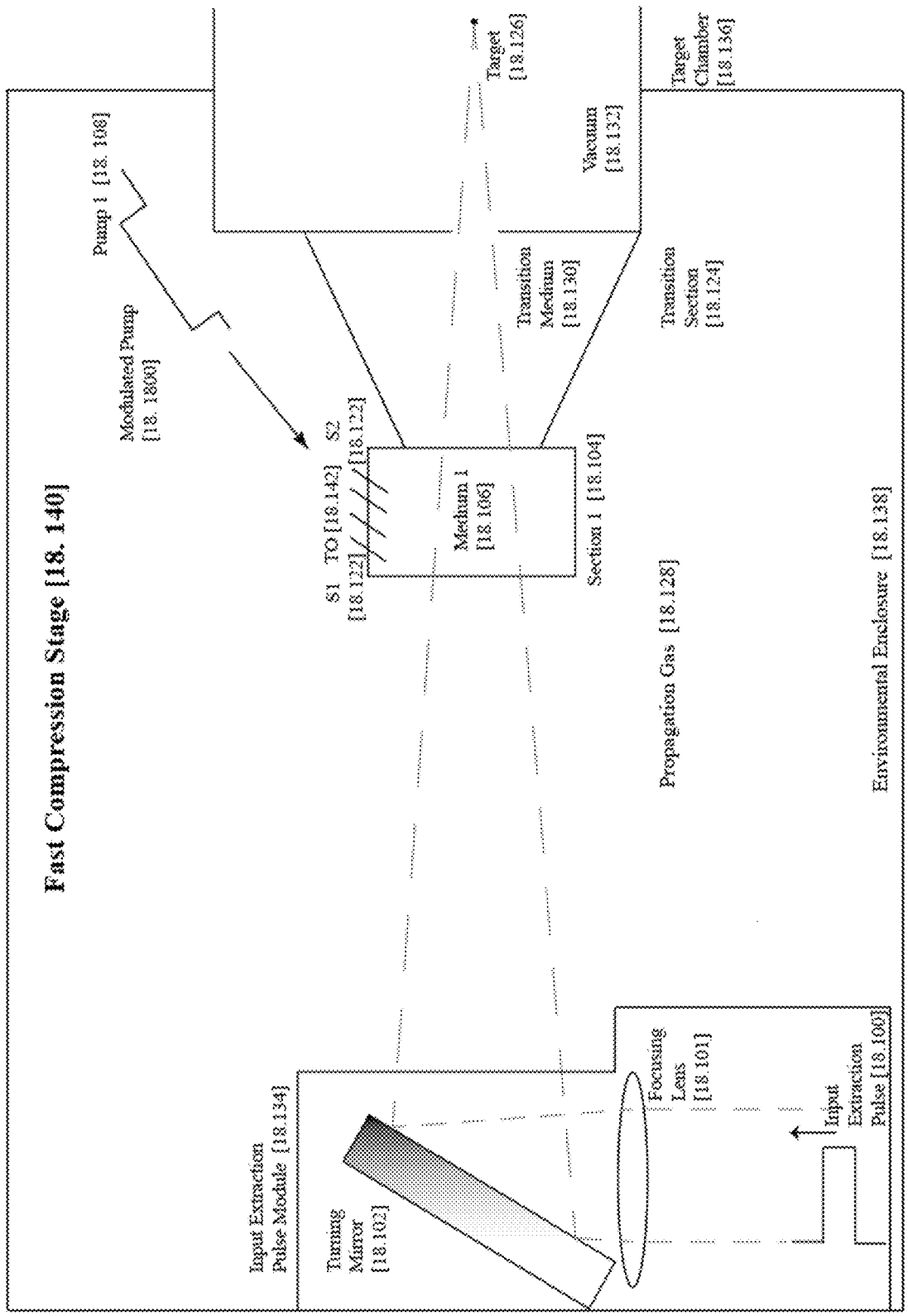
FIG. 32 shows a similar geometry as FIG. 10 with a method for modulating the pump beam to reduce speckle of the pump beam, if needed, and improve the extraction pulse properties.

An 18$^{th}$ Embodiment: Despeckled Pump (FIG. 32)

If the pump beams arriving at a section are frequency narrowed, they may be strongly speckled. The pump beam can consist of many overlapped separate beams at the compressor section and this can affect the speckling statistics favorably. There are many techniques for producing despeckled patterns using spatial and temporal averaging discussed for other applications. See, for example, R. L. McRory, Jr., "Laser-driven ICF Experiments," *Nuclear Fusion by Inertial Confinement: A Comprehensive Treatise*, by G. Velarde, Y. Ronen, and J. M. Martinez-Val, (Eds.), CRC Press, Inc., Boca Raton, Fla., Chapter 22, pp. 555-596 1993; I. Matsushima, T. Tomie, Y. Matsumoto, I. Okuda, E. Miura, H. Yashiro, E. Takahashi, and Y. Owadano, "Two-Dimensional Beam Smoothing by Broadband Random-Phase Irradiation," *Optics Communications*, 120, pp. 299-302, 1995; T. Lehecka, R. H. Lehmberg, A. V. Deniz, K. A. Gerber, S. P. Obenschain, C. J. Pawley, M. S. Pronko, and C. A. Sullivan, "Production of High Energy, Uniform Focal Profiles with the Nike Laser," *Optics Communications*, 117, pp. 485-491, 1995. The simplest case involves a single narrow bandwidth pump beam that utilizes a combination of temporal averaging and spatial modulation. A single phase plate with step phase modulation is used, such as a phase plate using separate grating regions to form an overlapped beam. (See for example pp. 560-564 of *"Nuclear Fusion by Inertial Confinement: A Comprehensive Treatise,"* by G. Velarde, Y. Ronen, and J. M. Martinez-Val, (Eds.), CRC Press, Inc., Boca Raton, Fla., 1993) that includes a phase plate with many separate regions of discrete phase modulation. This configuration may produce a 1 $\delta_{RMS}$ variation in a compressor pump input of 15% for some 20 overlapped pump beams. This means over 90% of the pump energy is contained within about ±30% of the average pump power. For many pump geometries, the angle between the pump and extraction beams is not exactly 180°, but in the range of 120-170°. When the pump and extraction beams cross in this range of angles, there is further averaging of the pump nonuniformities. Uniformities down to the 1% level may be obtained with increasingly complicated techniques. For individual pump beams that are overlapped at a compressor section, one approach is to phase modulate each pump beam with an overall time varying phase. For two beams, at a fixed offset frequency, the interference pattern would move one fringe in one $2\pi$ phase shift of one beam to the other. For the embodiments where the scattering linewidth is greater than $10^9$ Hertz, an averaging time is $10^{-9}$ seconds with a pump time of $10^{-8}$ seconds, the overall averaging could be a factor of 3-10 by impressing 10 $2\pi$ modulations. This leads to a typical case of $1\sigma$ on the order of 5% or better as compared to the static phase modulation. Then, some 90% of the pump energy intensity would be within about ±10% of the average intensity.

In addition to the techniques that can be imposed on the pump beams as they are formed, the phase of the pump beam may be modulated on the way from the pump output to the compressor sections. One method is to controllably modulate the density of the propagation medium located in the pump path before it impinges on the compressor sections. Heating or injection of a different index material will produce a phase modulation that quickly evolves into intensity modulation and averaging. There are regions in the propagation tube that produce controlled density or index patterns (acoustic, jets, heaters) that ensure rapid spatial averaging of the pump beams in the scattering medium. Alternatively, the pump beams can be made with very high optical quality. FIG. 32 shows the Modulated Pump [18. 1800] associated with Pump 1 [18. 108].

A 19$^{th}$ Embodiment: Temporally Modulated Pump and Extraction Beams

Figure 33:
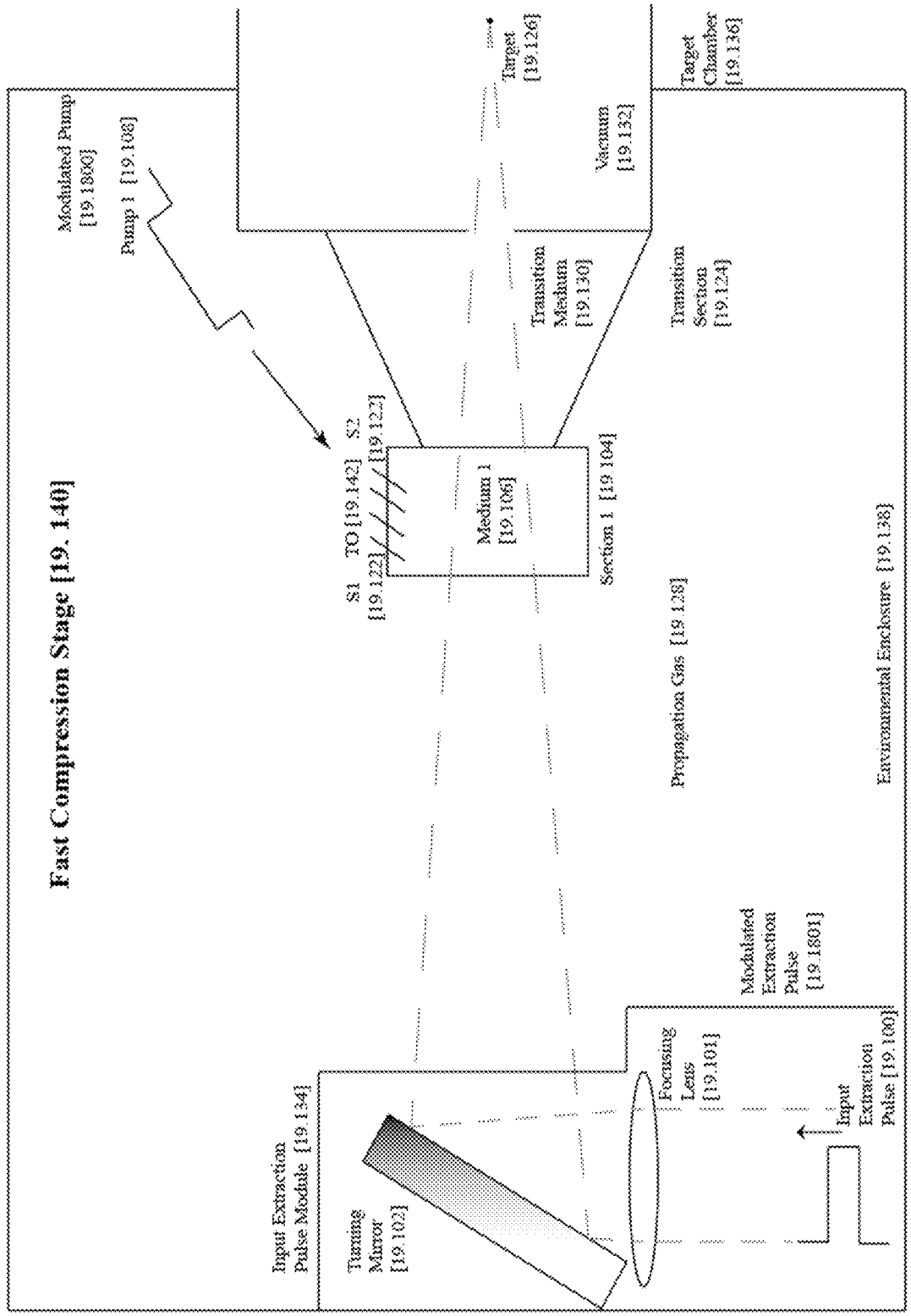
FIG. 33 shows a similar geometry as FIG. 10 with a method for temporally modulating the pump beam and extraction beam.

In some ICF applications, there are stringent requirements on the pulse shape versus time (see Lindl, for example, "The Physics Basis for Ignition Using Indirect Drive Targets on the National Ignition Facility," supra; and "Development of the Indirect-Drive Approach to Inertial Confinement Fusion and the Target Physics Basis for Ignition and Gain," supra). For the fast compressor, frequency control of the input pulse with elements that could give the ability to fine tune the temporal history of the Fast Compression Stage output in time is desirable. By setting the pump intensity versus time profile and shaping the input pulse in time a reasonable degree of control (~10% time history) may be obtained over the output pulse. If a temporally segmented compressor is utilized, different pulse lengths can be projected through the different sections and a composite pulse length obtained FIG. 33 shows an exemplary geometry with the Pump 1 [19. 108] and Input Extraction Pulse [19. 100] that may be temporally modulated ([19. 1800] and [19. 801] respectively). FIG. 34 shows a single section with a square wave pump and two different input pulse shapes, a square wave and a Gaussian to indicate exemplary temporal pulse shapes.

Figure 35:
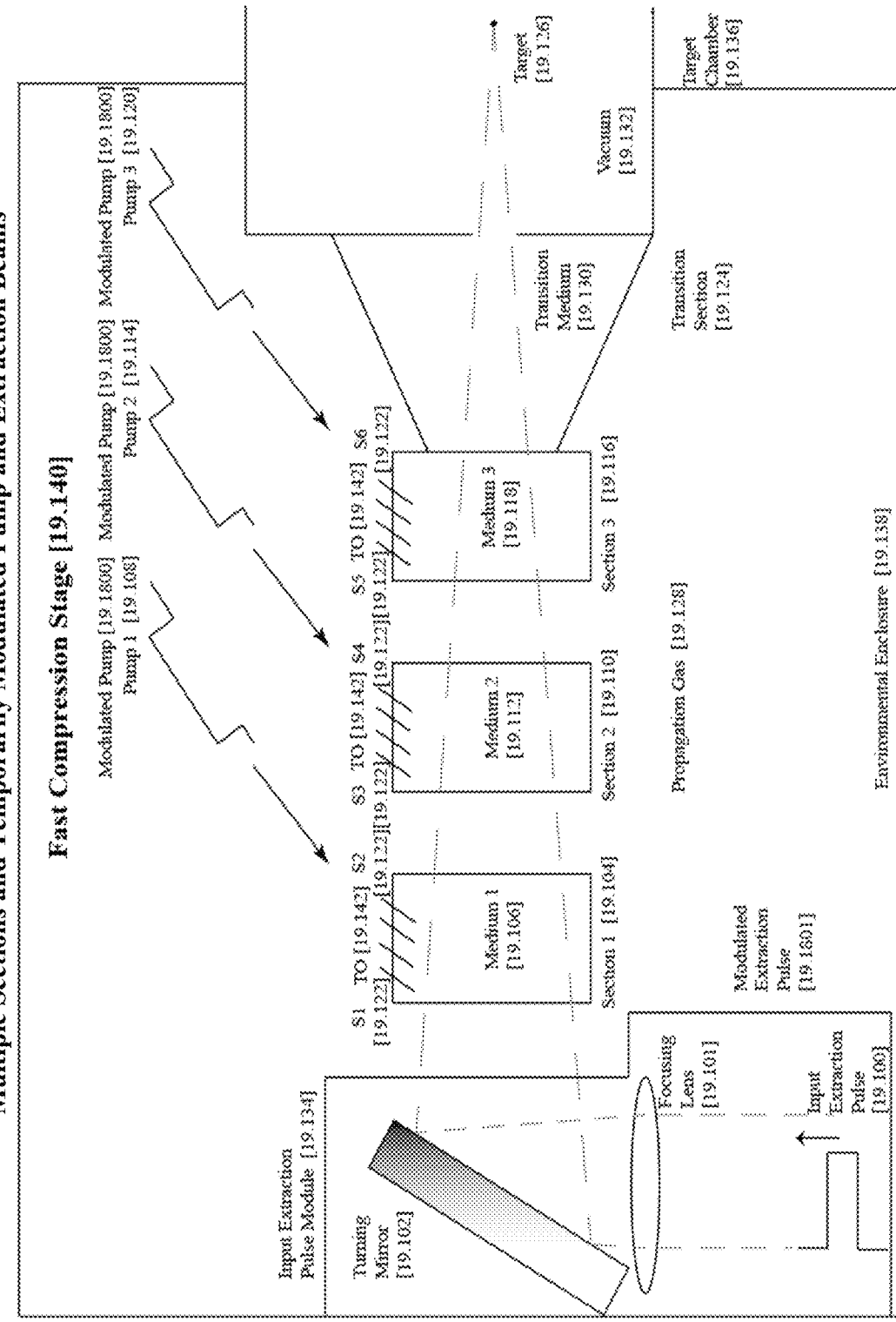
FIG. 35 shows the extension of the concept for FIG. 33 to a multiple section stage.

FIG. 35 shows an LCA with multiple sections that may be temporally modulated. Here, not only may the Input Extraction Pulse [19. 100] be modulated, (Modulated Extraction Pulse [19. 1801]), but the pumps, Pump 1 [19. 108], Pump 2 [19. 114], and Pump 3 [19. 120] may be modulated as well.

Figure 36:
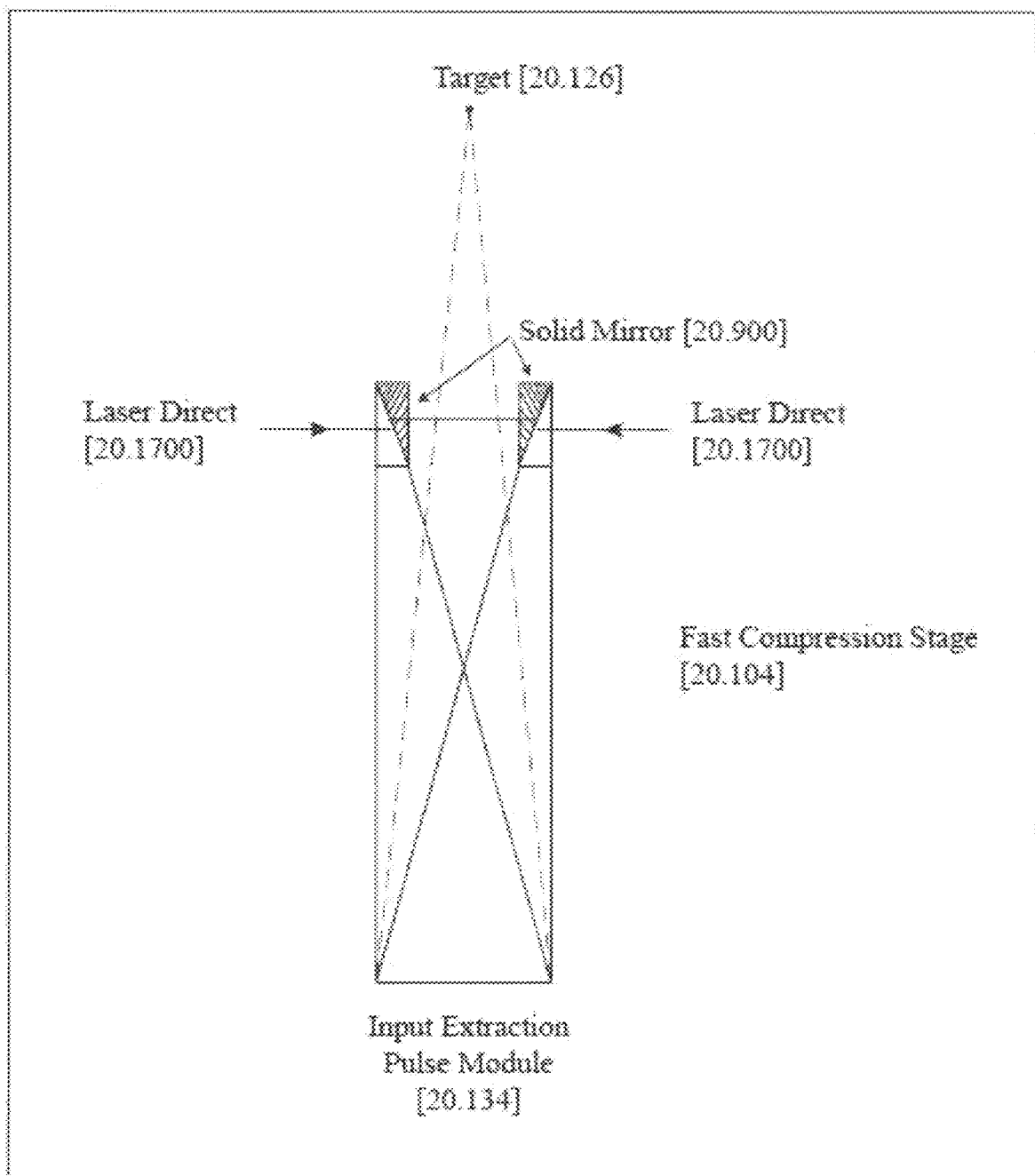
FIG. 36 shows a configuration of a compression stage with material optical elements for directing pump pulses into an amplifying section.
Figure 37:
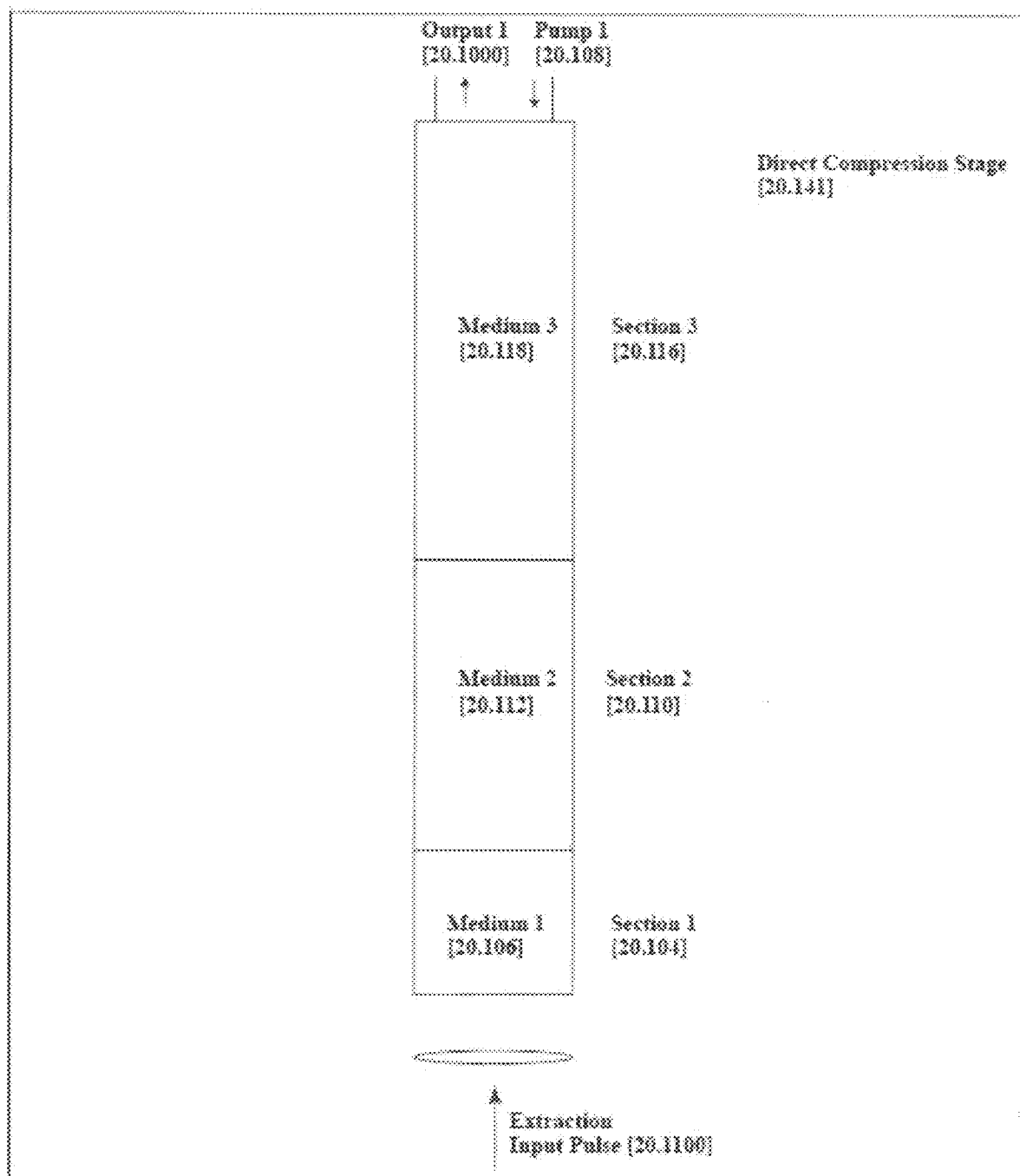
FIG. 37 shows a configuration of a compression stage with a plurality of amplifying sections that provides a large direct compression ratio.

A 20$^{th}$ Embodiment: Direct Compression (FIG. 36 and FIG. 37)

The compression arrangement may also be used to match the optical fluence from the output of a given type of laser to a compressed (spatially or temporally) beam. FIG. 36 shows such a configuration. Here, $10^{-8}$ sec pulse outputs from an array of diode or flashlap pumped glass lasers are added up by overlapping them into a compression stage. Here, the outputs from the glass lasers may be frequency converted before they are directed into the compression region. In the compression region, the overall efficiency may be 90%, the stage gain $10^4$, and the allowable bandwidth around $3 \times 10^9$ Hz. The output from the compressor is propagated through a He transition gas and through a transient window onto the target.

TABLE 20

Direct Compression

| Parameter | Section 1 | Section 2 | Section 3 | Stage |
|---|---|---|---|---|
| $\varepsilon_{input}$ (J/cm$^2$) | 1.00 | 41.24 | 523.45 | 1 |
| $\varepsilon_{output}$ (J/cm$^2$) | 41.24 | 523.45 | 3873.86 | 3873.86 |
| $\tau_{input}$ (sec) | 1.00E−08 | 1.00E−08 | 1.00E−08 | 1.00E−08 |
| $\tau_{pump}$ (sec) | 4.56E−08 | 4.56E−07 | 3.00E−06 | 3.00E−06 |
| $\varepsilon_{pump}$ (J/cm$^2$) | 53.39 | 533.87 | 3508.77 | 4096.03 |
| $\gamma_{section}$ (cm/watt) | 9.99E−12 | 9.99E−13 | 1.52E−13 | — |
| Gas | Ar | .1 Ar/.9 He | He | — |
| $\varepsilon_{sat}$ (J/cm$^2$) | 6.67 | 66.73 | 438.60 | — |
| L (cm) | 685 | 6847 | 45000 | 52532 |
| Width (cm) | 23 | 23 | 23 | 23 |
| $G_{SS}$ (nepers) | 8 | 8 | 8 | 24 |
| K ($\tau$ pump/ $\tau$ extract) | 5 | 46 | 300 | — |
| $G_{LS}$ | 41.24 | 12.69 | 7.40 | 3.87E+03 |
| $\eta_O$ | 0.75 | 0.90 | 0.95 | 0.95 |
| FASEextraction + Spontaneous (%) | 1.45E−01 | 2.54E−02 | 8.45E−01 | |
| BASEextraction + Spontaneous (%) | 9.20E−02 | 1.18E−02 | 2.60E−03 | |
| FASEpump + Spontaneous (%) | 1.25E−01 | 5.35E−02 | 6.06E−02 | |
| BASEpump + Spontaneous (%) | 3.77E−02 | 1.11E−02 | 3.21E−02 | |
| $\Theta_m$ (radians) - Pump | $4.16 \times 10^{-5}$ | $1.41 \times 10^{-5}$ | $5.22 \times 10^{-6}$ | |
| $\Theta_m$ (radians) - Extraction | $7.2 \times 10^{-5}$ | $8.74 \times 10^{-5}$ | $8.8 \times 10^{-5}$ | |

FIG. 37 shows a Direct Compressor with the Laser Direct [20. 1700] pumping and Solid Mirrors [20. 900]. Table 20 gives the parameters and design performance for an LCA with a Large Direct Compression Ratio as shown in FIG. 37. The General Discussion related how the B integral made very high temporal compression ratios difficult. The exemplary design of Table 20 indicates an efficient compressor with a K value of 300. The ASE values support such a compression ratio, and the spatial incoherence is used to suppress the predicted Bespalov and Talanov growth. The output is thus imaged onto a large area (in this case, the exit aperture of the stage). Also, the exemplary case shown is end pumped, either near on axis or with reflective walls forming a light guide. The operation is described as in the General Description, the shutters, etc. have been omitted for simplicity. For a $10^{-8}$ second Extraction Input Pulse [20. 100], a 500 meter long gain section driven by a Pump 1 pulse length of $3 \times 10^{-6}$ [sec] leads to a 300:1 temporal compression. The minimum angle, $\theta_m$, for this pump flux (treated as a constant) is shown in Table 20 for each section. For 500 m with a 23 cm output, the aperture subtended angle is $0.23/500 = 4.6 \times 10^{-4}$ radians, substantially larger than the section minimum angles $\theta_m$ for a $10^{-8}$ second extraction pulse or the pump pulse. A $10^{-9}$ second extraction pulse may also be so stabilized; however, the extraction pulse FASE losses would be prohibitive.

Figure 38:
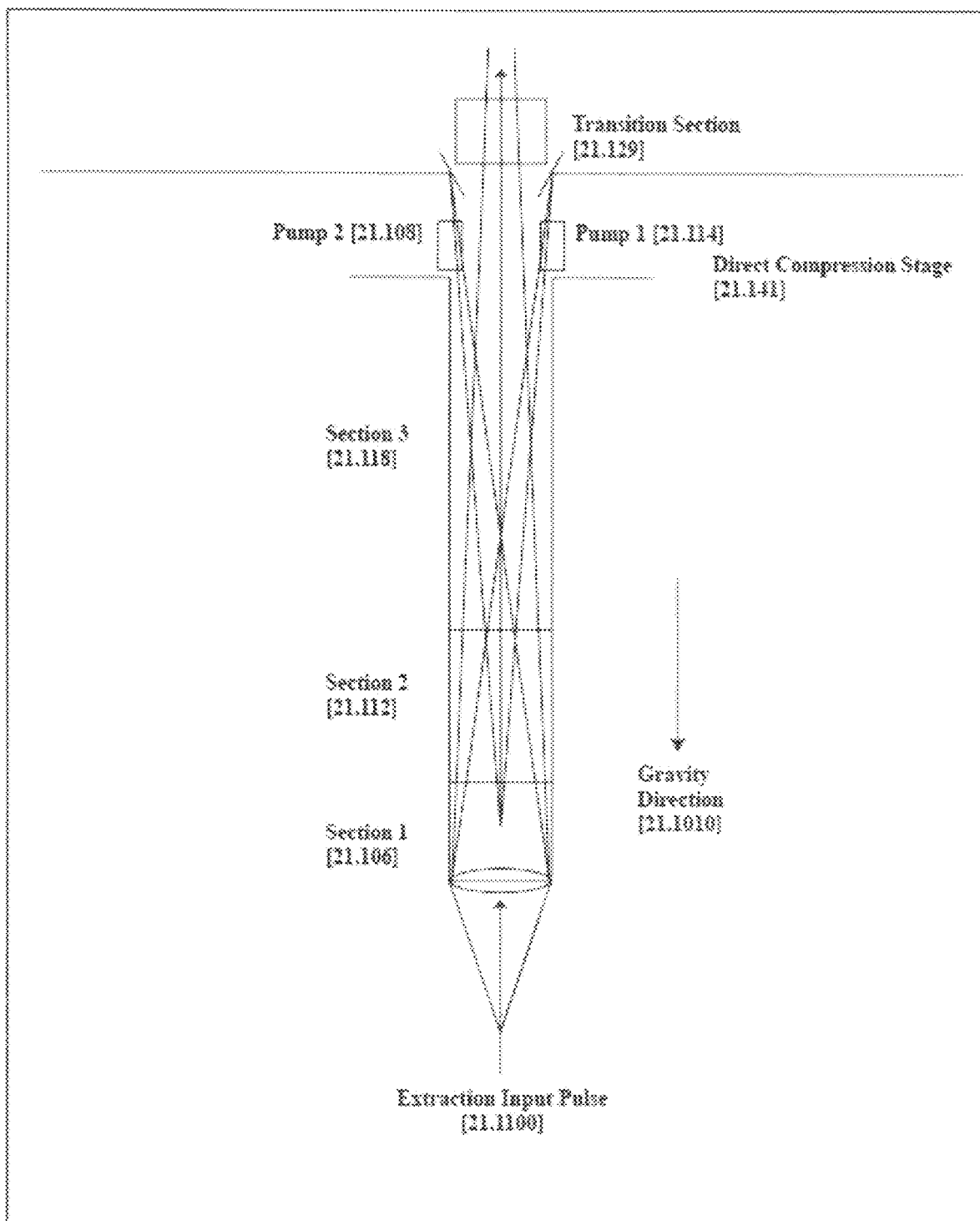
FIG. 38 shows a configuration of a vertical mounted orientation with respect to gravity.

A 21$^{st}$ Embodiment: Orientation with Respect to Gravity (FIG. 38)

The design may be simplified by orienting the stages in a certain attitude to facilitate operation. In order to reduce the need for fast transient apertures between gas sections, the orientation with respect to gravity may keep the gas regions separated. It is desirable to have the higher density regions at a lower gravitational potential. FIG. 38 shows such a configuration. The pump beams may come from a scattering region (such as the RAC) or from material turning elements or from the pump laser directly. In the exemplary case, the compression sections comprising the stage are mounted vertically and the gas densities chosen so that the interfaces between them are stable if the gas is controlled in temperature. For the gases given in Table 20, this is the case for the Gravity Direction [21. 1010] as shown. This assembly may be tilted, in which case the gas interface would be normal to the gravitational vector.

A 22$^{nd}$ Embodiment: In-Line Compression Cells (FIG. 39-42)

A class of embodiments utilizes near common propagation paths for the pump and extraction beams. The Fast Compression Stage then may have uncompressed pump light passing through it. Since this light has an intensity lower by approximately the compression ratio of the first stage, the overall G of the Fast Compressor action will be smaller by the compression ratio when the uncompressed pump light passes through than when exposed to the compressed light. Mechanically, such arrangements may be simpler and more compact and also may couple the light more efficiently from one stage to the next. The Fast Compression Stage optical extraction axis may be oriented through the 0-180° range and so go from essentially collinear to counter propagating. FIG. 35 shows such a compressor arrangement. Of course, such embodiments should be examined in terms of spatial and temporal coherence at each stage, ASE limitations, and beam quality decoupling criteria to ensure proper operation. FIG. 39-42 show this embodiment with variations.

Figure 39:
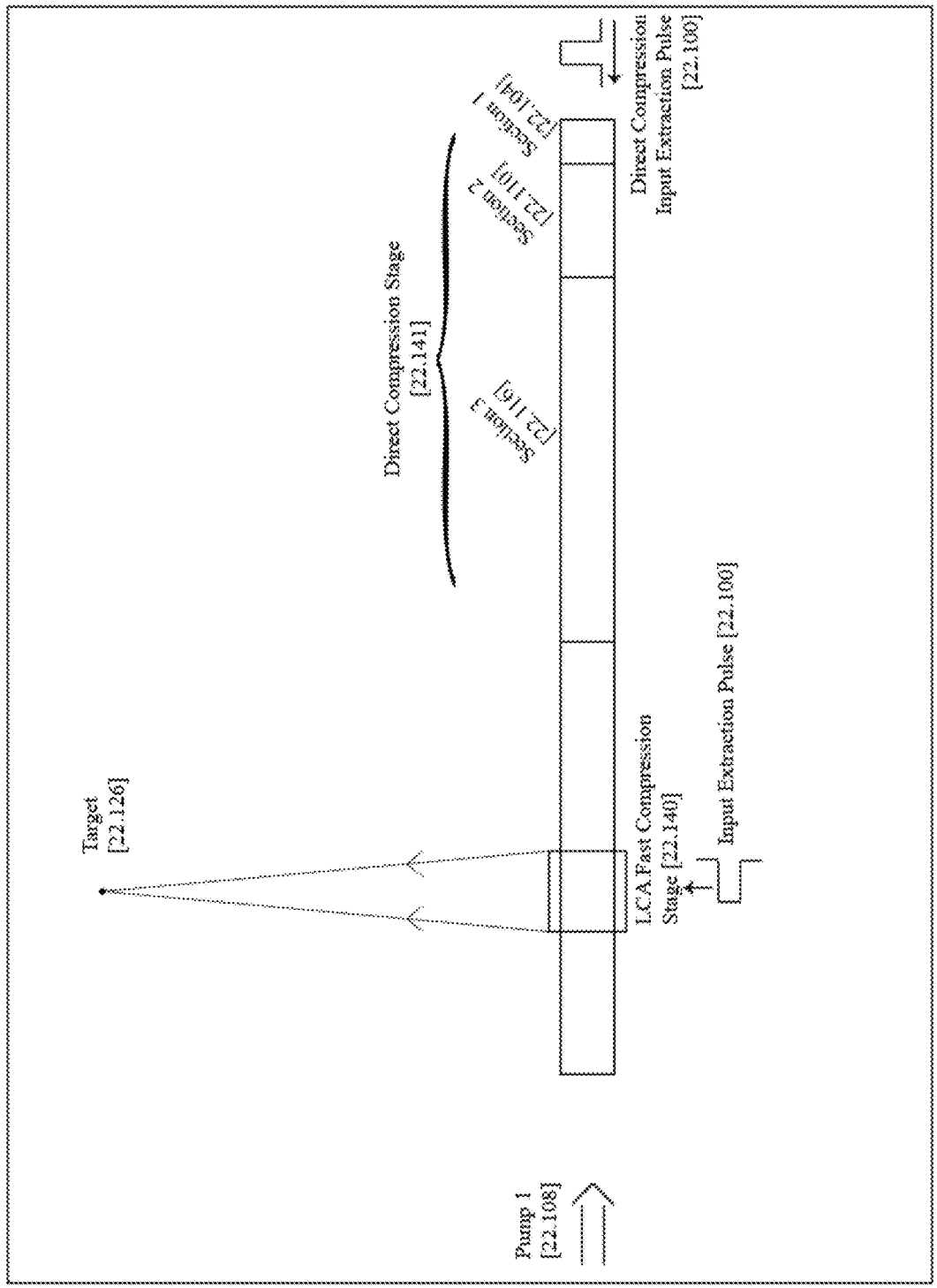
FIG. 39 shows a configuration for inline direct compression and fast compression cells.
Figure 40:
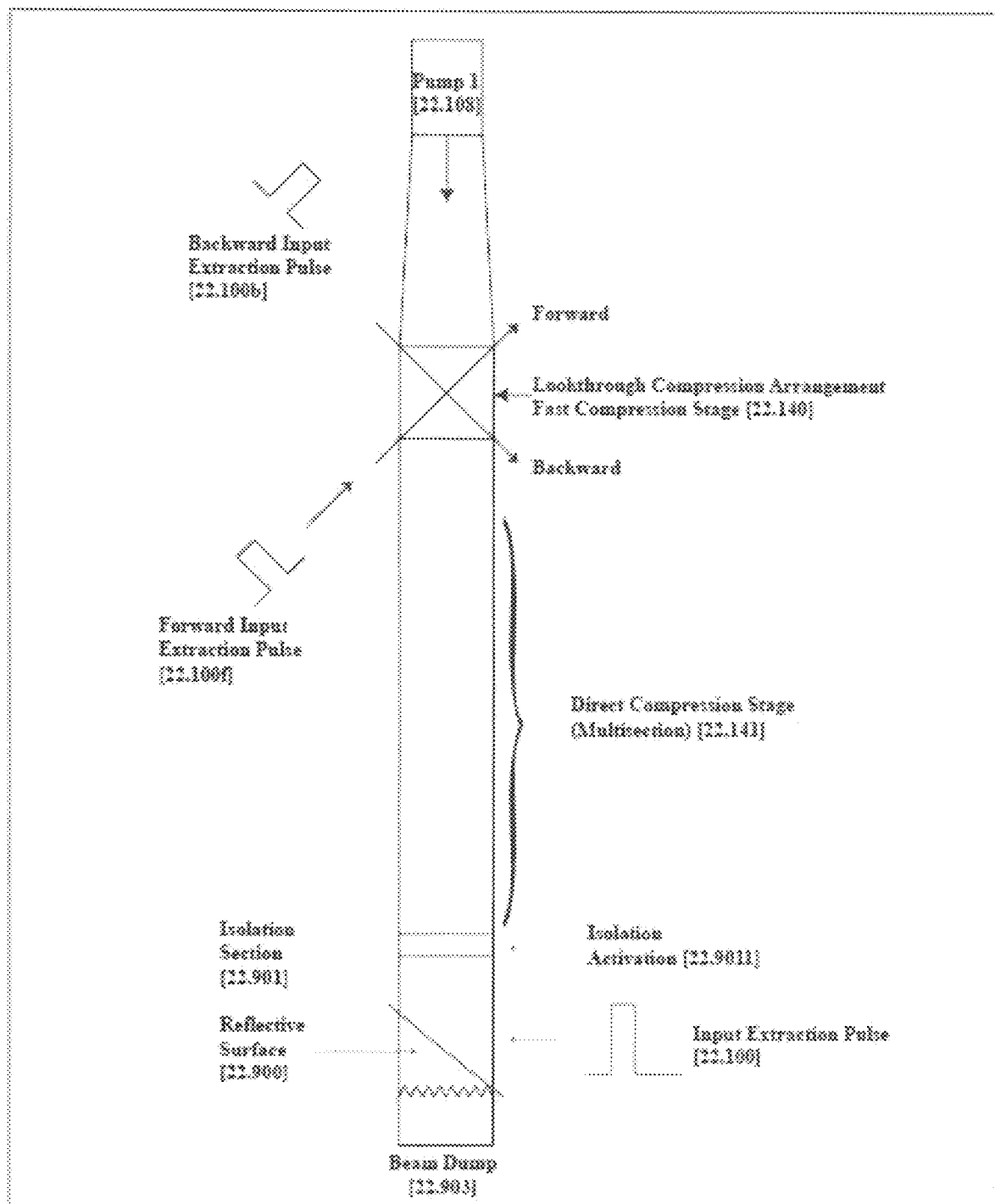
FIG. 40 shows a similar configuration to FIG. 38 but with both forward and backward variants in the fast compression stage.

FIG. 39 shows a Fast Compressor Stage [22. 140] with a 90° crossing angle driven by a Direct Compression Stage [22. 141] that in turn, is pumped by an inline pump, Pump 1 [22. 208]. The overall temporal compression from the Pump 1 to the Target may be over $10^3$, as a typical Fast Compressor Stage [22. 140] compresses 10:1 and a Direct Compression Stage [22. 141] may time compress on the order of 300. The overall compression is thus the product of the two stage compressions. This exemplifies the stage driving another, with the Direct Compression Stage [22. 141] designed to give good optical coupling and very high compression, but not having to focus on a target. FIG. 40 shows two variants, one a forward scattering geometry with input extraction pulse [22. 100f] and one with backward scattering geometries with input extraction pulse [22. 100b]; one or the other may be utilized, not both simultaneously. Also, the Direct Compression Stage [22. 141] has a Beam Dump [22. 903] and an Isolation Section [22. 901] driven by an Isolation Activation [22. 9011]. These elements, operating in conjunction with Reflective Surface [22. 900] may be needed to inject the Input Extraction Pulse [22. 100] and protect against unconverted energy from Pump 1 [22. 108] for high fluence operation.

Figure 41:
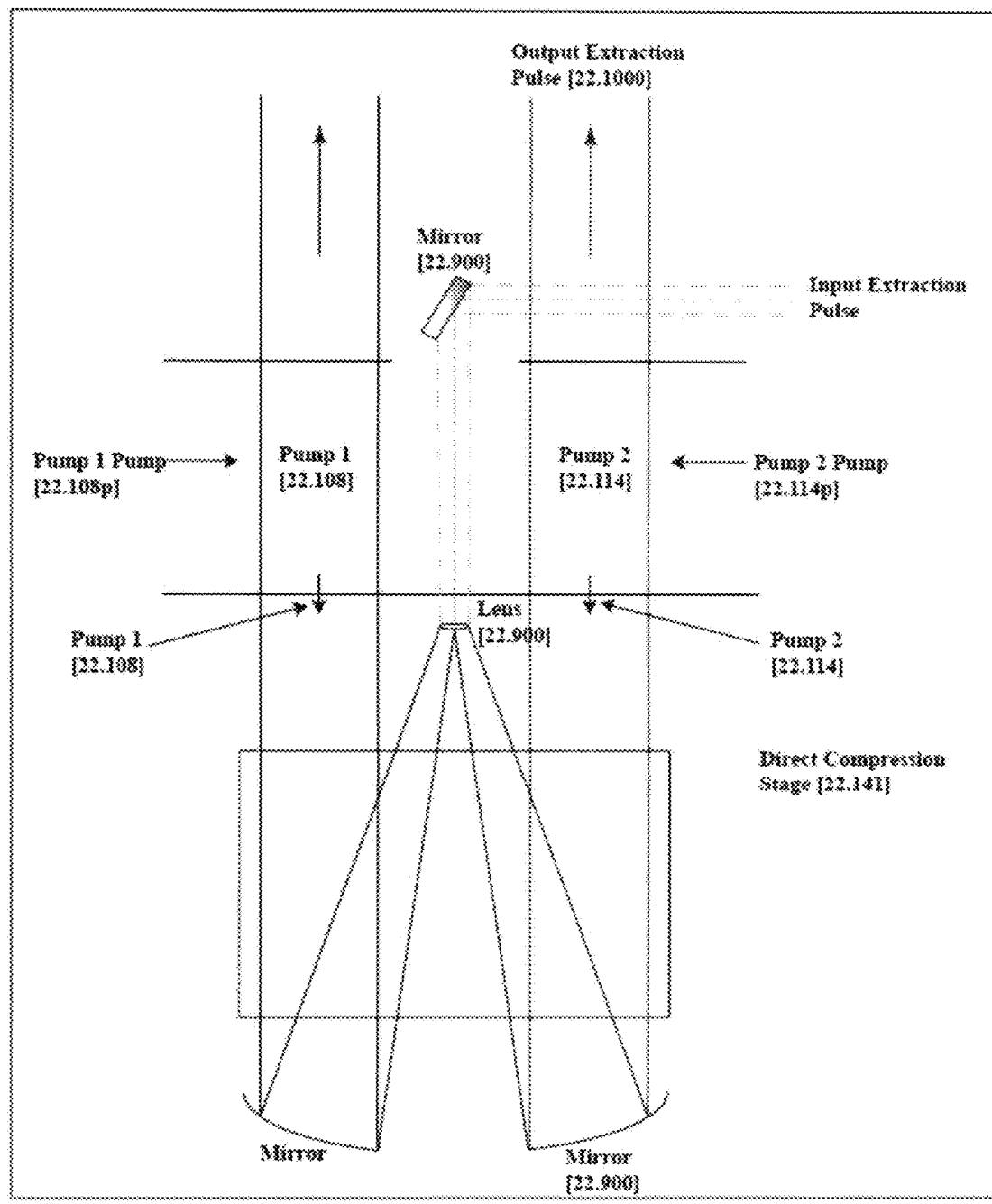
FIG. 41 shows a configuration with the pump pulse located in the extraction beam path.

FIG. 41 shows a particular arrangement where the Pump 1 [22. 108] and Pump 2 [22. 114] are within the optical path prior to the Output Extraction Pulse [22. 1000] for a Direct Compression Stage [22. 141].

Figure 42:
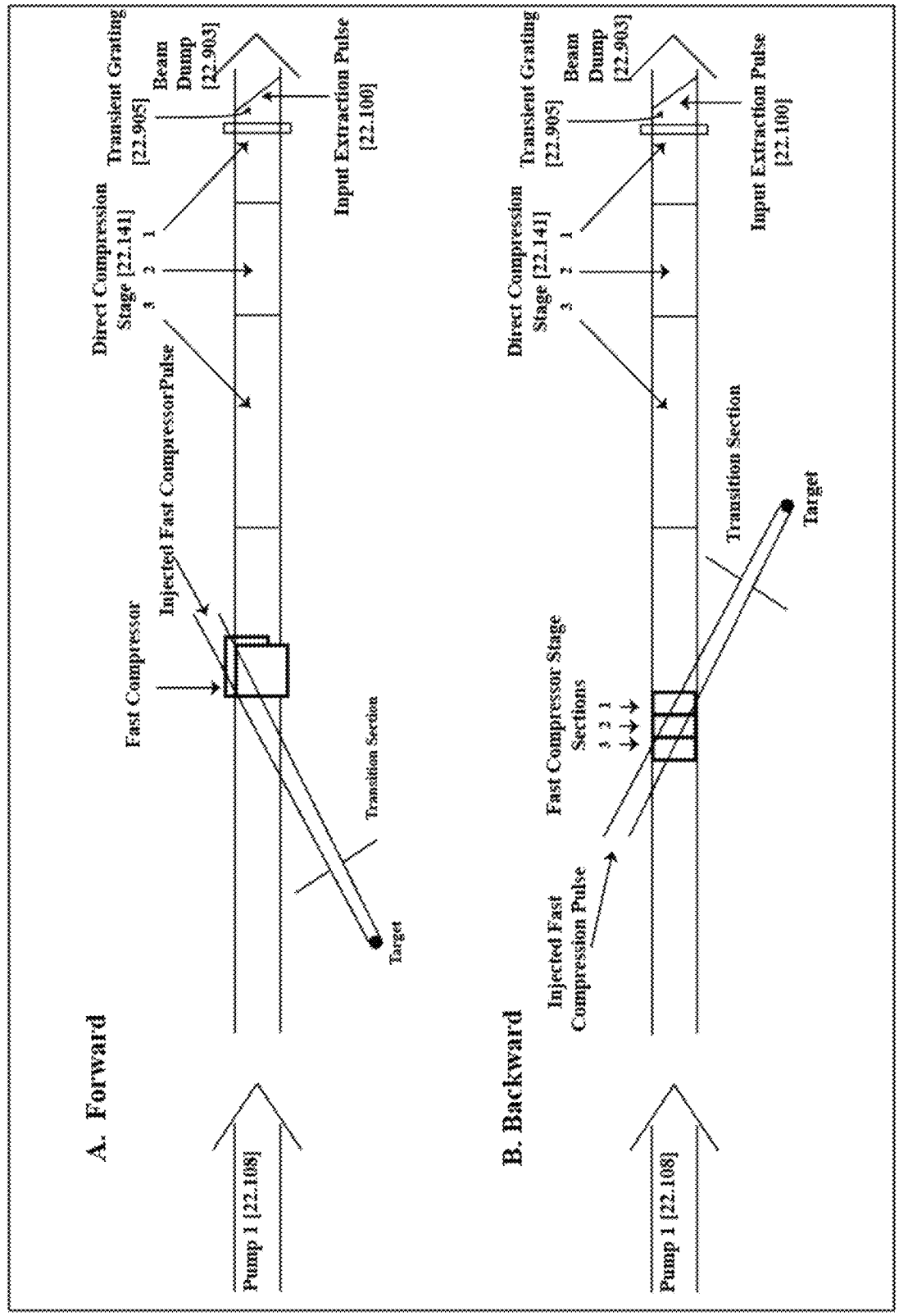
FIG. 42 shows a configuration with a beam switch to enable the direct compression stage to be driven at a very high fluence.

FIG. 42 shows a variant wherein a Transient Grating [22. 905] is formed to inject the Input Extraction Pulse [22. 100]. In this geometry, the grating directs the energy down the Direct Compression Stage [22. 141]; since it is not a material element, it can't be damaged by converted pump 1 energy and leads to very high fluence operation.

A 23$^{rd}$ Embodiment: Opposed Pumping Geometries (FIG. 43 and FIG. 44)

Figure 43:
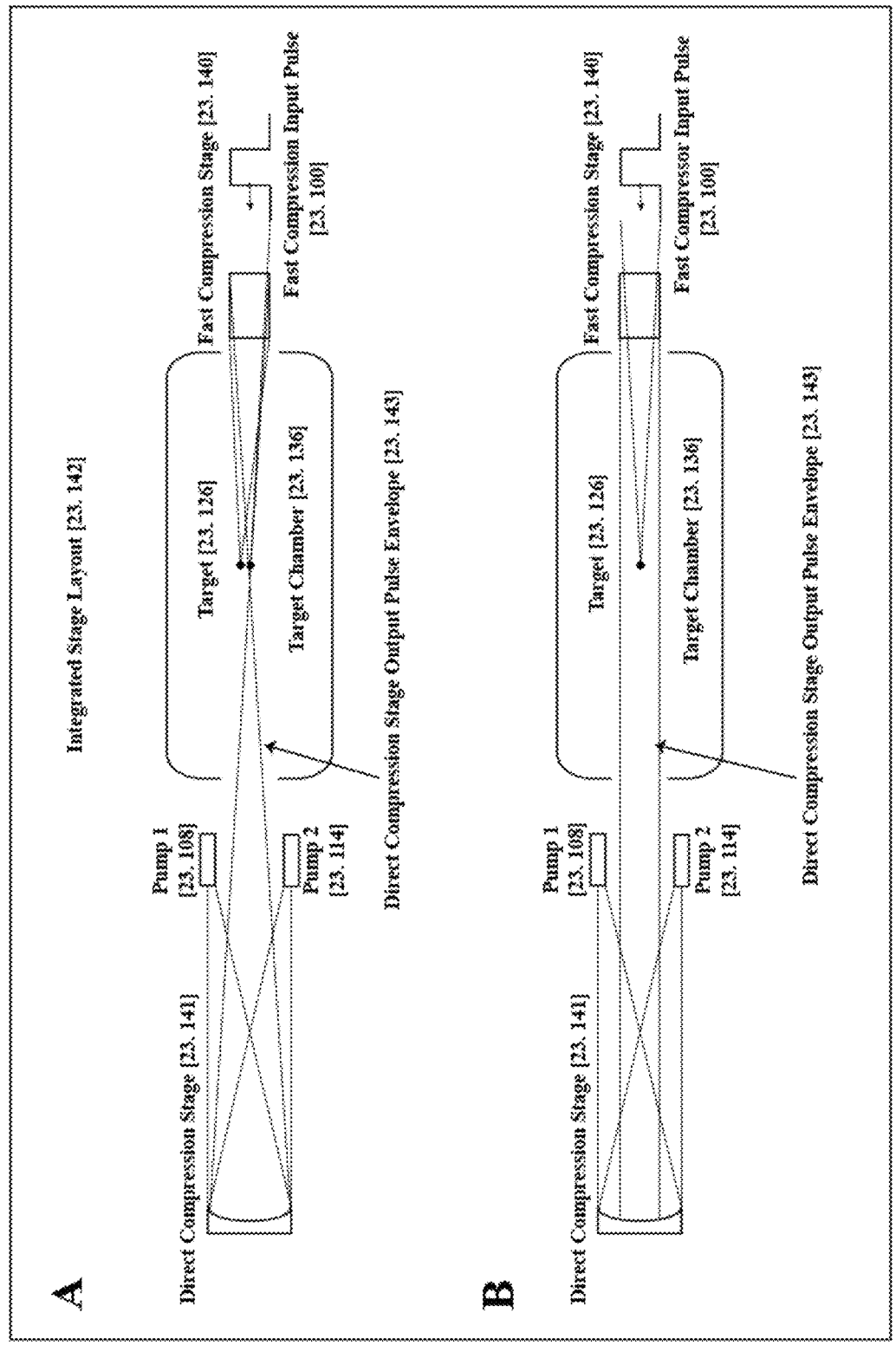
FIG. 43 shows two variants of a configuration for opposed pumping geometries with a direct compression stage and pump pulse with fast compression stage on the other side of target.

FIG. 43 shows two variants, a. and b., where series compression stages are packaged to give near in line coupling with the target on the axis between the Fast Compression Stage. Thus, there are two major variants for near in line stage coupling between the Fast Compression Stage [23. 140] and the Direct Compression Stage [23. 141] depending on the near collimated Direct Compression Stage Output Pulse Envelope [23. 143] in b. or the focusing geometry of a. Both are Integrated Stage Layouts [142] to give very high coupling efficiency. Certain elements, such as the vacuum transition and optical input to the Direct Compression Stage [23. 141] have been omitted for clarity.

A 24$^{th}$ Embodiment: Angularly Separated Direct Compressor Output (FIG. 44 and FIG. 45)

Figure 44:
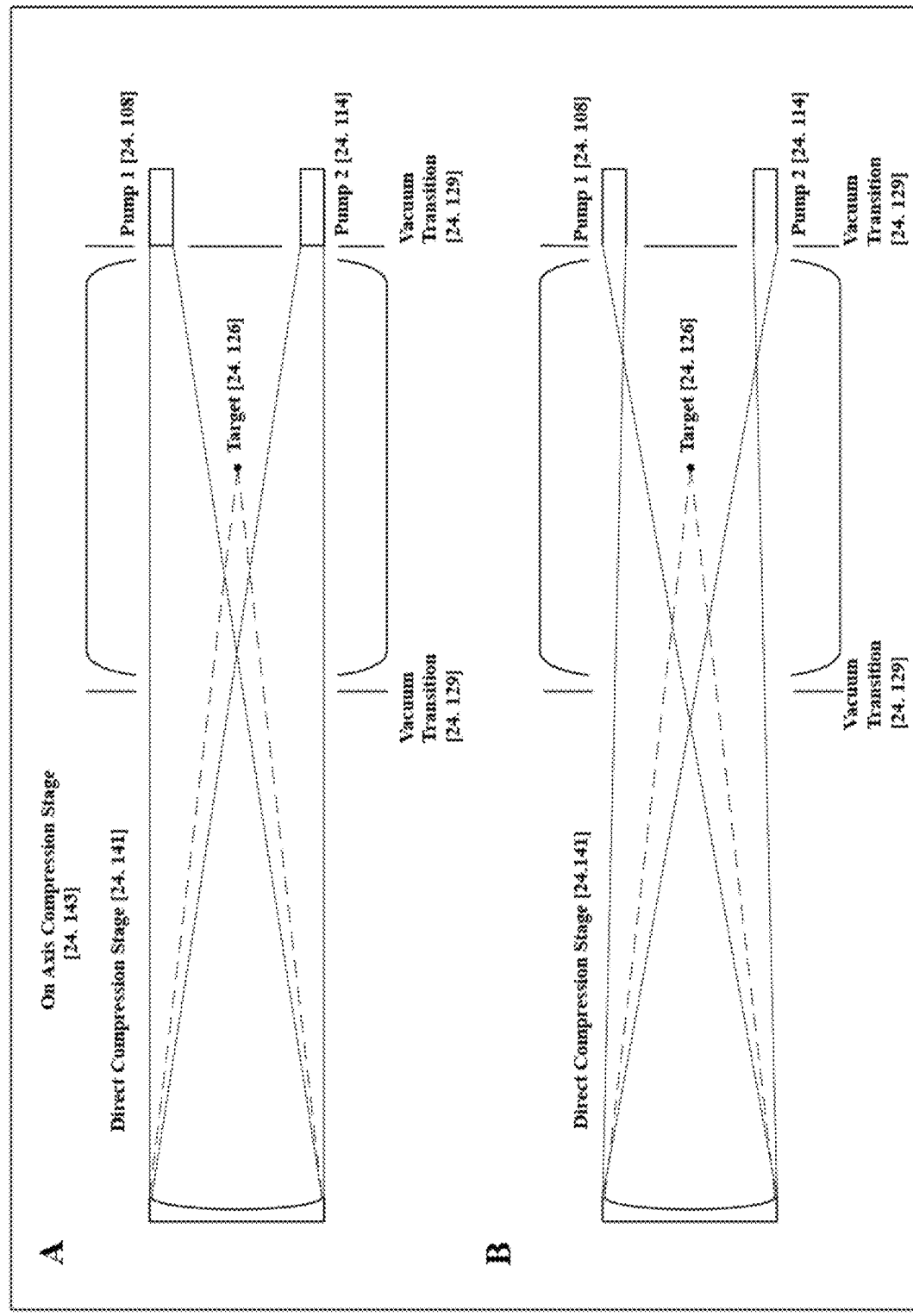
FIG. 44 shows two variants of a configuration for opposed pumping geometries with the target between the direct compression stage and pump pulse.
Figure 45:
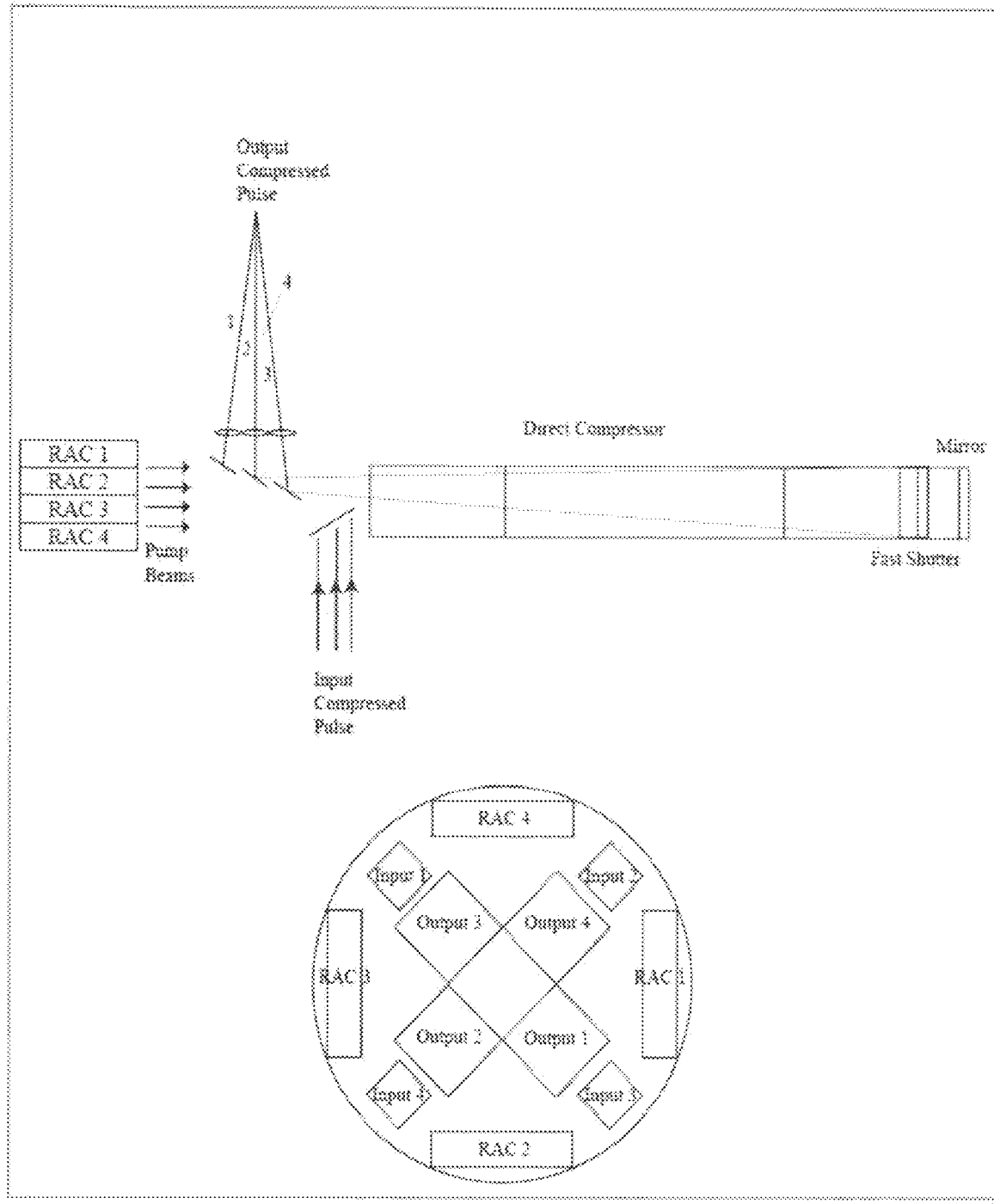
FIG. 45 shows a configuration for angularly separated outputs from a direct compression stage for packaging with material optics for directing and focusing at high fluence onto the Target.

FIG. 44 shows a single Direct Compression Stage [24. 141] being pumped in an Compression Stage [24. 143] arrangement, again with two variants, a. and b. FIG. 45 shows a packaging arrangement for a Direct Compression Stage [24. 141] with angularly separated compressor outputs. Here, the DC stage is addressed by angularly separated channels. The input channels may be separated in time as well. The output compressed pulses are then separated into separate output channel, collimated and sent on towards the target. Differential input delays may compensate for delays getting to the target in the output beam handling.

Figure 46:
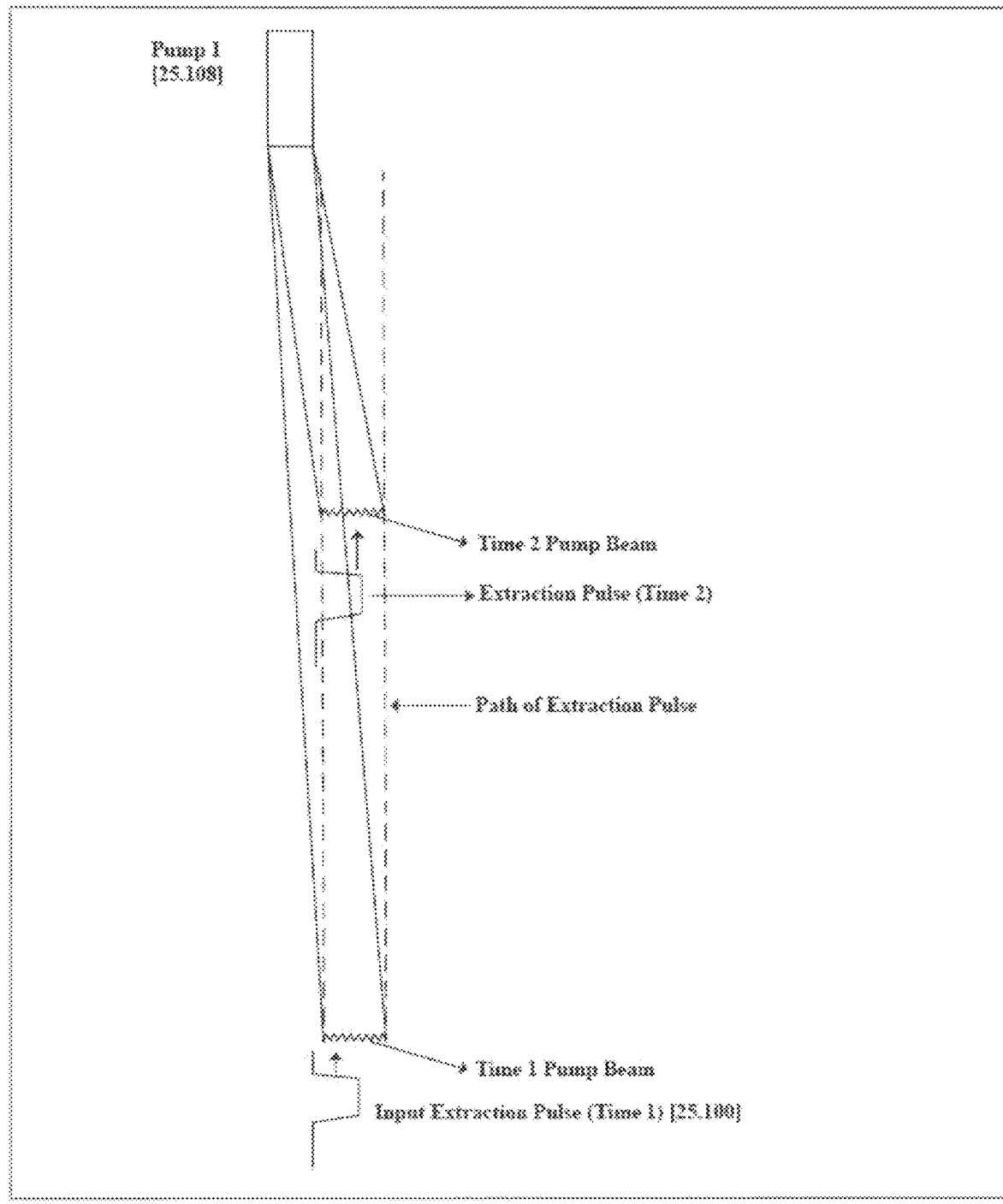
FIG. 46 shows the timing of a single pump beam properties changing in time to match efficiently to an extraction beam.
Figure 47:
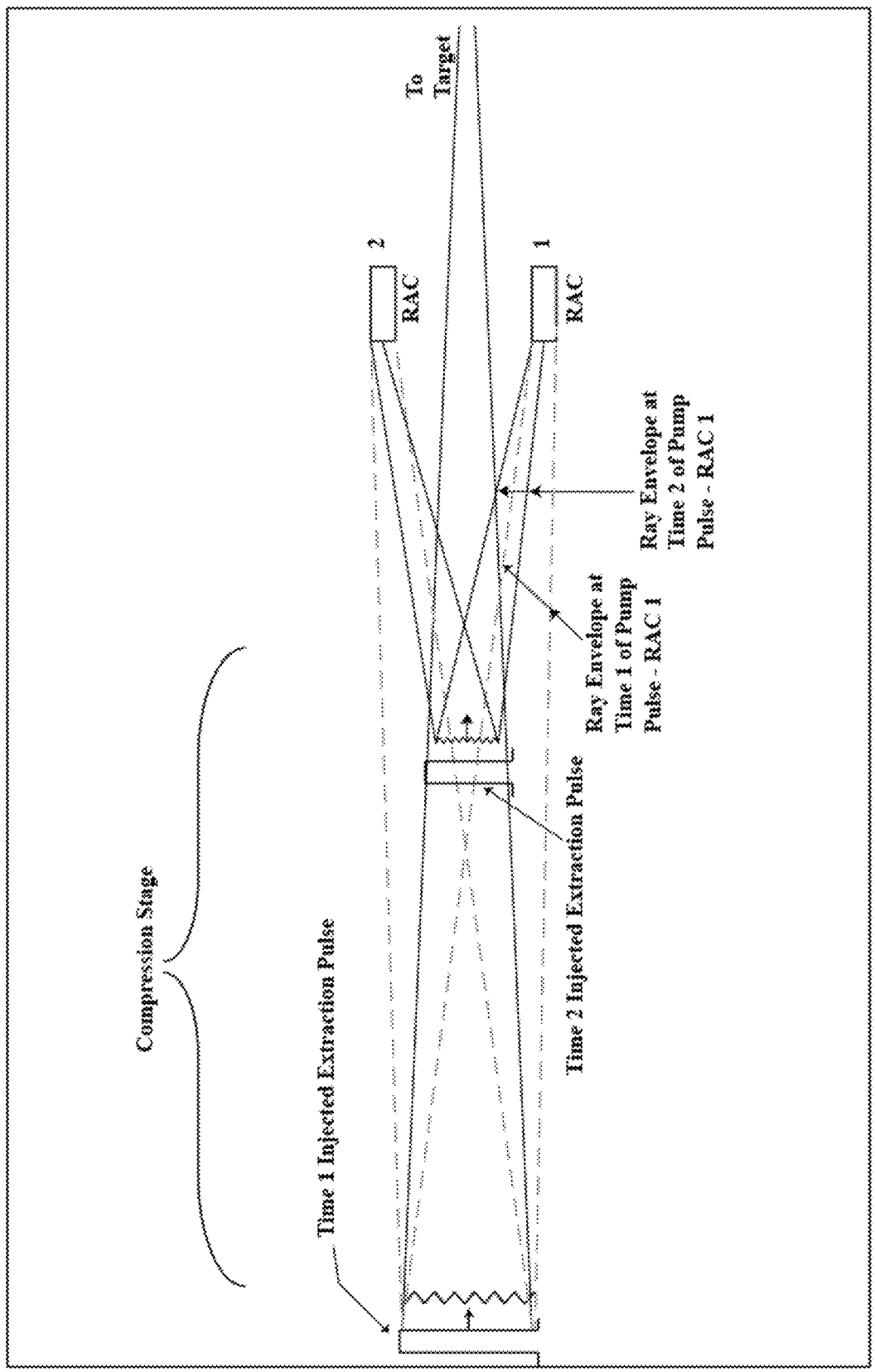
FIG. 47 shows a configuration with multiple pump beams for driving a direct compression stage with time varying pump outputs to efficiently match to the extraction pulse.
Figure 48:
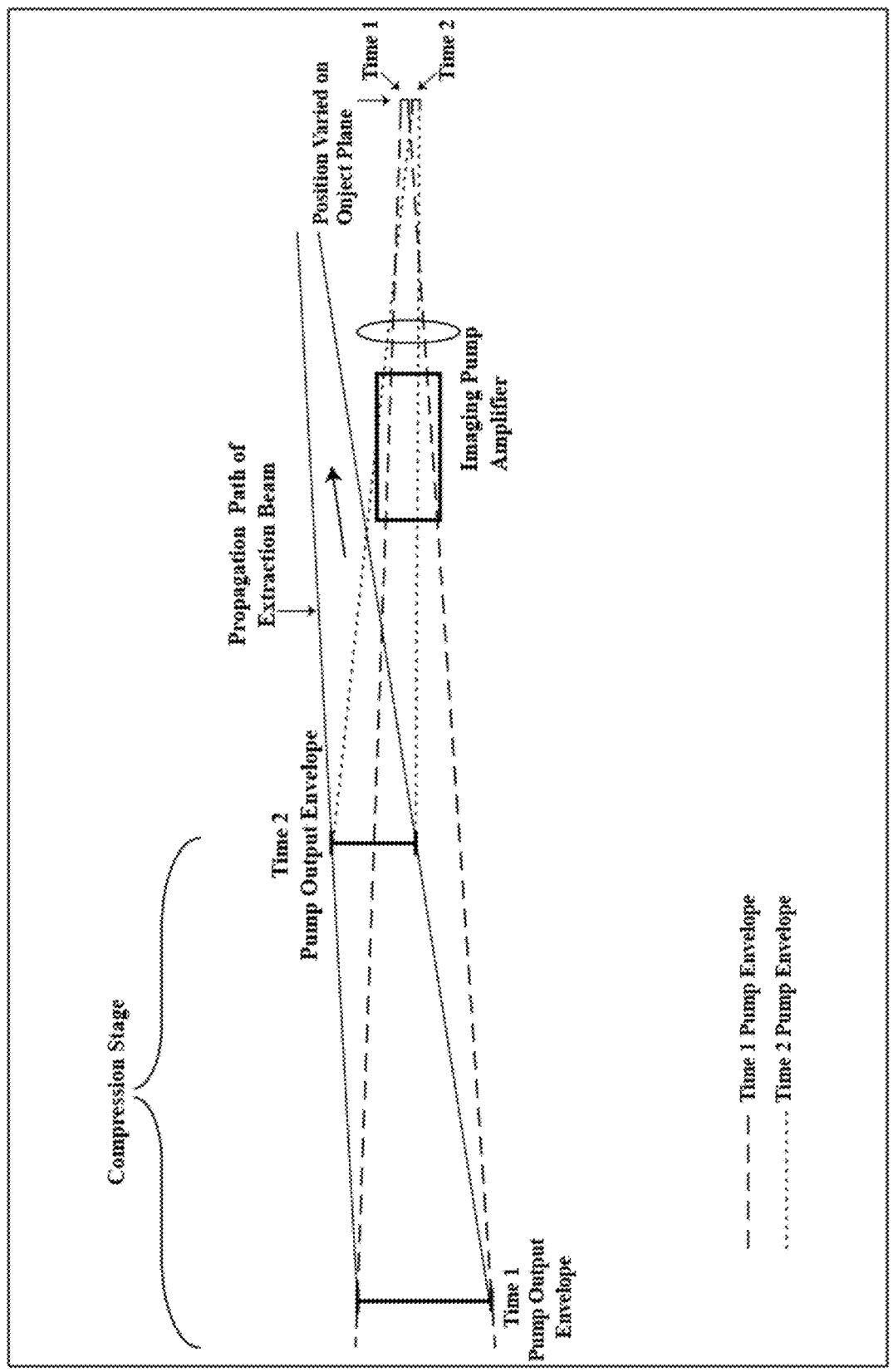
FIG. 48 shows a configuration for driving a pump beam to produce a desired time varying output.

A 25$^{th}$ Embodiment: Extraction Pulse Tracking (FIG. 46-48)

When compressors are based on stimulated scattering to convert one pattern of light to another pattern, the coupling efficiency may depend on the overlap between the two patterns of light. Particularly when one pattern is to be shortened temporally with respect to the other, the motion of the extraction light pattern may need to be matched to the pump pattern to achieve high efficiency. This may require moving and altering the shapes of the pumping pulse in time and space. FIG. 46 shows a simple geometry, with the shapes of the pump pulse being programmed to match the extraction pulse. See FIG. 47 for two pump pulses matching the extraction pulse position. FIG. 48 indicates one method of forming a tracking pulse.

For optimum efficiency, in some geometries it is useful to synchronize the position of the pump beam with the extraction pulse. This is particularly true as the offset angle (angle from pure counter-propagating beams) is increased. At 90° offset angle (pump beam perpendicular to the extraction beam), the pump beam needs to move at about the speed of light perpendicular to its direction of propagation. One method of modulation includes sending two or more beams at different angles and different times through an amplifier. For the 90° case if 10 beams were sent to sequentially to a section comprising a 1.5 meter long compression section and the illuminated pattern in each beamlet were some 20 cm long with some overlap, the 20 cm pump pattern would move synchronously with the extracting pulse. There are many means of making a pattern move, including interferometric (two or more beams have offset frequencies and interface such that they move 1 fringe in one beat cycle), rotating pump beam polarization with a deflection angle proportional to the polarization state, chirping frequencies with passing a beam through a grating.

In order to couple efficiently to a region to be extracted from, it may be desirable to zoom (change the output beam divergence) and "swing" (move the angle of the beam), perhaps at the same time. For direct compression, as the input pulse is amplified back towards the pump, the temporal pump beam history may change in time to enhance the efficiency. A simple way to zoom for geometries where the extraction pulse focuses (gets smaller) as it propagates towards the pump is to keep the input optics to an imaging amplifier, if one is utilized, fixed, but then vary the position on the input on the object plane. Then, no focal properties have to be time varying, and the RAC has large enough gain there is no intermediate beam forming necessary. The output angle may be changed in time by moving the object plane illumination centroid in time. FIG. 48 shows the irradiance from the pump tracking the extraction pulse size and position using this technique. The input beam to the input object plane for the RAC may be composed on a single beam that is chopped in time to 10-100 beamlets that are stacked end-to-end and directed to separate regions of the input plane sequentially.

The invention claimed is:

1. A system for amplifying an output fluence in a stimulated scattering system, the system comprising:
    an input extraction pulse module comprising:
        an optical pulse; and
        one or more optical elements positioned to direct said optical pulse toward a fast compression stage;
    said fast compression stage comprising:
        one or more sections that each correspond to a distinct medium and positioned within a propagation media without intervening permanent optical materials between sections;
        wherein said propagation media is a gaseous media within a total pressure range of 0.5-2 atmospheres;
    one or more pump pulses, each impinging upon one of the one or more sections, wherein said optical pulse is shorter than the pump pulse and is amplified as it interacts with the pump pulse;
    a transition section having a transition medium to receive the optical pulse; and
    a target chamber to hold a target within a vacuum, wherein said target interacts with and is energized by said optical beam.

2. The system of claim 1, further comprising:
    two or more sections each with corresponding distinct mediums;
    two or more pump pulses, wherein a pump pulse corresponds with each of the sections; and
    wherein an index matching medium lies within each of the sections.

3. The system of claim 1, further comprising:
    two or more sections each with corresponding distinct mediums;
    two or more pump pulses, wherein a pump pulse corresponds with each of the sections; and
    wherein an index and density matching medium lies within each of the sections.

4. The system of claim 1, further comprising:
two or more sections each with corresponding mediums;
two or more pump pulses, wherein a pump pulse corresponds with each of the sections; and
wherein a different medium lies within each of the sections.

5. The system of claim 1, further comprising:
two or more contiguous sections each with corresponding mediums; and
two or more pump pulses, wherein a pump pulse corresponds with each of the sections.

6. The system of claim 1, wherein the medium is selected from one of the following: noble gases, N2 isotopes, H2 isotopes and mixtures thereof.

7. The system of claim 1, wherein the one or more optical elements further comprises a polarization modulating element to control the angle of polarization of the optical beam relative to the pump beam and/or a polarization modulating element to control the angle of polarization of the pump beam.

8. The system of claim 1, wherein the one or more optical elements further comprises an active adaptive optical element or a passive scattering element to compensate for phase distortions.

9. The system of claim 1, wherein the one or more optical elements comprises active optics.

10. The system of claim 1, wherein the one or more pump pulses emits a single pump color.

11. The system of claim 1, wherein the one or more pump pulses emits a multi-color pump color.

12. The system of claim 1, wherein the one or more pump pulses each emit a unique color.

13. The system of claim 1, wherein the one or more pump pulses emits a modulated pump beam.

14. The system of claim 1, wherein the one section is segmented into four or more different segments arranged in parallel and wherein said one or more pump pulses further comprises:
four or more different pump pulses arranged to impinge upon each of the four segments.

15. The system of claim 1, wherein the input extraction pulse is shaped as a pattern.

16. The system of claim 1, wherein said transition section is a vacuum transition section without a permanent material surface.

17. The system of claim 1, wherein the input extraction pulse module and the pump pulse are positioned on an off-axis propagation path.

18. The system of claim 1, wherein the input extraction pulse module and the pump pulse are positioned on a common propagation path.

19. A method for amplifying an output fluence in a stimulated scattering process, the method comprising:
directing an optical pulse through one or more optical elements towards a fast compression stage, wherein said fast compression stage comprises one or more sections that correspond to a distinct medium and positioned within a propagation media that is a gaseous media within a total pressure range of 0.5-2 atmospheres;
directing one or more pump pulses towards a fast compression stage and impinging upon one of the one or more sections without impinging upon intervening permanent optical materials between sections, wherein said optical pulse is shorter than the pump pulse;
amplifying the optical pulse as it interacts with the one or more sections and the one or more pump pulses;
directing the optical pulse through a transition section having a transition medium; and
energizing a target held within a vacuum of a target chamber by interacting with the optical beam.

20. The method of claim 19, further comprising: directing two or more pump pulses towards two or more sections each with corresponding distinct mediums, wherein the sections comprise an index matching medium.

21. The method of claim 19, further comprising: directing two or more pump pulses towards two or more sections each with corresponding distinct mediums, wherein the sections comprise an index and density matching medium.

22. The method of claim 19, further comprising: directing two or more pump pulses towards two or more sections each with corresponding distinct mediums, wherein the sections comprise a different index medium.

23. The method of claim 19, further comprising: directing two or more pump pulses towards two or more contiguous sections each with corresponding distinct mediums.

24. The method of claim 19, further comprising selecting the medium from one of the following: noble gases, N2 isotopes, H2 isotopes and mixtures thereof.

25. The method of claim 19, further comprising controlling the angle of polarization of the optical beam relative to the pump beam and/or an angle of polarization of the pump beam.

26. The method of claim 19, further comprising compensating for phase distortions with an active adaptive optic system of a passive scattering element.

27. The method of claim 19, further comprising directing the optical pulse through active optics.

28. The method of claim 19, further comprising emitting a single pump color from each of the one or more pump pulses.

29. The method of claim 19, further comprising emitting a multi-color pump color from each of the one or more pump pulses.

30. The method of claim 19, further comprising emitting a unique pump color from each of the one or more pump pulses.

31. The method of claim 19, further comprising emitting modulated pump pulses from each of the one or more pump pulses.

32. The method of claim 19, wherein the one section is segmented into four different segments and arranged in parallel and further comprising emitting four different pump pulses upon each of the four segments.

33. The method of claim 19, further comprising emitting a patterned shaped input extraction pulse.

34. The system of claim 1, wherein said transition section is a vacuum transition section without a permanent material surface.

35. The method of claim 19, further comprising emitting the input extraction pulse and the pump pulse on an off-axis propagation path.

36. The method of claim 19, further comprising emitting the input extraction pulse and the pump pulse on a common propagation path.

37. A system for amplifying an output fluence in a stimulated scattering system, the system comprising:
a lookthrough compression arrangement configured to convert an entrance pulse having an entrance fluence $\varepsilon_{ENT}$ to an exit pulse having an exit fluence $\varepsilon_{EXIT}$;
wherein the ratio of the exit fluence $\varepsilon_{EXIT}$ to the entrance fluence $\varepsilon_{EXIT}$ is greater than $10^3$;
wherein the efficiency $\eta$ of conversion of the entrance pulse to the exit pulse is greater than 0.8; and wherein the lookthrough compression arrangement has a small signal gain exponent G less than 30.

38. The system of claim 37, further comprising a parameter for time compression.

39. The system of claim 37, wherein the conversion of the entrance pulse to the exit pulse is effecting by Raman scattering.

40. The system of claim 37, wherein the conversion of the entrance pulse to the exit pulse is effecting by Brillouin scattering.

41. A method for amplifying an output fluence in a stimulated scattering system, the method comprising:
   converting an entrance pulse having an entrance fluence $\varepsilon_{ENT}$ to an exit pulse having an exit fluence $\varepsilon_{EXIT}$;
   wherein the ratio of the exit fluence $\varepsilon_{EXIT}$ to the entrance fluence $\varepsilon_{ENT}$ is greater than $10^3$;
   wherein the efficiency $\eta$ of conversion of the entrance pulse to the exit pulse is greater than 0.8; and
   wherein a small signal gain exponent G less than 30.

42. The method of claim 41, further comprising adjusting for time compression.

43. The method of claim 41, wherein the conversion of the entrance pulse to the exit pulse is effecting by Raman scattering.

44. The method of claim 41, wherein the conversion of the entrance pulse to the exit pulse is effecting by Brillouin scattering.

* * * * *